(12) United States Patent
Short et al.

(10) Patent No.: US 10,978,088 B2
(45) Date of Patent: Apr. 13, 2021

(54) METHODS AND SYSTEMS FOR IMPROVED MEASUREMENT, ENTITY AND PARAMETER ESTIMATION, AND PATH PROPAGATION EFFECT MEASUREMENT AND MITIGATION IN SOURCE SIGNAL SEPARATION

(71) Applicant: XMOS INC., Hampton, NH (US)

(72) Inventors: Kevin M. Short, Durham, NH (US); Brian T. Hone, Ipswich, MA (US); Pascal Brunet, Pasadena, CA (US)

(73) Assignee: XMOS INC., Hampton, NH (US)

( * ) Notice: Subject to any disclaimer, the term of this patent is extended or adjusted under 35 U.S.C. 154(b) by 0 days.

(21) Appl. No.: 16/656,058

(22) Filed: Oct. 17, 2019

(65) Prior Publication Data

US 2020/0058316 A1 Feb. 20, 2020

Related U.S. Application Data

(60) Division of application No. 14/681,922, filed on Apr. 8, 2015, now Pat. No. 10,497,381, which is a
(Continued)

(51) Int. Cl.
*G10L 21/02* (2013.01)
*G10L 21/0272* (2013.01)
(Continued)

(52) U.S. Cl.
CPC ........... *G10L 21/0272* (2013.01); *G01S 3/74* (2013.01); *G01S 7/288* (2013.01); *G01S 13/723* (2013.01);
(Continued)

(58) Field of Classification Search
None
See application file for complete search history.

(56) References Cited

U.S. PATENT DOCUMENTS

| 4,559,605 A | 12/1985 | Norsworthy |
| 5,842,162 A | 11/1998 | Fineberg et al. |

(Continued)

FOREIGN PATENT DOCUMENTS

| EP | 1926321 A1 | 5/2008 |
| JP | 2002168950 A | 6/2002 |

(Continued)

OTHER PUBLICATIONS

T. Virtanen, A. Klapuri; Separation of harmonic sound sources using sinusoidal modeling; Jun. 2009; IEEE URL: https://ieeexplore.ieee.org/document/859072?reload=true (Year: 2000).*

(Continued)

*Primary Examiner* — Richa Mishra
(74) *Attorney, Agent, or Firm* — GTC Law Group PC & Affiliates

(57) ABSTRACT

A method of processing a signal includes taking a signal recorded by a plurality of signal recorders, applying at least one super-resolution technique to the signal to produce an oscillator peak representation of the signal comprising a plurality of frequency components for a plurality of oscillator peaks, computing at least one Cross Channel Complex Spectral Phase Evolution (XCSPE) attribute for the signal to produce a measure of a spatial evolution of the plurality of oscillator peaks between the signal, identifying a known predicted XCSPE curve (PXC) trace corresponding to the frequency components and at least one XCSPE attribute of the plurality of oscillator peaks and utilizing the identified PXC trace to determine a spatial attribute corresponding to an origin of the signal.

6 Claims, 62 Drawing Sheets

Related U.S. Application Data continuation-in-part of application No. 14/179,158, filed on Feb. 12, 2014, now Pat. No. 9,443,535, which is a continuation of application No. 13/886,902, filed on May 3, 2013, now Pat. No. 8,694,306.

(60) Provisional application No. 61/749,606, filed on Jan. 7, 2013, provisional application No. 61/785,029, filed on Mar. 14, 2013, provisional application No. 61/642,805, filed on May 4, 2012, provisional application No. 61/977,357, filed on Apr. 9, 2014.

(51) Int. Cl.

| | |
|---|---|
| G01S 3/74 | (2006.01) |
| G01S 13/02 | (2006.01) |
| G01S 13/72 | (2006.01) |
| G01S 13/88 | (2006.01) |
| G01S 7/288 | (2006.01) |
| G10L 15/25 | (2013.01) |
| H04R 3/00 | (2006.01) |
| G10L 13/02 | (2013.01) |
| G10L 15/26 | (2006.01) |

(52) U.S. Cl.
CPC ............. *G01S 13/88* (2013.01); *G10L 13/02* (2013.01); *G10L 15/26* (2013.01); *H04R 3/00* (2013.01); *G01S 2007/2883* (2013.01)

(56) References Cited

U.S. PATENT DOCUMENTS

| | | | |
|---|---|---|---|
| 6,253,175 | B1 | 6/2001 | Basu et al. |
| 6,381,571 | B1 | 4/2002 | Gong et al. |
| 6,526,378 | B1 | 2/2003 | Tasaki et al. |
| 6,535,666 | B1 | 3/2003 | Dogan et al. |
| 7,454,333 | B2 | 11/2008 | Ramakrishnan et al. |
| 7,457,756 | B1 | 11/2008 | Nelson et al. |
| 7,729,912 | B1 | 6/2010 | Bacchiani et al. |
| 8,638,952 | B2 | 1/2014 | Matsuo et al. |
| 8,694,306 | B1 | 4/2014 | Short et al. |
| 9,443,535 | B2 | 9/2016 | Short et al. |
| 9,495,975 | B2 | 11/2016 | Short et al. |
| 9,728,182 | B2 | 8/2017 | Short et al. |
| 10,410,623 | B2 | 9/2019 | Short et al. |
| 2004/0230428 | A1 | 11/2004 | Choi et al. |
| 2005/0091042 | A1 | 4/2005 | Acero et al. |
| 2005/0156780 | A1 | 7/2005 | Bonthron et al. |
| 2005/0212930 | A1 | 9/2005 | Sim et al. |
| 2006/0053002 | A1 | 3/2006 | Visser et al. |
| 2006/0056647 | A1 | 3/2006 | Ramakrishnan et al. |
| 2006/0153059 | A1 | 7/2006 | Spence et al. |
| 2006/0269057 | A1 | 11/2006 | Short et al. |
| 2008/0228470 | A1 | 9/2008 | Hiroe et al. |
| 2009/0222259 | A1 | 9/2009 | Kida et al. |
| 2010/0302971 | A1 | 12/2010 | Walker et al. |
| 2010/0322437 | A1 | 12/2010 | Matsuo et al. |
| 2011/0035215 | A1 | 2/2011 | Sompolinsky et al. |
| 2012/0226691 | A1 | 9/2012 | Edwards |
| 2014/0079248 | A1 | 3/2014 | Short et al. |
| 2014/0163991 | A1 | 6/2014 | Short et al. |
| 2014/0316771 | A1 | 10/2014 | Short et al. |
| 2015/0287422 | A1 | 10/2015 | Short |
| 2015/0348536 | A1 | 12/2015 | Ando |
| 2016/0071528 | A9 | 3/2016 | Short et al. |
| 2016/0284343 | A1 | 9/2016 | Short et al. |
| 2017/0004844 | A1 | 1/2017 | Short et al. |
| 2017/0301343 | A1 | 10/2017 | Short et al. |

FOREIGN PATENT DOCUMENTS

| | | | |
|---|---|---|---|
| JP | 2005229453 | A | 8/2005 |
| JP | 2009089315 | A | 4/2009 |
| JP | 2009533912 | A | 9/2009 |
| JP | 2011007861 | A | 1/2011 |
| KR | 101001839 | B1 | 12/2010 |
| RU | 2216052 | C2 | 11/2003 |
| WO | 2003041052 | A1 | 5/2003 |
| WO | 2005029467 | A1 | 3/2005 |
| WO | 2007118583 | A1 | 10/2007 |
| WO | 2013166439 | A1 | 11/2013 |
| WO | 2014145960 | A2 | 9/2014 |
| WO | 2014145960 | A3 | 3/2015 |
| WO | 2015157458 | A1 | 10/2015 |

OTHER PUBLICATIONS

Kevin M. Short, Ricardo A. Garcia; Signal Analysis Using the Complex Spectral Phase Evolution (CSPE) Method; May 2006; URL:http://jssunderlin.pbworks.com/f/13449.pdf (Year: 2006).*

Ngoc Q K Duong ,Emmanuel Vincent; Under-Determined Reverberant Audio Source Separation Using a Full-Rank Spatial Covariance Model; Dec. 2009; URL:file:///C:/Users/rmishra/Downloads/0912.0171%20(1).pdf (Year: 2009).*

13784390.0, "European Application Serial No. 13784390.0, Extended European Search Report dated Mar. 16, 2016", Kaonyx Labs LLC, 9 Pages.

14763371.3, "European Application Serial No. 14763371.3, Extended European Search Report dated Jul. 27, 2017", Setem Technologies, Inc., 9 Pages.

Dognin, "A Bandpass Transform for Speaker Normalization", Ph.D. Dissertation, University of Pittsburgh 2003, Dissertation Abstracts International Section B: The Sciences and Engineering, URL:http://d-scholarship.pitt.edu/8926/1/Dissertation_Pierre_L_Dognin23July200. pdf [retrieved on Jun. 23, 2017], 2004, 94 pages.

Duong, et al., "Under-Determined Reverberant Audio Source Separation Using a Full-Rank Spatial Covariance Model", IEEE Transactions on Audio, Speech and Language Processing. IEEE Service Center, New York, NY. USA. vol. 18, No. 7, Sep. 1, 2010, Sep. 1, 2010, pp. 1830-1840.

Fujimoto, et al., "Estimation and tracking of fundamental, 2nd and 3d harmonic frequencies for spectrogram normalization in speech recognition", Bulletin of the Polish Academy of Sciences. Technical Sciences, vol. 60, No. 1, 2012, pp. 71-81.

Glavitsch, "Speaker normalization with respect to F0, a perceptual approach", Eidgenossische Technische Hochschule Zurich Swiss Federal Institute of Technology Zurich, TIK-Report Nr, 185 URL:http://www.tik.ee.ethz.ch/spr/publications/Glavitsch:03_report.pdf [retrieved on Jun. 23, 2017], Dec. 22, 2003, 12 pages.

Nelson, "Applications of Surface Correlation to the Estimation of the Harmonic Fundamental of Speech", EURASIP Journal on Applied Signal Processing, 2002, pp. 1, 80-86.

Nelson, "Cross-spectral methods for processing speech", J. Acoust. Soc. Am., vol. 110, No. 5, Pt. 1, Nov. 2001, pp. 2575-2592.

PCT/US2013/039544, "International Application Serial No. PCT/US2013/039544, International Preliminary Report on Patentabiliy With Written Opinion dated Nov. 13, 2014", Kaonyx Labs LLC, 7 Pages.

PCT/US2013/039544, "International Application Serial No. PCT/US2013/039544, International Search Report and Written Opinion dated Sep. 27, 2013", 10 pages.

PCT/US2014/030819, "International Application Serial No. PCT/US2014/030819, International Preliminary Report on Patentability and Written Opinion dated Sep. 15, 2015", Setem Technologies, Inc., 4 Pages.

PCT/US2014/030819, "International Application Serial No. PCT/US2014/030819, International Search Report and Written Opinion dated Jan. 15, 2015", Setem Technologies, Inc., 5 Pages.

PCT/US2015/024988, "International Application Serial No. PCT/US2015/024988, International Search Report dated Jun. 30, 2015", Kaonyx Labs, LLC, 9 pages.

PCT/US2015/024988, "International Application Serial No. PCT/US2015/024988, International Preliminary Report on Patentability and Written Opinion dated Oct. 20, 2016", Setem Technologies, Inc., 6 Pages.

(56) References Cited

OTHER PUBLICATIONS

Short, et al., "Multichannel Audio Processing Using a Unified-Domain Representation", J. Audio Eng. Soc., vol. 55, No. 3, Mar. 2007 (Mar. 1, 2007), pp. 156-165.

Short, et al., "Signal Analysis Using the Complex Spectral Phase Evolution (CSPE) Method", Audio Engineering Society, Convention Paper 6645, Presented at the 120th Convention, Paris, France URL: http://jssunderlin.pbworks.com/f/13449.pdf, May 20-23, 2006, 13 pages.

Virtanen, et al., "Separation of Harmonic Sound Sources Using Sinusoidal Modeling", 2013 IEEE International Conference on Acoustics, Speech and Signal Processing (ICASSP); Vancouver, BC; May 26-31, 2013, vol. 2., Jun. 5, 2000 (Jun. 5, 2000), pp. 765-768.

\* cited by examiner

| Take a signal recorded by a plurality of signal recorders. | 6100 |

| Apply at least one super-resolution technique to the signal to produce an oscillator peak representation of the signal comprising a plurality of frequency components for a plurality of oscillator peaks. | 6102 |

| Compute at least one Cross Channel Complex Spectral Phase Evolution (XCSPE) attribute for the signal to produce a measure of a spatial evolution of the plurality of oscillator peaks between the signal recorders. | 6104 |

| Identify a known predicted XCSPE curve (PXC) trace corresponding to the frequency components and at least one XCSPE attribute of the plurality of oscillator peaks. | 6106 |

| Utilize the identified PXC trace to determine a spatial attribute corresponding to an origin of the signal. | 6108 |

Fig. 61

```
┌─────────────────────────────────────────────────────────┐
│   Take a signal recorded by a plurality of signal recorders.  │──── 6200
└─────────────────────────────────────────────────────────┘
                              │
┌─────────────────────────────────────────────────────────┐
│ Apply at least one super-resolution technique to the signal │
│ to produce an oscillator peak representation of the signal  │──── 6202
│ comprising a plurality of frequency components for a        │
│             plurality of oscillator peaks.                  │
└─────────────────────────────────────────────────────────┘
                              │
┌─────────────────────────────────────────────────────────┐
│   Compute at least one Cross Channel Complex Spectral       │
│ Phase Evolution (XCSPE) attribute for the signal to produce │──── 6204
│ a measure of a spatial evolution of the plurality of oscillator │
│         peaks between the signal recorders.                 │
└─────────────────────────────────────────────────────────┘
                              │
┌─────────────────────────────────────────────────────────┐
│ Identify a known predicted XCSPE curve (PXC) trace          │
│ corresponding to the frequency components and at least      │──── 6206
│ one XCSPE attribute of the plurality of oscillator peaks.   │
└─────────────────────────────────────────────────────────┘
                              │
┌─────────────────────────────────────────────────────────┐
│ Measure deviations away from the PXC trace of a plotted     │──── 6208
│    position for each of the plurality of oscillator peaks.  │
└─────────────────────────────────────────────────────────┘
                              │
┌─────────────────────────────────────────────────────────┐
│ Determine a path propagation effect (PPE) based, at least in │
│ part, on the deviations and an amount of reverberation in   │──── 6210
│                  the original signal.                       │
└─────────────────────────────────────────────────────────┘
```

Fig. 62

METHODS AND SYSTEMS FOR IMPROVED MEASUREMENT, ENTITY AND PARAMETER ESTIMATION, AND PATH PROPAGATION EFFECT MEASUREMENT AND MITIGATION IN SOURCE SIGNAL SEPARATION

CROSS-REFERENCE TO RELATED APPLICATIONS

This application is a divisional of U.S. application Ser. No. 14/681,922, filed Apr. 8, 2015.

U.S. application Ser. No. 14/681,922 is a continuation-in-part of U.S. application Ser. No. 14/179,158, filed Feb. 12, 2014, now U.S. Pat. No. 9,443,535. U.S. application Ser. No. 14/179,158 is a continuation of U.S. application Ser. No. 13/886,902, filed May 3, 2013, now U.S. Pat. No. 8,694,306, which claims the benefit of U.S. provisional patent application Ser. No. 61/749,606 filed Jan. 7, 2013, U.S. provisional patent application Ser. No. 61/785,029 filed Mar. 14, 2013, and U.S. provisional patent application Ser. No. 61/642,805 filed May 4, 2012.

U.S. application Ser. No. 14/681,922 claims the benefit of U.S. provisional patent application Ser. No. 61/977,357 filed Apr. 9, 2014.

All of the above applications are incorporated herein by reference in their entirety.

BACKGROUND

Field of the Invention

The present invention relates to methods and systems for signal processing and, more specifically, to methods and systems for separating a signal into different components.

Description of the Related Art

Signal separation (SS) is a separation of any digital signal originating from a source into its individual constituent elements, such that those elements may be deconstructed, isolated, extracted, enhanced, or reconstituted in isolation, in part, or in whole. SS may be performed on any form of data including auditory data and/or visual data or images. SS may be performed using a plurality of source dependent methodologies including principal components analysis, singular value decomposition, spatial pattern analysis, independent component analysis (ICA), computational auditory scene analysis (CASA) or any other such technique.

Conventional SS techniques typically require prohibitive amounts of processing to achieve real or near real time performance and are thus far quite often incapable of effectively identifying and isolating signal sources within a given signal. There is therefore a need for a system and algorithms for operating such a system that provides for real or near real time signal separation.

SUMMARY OF THE INVENTION

The methods and systems for SS in accordance with various embodiments disclosed herein are source-agnostic. The nature of the original signal is generally irrelevant with respect to generation methodology or apparatus. Signal sources to which SS systems and methods may be applied include but are not limited to sound, audio, video, photographic, imaging (including medical), communications, optical/light, radio, RADAR, sonar, sensor and seismic sources. The methods and systems described herein may include a set of source agnostic systems and methods for signal separation. These include methods of high-resolution signal processing to mathematically describe a signal's constituent parts, methods of tracking and partitioning to identify portions of a signal that are "coherent"—i.e., emanating from the same source—and methods to re-combine selected portions, optionally in the original signal format, and/or sending them directly to other applications, such as a speech recognition system.

In accordance with another exemplary and non-limiting embodiment, a method of processing a signal comprises receiving a plurality of signal streams each comprising a substantial amount of ambient noise or interfering signals and creating first and second sets of input sample windows each corresponding to one of the plurality of signal streams, wherein an initiation of the second set of input samples time lags an initiation of the first set of input samples, multiplying the first and second sample windows by an analysis window, converting the first and second input sample windows to a frequency domain and storing the resulting data, performing complex spectral phase evolution (CSPE) on the frequency-domain data to estimate component frequencies of the data set at a resolution greater than the fundamental transform resolution, using the component frequencies estimated in the CSPE, sampling a set of stored high resolution windows to select a high resolution window that fits at least one of the amplitude, phase, amplitude modulation and frequency modulation of the underlying signal component, using a tracking algorithm to identify at least one tracklet of oscillator peaks that emanate from a single oscillator source within the underlying signal, grouping tracklets that emanate from a single source, rejecting tracklets that are likely to be associated with noise or interfering signals, selecting at least one grouping of tracklets, reconstructing a signal from the selected groupings of tracklets and providing the signal as an output.

In accordance with an exemplary and non-limiting embodiment, a method of processing a signal comprises taking a signal recorded by a plurality of signal recorders, applying at least one super-resolution technique to the signal to produce an oscillator peak representation of the signal comprising a plurality of frequency components for a plurality of oscillator peaks, computing at least one Cross Channel Complex Spectral Phase Evolution (XCSPE) attribute for the signal to produce a measure of a spatial evolution of the plurality of oscillator peaks between the signal recorders, identifying a known predicted XCSPE curve (PXC) trace corresponding to the frequency components and at least one XCSPE attribute of the plurality of oscillator peaks and utilizing the identified PXC trace to determine a spatial attribute corresponding to an origin of the signal.

In accordance with an exemplary and non-limiting embodiment a method of processing a signal comprises taking a signal recorded by a plurality of signal recorders, applying at least one super-resolution technique to the signal to produce an oscillator peak representation of the signal comprising a plurality of frequency components for a plurality of oscillator peaks, computing at least one Cross Channel Complex Spectral Phase Evolution (XCSPE) attribute for the signal to produce a measure of a spatial evolution of the plurality of oscillator peaks between the signal recorders and a measured time of flight of the plurality of oscillator peaks, identifying a known predicted XCSPE curve (PXC) trace corresponding to the frequency components and at least one XCSPE attribute of the plurality of oscillator peaks, measuring deviations away from the PXC trace of a plotted position for each of the plurality of oscillator peaks and determining a path propagation effect (PPE) based, at least in part, on the deviations and an amount of reverberation in the original signal.

BRIEF DESCRIPTION OF THE FIGURES

In the figures, which are not necessarily drawn to scale, like numerals may describe substantially similar components throughout the several views. Like numerals having different letter suffixes may represent different instances of substantially similar components. The figures illustrate generally, by way of example, but not by way of limitation, certain embodiments discussed in the present document.

FIG. 61 is an illustration of a method according to an exemplary and non-limiting embodiment.

FIG. 62 is an illustration of a method according to an exemplary and non-limiting embodiment.

DETAILED DESCRIPTION

Figure 1:
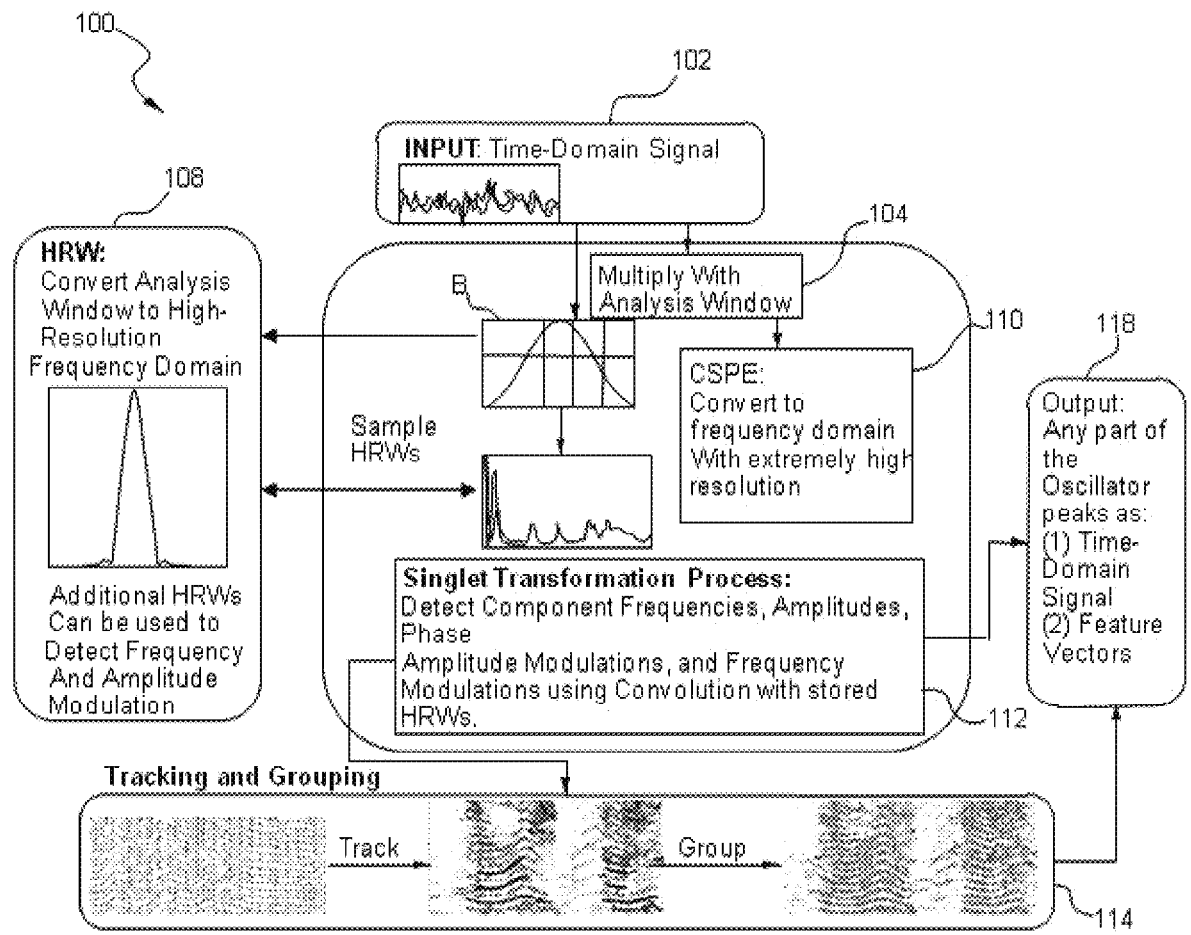
FIG. 1 is an illustration of a signal extraction process according to an exemplary and non-limiting embodiment.

FIG. 1 illustrates an exemplary and non-limiting embodiment of a method 100 for source signal separation. In an example, a representative input signal may be a source signal (SS) including an audio signal/sound as an input to the system such that the SS is a source agnostic and may be used with respect to any type of source signal. Other representative input signals may include but are not limited to ambient sound, audio, video, speech, image, communication, geophysical, SONAR, RADAR, thermal, optical/light, medical, and musical signals. The method 100 may include one or more steps that may be used in combination or in part to analyze the SS, separate the SS into its constituent elements, and then reconstitute the SS signal in whole or in part.

As shown in FIG. 1, the method 100 may be configured to select a signal at step 102 so as to process the signal for the signal separation. In an example, contiguous samples (referred to herein as "windows" or "sample windows" that may represent windows of samples in time) may be selected for analysis. Typically, multiple windows may be selected with a small time-delay between them. Further, at step 104, the method 100 may be configured to multiply the SS (i.e., in the form of contiguous samples) with an analysis window such as a window B1 as illustrated in FIG. 1. The analysis window may also be referred to herein as a taper.

At step 108, a high resolution window (HRW) such as a HRW C1 may be created. Further, a copy of the analysis window used for signal preparation may be converted to a high-resolution frequency domain and stored for oscillator peak analysis. Optionally, sets of HRWs may be stored that have amplitude and frequency modulation effects added therein. At step 110, a conversion to Frequency Domain and Complex Spectral Phase Evolution (CSPE) high-resolution frequency estimate may be performed. In an example, time-domain windows are converted to the frequency domain via a transform, such as a Fast Fourier Transform (FFT), the Discrete Fourier Transform (DFT) the Discrete Cosine Transform (DCT) or other related transform. The accuracy of frequency estimates created by such transforms may be conventionally limited by the number of input samples. The CSPE transform overcomes these limitations and provides a set of highly accurate frequency estimates. In particular, the CSPE calculation uses the phase rotation measured between the transforms of two time-separated sample windows to detect the actual underlying frequency.

At step 112, the method 100 may be configured to identify oscillator peak parameters via a Singlet Transform Process. Specifically, high resolution windows (HRWs) are sampled to select the HRW with the most accurate fit to estimate the amplitude, phase, amplitude modulation and frequency modulation of the underlying signal component using high accuracy frequency estimates that are provided by the CSPE calculation. In some embodiments, one may remove the effects of this component so that estimates of nearby oscillators may become more accurate. The singlet transform process may be reversed to re-produce portions of or the entire original frequency domain signal. At step 114, the method 100 may be configured to perform tracking and grouping. In an example, the tracking may be performed to identify oscillator peaks that may emanate from a single oscillator using tracking algorithms, such as a single harmonic produced by a musical instrument or a person's voice. A set of oscillator peaks that has been determined to be emanating from a single source is called a tracklet. In an example, the grouping may be performed to identify tracklets that emanate from a single source. For example, such a grouping can include multiple harmonics of a single musical instrument or person's voice. A set of tracklets that has been determined to be emanating from a single source is called a coherent group.

At step 118, the oscillator peaks may be output at any stage after the singlet transform process. Further, the information gathered in the tracking and grouping stages may be used to select a set of desired oscillator peaks. In an example, some or all oscillator peaks may be converted accurately into some or all of the original signal formats using the singlet transform process. In another example, some or all oscillator peaks may be converted into another format, such as a feature vector that may be used as an input to a speech recognition system or may be further transformed through a mathematical function directly into a different output format. The above steps may be used to analyze, separate and reconstitute any type of signal. The output of this system may be in the same form as the original signal or may be in the form of a mathematical representation of the original signal for subsequent analysis.

As used herein in the detailed description, a "frequency-phase prediction" is a method for predicting the frequency and phase evolution of a tracklet composed of oscillator peaks. As used herein, a "feature vector" is a set of data that has been measured from a signal. In addition, commonly feature vectors are used as the input to speech recognition systems. As used herein, "Windowed transform" refers to pre-multiplying an original sample window by a "taper" or windowing function (e.g., Hanning, Hamming, boxcar, triangle, Bartlett, Blackman, Chebyshev, Gaussian and the like) to shape spectral peaks differently. As used herein, "Short" refers, generally, to a finite number of samples that is appropriate to a given context and may include several thousand or several hundreds of samples, depending on the sample rate, such as in a Short Time Fourier Transform (STFT). For example, an audio CD includes 44100 samples per second, so a short window of 2048 samples is still only about $\frac{1}{20}$th of a second. As used herein a "tracklet" refers to a set of oscillator peaks from different frames that a tracker has determined to be from the same oscillator. As used herein, a "Mahalanobis Distance" refers to a well-known algorithm in the art for measuring the distance between two multi-dimensional points that takes uncertainty measures into account. This algorithm is commonly used in tracking applications to determine the likelihood that a tracklet and a measurement should be combined or assigned to the same source or same tracklet. As used herein, "tracklet association" refers to a method for determining which new measurements should be combined with which existing tracklets. As used herein, "greedy association" refers to an algorithm known in the art for performing tracklet association. As used herein, "partitioning" refers to a method for dividing tracklets into distinct groups. Generally these groups will correspond to distinct sound emitters, such as a person speaking. As used herein, a "union find" is an algorithm known in the art for partitioning. As used herein, a "coherent group" refers to a set of tracklets that have been determined to be from the same signal emitter, such as a person speaking. As used herein, a "Mel Frequency Complex Coefficient" is a well-known type of feature commonly used as the input to speech recognition systems.

In accordance with one or more embodiments, the methods and systems for SS disclosed herein may facilitate separation of a source signal into a plurality of signal elements. The methods and systems described herein may be used in whole or in part to isolate and enhance individual elements in the source signal. The systems and methods may be applied to generally any signal source to achieve signal separation.

In accordance with one or more embodiments, the methods and systems for SS may facilitate execution of a series of algorithms that may be used in part or in combination to perform signal separation and enhancement. The series of algorithms may be implemented in hardware, software, or a combination of hardware and software.

In accordance with one or more embodiments, the methods and systems for SS may be configured to a pre-processor that may be a single-channel or a multi-channel, and a super-resolution module that may be a single-channel or a multi-channel. In accordance with one or more embodiments, the methods for SS may include a family of methods that may be based on Complex Spectral Phase Evolution, including methods for short-time stable sinusoidal oscillations, short-time linear frequency modulation methods, time-varying amplitude modulation methods, joint amplitude and frequency modulation methods, and a Singlet Representation method. As used herein, FM-CSPE refers to the specific methods within the family of CSPE methods that apply to frequency modulating signals. Similarly, AM-CSPE refers to the specific methods within the family of CSPE methods that apply to amplitude modulating signals.

The methods and systems for SS described herein can provide one or more of the following advantages. For example, the methods and systems may facilitate extraction of interfering elements from the source signal separately and unwanted elements may be removed from the source signal. In an example, targeted elements of the source signal may be extracted or isolated without corrupting the targeted element using the methods and systems for SS. In another example, overlapping signal elements within the same frequency range may be independently extracted and enhanced despite the convolution effects of the measurement process (also known as "smearing" or the "uncertainty principle"). The methods and systems for SS as described herein may facilitate provisioning of a detailed analysis of the source signal due to an increase in an accuracy of the processing techniques of the methods and systems for SS disclosed herein with respect to current processing techniques.

In accordance with one or more embodiments, the methods and systems for SS may be configured to include a signal component tracker that may be configured to implement a method for grouping signal components in time, and/or by harmonics, and/or by other similarity characteristics to identify coherent sources. In accordance with one or more embodiments, the methods and systems for SS may be configured to include a coherent structure aggregator and a coherent structure selector/separator such that the coherent structure selector/separator may be configured to implement a method for identifying coherent structures for extraction, isolation, enhancement, and/or re-synthesis. In accordance with one or more embodiments, the methods and systems may be configured to include a unified domain transformation and unified domain complex spectral phase evolution (CSPE) such as to combine multiple signal channels into a single mathematical structure and to utilize a version of the CSPE methods designed to work in the unified domain. The methods and systems for SS may be configured to include a re-synthesis module that may facilitate generation of a frequency domain signal from a set of oscillator peaks. The re-synthesis module may be implemented using a single-channel or a multi-channel module.

In accordance with one or more embodiments, the SS system may be configured to include a multi-channel pre-processor, a multi-channel super-resolution module, a tracker/aggregator/selector/separator, and a multi-channel re-synthesis module. In accordance with one or more embodiments, the methods for SS may be configured to include one or more of the operations such as a complex spectral phase evolution (CSPE), a singlet representation method, a unified domain transformation, a unified domain complex spectral phase evolution, a signal component tracking, a coherent structure aggregation, a coherent structure separation, a coherent structure reconstruction in the time domain, an ambient signal remixing or reconstitution and other operations.

The CSPE operation may refer to a method for overcoming the accuracy limitations of the Fast Fourier Transform (FFT) or Discrete Fourier Transform (DFT). The CSPE operation may improve an accuracy of FFT-based spectral processing, in some embodiments from 21.5 Hz to the order of 0.1 Hz. In some embodiments, the accuracy may be better than 0.1 Hz. In accordance with one or more embodiments, the CSPE operations may be configured to include short-time stable sinusoidal oscillation methods, short-time linear frequency modulation methods, time-varying amplitude modulation methods, and joint amplitude and frequency modulation methods.

The singlet representation method refers to a method by which a short-time stable or quasi-stable oscillator may be projected into a frequency domain signal or extracted from a frequency domain signal. In an example, the oscillator may refer to any source of oscillation, including but not limited to a sinusoidal oscillation, a short-time stable oscillation of any duration, a quasi-stable oscillation, or a signal that may be created to a desired degree of accuracy by a finite sum of such oscillators. The singlet transformation or singlet representation may include information on an amplitude, phase and (super-resolution) frequency of the oscillator, along with information about the smearing characteristics of the oscillator that may indicate the degree of interference with other signal elements. Further, the singlet representation can include information about the smearing and interference characteristics as a function of the number of decibels of interference in a given frequency bin of the original FFT or DFT. In some embodiments, the singlet representation may include information about the (super-resolution) frequency modulation, amplitude modulation and joint frequency-amplitude modulation characteristics.

The unified domain transformation may refer to a method for combining multiple signal channels into a single mathematical structure and the unified domain complex spectral phase evolution may refer to a version of the CSPE methods designed to work in the Unified Domain. The signal component tracking may refer to a method for grouping signal components in time, and/or by harmonics, and/or by other similarity characteristics to identify coherent sources. The coherent Structure Separation may refer to a method for identifying coherent structures for extraction, isolation, enhancement, and/or re-synthesis and the coherent structure reconstruction may refer to a method for creating a frequency domain or time domain signal that is composed of selected oscillator peaks. The ambient signal remixing or reconstitution may refer to a method for adding the original signal (or an amplified or attenuated version of the original signal) to the signal created by coherent structure reconstruction in the time domain to generate a signal having certain desirable characteristics. In an example, an output may include coherent structure reconstruction in the time domain, an ambient signal remixing or reconstitution, feature vector creation and automatic translation from mathematical representation to other output formats.

Figure 2:
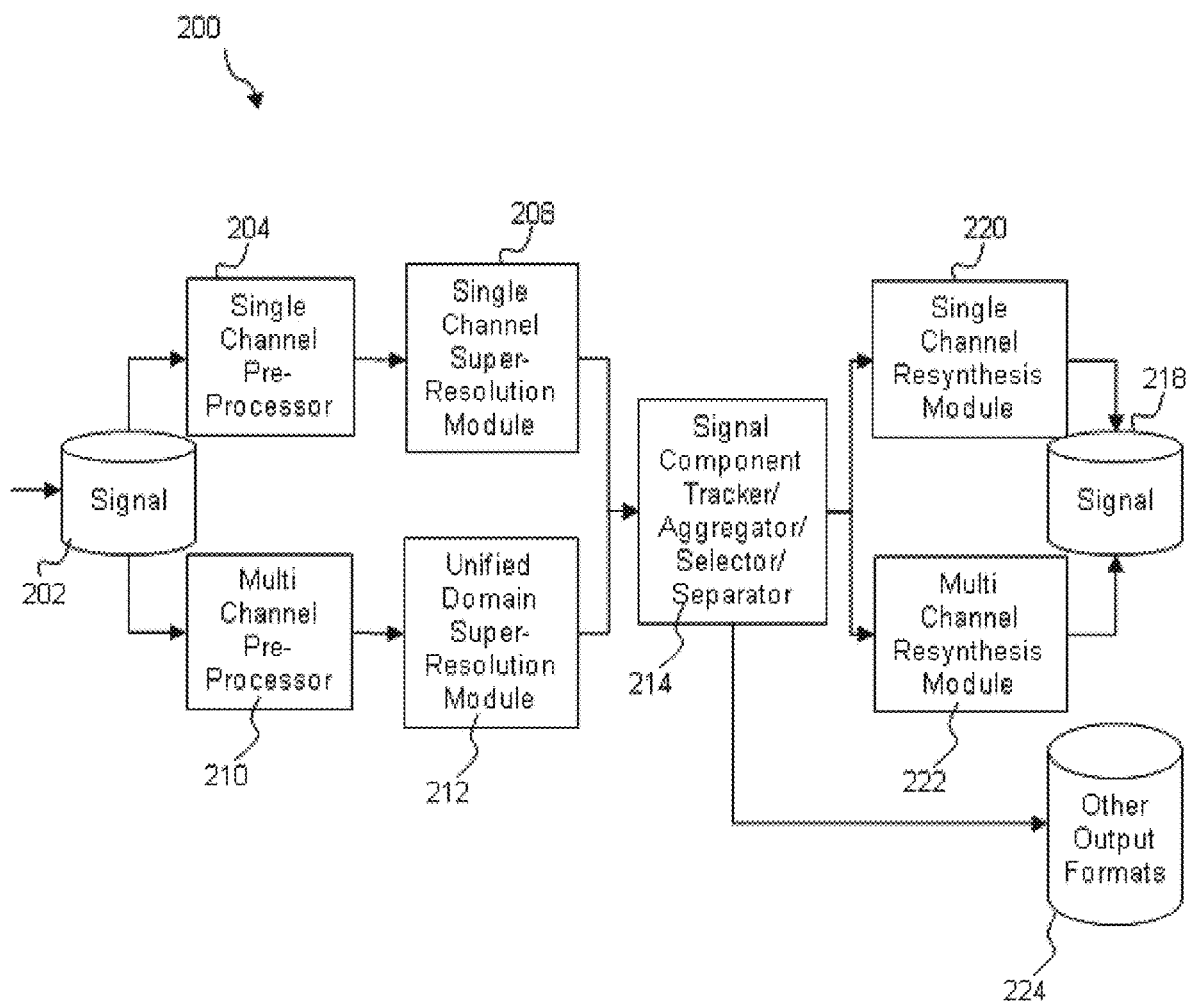
FIG. 2 illustrates signal extraction processing steps according to an exemplary and non-limiting embodiment.

FIG. 2 illustrates an embodiment of a SS system 200 that may be configured to separate the source signal 202 into the plurality of elements. In accordance with one or more embodiments, the SS system 200 may be configured to include one or more components such as a single channel pre-processor 204, a single channel super-resolution module 208, a multi-channel pre-processor 210, multi-channel super-resolution module 212, tracker/aggregator/selector/separator 214, single channel re-synthesis module 220, and a multi-channel re-synthesis module 222. These components may be implemented in hardware, software, or programmable hardware such as a Field Programmable Gate Array (FPGA).

The single channel pre-processor 204 may facilitate in pre-processing (e.g., preparation) of a single-channel time domain signal that may be processed by the single channel super-resolution module. The single channel super-resolution module 208 may facilitate in detection of a set of oscillator peaks in a signal that has been prepared by the single channel pre-processor. The multi-channel pre-processor 210 may facilitate in pre-processing (e.g., preparation) of a multi-channel time domain signal that may be processed by the multi-channel super-resolution module 212. The multi-channel super-resolution module 212 may facilitate in detection of a set of oscillator peaks in signal that has been prepared by the multi-channel pre-processor. In one or more embodiments, the single channel or the multi-channel pre-processors may be combined such as to operate as a single component of the system.

The tracker/aggregator/selector/separator ("TASS") 214 may be configured to group, separate, and/or select the subset of oscillator peaks. The single channel re-synthesis module 220 may be configured to produce a frequency domain signal from the set of oscillator peaks. The multi-channel re-synthesis module 222 may be configured to produce a multi-channel frequency domain signal from the set of oscillator peaks, including any number of channels. In one or more embodiments, the re-synthesis may be described as being produced by the single channel module or the multi-channel module, but these may be combined such as to operate as a single component of the system.

In accordance with one or more embodiments, the system 200 may be configured to utilize or include varying forms of algorithms, implemented in hardware, software or a combination thereof, customized for specific applications including but not limited to audio, video, photographic, medical imaging, cellular, communications, radar, sonar, and seismic signal processing systems. As illustrated in FIG. 2, a signal 202 may be received. The signal 202 may include data associated with a live-feed such as ambient sound, or prerecorded data, such as a recording of a noisy environment. The received signal 202 may be categorized as a single channel signal or a multi-channel signal. If the signal 202 has a single channel of data, such as a mono audio signal, the data associated with the signal 202 may be converted to the frequency domain with the single channel pre-processor 204. Further, one or more oscillator peaks may be identified in the frequency domain signal using the single channel super resolution module 208.

Conversely, the signal 202 may be converted to the frequency domain using the multi-channel processor 210 if the signal has multiple channels of data, such as a stereo audio signal. Further, the frequency domain signal may be communicated to the unified domain super resolution module 212 where a unified domain transformation of the frequency data may be performed and (super-resolution) oscillator peaks in the unified domain frequency data may be identified.

In accordance with one or more embodiments, TASS module 214 may be utilized to identify discrete signal sources by grouping peaks and to aggregate oscillator peaks to isolate desired discrete sources. The TASS module 214 may be configured to select one or more coherent groups from the aggregated oscillator peaks. Accordingly, the one or more coherent groups of peaks may be separated and delivered as an output in one or more formats to one or more channels.

In accordance with one or more embodiments, an output signal may be re-synthesized using the components as illustrated in FIG. 2. As an example and not as a limitation, the oscillator peaks may be converted to a re-synthesized signal 218 using the single channel re-synthesis module 220 if the source signal 202 is an originally single-channel signal. The re-synthesized signal 218 may also be referred herein to as a single channel signal generated using the single channel re-synthesis module 220. Similarly, the oscillator peaks may be converted to generate the re-synthesized signal 218 using the multi-channel re-synthesis module 222 if the source signal 202 is an originally multi-channel signal. The re-synthesized signal 218 may also be referred herein to as a multi-channel signal when generated using the multi-channel re-synthesis module 222. As illustrated, signal information may be outputted in the compact form of the analysis parameters; and/or the signal may be outputted directly into another format, such as one that can be achieved by a mathematical transformation from, or reinterpretation of, the analysis parameters. In other embodiments, the signal information may be outputted as feature vectors that may be passed directly to another application, such as a speech recognizer or a speaker identification system.

In accordance with one or more embodiments, the single channel pre-processor 204 may be configured to facilitate preparation of single channel time domain signal data for processing by the Single Channel CSPE super resolution techniques using the single channel super resolution module 208. The input to the single channel pre-processor 204 is a single-channel time-domain signal that may be a live feed or a recorded file. In an example, a multi-channel data streams are processed by the multi-channel pre-processor 210 that may be configured to process at least more than one channels of the multi-channel data stream.

Conventional signal analysis systems generally use the DFT or FFT or the Discrete Cosine Transform (DCT) or related transform to convert time-domain signal data to the frequency-domain for signal analysis and enhancement. The techniques employed in the methods and systems for SS as disclosed herein may be configured to facilitate pre-processing of the signal 202 using two (or more) FFTs as building blocks, where the time-domain input to the second (or more) FFT is a set of samples that are time delayed with respect to the input to the first FFT.

Figure 3:
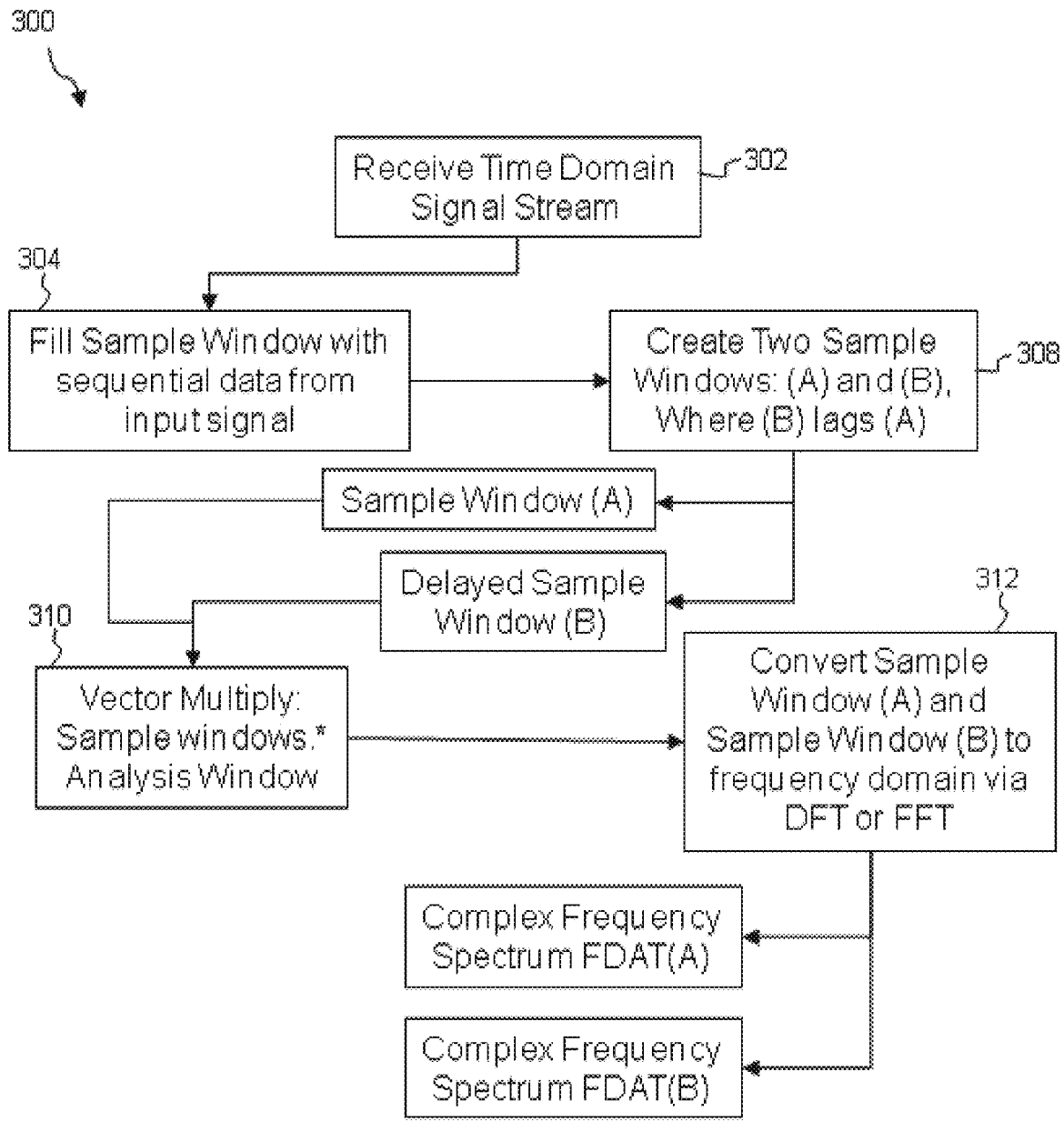
FIG. 3 illustrates a method for pre-processing the source signal using a single channel pre-processor according to an exemplary and non-limiting embodiment.

FIG. 3 illustrates an example embodiment of a method 300 for pre-processing the signal 202 using the single channel pre-processor 204. As illustrated, at step 302, the time domain signal stream may be received by the single channel pre-processor 204. At step 304, a sample window may be filled with n sequential samples of an input signal such as the signal 202. At step 308, two sampled windows such as a sample window A and a sample window B may be created. In an example, a size of the sample window A and a number of samples in the sample window A may overlap with subsequent and previous sample windows that may be specified by the user in a parameter file, or may be set as part of the software or hardware implementation. In an example, the sample window B may be referred herein to as a time-delayed sample window such that the sample windows A and B may offset in time and the sample window B may lag with sample window A.

At step 310, an analysis window (referred to herein as a taper) may be applied to the sample window A and sample window B such as to create a tapered sample window A and a tapered sample window B respectively. In an example, the analysis window may be applied using a Hadamard product, whereby two vectors are multiplied together pair wise in a term-by-term fashion. The Hadamard/Schur product is a mathematical operation that may be defined on vectors, matrices, or generally, arrays. When two such objects may have the same shape (and hence the same number of elements in the same positions), then the Hadamard/Schur product is defined as the element-by-element product of corresponding entries in the vectors, matrices, or arrays, respectively. This operation is defined, for instance, in a Matlab programming language to be the operator designated by "*", and in the text below it will be represented either as or as the operator "⊙" in equations below. As an example, if two vectors are defined as $v_1$=[a,b,c,d] and $v_2$=[e,f,g,h], then the Hadamard/Schur product would be the vector $v_1 \odot v_2$=[ae, bf, cg, dh]. In another example, the analysis window may be chosen to be a standard windowing function such as the Hanning window, the Hamming window, Welch window, Blackman window, Bartlett window, Rectangular/Boxcar window, or other standard windowing functions, or other similar analysis window of unique design. At step 312, the tapered sample windows A and B may be converted to a frequency domain using a DFT or FFT or the Discrete Cosine Transform (DCT) or related transform. As a result, FDAT (A) and FDAT (B) may be generated on conversion such that the FDAT (A) and FDAT (B) are in a complex form.

Figure 4:
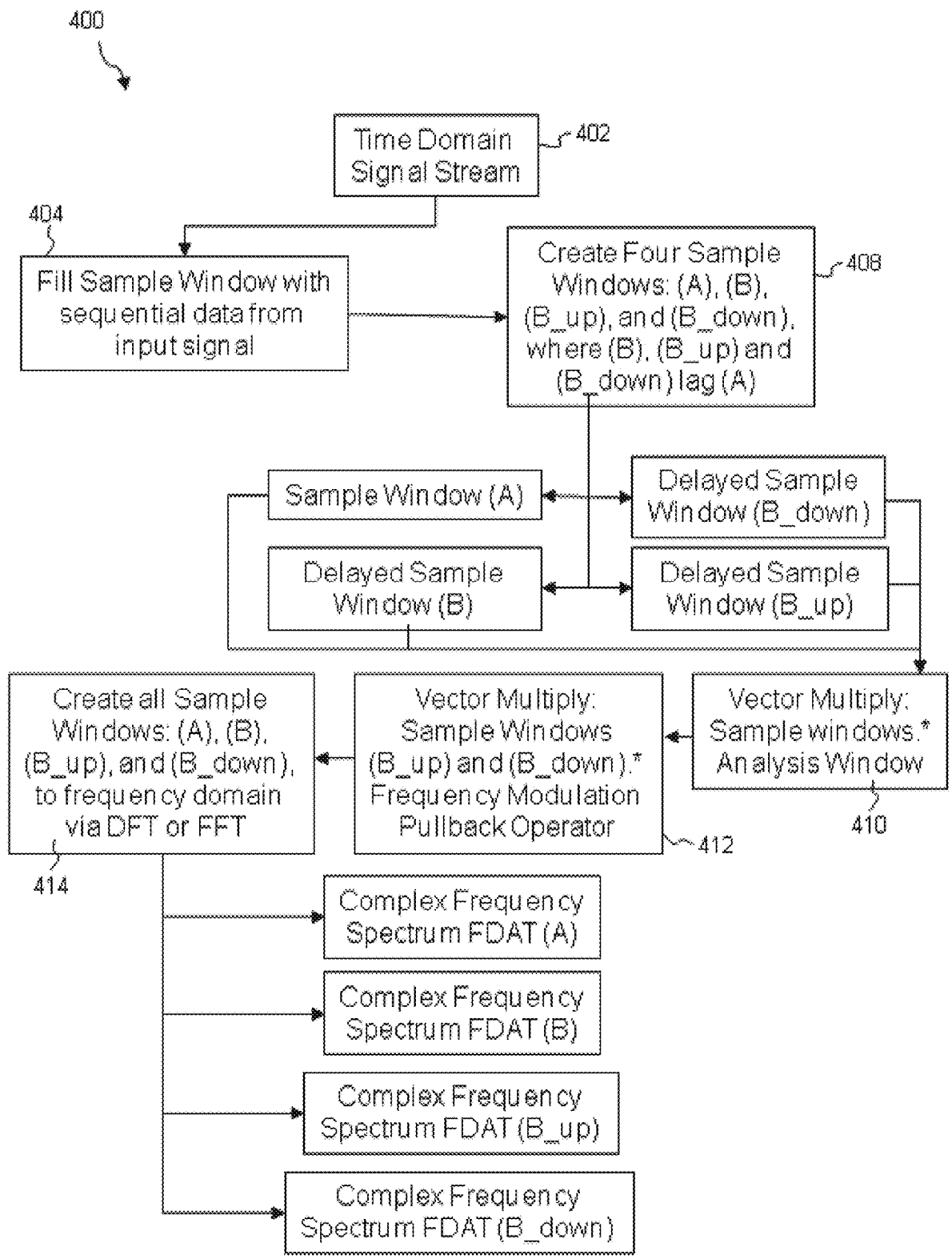
FIG. 4 illustrates a method for pre-processing the source signal using the single channel pre-processor to detect frequency modulation within the signal according to an exemplary and non-limiting embodiment.

FIG. 4 illustrates an example embodiment of a method 400 for pre-processing the signal 202 using the single channel pre-processor 204 when frequency modulation detection is required. As illustrated, at step 402, the time domain signal stream may be received by the single channel pre-processor 204. At step 404, a sample window may be filled with n sequential samples of an input signal such as the signal 202. At step 408, four sampled windows such as a sample window A, a sample window B, a sample window (B_up) and a sample window (B_down) may be created. In an example, the sample window (B_up) and the sample window (B_down) may include the same samples as the (B) window, but may be processed differently. In an example, a size of the sample window A and a number of samples in the sample window A may overlap with subsequent and previous sample windows that may be specified by the user in a parameter file, or may be set as part of the software or hardware implementation. In an example, the sample window B may be referred herein to as a time-delayed sample window such that the sample windows A and B may offset in time and the sample window B may lag with sample window A.

At step 410, an analysis window (referred to herein as a taper) may be applied to the sample window A and sample window B such as to create a tapered sample window A and a tapered sample window B respectively. At step 412, a modulation pullback operator may be applied to the sample window (B_up) and sample window (B_down) such as to create the tapered windows that can accomplish frequency modulation detection in the signal 202. In an example, the frequency modulation detection in the signal 202 may be accomplished via the Hadamard product between the sampled modulation pullback operator and the other samples such as the sample window (B_up) and sample window (B_down). For example, a sample window (B_up) may be used with the modulation pullback operator for detection of positive frequency modulation and a sample window (B_down) may be used with the modulation pullback operator for detection of negative frequency modulation. At step 414, all four tapered sample windows may be converted to a frequency domain using a DFT or FFT. As a result, FDAT (A), FDAT(B), FDAT(B_up) and FDAT(B_down) are created in a form of complex spectrum.

The aforementioned methods (e.g., methods 300 and 400) may further include analyzing an evolution of the complex spectrum from FDAT (A) to FDAT (B) and determining a local phase evolution of the complex spectrum near each peak in the complex spectrum. The resulting phase change may be used to determine, on a super-resolved scale that is finer than that of the FFT or DFT, an underlying frequency that produced the observed complex spectral phase evolution. The underlying frequency calculation is an example of super-resolution available through the CSPE method. Further, the method 400 can include analyzing the evolution of the complex spectrum from FDAT(A) to FDAT(B_down) and from FDAT(A) to FDAT(B_up) to detect the properties of down modulation and up modulation such as to detect presence of the frequency modulation in the signal 202.

The methods can further include testing the complex spectral phase evolution behavior of nearby points in the complex spectrum for each of the detected underlying frequencies. The testing may facilitate in determining whether the behavior of nearby points in the complex spectrum is consistent with the observed behavior near the peaks in the complex spectrum. Such approach may be applied to retain well-behaved peaks and reject inconsistent peaks. Similarly, for each individual modulating underlying frequency, the methods can include testing the complex spectral phase evolution behavior of nearby points in the complex spectrum to determine if they evolve in a manner that is consistent with the observed modulation behavior near the peaks.

The methods can further include conducting a deconvolution analysis to determine the amplitude and phase of the underlying signal component that produced the measured FFT or DFT complex spectrum for each consistent peak. Further, a reference frequency, amplitude, phase, and modulation rate for each consistent modulating peak of the underlying signal component that produced the measured FFT or DFT complex spectrum may be determined. The reference frequency is generally set to be at the beginning or at the center of a frame of time domain samples.

The aforementioned methods as implemented by the single channel pre-processor 204 creates at least two frequency domain data sets that can then be processed by single channel CSPE super resolution methods. As discussed, the time domain input to the second set lags the time domain input to the first set by a small number of samples, corresponding to a slight time delay. Each input is multiplied by the analysis window and is then transformed to the frequency domain by the DFT or FFT. The frequency domain output of the pre-processor will henceforth be referred to as FDAT (A) and FDAT (B). In addition, two additional frequency domain data sets such as FDAT (B_up) and FDAT (B_down) may be created if frequency modulation detection is required. FDAT (B_up) and FDAT (B_down) are frequency domain representations of the time delayed samples contained in the sample window (B) on which the modulation pullback operator is applied before conversion to the frequency domain. FDAT (B_up) has had a positive frequency modulation pullback operator applied, and FDAT (B_down) has had a negative frequency modulation pullback operator applied.

Thus, via the inputs, methods and outputs noted above, in accordance with an exemplary and non-limiting embodiment, a preprocessor receives a signal stream to create a set of data in the frequency domain, then creates a first set of input samples in the time domain and at least a second set of input samples in the time domain. The initiation of the second set of input samples time lags the initiation of the first set of input samples, thus creating two windows, the commencement of one of which is time-delayed relative to the other. The first and second sets of input samples are then converted to a frequency domain, and frequency domain data comprising a complex frequency spectrum are outputted for each of the first and second sets of input samples. In some embodiments, the first and second sets of inputs samples are converted to the frequency spectrum using at least one of a DFT and a FFT or other transform. In yet other embodiments, optional transforms to detect frequency modulation may be applied to the time-delayed windows. In some embodiments a taper or windowing function may be applied to the windows in the time domain.

In some embodiments, the applied transforms may not output complex domain data. For example, application of a discrete cosine transform (DCT) tends to result in the output of real data not in the complex domain.

As is evident, the described pre-processing methods: (i) introduce the concept of a time lag between windows that allows one to perform CSPE and (ii) may utilize various transforms of the type that are typically applied to perform frequency modulation detection. By "time lag" it is meant that a second window starts and ends later than the start and end of the first window in an overlapping way. This time lag mimics the human brain's ability to store information.

In accordance with one or more embodiments, the single channel super resolution module 208 may be configured to obtain higher frequency accuracy to permit and use singlet representation methods to extract components of the original signal such as the signal 202. The single channel super resolution module 208 may be configured to use the following inputs such as to facilitate the extraction of components from the signal 202. The single channel super resolution module 208 may require input information such as at least two sets of frequency domain data (FDAT (A) and FDAT (B)) as generated by the single channel pre-processor 204, one or more parameters that may have been used while applying a tapering function to the sample window A and the sample window B, super-resolved analysis of the transform of the windowing function at a resolution that is much finer than the DFT or FFT transformation and the like. This information can be pre-computed because the functional form of the windowing function is known a priori and can be analyzed to generally any desired degree of precision. In addition, the single channel super resolution module 208 may require two additional sets of frequency domain data FDAT (B_up) and FDAT(B_down), as generated by the single channel pre-processor 204 for detection of the frequency modulation in the signal 202. Optionally, the single channel super resolution module 208 may use additional super-resolved analysis windows for detection and characterization of amplitude modulation and joint frequency/amplitude modulation.

Figure 5:
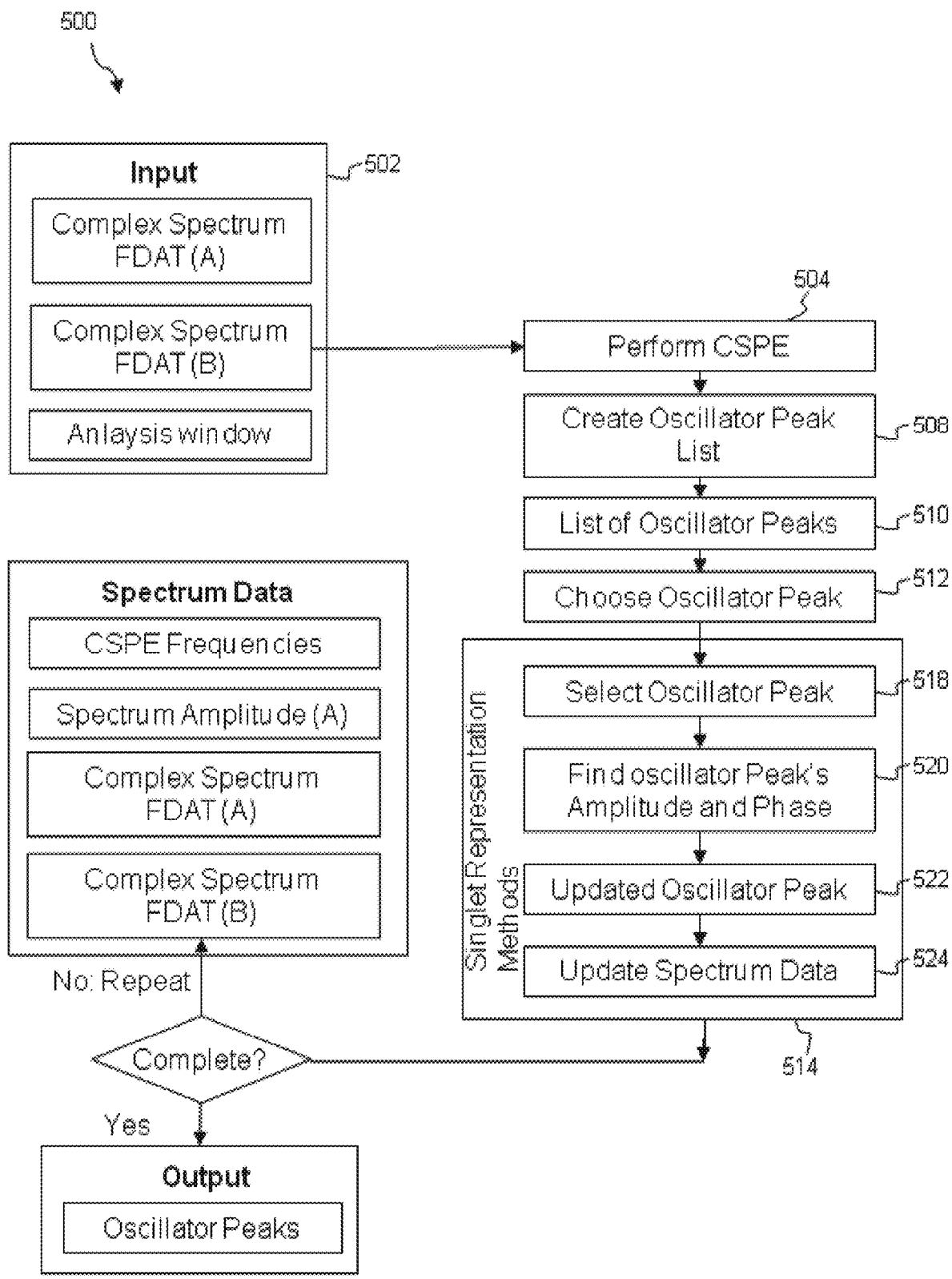
FIG. 5 illustrates a single channel super-resolution algorithm according to an exemplary and non-limiting embodiment.

FIG. 5 illustrates a method 500 for generating high accuracy frequency estimates such as to enable the extraction of a set of signal components. The single channel super resolution module 208 may be configured to utilize an input 502 that may include the two sets of frequency domain data (FDAT (A) and FDAT (B)) and the analysis window. At step 504, the single channel super resolution module 208 may be configured to calculate the complex spectral phase evolution to generate high resolution frequencies for subsequent signal extraction. At step 508, oscillator peaks in the complex Spectrum (FDAT(A) or FDAT(B)) are identified such as to generate a list of oscillator peaks 510. The oscillator peaks may be defined as the projection of an oscillator into the frequency domain and may be identified as local maxima at some stage in the processing process.

In an example, at step 512, the CSPE behavior of nearby points in the complex spectrum (FDAT(A) or FDAT(B)) may be tested for each of the identified local maxima such as to choose an oscillator peak. The testing may facilitate in determining whether the behavior of nearby points in the complex spectrum is consistent with the observed behavior near the peaks in the complex spectrum. Such approach may be applied to retain well-behaved peaks and reject inconsistent peaks. Similarly, for each individual modulating underlying frequency, the CSPE behavior of nearby points in the complex Spectrum may be tested such as to determine if they evolve in a manner that is consistent with the observed modulation behavior near the peaks. In an example, peak rejection criteria may be applied to discriminate targeted maxima generated by the main lobe of oscillators from non-targeted maxima generated by other phenomena such as unwanted noise or side lobes of oscillators. Further, extraction of targeted maxima by a variety of selection criteria may be prioritized. The variety of selection criteria may include but is not limited to, magnitude selection, frequency selection, psychoacoustic perceptual model based selection, or selection based on identification of frequency components that exhibit a harmonic or approximate harmonic relationship.

At step 514, one or more singlet representation methods may be used such as to generate an output. The one or more singlet representation methods may include determining the amplitude, phase, and optionally amplitude and frequency modulation of the oscillator peak 518 at step 520. In addition, the one or more singlet representation methods may include generation of the updated oscillator peak 522 and update of the spectrum data at step 524. The method may include removing the contribution of the oscillator peak from FDAT (A) and FDAT (B), and this may be done for any type of oscillator peak, including AM modulating and FM modulating oscillator peaks. The removal of the contribution may extend beyond the region of the maxima in FDAT(A) or FDAT(B) and separate out the smeared interference effect of the oscillator on other signal components that are present. Such type of removal process is a non-local calculation that may be enabled by the super-resolution analysis of the previous processing steps. Further, the singlet representation method may include consistent handling of the aliasing of signal components through the Nyquist frequency and through the DC (zero-mode) frequency.

At step 528, a determination is made as to whether the process is completed. That is to say, the determination of completion of the process may include whether an adequate number of targeted maxima are identified, signal components are prepared for tracking, and/or aggregation into coherent groups, and/or separation and selection, and/or re-synthesis. The single channel super resolution module 208 may be configured to repeat the processing steps using the spectrum data 530 if it is determined that the process is not completed. The method 500 proceeds to 532 if it is determined that the process is completed and at 532, oscillator peaks 534 are outputted for example, displayed to a user.

Figure 6:
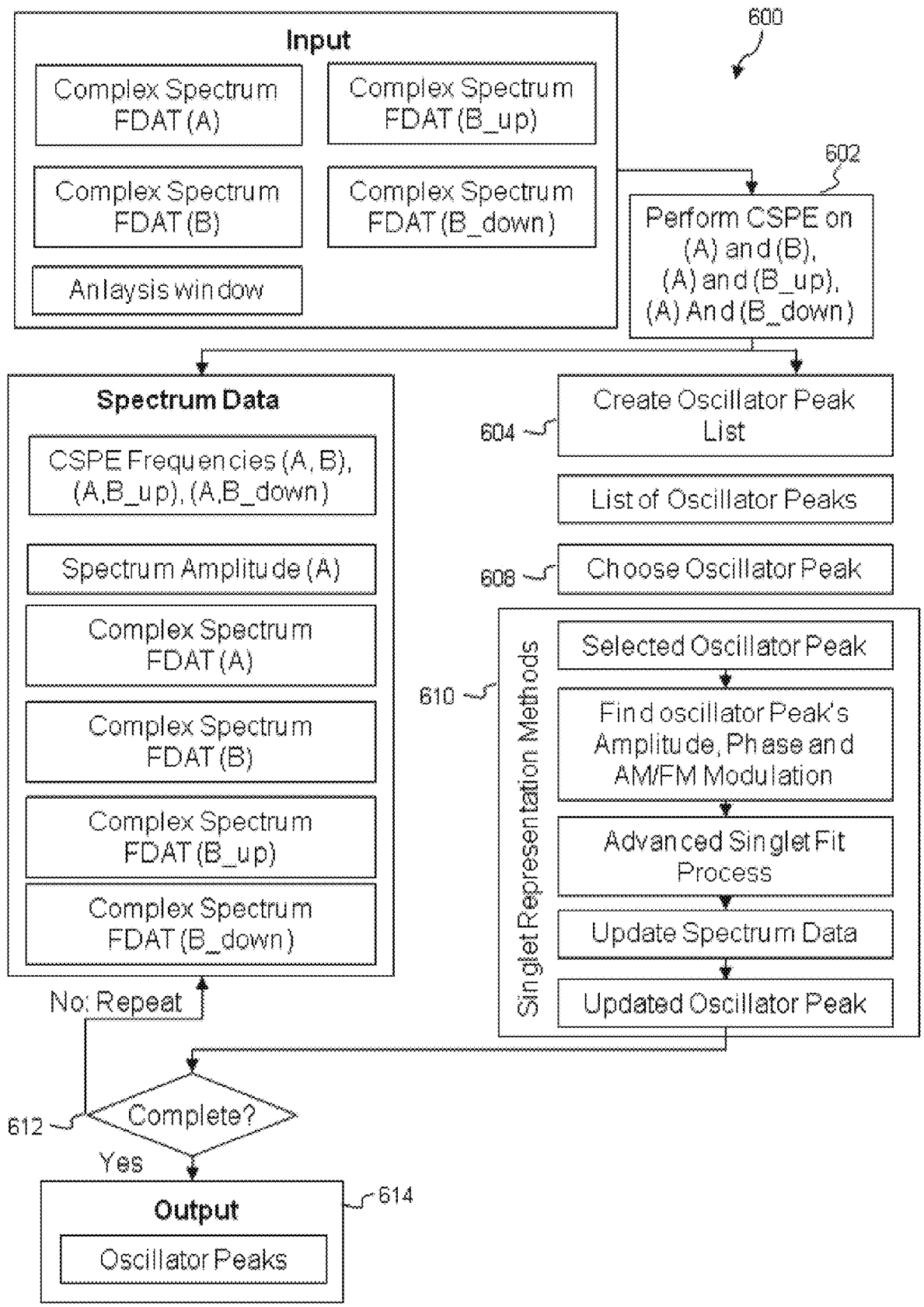
FIG. 6 illustrates a method for generating high accuracy frequency and AM and FM modulation estimates such as to enable the extraction of a set of signal components according to an exemplary and non-limiting embodiment.

FIG. 6 illustrates a method 600 for generating a high accuracy frequency and AM and FM modulation estimates such as to enable the extraction of a set of signal components. The method 600 may require two additional sets of frequency domain data FDAT (B_up) and FDAT(B_down) when compared to the data sets as required by the method 500. The additional sets of frequency domain data can enable the detection of AM and/or frequency modulation within the original signal 202. At step 602, the method 600 may perform CPSE on complex spectrum data such as FDAT(A), FDAT(B), FDAT (B_up) and FDAT (B_down). At step 604, an oscillator peak list may be created and at 608, oscillator peak is chosen using the techniques as disclosed in 508 and 512 of the method 500 respectively. At step 610, the method 600 may be configured to include one or more singlet representation techniques such to extract the components from the signal 202. These techniques are further disclosed in the description with reference to advanced singlet fit process. The method 600 may proceed to step 612 where a determination is made regarding completion of the process. On completion, at step 614, the method 600 may output the oscillator peaks.

Thus, in accordance with certain exemplary and non-limiting embodiments, taking the inputs and implementing the methods described herein, a processor receives a first set and a second set of frequency domain data, each having a given, or "fundamental," transform resolution, and the processor performs complex spectral phase evolution (CSPE), as further described herein, on the frequency domain data to estimate component frequencies at a resolution at very high accuracy, such accuracy being typically greater than the fundamental transform resolution. As used herein, "transform resolution" refers to the inherent resolution limit of a transformation method; for example, if a DFT or FFT is calculated on an N-point sample window taken from data that was sampled at Q samples per second, then the DFT or FFT would exhibit N frequency bins, of which half would correspond to positive (or positive-spinning) frequency bins and half would correspond to negative (or negative-spinning) frequency bins (as defined by a standard convention known to those familiar with the field); the highest properly sampled signal that can be detected in this method is a frequency of Q/2 and this is divided up into N/2 positive frequency bins, resulting in an inherent "transform resolution" of Q/N Hertz per bin. A similar calculation can be done for any of the other transformation techniques to determine the corresponding "transform resolution." In some embodiments there may further be performed peak selection comprising identifying one or more oscillator peaks in the frequency domain data, testing the CSPE behavior of at least one point near at least one of the identified oscillator peaks to determine well-behaved and/or short-term-stable oscillation peaks and performing an extraction of identified oscillator peaks. In yet other embodiments, one may further determine the amplitude and the phase of each identified oscillator peak and perform singlet transformation/singlet representation to map from a high resolution space to a low resolution space. In yet other embodiments, one may further perform singlet representation to remove a contribution of each identified oscillator peak from the frequency domain data.

As used above and herein, the "given," "original" or "fundamental" transform resolution is the resolution of the transform, such as the FFT, used to provide the input data set of frequency domain data—that is, the inherent resolution of the transform used as the fundamental building block of the CSPE. Additional details on the CSPE transformation itself follow.

The CSPE calculates higher accuracy estimates of frequencies than those produced by a conventional transformation, such as the standard DFT or FFT. Conventional FFT and DFT methods assume that the frequency estimate is located in the center of a frequency bin, whereas CSPE in accordance with one or more embodiments measures the rotation of complex phase of a signal over time to generate a high-resolution estimate of its location within a frequency bin. References to CSPE throughout this disclosure should be understood to encompass this capability to estimate characteristics of a signal, such as rotation of complex phase, at very high resolution within a frequency bin. In accordance with one or more embodiments, the CSPE method as disclosed herein may provide for a super-resolution frequency signal analysis. Generally, N samples are obtained from a signal for example, a digitally sampled signal from a music file in the .wav format, or an output of an analog-to-digital converter that may be attached to any sensor device, or a scan line of an image in black-and-white or RGB format and the like. A Fourier transform such as the Discrete Fourier Transform (DFT) or Fast Fourier Transform (FFT) is performed on the N samples of the signal (e.g., samples 1, ..., N). Similarly, N samples are obtained from a time-delayed snapshot of the signal (e.g., samples τ+1, ..., τ+N for a time delay t) and a Fourier transform is applied to these time delayed samples. The phase evolution of the complex Fourier transform between the original samples and the time-delayed samples is then analyzed. Particularly, the conjugate product of the transforms is obtained (with the multiply being a Schur or Hadamard product where the multiplication is done term-by-term on the elements of the first transformed vector and the complex conjugate of the second transformed vector) and then the angle of this conjugate product is obtained. Using this product and angle information, numerous advantageous applications may be realized. For example, the angle may be compared to the transforms to determine fractional multiples of a period such that the correct underlying frequency of the signal may be determined. Once the phase evolution is used to determine the correct signal frequency at much higher resolution than is possible with the original transform, it becomes possible to calculate a corrected signal power value. Further, the power in the frequency bins of the Fourier transforms may be re-assigned to, among other things, correct the frequency. In this case, the signal power that has smeared into nearby frequency bins is reassigned to the correct source signal frequency.

The CSPE algorithm may allow for the detection of oscillatory components in the frequency spectrum of the signal 202, and generally provide an improved resolution to the frequencies which may be in the transform. As stated above, the calculations can be done with the DFTs or the FFTs. Other transforms, however, can be used including continuous transforms and hardware-based transforms.

As shown in the following example, suppose a signal, s(t), is given and a digitally sampled version of the same signal, $\vec{s}=(s_0, s_1, s_2, s_3, \ldots)$ is defined. If N samples of the signal are taken, the DFT of the signal can be calculated by first defining the DFT matrix. For $W=e^{i2\pi/N}$ the matrix can be written as:

$$W = \begin{bmatrix} 1 & 1 & 1 & 1 & \ldots & 1 \\ 1 & W & W^2 & W^3 & \ldots & W^{N-1} \\ 1 & W^2 & W^4 & W^6 & \ldots & W^{2(N-1)} \\ 1 & W^3 & W^6 & W^9 & \ldots & W^{3(N-1)} \\ \vdots & \vdots & \vdots & \vdots & \ddots & \vdots \\ 1 & W^{N-1} & W^{2(N-1)} & W^{3(N-1)} & \ldots & W^{(N-1)(N-1)} \end{bmatrix}$$

Each column of the matrix is a complex sinusoid that is oscillating an integer number of periods over the N point sample window. In accordance with one or more embodiments, the sign in the exponential can be changed, and in the definition of the CSPE, the complex conjugate can be placed on either the first or second term.

For a given block of N samples, define $$\vec{S}_0 = \begin{bmatrix} s_0 \\ s_1 \\ s_2 \\ s_3 \\ \vdots \\ s_{N-1} \end{bmatrix}, \vec{S}_1 = \begin{bmatrix} s_1 \\ s_2 \\ s_3 \\ s_4 \\ \vdots \\ s_N \end{bmatrix},$$

and in general, $$\vec{s}_i = \begin{bmatrix} s_i \\ s_{i+1} \\ s_{i+2} \\ s_{i+3} \\ \vdots \\ s_{i+N-1} \end{bmatrix},$$

the DFT of the signal can be computed as $$F(\vec{s}_i) = \begin{bmatrix} 1 & 1 & 1 & 1 & \ldots & 1 \\ 1 & W & W^2 & W^3 & \ldots & W^{N-1} \\ 1 & W^2 & W^4 & W^6 & \ldots & W^{2(N-1)} \\ 1 & W^3 & W^6 & W^9 & \ldots & W^{3(N-1)} \\ \vdots & \vdots & \vdots & \vdots & \ddots & \vdots \\ 1 & W^{N-1} & W^{2(N-1)} & W^{3(N-1)} & \ldots & W^{(N-1)(N-1)} \end{bmatrix} \begin{bmatrix} s_i \\ s_{i+1} \\ s_{i+2} \\ s_{i+3} \\ \vdots \\ s_{i+N-1} \end{bmatrix}$$

As described above, the CSPE may analyze the phase evolution of the components of the signal between an initial sample of N points and a time-delayed sample of N points. Allowing the time delay be designated by $\Delta$ and the product of $F(\vec{s}_i)$ and the complex conjugate of $F(\vec{s}_{i+\Delta})$, the CSPE may be defined as the angle of the product (taken on a bin by bin basis, equivalent to the ".*" operator in Matlab, also known as the Schur product or Hadamard product) CSPE= $\sphericalangle (F(\vec{s}_i) \odot F^*(\vec{s}_i))$, where the $\varepsilon$ operator indicates that the product is taken on an element-by-element basis as in the Schur or Hadamard product, and the $\Sigma$ operator indicates that the angle of the complex entry resulting from the product is taken.

To illustrate this exemplary process on sinusoidal data, take a signal of the form of a complex sinusoid that has period $p=q+\delta$ where q is an integer and $\delta$ is a fractional deviation of magnitude less than 1, i.e., $|\delta| \leq 1$. The samples of the complex sinusoid can be written as follows:

$$\vec{s}_0 = \begin{bmatrix} e^0 \\ e^{i2\pi \cdot \frac{q+\delta}{N}} \\ e^{i2\pi \cdot 2\frac{q+\delta}{N}} \\ e^{i2\pi \cdot 3\frac{q+\delta}{N}} \\ \vdots \\ e^{i2\pi \cdot (N-1)\frac{q+\delta}{N}} \end{bmatrix}$$

If one were to take a shift of one sample, then $\Delta=1$ in the CSPE, and:

$$\vec{s}_1 = \begin{bmatrix} e^{i2\pi \cdot \frac{q+\delta}{N}} \\ e^{i2\pi \cdot 2\frac{q+\delta}{N}} \\ e^{i2\pi \cdot 3\frac{q+\delta}{N}} \\ e^{i2\pi \cdot 4\frac{q+\delta}{N}} \\ \vdots \\ e^{i2\pi \cdot N\frac{q+\delta}{N}} \end{bmatrix}$$

which can be rewritten to obtain:

$$\vec{s}_1 = \begin{bmatrix} e^{i2\pi \cdot \frac{q+\delta}{N}} \\ e^{i2\pi \cdot 2\frac{q+\delta}{N}} \\ e^{i2\pi \cdot 3\frac{q+\delta}{N}} \\ e^{i2\pi \cdot 4\frac{q+\delta}{N}} \\ \vdots \\ e^{i2\pi \cdot N\frac{q+\delta}{N}} \end{bmatrix} = e^{i2\pi \cdot \frac{q+\delta}{N}} \begin{bmatrix} e^0 \\ e^{i2\pi \cdot \frac{q+\delta}{N}} \\ e^{i2\pi \cdot 2\frac{q+\delta}{N}} \\ e^{i2\pi \cdot 3\frac{q+\delta}{N}} \\ \vdots \\ e^{i2\pi \cdot (N-1)\frac{q+\delta}{N}} \end{bmatrix} = e^{i2\pi \cdot \frac{q+\delta}{N}} \vec{s}_0$$

One determines the conjugate product (again, taken on an element-by-element basis) of the transforms, the result is:

$$F(\vec{s}_i) \odot F^*(\vec{s}_{i+1}) = e^{-i2\pi \cdot \frac{q+\delta}{N}} F(\vec{s}_i) \odot F^*(\vec{s}_i) = e^{-i2\pi \cdot \frac{q+\delta}{N}} \|F(\vec{s}_i)\|^2$$

The CSPE is found by taking the angle of this product to find that:

$$\frac{2\pi}{N} CSPE = \sphericalangle (F(\vec{s}_i) \odot F^*(\vec{s}_i)) = 2\pi \cdot \frac{q+\delta}{N}$$

If this is compared to the information in the standard DFT calculation, the frequency bins are in integer multiples of $$\frac{2\pi}{N},$$

and so the CSPE calculation provided information that determines that instead of the signal appearing at integer multiples of $$\frac{2\pi}{N},$$

the signal is actually at a fractional multiple given by $q+\delta$. This result is independent of the frequency bin under consideration, so the CSPE may allow an accurate determination of underlying frequency no matter what bin in the frequency domain is considered. In looking at the DFT of the same signal, the signal would have maximum power in frequency bin $q-1$, $q$, or $q+1$, and if $\delta \neq 0$, the signal power would leak to frequency bins well outside the range of bins. The CSPE, on the other hand, may allow the power in the frequency bins of the DFT to be re-assigned to the correct underlying frequencies that produced the signal power. In accordance with one or more embodiments, the definition of the $\Omega$ matrix, the columns on the right are often interpreted as "negative frequency" complex sinusoids, since $$\begin{bmatrix} 1 \\ W^{N-1} \\ W^{2(N-1)} \\ W^{3(N-1)} \\ \vdots \\ W^{(N-1)(N-1)} \end{bmatrix} = \begin{bmatrix} 1 \\ W^{-1} \\ W^{-2} \\ W^{-3} \\ \vdots \\ W^1 \end{bmatrix}$$

similarly the second-to-last column is equivalent to $$\begin{bmatrix} 1 \\ W^{-2} \\ W^{-4} \\ W^{-6} \\ \vdots \\ W^2 \end{bmatrix}$$

The phrase 'negative frequency components' as used herein the description may indicate the projection of a signal onto the columns that can be reinterpreted in this manner (and consistent with the standard convention used in the field).

In accordance with one or more embodiments, the oscillator peak selection process as used in the methods 400 and 500 of the description, may facilitate in identification of maxima in the frequency domain spectra that are main-lobe effects of oscillators, and determination of an optimal order in which to extract the oscillator peaks from the frequency domain data. In an example, the oscillator peak selection process may include converting the complex frequency data stored in FDAT (A) to an amplitude. The amplitude of an element of FDAT (A) is the absolute value of the complex value of that element. The amplitude of an element of the FDAT (A) may also be referred herein to as spectrum amplitude (A).

The oscillator peak selection process can include identifying local maxima in the spectrum amplitude (A). In an example, an element at location n is a local maximum if the amplitude at the location n is greater than the amplitude of the element at location n−1 and the amplitude of the element at location n+1. Further, the local maxima may be tested such as to identify main-lobe effects of the oscillators that are referred herein to as the oscillator peaks. For example, the amplitude of the local maxima may be tested against a minimum threshold value. In another example, proximity of the CSPE frequency corresponding to the location of the local maxima is determined with respect to the center of the FFT frequency bin corresponding to that location. If the CSPE frequency is not proximate enough, this may signify that the local maximum is a side-lobe effect of an oscillator or is a noise-induced peak. However, if the amplitude of the local maxima is greater than a certain threshold, the local maxima may be considered to be a significant peak regardless of earlier tests and may be constructed from a group of oscillators.

The oscillator peak selection process can include determining an order in which to extract oscillator peaks from the FDAT (A) and FDAT (B). Higher priority peaks are chosen using selection criteria appropriate for a given application; that is, for example, certain types of higher order peaks are typically more characteristic of desired signals, rather than noise, in given situation. Peaks may be chosen by, among other techniques, magnitude selection, a psycho-acoustic perceptual model (such as in the case of signal extraction for speech recognition or speech filtering), track duration, track onset times, harmonic associations, approximate harmonic associations or any other criteria appropriate for a given application.

In accordance with one or more embodiments, the CSPE high resolution analysis may be configured to convert tone-like signal components to structured (e.g., line) spectra with well-defined frequencies, while the noise-like signal bands do not generally take on structure. As such, the signal may be substantially segregated into the tone-like and the noise-like components. To select oscillator peaks, in embodiments a series of steps may be employed. For example, firstly, the CSPE analysis may test the complex spectral phase evolution behavior of nearby points in the complex spectrum for each individual underlying frequency detected such as to determine if they evolve in a manner that is consistent with the observed behavior near the peaks in the complex spectrum. Further criteria may be applied to retain well-behaved peaks and reject poorly behaved (e.g., inconsistent) peaks.

In an example, the CSPE analysis may be configured to conduct a deconvolution analysis for the each consistent, well-behaved peak such as to determine the amplitude and phase of the underlying signal component that produced the measured FFT or DFT complex Spectrum. The data obtained from the high resolution frequency analysis can be used to prioritize the components of the signal in order of importance; for example, priority in the case of recognition of speech signals in a noisy environment may be based on perceptual importance or impact on intelligibility. A psychoacoustic perceptual model (PPM) may be provided in the Unified Domain such that independent computations for each channel of data may not have to be computed separately, and the Unified Domain PPM may give information that may be used to give priority to specific components in the multi-channel data. In an example, the Unified Domain PPM may be used to give emphasis to signals coming from a specified direction or range of directions. Accordingly a Unified Psychoacoustic Perceptual Model (UPPM) is provided that incorporates the effects of spectral, spatial and temporal aspects of a signal into one algorithm. This algorithm may be embodied in hardware or performed in software.

In accordance with one or more embodiments, the UPPM computation may be separated into three steps. The first step may include a high resolution signal analysis that may distinguish between tone-like and noise-like signal components. The second step may include calculation of the coherency groups of signal components based on frequency, sound pressure level, and spatial location, with each coherency group providing a "unit of intelligibility" that may be enhanced. Further, the interference and separability of the coherency groups may be calculated and projected to create a Coherency Surface in the Unified Domain. In an example, the Coherency Surfaces may be utilized to create a surface that is defined over the entire spatial field. In addition, Coherency Curves can be obtained with a transformation from the Unified Domain for stereo audio signals, left and right channel. Thus, a traditional single-channel processing techniques can still be performed on a signal. At any time, a multi-channel signal can be transformed back into the Unified Domain or a signal in the Unified Domain can be transformed into a multi-channel signal (or a single-channel signal) for signal processing purposes.

In accordance with one or more embodiments, the singlet representation method may include a set of operations that can identify the parameters of an oscillator from frequency domain data, or can generate frequency domain data using the parameters of an oscillator. Various steps in the singlet transformation process in accordance with one or more embodiments may include calculating the normalized shape of the projection of an oscillator in the frequency domain. Further, the steps may include calculating the magnitude and phase of an oscillator by fitting the calculated spectrum to a set of frequency data and calculating the magnitude and phase of a low frequency oscillator, accounting for interference effects caused by aliasing through DC. In addition, the steps may include adding or subtracting an oscillator's frequency domain representation to or from frequency domain data, accounting for aliasing though Nyquist and DC. In accordance with one or more embodiments, complex analysis methods may be employed to further characterize an oscillator peak's frequency and amplitude modulation within a single FFT window. These complex algorithms are discussed further in detail in the description.

In accordance with one or more embodiments, a normalized shape of the oscillator's projection in the frequency domain may be calculated using an input including a high resolution frequency domain version of the analysis window used in the single channel pre-processor 204 and a high-accuracy frequency estimate of an oscillator peak, as created by CSPE. The high resolution frequency domain version of the analysis window used in the single channel pre-processor 204 may also be referred herein to as FWIN. The FWIN is the frequency domain representation of a high-resolution version of the analysis window used in the single channel pre-processor 204 such as to apply a taper to the sample window A and sample window B. The FWIN may be longer than the original analysis by a factor of 16 or 32. This factor is called the 'upsample' rate. In other embodiments, the high-resolution version of the analysis window may be known exactly through a mathematical functional representation.

If it is determined that the frequency of the oscillator is in the center of the FFT bin, the shape of the oscillator's projection matches a down-sampled version of FWIN, and can be created by first choosing a pointer from FWIN at its center, then choosing points at intervals of the upsample rate. If the frequency is not in the center of the FFT bin, the shape of the oscillator may correspond to a subset of FWIN slightly offset in frequency from those points. In accordance with one or more embodiments, the shape of an oscillator's projection into the frequency domain may be created using a method that may include calculating the distance in frequency between the center of the FFT bin corresponding to this location and the CSPE frequency. The method may further include choosing a first sample from FWIN at the FWIN's center plus the offset as calculated above. The method may include a calculation step choosing samples from FWIN at predetermined intervals based on upsample rate. For example, if the calculated offset corresponds to five bins in FWIN, the upsample rate is 16, and FWIN's center bin corresponds to 32769, then the FWIN bins chosen may be: [ . . . , 32741, 32757, 32773, 32789, 32805 . . . ]. In an example, the number of bins that may be chosen may depend on a user-defined parameter of the system. The output of this step is a set of complex samples chosen from FWIN and these complex samples may be referred herein to as the oscillator peak normalized spectrum. These samples may have inaccurate amplitude and phase.

In accordance with one or more embodiments, accurate amplitude and phase of the complex samples chosen from FWIN may be calculated on determination of the peak shape of the oscillator. In an example, the amplitude and phase calculation may be accomplished by fitting the oscillator's shape to a set of frequency domain data, typically stored in FDAT (A) and this phase may also be referred herein to as a Fit amplitude phase that may need an oscillator peak normalized spectrum, an oscillator peak's high accuracy frequency as calculated by CSPE, and a set of frequency domain data, typically FDAT (A). Further, the method may include solving for the magnitude and phase rotation that fits the spectrum data and multiplying sampled normalized spectrum by new magnitude and phase.

On estimation of the frequency of a signal component, an accurate approximation of the contribution of that signal component to the measured spectrum of a signal can be determined. In one or more embodiments, this follows from a property of the discrete Fourier Transform when applied to signals that are not centered in the middle of a frequency bin. This process follows from the properties of convolution and windowing. In other embodiments, where the high-resolution version of the analysis window may be known exactly as mathematical functional representation, the convolutional properties may be calculated in a continuous fashion.

In accordance with one or more embodiments, when a signal is analyzed, a finite number of samples may be selected, and a transform may be computed. As an example and not as a limitation, a DFT may be applied on the signal. However, other transforms having similar properties and are well known to researchers familiar with the art may be applied on the signal. The transform of the window of data is generally preceded by a windowing step, where a windowing function, W(t), is multiplied by the data, S(t). Suppose W(t) is called the analysis window (and later the windows of data can be reassembled using the same or different synthesis windows). Since the data is multiplied by the window in the time domain, the convolution theorem states that the frequency domain representation of the product of W(t)*S(t) exhibits the convolution of the transforms, $\hat{W}(f)$ and $\hat{S}(f)$, where the notation indicates that these are the transforms of W(t) and S(t), respectively. If the high resolution spectral analysis reveals that there is a signal component of magnitude $M_0$ at a frequency $f_0$, then the convolution theorem implies an existence of a contribution centered at $f_0$ that is shaped like the analysis window, giving a term essentially of the form $M_0 \hat{W}(f-f_0)$. In a discrete spectrum, such as the spectrum calculated by the discrete Fourier transform, there is a finite grid of points that result in a sampled version of the spectrum. Thus, the contribution centered at $f_0$ described above is sampled on the finite grid points that are integer multiples of the lowest nonzero frequency in the spectrum. Equivalently, if the discrete Fourier transform is calculated for N points of data that has been properly sampled with a sample rate of R samples/sec, then the highest frequency that is captured is the Nyquist frequency of R/2 Hz and there will be N/2 independent frequency bins. This provides a lowest sampled frequency of (R/2 Hz)/(N/2 bins)=R/N Hz/bin. In addition, all other frequencies in the discrete Fourier transform are integer multiples of R/N.

Because of the relationship between the analysis window transform, $\hat{W}(f)$, and the spectral values that have been sampled onto the frequency grid of the discrete transform, such as the discrete Fourier transform, it is possible to use knowledge of $\hat{W}(f)$, along with the measured sample values on the grid points nearest to $f_0$, to calculate a good estimate of the magnitude, $M_0$. To calculate this value, the nearest frequency grid point to $f_0(f_{grid})$ is identified, a difference $\Delta f = f_0 - f_{grid}$ is calculated, and the magnitude value of the transform of the signal at that grid point $M_{grid}$ is calculated. The true magnitude can then be calculated from the following relation $$\frac{M_{grid}}{\|\hat{W}(-\Delta f)\|} = \frac{M_0}{\|\hat{W}_{max}\|}$$

In an example, $\|\hat{W}_{max}\|$ is taken to mean the maximum magnitude of the transform of the analysis window, and is generally normalized to 1. Also, the transform of the analysis window is generally symmetric, so the sign of $\Delta f$ generally does not matter. These relations can be adapted for more unusual windowing functions by those skilled in the art by manipulation of the basic convolution relation. Assuming a fixed resolution to the knowledge of $\hat{W}(f)$, $\hat{W}(f)$ can be sampled on a fine-scaled grid that is 2 times, 4 times, 8 times, 16 times, 32 times, or 64 times, or N times finer than the resolution of the frequency grid in the DFT. In this case, the difference value $\Delta f$ is calculated to the nearest fraction of a frequency bin that may correspond to the fine-scaled grid. For example, if the fine scaled grid is 16 times finer than the original frequency grid of the transform, then $\Delta f$ is calculated to 1/16 of the original frequency grid. The desired fine-grained resolution is dependent on the particular application and can be chosen by one skilled in the art.

In accordance with one or more embodiments, the phase of the true signal may be adjusted on estimation of the true signal frequency and magnitude so that the signal may align with the phases that are exhibited by the discrete frequency spectrum. So, if $\phi_{grid}$ represents the phase angle associated with the magnitude $M_{grid}$, and $\phi_{win}$ represents the phase angle of $\hat{W}(-\Delta f)$, then the analysis window must be rotated by an amount that is equal to $\phi_{rot} = \phi_{grid} - \phi_{win}$. Once this is done, all of the information about the signal component is captured by the values of $f_0$, $M_0$, and $\phi_{rot}$. As a result, reconstruction of the signal component needs a representation of the analysis window, $\hat{W}(f)$, shifting of the representation to frequency $f_0$, rotating it by angle $\phi_{rot}$, and multiplying it by magnitude $M_0$ (assuming the analysis window has maximum magnitude equal to 1, otherwise multiply by a factor that scales the window to magnitude $M_0$). The output of fit amplitude and phase includes the oscillator peak's true amplitude and phase, and the oscillator peak's scaled spectrum.

In accordance with one or more embodiments, an accurate amplitude and phase may be calculated for a low frequency oscillator on determination of the peak shape of the oscillator. In such cases of the low frequency oscillator, the effect of aliasing through DC may interfere with the complex conjugate projection of that oscillator. Because of this interference, it is difficult to measure true amplitude and phase of the oscillator using conventional techniques. The methods presented here in accordance with one or more embodiments represent an innovation that solves the problem of calculating the true amplitude and phase of the low frequency oscillator. In an example, the method may include using an input that may include a low frequency oscillator peak's normalized spectrum, a low frequency oscillator peak's high accuracy frequency as calculated by CSPE, and a set of frequency domain data, typically FDAT (A) such as to determine the true amplitude and phase of the low frequency oscillator. In certain embodiments, the method may include an iterative step wherein CSPE frequency values are varied through a range of values to achieve an improved match to the oscillator's spectrum.

In signal processing applications, if data is sampled too slowly, then an aliasing problem at high frequencies may be present. Interference also exists at extremely low frequencies and will be referred to herein as the interference through DC problem. This problem occurs when finite sample windows are used to analyze signals. The windowing function used in the sampling is intimately involved, but the problem can occur in the presence of any realizable finite-time window function. To state the problem clearly, assume that a signal of frequency $f_0$ is present and is close to the DC or 0 Hz frequency state. If such a signal is sampled over a finite-time window $W(t)$, then, as discussed above, the frequency spectrum of the signal is equal to the convolution in the frequency domain of a delta function at frequency $f_0$, with the Fourier transform of the windowing function, which is designated as $\hat{W}(f)$. In a discrete formulation, the result is then projected onto the grid of frequencies in the discrete transform, e.g., onto the frequency grid of the Fast Fourier Transform (FFT). Since the transform of the windowing function is not infinitely narrow, the spectrum has power spilling over into frequency bins other than the one that contains $f_0$. In fact, the transform of the windowing function extends through all frequencies, so some of the signal power is distributed throughout the spectrum causing a pollution of nearby frequency bins from the spillover of power. Depending on the windowing function, the rate at which $\hat{W}(f)$ falls to zero varies, but for most windows used in practice, e.g., Hanning windows, Hamming windows, Boxcar windows, Parzen windows and many others known to those skilled in the art, there is significant spillover beyond the bin that contains $f_0$. This spillover or smearing effect is important throughout the spectrum of a signal, and when two signal components are close in frequency, the interference from the spillover can be significant. However, the problem becomes acute near the DC bin, because any low frequency signal has a complex conjugate pair as its mirror image on the other side of DC. These complex conjugate signals are often considered as "negative frequency" components, but for a low frequency signal, the pairing guarantees a strong interference effect. However, the complex conjugate nature of the pairing allows for a solution of the interference problem to reveal the true underlying signal and correct for the interference, if a good estimate of the frequency can be achieved. The methods described herein address the problem of the conventional methods. The method may include considering the spectrum at $f_0$, and the measured spectral value at $f_0$ as a reflection of a contribution from the "positive frequency" component, which will be designated as $Ae^{i\sigma_1}$, and a contribution from the mirror image or "negative frequency" component, $Be^{i\sigma_2}$. Since the $Be^{i\sigma_2}$ contribution comes from the negative frequencies at $-f_0$, the contribution at $+f_0$ is taken from the conjugate of the analysis window $\hat{W}^*(f)$. If $\hat{W}^*(f)$ is assumed to be defined so that it is centered at $f=0$, then the contribution from the negative frequency component comes at a distance $2f_0$ from the center of $\hat{W}^*(f)$. Consequently, if a high resolution estimate of the frequency $f_0$, is obtained, then the contributions to the measured spectral value at $+f_0$ from positive and negative frequencies can be determined. The method can include setting the phase to be 0 at both the $+f_0$ and $-f_0$ positions. When set in this position, the values for $Ae^{i\sigma_1}$ and $Be^{i\sigma_2}$ are known completely, and so the difference $\sigma_1-\sigma_2$ is obtained. In addition, when the phase is 0, the signal components in the $+f_0$ and $-f_0$ positions are real, so the complex conjugate spectrum from the negative frequency is in the same relative phase position as the spectrum in the positive frequencies. However, when the phase becomes different from 0, the relative phase values must rotate in the opposite sense, so that if the phase at $+f_0$ is set to $\phi$, then the phase at $-f_0$ must be set to $-\phi$ to maintain the complex conjugate pairing. This means that in the zero phase orientation, the contributions $Ae^{i\sigma_1}$ and $Be^{i\sigma_2}$ have a relative phase difference of $\sigma_1-\sigma_2$, but as the phase orientation at $+f_0$ is set to $\phi$, the phase orientation at $-f_0$ counter-rotates and becomes set to $-\phi$, so the contribution $Be^{i\sigma_2}$ must counter-rotate by the same amount. Thus, in any phase orientation, the net contribution at a given frequency is a combination of rotated and counter-rotated versions of $Ae^{i\sigma_1}$ and $Be^{i\sigma_2}$ and these sums trace out an ellipse. Also, since the major axis of the ellipse will occur when $Ae^{i\sigma_1}$ and $Be^{i\sigma_2}$ are rotated into alignment, this occurs when the rotation angle is $\theta=\frac{1}{2}(\sigma_1-\sigma_2)$ and the sum of the rotated and counter-rotated versions becomes $$e^{\frac{-i}{2}(\sigma_1-\sigma_2)}(Ae^{i\sigma_1}) + e^{\frac{i}{2}(\sigma_1-\sigma_2)}(Be^{i\sigma_2}) = (A+B)e^{\frac{i}{2}(\sigma_1+\sigma_2)}.$$

As a result, the major angle occurs when the rotation and counter-rotation put the terms into alignment at an angle that is the average of the phase angles. The position of the minor axis can be similarly determined, since it occurs after a further rotation of $\pi/2$ radians. Thus, the sum of the rotated and counter-rotated versions for the minor axis becomes $$e^{i\frac{\pi}{2}}e^{\frac{-i}{2}(\sigma_1-\sigma_2)}(Ae^{i\sigma_1}) + e^{-i\frac{\pi}{2}}e^{\frac{i}{2}(\sigma_1-\sigma_2)}(Be^{i\sigma_2}) = (A-B)e^{\frac{i}{2}(\sigma_1+\sigma_2+\pi)}.$$

The method may further include facilitating parameterization of the ellipse so that the angular orientation can be determined in a straightforward manner. To start with, consider an ellipse with major axis on the x-axis and of magnitude M, and let S be the magnitude of the minor axis. The ellipse can then be parameterized by $\tau \rightarrow (M\cos\tau, S\sin\tau)$ and by specifying a value for $\tau$, any point on the ellipse can be chosen. If $\tau$ gives a point on the ellipse, and the angular position, $\rho$, of the point in polar coordinates (since this will correspond to the phase angle for the interference through DC problem), can be found from the relation $$\tan\rho = \frac{S\sin\tau}{M\cos\tau} = \frac{S}{M}\tan\tau.$$

When this form of parameterization is applied to the interference through DC problem, the ellipse formed by rotated and counter-rotated sums of $Ae^{i\sigma_1}$ and $Be^{i\sigma_2}$ is rotated so that the major and minor axes align with the x- and y-axes, and then the measured spectrum is examined to determine the actual angle exhibited by the resultant spectral components. The resultant angle from the measured spectrum is labeled $\Omega$. Since the major axis is at $\Delta=\frac{1}{2}(\sigma_1+\sigma_2)$, a further rotation is needed to put the resultant at angle $\Omega$. Therefore, $\tau$ corresponding to $\Omega-\Delta$ needs to be determined, and in an example, is obtained using the following relation:

$$\tan(\Omega-\Delta) = \frac{A-B}{A+B}\tan\tau$$

provided as the result:

$$\tau = \tan^{-1}\left(\frac{A+B}{A-B}\tan(\Omega-\Delta)\right)$$

The method may further include recognizing that the relations above are determined solely from knowledge of the frequencies and complex conjugate relationship at the $+f_0$ and $-f_0$ positions in the spectrum. All of the analysis was determined from the relative magnitudes of the transform of the windowing function. The relative magnitudes will remain in the same proportion even when the signals are multiplied by an amplitude value. Therefore, the recreation of the true measured spectrum may require selecting the true amplitude value from the spectrum and then rescale the sum of the rotated and counter-rotated contributions so that they equal the amplitudes exhibited by the measured spectral values. The final result is a highly accurate measure of the true amplitude of the signal at $+f_0$, so that when the spectrum is reconstructed with the windowing function $W(f)$ positioned at $+f_0$, and its mirror-image, complex conjugate pair, $\hat{W}^*(f)$, placed at $-f_0$, the resulting sum that includes the interference through the DC bin will be a highly accurate reconstruction of the true, measured signal spectrum.

The above analysis has focused on the interaction at the $+f_0$ and $-f_0$ positions in the spectrum and a similar analysis can be conducted at any of the affected frequencies to derive an equivalent result. The analysis at the $+f_0$ and $-f_0$ positions is for illustrative purpose since the signal is concentrated there, and in practice generally gives the highest signal to noise ratio and most accurate results. The output of fit amplitude and phase for low frequency oscillators is a low frequency oscillator peak's true amplitude and phase, and a low frequency oscillator peak's scaled spectrum.

In one or more examples, it may be determined that the estimate of $+f_0$ may not be sufficiently accurate. In these cases, it is possible to vary the value of $+f_0$ over a range of frequencies and continue to iterate the process until a desired accuracy is reached and is discussed further in detail herein.

In accordance with one or more embodiments, some or all oscillator peaks that are fit using the low-frequency method are tested and corrected for error. The method of testing and correcting the low frequency oscillator peak error may include subtracting an oscillator peak from spectrum to which it was fit and calculating the residual spectrum. If the residual spectrum near the center of that oscillator peak is above a threshold, the method may include modifying the CSPE frequency at intervals on either side of the original spectrum, and repeating low frequency amplitude and phase calculations. Accordingly, the method may include using the oscillator peak with the lowest residual error. The method described in this section may be used in the process of frequency and amplitude modulation detection.

In accordance with one or more embodiments, interference by an oscillator aliasing across DC or Nyquist should be accounted for when removing or adding an oscillator peak to or from frequency data such as to prevent the incorrect identification of peaks or re-synthesis of peaks. In an example, this can be accomplished by implementing a method for adding or subtracting the complex conjugate of the portion that wraps through DC or Nyquist in addition to the primary addition or subtraction. In an example, the method may include using an input that may include an oscillator peak's high resolution frequency as calculated by CSPE, an oscillator peaks' scaled spectrum, and a set of frequency domain data such as to perform oscillator peak addition and subtraction. The method can include identifying the location of the oscillator peak in the frequency domain data and dividing the oscillator peak into a primary region and a tail region if the oscillator peak is situated such that it is bisected by either the DC frequency or the Nyquist frequency. The tail region is the portion that lies in the negative frequencies between DC and -Nyquist (negative Nyquist) (where we adopt the convention that half of the frequencies in the complex FFT are designated positive (or positive-spinning) frequencies and half of the frequencies are designated negative (or negative-spinning) frequencies.

In an example, the method can include adding the primary region to the input frequency domain data and adding the complex conjugate of the tail region to the input frequency domain data when an additive operation is performed to prevent the incorrect identification of peaks or re-synthesis of peaks. Otherwise, the method can include subtracting the primary region from the input frequency domain data and subtracting the complex conjugate of the tail region from the input frequency domain data to prevent incorrect identification of peaks or re-synthesis of peaks. The method may output a modified set of the frequency domain data received as input to this step.

In accordance with one or more embodiments, the output of the single-channel super-resolution methods may include a set of parameters describing individual oscillator components. Each set may include the information used to accurately reconstruct that oscillator in the single channel re-synthesis methods. In a preferred embodiment, the information may include frequency, amplitude, and phase related information corresponding to the oscillator component.

In an example, the multi-channel pre-processor 210 may be configured, in accordance with one or more embodiments, to prepare multi-channel time domain signal data that may be processed by the multi-Channel CSPE super resolution techniques. In an example, as an input, a multi-channel time-domain signal may be fed to the multi-channel pre-processor 210. The input may be a live feed or a recorded file. In another example, single-channel data streams may be processed by the single-channel pre-processor.

The multi-channel pre-processor 210 may be configured to follow the same methods described as discussed previously for the single-channel preprocessor in 204, but the methods may be repeated for multiple channels of data. In an example, the multi-channel pre-processor 210 may perform a method for each channel of input signal in accordance with one or more embodiments. The method may include filling a sample window with n sequential samples of input signal for that channel. In an example, the sequential sample windows may be configured to overlap with each other such that the size of the sample window and number of samples that the sample window overlaps with subsequent and previous sample windows may be specified by the user in a parameter file. The size and number of overlapping sample window may also be set as part of a software or hardware implementation. For exemplary purposes a sample window may be defined, hereinafter referred to as Sample Window (A).

The method may further include creating a second, time-delayed sample window. For exemplary purpose, the second sample window may hereinafter be referred as Sample Window (B). The sample window A and the sample window B may be offset in time such that the sample window B lags the sample window A. Sample Window (B) lags Sample Window (A). The method may further include creating two more time-delayed sample windows if frequency modulation detection is desired. The additional sample windows may contain the same samples as the sample window B, but the additional windows may be processed differently. The additional windows may hereinafter be referred to as (B_up) and (B_down) for exemplary purpose. The detection of frequency modulation may include applying a 'Modulation Pullback Operator' to the (B_up) and (B_down) sample windows. This may be accomplished via a Hadamard product. For example, for the (B_up) sample window, a Modulation Pullback Operator for positive frequency modulation may be used. Further, for the (B_down) sample window, a Modulation Pullback Operator for negative frequency modulation may be used. The method may further include applying an analysis window, or taper, to both, the sample window A and the sample window B separately. This may be accomplished via the Hadamard product, as discussed previously. In an example, the frequency modulation detection may include applying the analysis window to the (B_up) and (B_down) sample windows. The method may further include converting both the tapered sample window A and the tapered sample window B to the frequency domain using a DFT or FFT. For exemplary purposes, the frequency domain output may hereinafter be referred to as FDAT_channel_X (A) and FDAT_channel_X (B), where X is the identifier of the channel. Further, if frequency modulation detection may be desired, the FDAT_channel_X (B_up) and FDAT_channel_X (B_down) windows may be created using the same process as discussed previously for the (B_up) and (B_down) sample windows.

In an example, an output of the multi-channel pre-processor 210 may include two sets of data per frame, such that each data set may have been converted to the frequency domain via the Fast Fourier Transform (FFT) technique or any other related frequency transform technique. For each channel, the second set may lag the first set by a small number of samples, corresponding to a slight time delay. For the exemplary purpose of description, these data sets may be referred as FDAT_channel_0 (A), FDAT_channel_0 (B) . . . FDAT_channel_N (A), and FDAT_channel_N (B). In an example, if frequency modulation detection is desired, two additional frequency domain data sets may be created for each channel. These may be hereinafter exemplarily referred to as the FDAT_channel_X (B_up) and FDAT_channel_X (B_down). FDAT_channel_X (B_up) and FDAT_channel_X (B_down) may be the frequency domain representations of the time delayed samples that may be contained in the sample window B and that may have had a Modulation Pullback Operator applied to them before conversion to the frequency domain. The FDAT_channel_X (B_up) may have a positive frequency Modulation Pullback Operator applied, and the FDAT_channel_X (B_down) may have a negative frequency Modulation Pullback Operator applied.

In accordance with an exemplary and non-limiting embodiment, a preprocessor may receive a plurality of signal streams to create a set of data in the frequency domain. The frequency domain data may comprise a plurality of sample windows, or "data sets". For the purpose of description, the "Sample window" may refer to a window of n samples that may be taken from an original time series data. Each of the plurality of frequency domain data sets may then be used to create a first data set and a second data set wherein the initiation of the second data set time may lag the initiation of the first data set, and each of the plurality of sample data sets may be converted to a frequency domain and outputted as a complex frequency spectrum for each of the first and second data sets. In some examples, each corresponding first data set/window and second data set/window may be converted to the frequency spectrum, such as by using a conventional transform, such as a FFT, DCT, or any other such transform.

In an example, a multi-channel super resolution module may be defined. The multi-channel super resolution module may be configured to obtain a higher frequency accuracy to permit the use of singlet transforms to extract components of an original signal. In an example, the input of the multi-channel super-resolution module may include two sets for frequency domain data for each channel from the multi-channel pre-processor 210. The data set may be hereinafter referred to as an FDAT_channel_0 (A) and an FDAT_channel_0 (B) . . . FDAT_channel_N (A), and FDAT_channel_N (B), where the channel is specified as channel_0 up to channel_N, and the frequency data is specified as (A) for non-time-delayed data and (B) for time-delayed data.

The input may further include parameters describing the analysis window used when applying a taper to the sample window A and the sample window B. In an example, if frequency modulation is desired, the input may further include two additional sets of frequency domain data, a data FDAT (B_up) and a data FDAT (B_down), as generated by the single channel pre-processor. In an example, the input may further include optional additional super-resolved analysis windows for detection and characterization of frequency and amplitude modulation.

Figure 7:
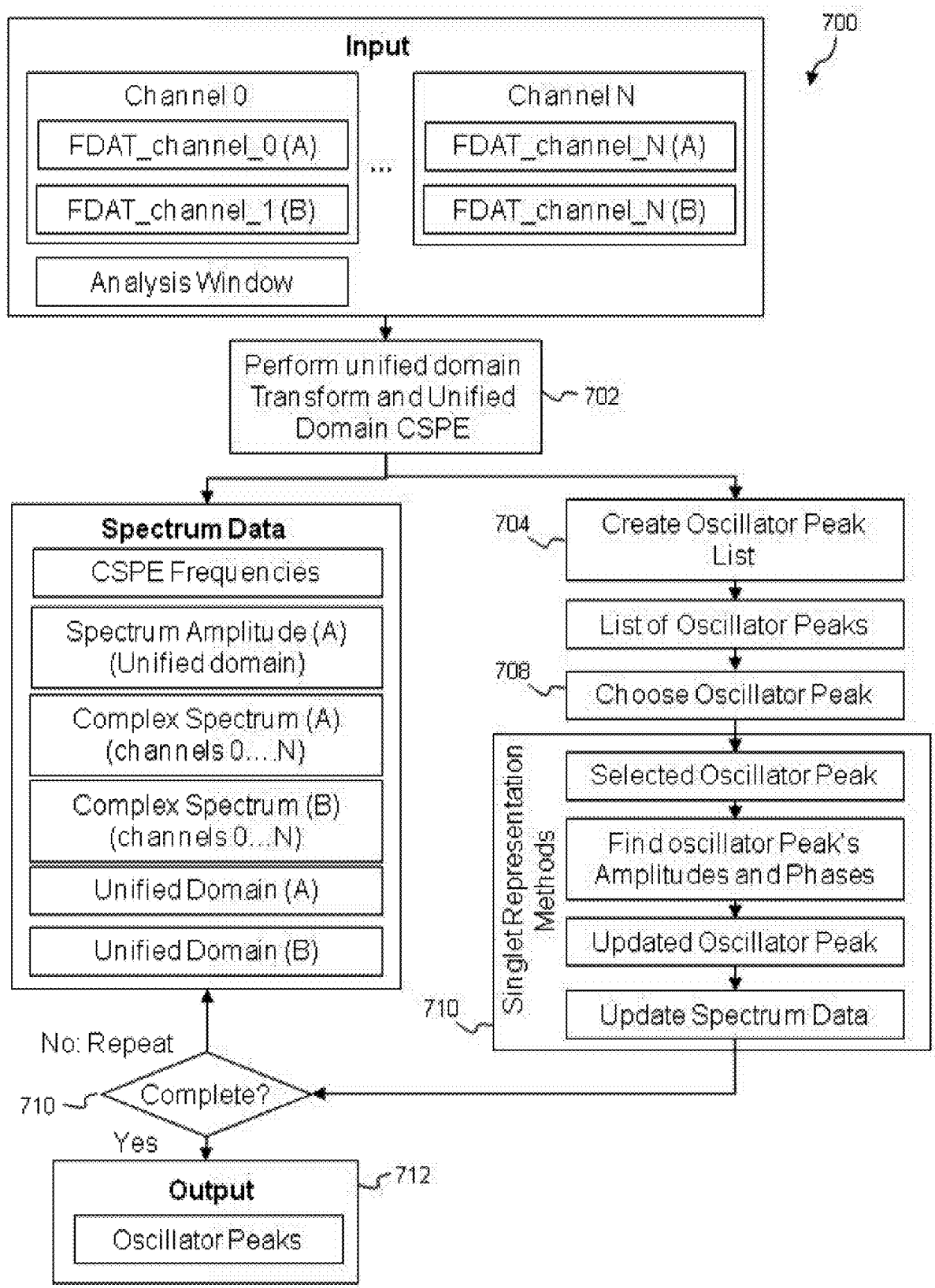
FIG. 7 illustrates an example of a method for unified domain super resolution according to an exemplary and non-limiting embodiment.

FIG. 7 illustrates a method 700 for unified domain super resolution. The method illustrates by way of example, performing signal decomposition in the Unified Domain by decomposing into discrete objects such as steady tones, noise-like elements, transient events, and modulating frequencies. The method 700 in accordance with one or more embodiments may be an extension of the single-channel super-resolution methods.

The method may include, at 702, performing unified domain transform and unified domain complex spectral phase evolution (CSPE) on complex spectral phase evolution frequencies obtained from the plurality of input channels. The input channels may include the channels input to the multi-channel super resolution module, such as the channels FDAT_channel_0 (A), FDAT_channel_0 (B) . . .

FDAT_channel_N (A), and FDAT_channel_N (B) as discussed previously. The method 700 may further include using the singlet transform methods to remove the contribution of the oscillator peak from FDAT_channel_0 (A), FDAT_channel_0 (B) . . . FDAT_channel_N (A), FDAT_channel_N(B). This may be done at 704, by creating a list of oscillator peaks from the transformed channel data. Further, from the list of oscillator peaks, at 708, an oscillator peak may be chosen using a peak selection process. The peak selection process may include identifying oscillator peaks. The peak selection process may further include applying peak rejection criteria to discriminate targeted maxima generated by the main lobe of oscillators from non-targeted maxima generated by other phenomena such as unwanted noise or side lobes of oscillators. The targeted maxima may then be prioritized based on a plurality of factors including a magnitude and frequency of separation, an application of a psychoacoustic model, or tracker state information that may be used to prioritize peak selection. The method 700 may further include, at 710, using singlet transform methods to identify the amplitude and phase of the oscillator peak in each channel. The oscillator peak's information may be saved for an output from the process. The method 700 may further include, at 710, making a determination if the process may be complete. If the process is complete, at 712, the oscillator peak information saved previously may be provided as an output of performing the method 700. Alternatively, if at 712 it is determined that the process of identifying oscillator peaks is not complete, the method 700 may be repeated.

Figure 8:
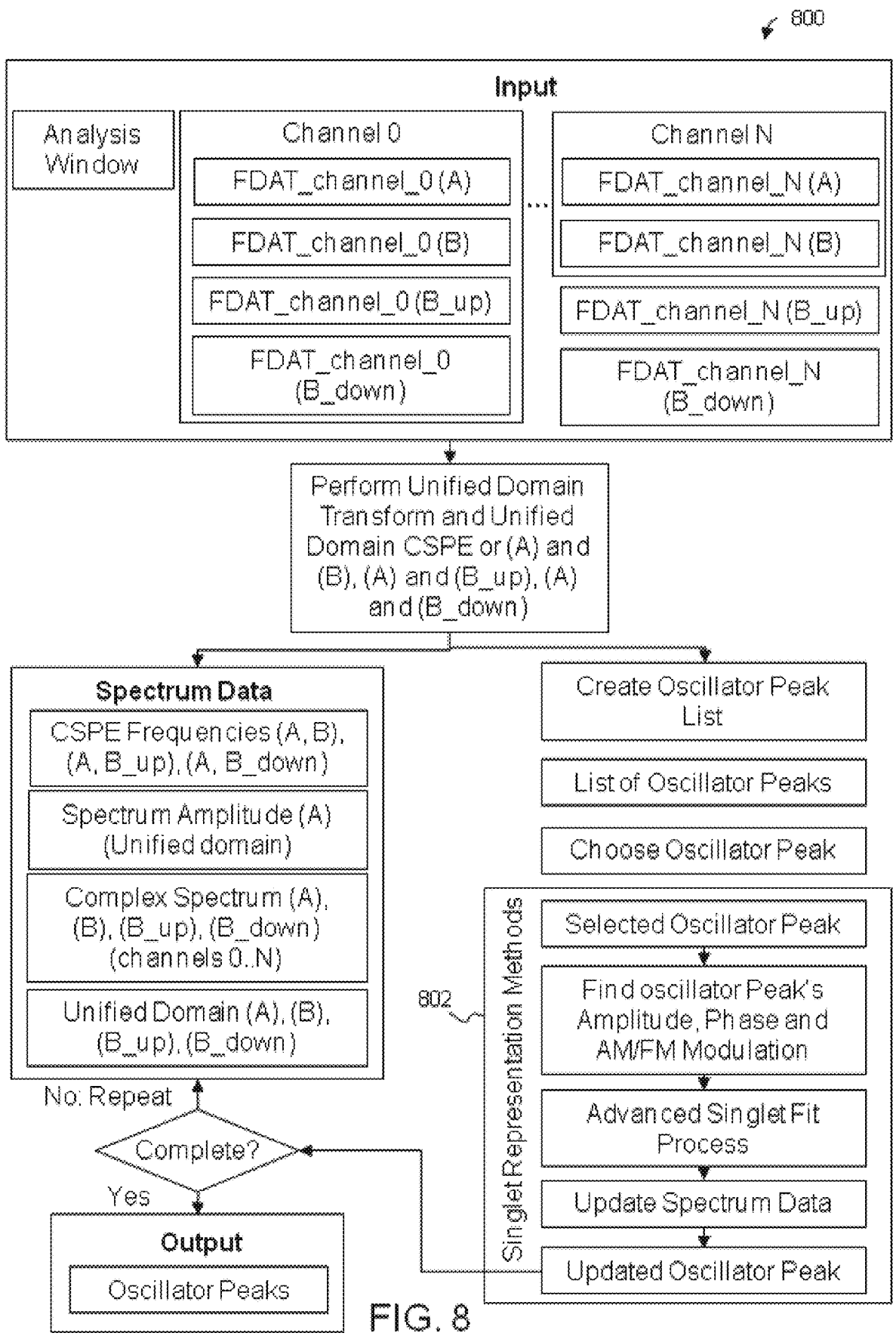
FIG. 8 illustrates an example of a method for unified domain super resolution with amplitude and frequency modulation detection according to an exemplary and non-limiting embodiment.

In an example, the method 700 may further include preparing signal components for tracking and/or filtering and/or re-synthesis. In an alternate embodiment, the method for unified domain super resolution may be used in conjunction with amplitude and frequency modulation detection. FIG. 8 illustrates such a method 800, which incorporates additional amplitude and frequency modulation detection at 802, apart from the steps included in the method 700. At 802, if amplitude and/or frequency modulation detection is desired, a technique involving the Advanced Fit Process is used.

The unified domain representation of the spectrum data in accordance with one or more embodiments may be calculated using the techniques of which will be discussed in the following description.

Unified Domain may be a representation of multi-channel signals as a single channel of data. There may be lossless transformation that converts a multi-channel signal into a Unified Domain. As a result, a signal in the Unified Domain may be processed as a whole, rather than separately processing the individual channels. In an example, even when a signal is transformed into the Unified Domain, all of the signal's information about the magnitudes, frequencies, and spatial component related to a signals location may be retained. The transformation of the signal may be an invertible technique such that a signal in the Unified Domain may be reverted back to a multi-channel signal, such as a surround-sound signal, or a stereo signal of an RGB signal. In an example, the Unified Domain transformation may include a feature such that the original, multi-channel signal may be converted to a representation where a single magnitude component is multiplied by a matrix from the special unitary group, SU(N), where N represents the number of channels in the original data signal.

In an example, the process of converting to the Unified Domain (UD) may begin when a multi-channel signal stream may be converted to a single channel signal stream in the Unified Domain. A transformation may be utilized to perform the conversion. The transformation may include retaining information about the magnitudes, frequencies, internal phases, and spatial locations of the signal components of each channel while placing the information in a single "signal". Further, the transformation may include using a stream of matrices rather than a single, 1-dimensional stream of data samples. The UD transformation may be an invertible technique as the UD representation involves a single magnitude component multiplied by an element of the complex Special Unitary group for N-channels (SU(N)). In some examples, the UD matrix may be taken from the Unitary Group U(n). The SU(N) group may be represented in many ways. For the purposes of transforming a multi-channel signal, the structures of complex matrices may be employed. In an example, stereo input may be represented in UD. Since stereo input includes two channels, such that N=2, accordingly, the representation in the Unified Domain may be provided as a single magnitude component multiplied by a 2×2 complex matrix. More particularly, the transformation of a multi-channel audio stream may be represented as:

$$T: C^N \leftrightarrow \text{mag} * SU(N) \equiv U^N$$

$$[\text{audio}_{ch0} \text{audio}_{ch1} \ldots \text{audio}_{chN-1}] \leftrightarrow U^N$$

where the magnitude may be a function of frequency, N may represent the number of input channels, and U represents the Unified Domain.

For a conventional two channel audio stream (such as Left/Right) the representation may become:

$$[LR] \leftrightarrow U^2$$

This representation may include a one-to-one mapping between the two channel audio stream and the representation as a stream of matrices in the UD and the transformation may be lossless. Any manipulations done in one domain may have an equivalent counterpart in the other domain. Persons skilled in the art may appreciate that a number of processing techniques may be performed on a signal in the Unified Domain that may prove to be advantageous. For example, a process applied to a signal may be performed faster since the process may only have to be performed once in the Unified Domain, while the process would otherwise have to be performed separately for each sub-channel. Furthermore, Unified Domain manipulations have the advantage of operating on all of the channels at the same time, thus keeping the channels synchronized without the need for additional synchronization processes to be performed.

In accordance with exemplary and non-limiting examples, a processor may be configured to receive a plurality of channels, each comprising a first set and a second set of frequency domain data having a transform resolution. The plurality of channels may be combined into a unified domain representation and complex spectral phase evolution (CSPE) may be performed on the unified domain representation to estimate component frequencies at a resolution or accuracy greater than the fundamental transform resolution. In such examples, the mathematics discussed above may apply uniformly as CSPE turns the plurality of channels into a representation in the Unified domain. For example, instead of a right and left channel, CSPE may render a single matrix form representation including all of the inputted channels.

In other examples, further performing peak selection may be performed comprising identifying one or more oscillator peaks in the unified domain representation and testing the CSPE behavior of at least one point near at least one identified oscillator peak to retain well-behaved peaks. These identified peaks may then be extracted in prioritized fashion. In other examples, singlet representation may be performed to identify amplitude and phase of each identified oscillator peak. In yet other examples, singlet representation may be performed to remove a contribution of each identified oscillator peak from the unified domain representation.

In an example, unified domain CPSE methods may be defined. In an example, a method may include performing a processing step on a signal in the Unified Domain that may include performing a high resolution frequency analysis. The high resolution frequency analysis may be an extension of the 1-dimensional CSPE transformation discussed previously. As in the 1-dimensional case, the phase evolution of the components of a signal in the Unified Domain may be analyzed between an initial sample of N points and a time delayed sample of N points. From this comparison, a fractional multiple may be obtained that is representative of the spatial location where the signal components actually appear. As a result, the correct underlying frequency and estimated spatial location for the signal may be determined. To correct the underlying frequency present in the sampled signal, the information may be utilized to re-assign signal power in the frequency bins of the transform utilized to obtain the high resolution frequency analysis.

In accordance with one or more examples, one process that may be utilized to manipulate a signal in the Unified Domain may be a high resolution frequency analysis and the process may be implemented as a matrix-based version of the Complex Spectral Phase Evolution (CSPE) method. As a result, the transformation may in certain examples, for example, give signal accuracies on the order of 0.01 Hz for stable signals at CD sample rates analyzed in approximately 46 ms windows. In certain other examples, signal accuracies of 0.01 Hz, 0.001 Hz or even finer accuracies may result. The CSPE high resolution analysis may be capable of converting tone-like signal components to line spectra with well-defined frequencies, while the noise-like signal bands do not take on structure. As such, the signal may be substantially segregated into tone-like and noise-like components. Further processing may be utilized to, such as, detect if there is the presence of a transient signal component or an amplitude- or frequency-modulating signal component in a frame of sample data or test for, and aggregate, harmonic groupings of frequencies. Persons skilled in the art may appreciate that the processing may be performed on an entire signal (e.g., an entire audio signal) or portions of a signal. As such, a windowing step may be provided at any point in the process. For example, frames of data may be taken directly from the multi-channel data stream or from the data in the Unified Domain.

In an example, the UD transformation may provide a way to analyze data simultaneously in multiple channels, such as might be present in music for stereo music with two channels or surround sound music with multiple channels. In a similar example, one may consider image and video data to be composed of multiple channels of data, such as in the RGB format with Red, Blue and Green channels. Thus, the multi-channel signal may be represented in the form of a one-dimensional magnitude vector in the frequency domain, multiplied by a vector of matrices taken from the Special Unitary Group, SU (n). Accordingly, a more particular transformation of a multiple channel signal to a signal in the Unified Domain may occur as follows.

In one illustrative example, the input data may be stereo music containing 2 channels of data designated Left and Right, and the result may be a magnitude vector multiplied by a vector of matrices from the Special Unitary Group of dimension 2, SU(2). A transformation process to achieve the above mentioned conversion of stereo music to the resultant magnitude vectors may include a plurality of steps. The first step may include selecting a window of music data and transform it to the frequency domain using a transformation such as the Discrete Fourier Transform (DFT). As a result of performing the step, a representation of the signal in discrete frequency bins may be obtained. In an example, N samples may be selected in the window of data. Consequently N frequency bins may be obtained. Alternatively, there may be variations of the transforms known to those skilled in the art that may alter the number of frequency bins.

The frequency domain transformation may result in 2 channels of (generally) complex frequency information. Thus, each frequency bin may be viewed as a complex vector with 2 elements. These elements may then be multiplied by a complex matrix taken from the group SU (2), resulting in a single magnitude component. This magnitude component may be stored with the matrix as the representation of the stereo music.

In an example, the transformation process may be represented mathematically as follows:

left channel: $\vec{S}_L = s_{0L}, s_{1L}, s_{2L}, \ldots$ right channel: $\vec{S}_R = s_{0R}, s_{1R}, s_{2R}, \ldots$ To convert to the frequency domain, the following mathematical operations may be performed:

$$\vec{F}_L = \text{DFT}(\vec{s}_L)$$

$$\vec{F}_R = \text{DFT}(\vec{s}_R)$$

The group elements may be represented in a plurality of ways. For example, for the SU(2) matrices for 2 channels of data the representation may take the form as represented below:

$$U = \begin{bmatrix} e^{-i\phi_1}\cos\sigma & e^{-i\phi_2}\sin\sigma \\ -e^{i\phi_2}\sin\sigma & e^{i\phi_1}\cos\sigma \end{bmatrix}$$

In an example, the angles with components of the frequency domain vectors may be identified as follows. Let the $j^{th}$ complex component of $\vec{F}_L$ be designated as $a_j + ib_j = r_{Lj} e^{i\phi_1}$ and the $j^{th}$ complex component of $\vec{F}_R$ be designated as $c_j + id_j = r_{Rj} e^{i\phi_2}$. The complex frequency components may then be identified with the elements of the (KS note: this must appear as SU(2) with no gaps or separations or carriage returns inserted) SU(2) matrix for the $j^{th}$ frequency bin by setting $\cos\sigma = r_{Lj}/\sqrt{r_{Lj}^2 + r_{Rj}^2}$ and $\sin\sigma = r_{Rj}/\sqrt{r_{Lj}^2 + r_{Rj}^2}$, and the phase variables may be the same $\phi_1$ and $\phi_2$ values. If the SU(2) matrix is multiplied by a 2-vector of the frequency components for the $j^{th}$ frequency bin, then the result may be a single magnitude vector:

$$[U_j] = \begin{bmatrix} F_{Lj} \\ F_{Rj} \end{bmatrix} = \begin{bmatrix} \sqrt{r_{Lj}^2 + r_{Rj}^2} \\ 0 \end{bmatrix}$$

The SU (2) matrices may be preferably unitary and may have inverse matrices, such that, all of the information may be contained in the magnitude vector and the U matrix.

Thus, a new representation for the two channel data may be provided that may contain all of the information that was present in the original:

$$\sqrt{r_{Lj}^2 + r_{Rj}^2}\,[U_j] = \sqrt{r_{Lj}^2 + r_{Rj}^2}\begin{bmatrix} e^{-i\phi_1}\cos\sigma_j & e^{-i\phi_2}\sin\sigma_j \\ -e^{i\phi_2}\sin\sigma_j & e^{i\phi_1}\cos\sigma_j \end{bmatrix}$$

In one or more examples, once the data is represented in the Unified Domain representation, the previously represented two independent channels of music, that is to say, the right and the left frequencies, may be represented in the Unified Domain as a single magnitude vector multiplied by a complex matrix from SU(2). The transformation may be inverted easily, so it may be possible to change back and forth in a convenient manner.

In the one or more examples discussed above, a majority of the signal processing operations that may be used in processing multi-channel signals may be computed in the Unified Domain. So, in one application, the front end processing may use a calculation of the Complex Spectral Phase Evolution (CSPE). The Unified CSPE may be calculated by converting a window of data to the Unified Domain. The representation for that window may be called $\Lambda_1$. Further, a time-shifted window of data to the Unified Domain may be represented as $\Lambda_2$. The Unified CSPE may then require a calculation of $\Lambda_1 \odot \Lambda_2^*$, where the operator $\odot$ is configured to take the component-wise product (also known as the Schur product or Hadamard product) of the matrices over all of the frequency bins, and the * indicates that the complex conjugate is taken. In order to obtain the remapped frequencies of the CSPE in the Unified Domain, the arguments of the complex entries in the Unified CSPE may be calculated.

In an example, the traditional signal processing functions may be advantageously reformulated so that they may be computed in the Unified Domain. In an example, there may be a mathematical equivalence between the Unified Domain and the usual representations of data in the frequency domain or the time domain. When coupled with the remapping of the frequencies in the Unified CSPE, it may become possible to consider the signal components as having a spatial position and internal phase relationships. This may be done, such that, in the case where the input data is stereo audio with right and left channels, by associating the spatial effect of the stereo audio to operate over a field spanning an angle of approach to the listener. In this view, a signal component that may occur with a given value of $\sigma$ may be viewed as occurring at angle $\sigma$ in the stereo field, with a magnitude given by the magnitude component derived from the Unified Domain representation magnitude values. Furthermore, the internal phase angles of the 2 channels may be preserved in the $\phi_1$ and $\phi_2$ values assigned to that signal component.

In an example, the music on the left and right channels may be composed of two components, with frequencies $f_0$ and $f_1$. When the components may be converted to the Unified Domain and processed with the Unified CSPE, these signals may be associated with their magnitudes, spatial positions, and internal phases so $f_0 \leftrightarrow |f_0|$, $\sigma_0$, $\phi_{01}$ and $\phi_{02}$ and for the second signal, the association is $f_1 \leftrightarrow |f_1|$, $\sigma_1$, $\phi_{11}$ and $\phi_{12}$. Then, determination of the coherency surface may be adapted to have a spatial component. For example, if a signal component such as $f_0$, would have a 1-dimensional masking effect over nearby frequencies that is given by the masking function $G(f_0; f)$, then this masking effect may be extended to the unified domain, the coherency surface function would pick up a spatial component related to the angular separation between the signal components, and one can represent one embodiment of this as a coherency function $H(f_0; f, \sigma) = G(f_0; f) \cdot \cos(\sigma - \sigma_0)$, where the cosine function represents the spatial component. Similarly, a coherency function may be derived for every signal component and a global coherency surface defined over the entire spatial field of the data may be found, for example, by taking the sum of the coherency functions at a given point in the spatial field, or the maximum of the coherency functions at a given point in the spatial field or the average of the coherency functions at a point in the spatial field or any of a number of other selection rules for the coherency functions at a point in the spatial field. Further, other spatial functions than the cosine function may be utilized as well as functions that drop off faster in the spatial direction or functions that fall off slower in the spatial direction.

Figure 9:
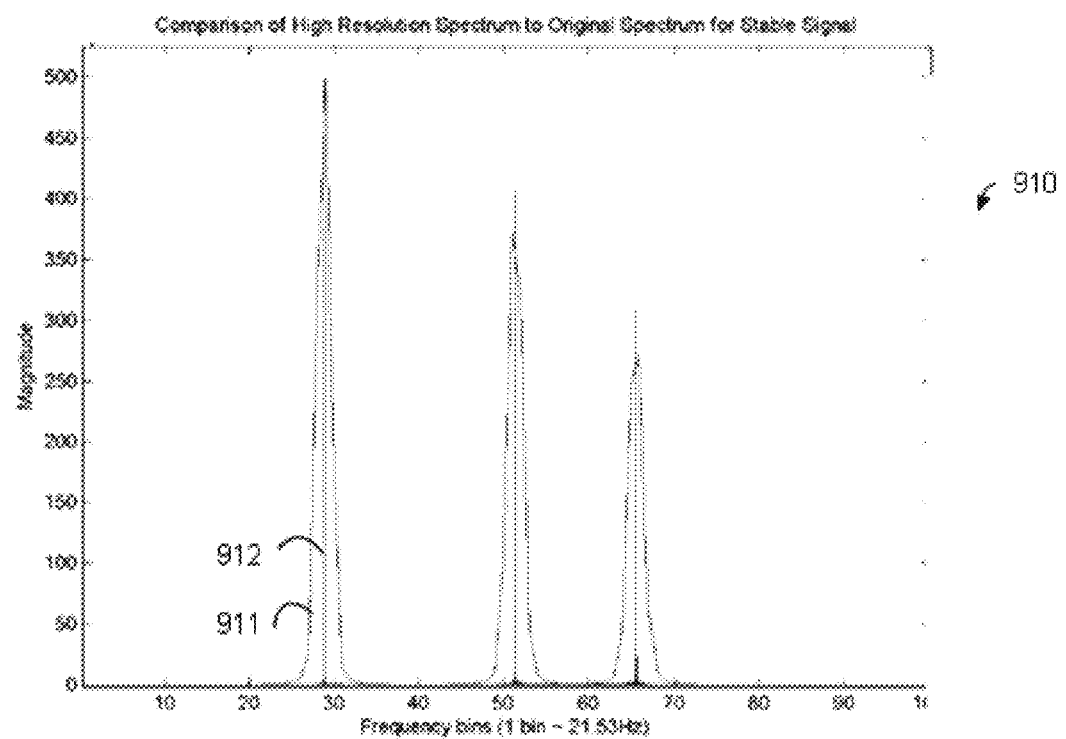
FIG. 9 illustrates a graphical representation of FFT spectrum according to an exemplary and non-limiting embodiment.
Figure 9:
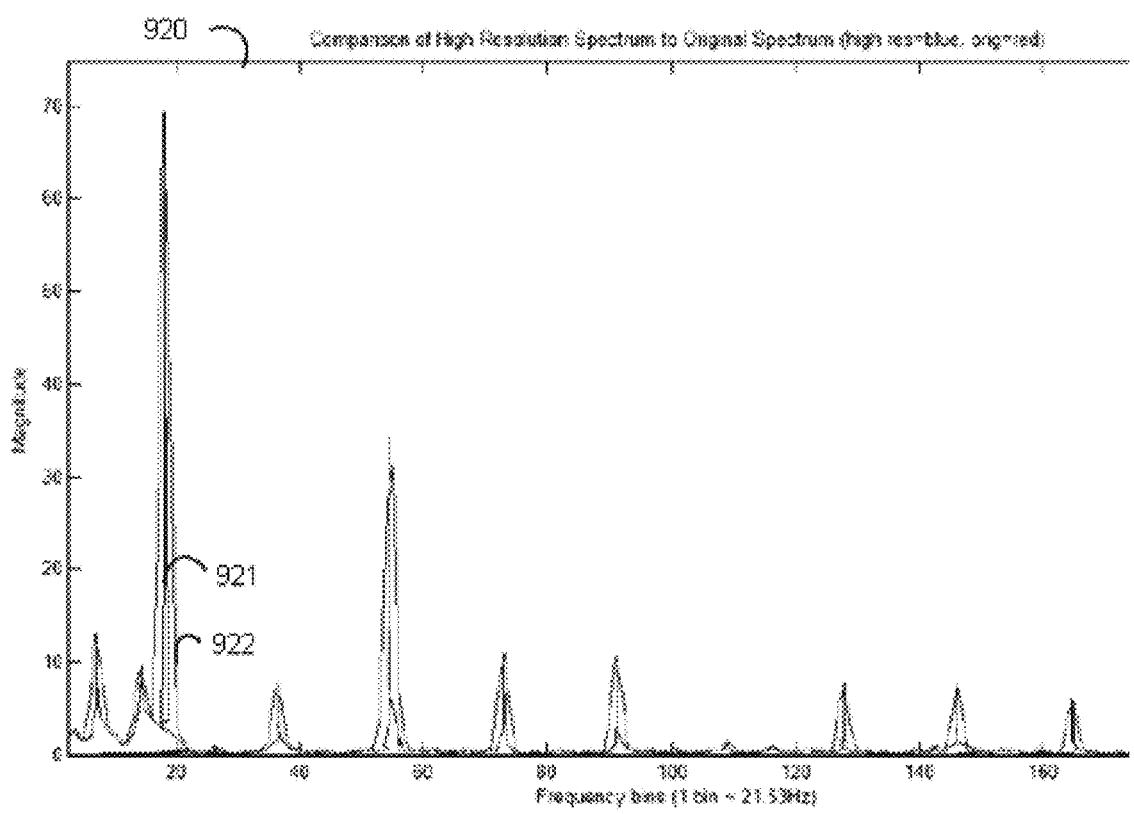

In an example, the process of converting to the Unified Domain, calculation of high-resolution Unified CSPE information, and calculation of Coherency surfaces in the Unified Domain, may provide the possibility to jointly consider all of the components that make up a multi-channel signal and process them in a consistent manner. In alternative examples, other refinements and examples of the applicability of the signal processing algorithms may be made. For example, the CSPE super-resolution algorithm may be applied more generally than just to a single signal component. Accordingly, the CSPE algorithm may be used to resolve many signals components provided there is some separation between the signal frequencies. When multiple signals may be present, the super-resolution of the frequencies may be most accurate near spectral frequency bins that may be dominated by an individual signal component, and the regions of the spectrum that are away from the signal centers may be generally remapped to the nearest dominant signal frequency. For example, for a signal composed of three sinusoids the signals do not lie in the center of frequency bins. In this example, the algorithm may be configured to successfully recalculate the true underlying frequencies with good accuracy. FIG. 9 illustrates a graphical representation of this process (see 910). The original FFT spectrum is shown as line 911 and the remapped spectrum is shown as line 912; the remapped spectrum is effectively a line spectrum. For this example, the exact frequencies (in frequency bin numbers) are 28.7965317, 51.3764239, and 65.56498312, while the estimated frequencies are 28.7960955, 51.3771794, and 65.5644420. If these spectra were calculated from music sampled at CD sampling rates of 44100 samples/sec, the fundamental transform resolution of each frequency bin would be approximately 21.53 Hz/bin, so the measured signals are accurate to approximately 0.001 bins, which is equivalent to 0.02153 Hz. However, the real-world music data may not be as clean and stable. Thus, the accuracy of the computed high-resolution spectrum may be affected such as by the presence of nearby interfering signals, modulations of the frequencies, and noise-like signals that have a broadband spectrum. In such examples, the high-resolution analysis may give signal accuracy of the order of 0.1 Hz for any signal component that may be relatively stable over the sample window. An example is given for a window of data taken from a track by Norah Jones and the remapped spectrum appears in signal 920, where the original signal is line 922 and the remapped signal is line 921. In an example of an alternate variation of the algorithm, a similar resolution may be provided for a linearly modulating signal component while returning a high-resolution estimate of the initial signal frequency in the window, along with the modulation rate. This may be affected by changing the CSPE to include a multiplication by a complex vector that counteracts the modulation by a measured amount (the pull-back operator). This may be discussed further in the sections on frequency modulation discussed in the supporting description.

The CSPE technique may also be utilized for real signals in addition to complex signals, as real functions may be expressed as the sum of a complex function and its complex conjugate function. For example, for a real sinusoid with period $p=q+\delta$ where p is an integer and $\delta$ is a fractional deviation of magnitude less than 1, i.e. $|\delta| \leq 1$, with amplitude "a" and arbitrary phase, the samples of a real sinusoid may be written as linear combinations of complex sinusoids, such as the following (here $j=\sqrt{-1}$):

$$\vec{s}_{0(n)} = \frac{a}{2} e^{j\frac{2\pi(q+\delta)}{N}n} + \frac{a}{2} e^{-j\frac{2\pi(q+\delta)}{N}n}$$

and the one sample shift would be:

$$\vec{s}_{1(n)} = \frac{a}{2} e^{j\frac{2\pi(q+\delta)}{N}n} e^{j\frac{2\pi(q+\delta)}{N}} + \frac{a}{2} e^{-j\frac{2\pi(q+\delta)}{N}n} e^{-j\frac{2\pi(q+\delta)}{N}} \text{ if }$$

$$D = e^{j\frac{2\pi(q+\delta)}{N}}$$

is defined, the vectors may be written as:

$$\vec{s}_{0(n)} = \frac{a}{2} D^n + \frac{a}{2} D^{-n}$$

$$\vec{s}_{1(n)} = \frac{a}{2} D^n D + \frac{a}{2} D^{-n} D^{-1}$$

In this example, the DFT of each one of these vectors may then be:

$$F(\vec{s}_0) = F\left(\frac{a}{2} D^n + \frac{a}{2} D^{-n}\right)$$

$$F(\vec{s}_0) = \frac{a}{2} F(D^n) + \frac{a}{2} F(D^{-n})$$

$$F(\vec{s}_1) = F\left(\frac{a}{2} D^n D + \frac{a}{2} D^{-n} D^{-1}\right)$$

$$F(\vec{s}_1) = \frac{a}{2} DF(D^n) + \frac{a}{2} D^{-1} F(D^{-n})$$

The CSPE may be computed using the complex product $F(\vec{s}_0) \odot F^*(\vec{s}_1)$ of the shifted and unshifted transforms, where the product operator $\odot$ may be defined as the complex product taken element-by-element in the vector:

$$F(\vec{s}_0) F^*(\vec{s}_1) = \left[\frac{a}{2} F(D^n) + \frac{a}{2} F(D^{-n})\right] \odot \left[\frac{a}{2} DF(D^n) + \frac{a}{2} D^{-1} F(D^{-n})\right]^*$$

$$= \left(\frac{a}{2}\right)^2 [F(D^n) + F(D^{-n})] \odot [D^* F^*(D^n) + DF^*(D^{-n})]$$

The product may be expanded to obtain the following $$F(\vec{s}_0) F^*(\vec{s}_1) = \left(\frac{a}{2}\right)^2 \begin{bmatrix} D^* F(D^n) \odot F^*(D^n) + \\ DF(D^n) \odot F^*(D^{-n}) + \\ D^* F(D^{-n}) \odot F^*(D^n) + \\ DF(D^{-n}) \odot F^*(D^{-n}) \end{bmatrix}$$

The above equation may be simplified to produce:

$$F(\vec{s}_0) F^*(\vec{s}_1) = \left(\frac{a}{2}\right)^2 \begin{bmatrix} D^* \|F(D^n)\|^2 + \\ DF(D^n) \odot F^*(D^{-n}) + \\ D^* F(D^{-n}) \odot F^*(D^n) + \\ D\|F(D^{-n})\|^2 \end{bmatrix}$$

In an example, the above simplified equation may be viewed as a sum of the CSPE for a "forward-spinning" or "positive-frequency" complex sinusoid and a "backward-spinning" or "negative-frequency" complex sinusoid, plus interaction terms. The first and the last terms in the sum may be the same as previously discussed CSPE calculations, but instead of a single complex sinusoid, there may be a linear combination of two complex sinusoids. Further, the contributions to the CSPE from these two terms may represent highly-concentrated peaks positioned at $q+\delta$ and $-(q+\delta)$, respectively. The interaction terms may have some properties that may decrease the accuracy of the algorithm if not handled properly. As will be shown below, the bias introduced by the interaction terms may be minimized by windowing the data. Additionally, the interaction terms, Γ, may be simplified as follows:

Γ=[DF(D$^n$)⊙F*(D$^{-n}$)+D*F(D$^{-n}$)⊙F*(D$^n$)]

Γ=2*Re[DF(D$^n$)⊙F*(D$^{-n}$)]

F(D$^n$) may be, for example, a peak concentrated at frequency position $q+\delta$, and that F(D$^{-n}$) may be a peak concentrated at frequency position $-(q+\delta)$, and that the product may be taken on an element-by-element basis, (so Γ≈0 for a number of cases).

The data provided in the exemplary scenario discussed above may be analyzed using an analysis window, including but not limited to a Hanning window, a Hamming window, or a rectangular window, or any other standard windowing function. Further, the measured spectrum may be found by convolving the true (that is to say, delta-like) sinusoidal spectrum with the analysis window. For example, if a rectangular window (such as, the boxcar window) is used, the leakage into nearby spectral bins may be significant and may be of sufficient strength to produce significant interaction terms. The interaction terms may cause the magnitude squared terms (that is to say, the terms in ‖●‖$^2$ brackets) to interfere. To reduce the chance of significant interaction terms, another analysis window known in the art may be utilized so that the leakage may be confined to the neighborhood of $q+\delta$, and $-(q+\delta)$, so the Γ≈0 case is the most common situation. Further, after the CSPE is calculated, the frequencies may be reassigned by extracting the angle information. For the positive frequencies (such that where k>0), it may be determined that:

$$f_{CSPEk} = \frac{-N_k(F_k(\vec{s}_0)F_k^*(\vec{s}_1))}{2\pi}$$

$$= \frac{-N_k\left(\left(\frac{a}{2}\right)^2 \|F_k(D^n)\|^2 e^{-j\frac{2\pi(q+\delta)}{N}}\right)}{2\pi}$$

$$= \frac{-N\left(-\frac{2\pi(q+\delta)}{N}\right)}{2\pi}$$

$$f_{CSPEk} = (q+\delta)$$

For the negative frequencies (k<0), the opposite value, $f_{CSPEk} = -(q+\delta)$ may be determined. Consequently, in the case of real signals (such as may be the case when $\Gamma \approx 0$), all of the power in the positive frequencies may be remapped to $q+\delta$, and all of the power in the negative frequencies may be remapped to $-(q+\delta)$. Such a result may be substantially independent of the frequency bin and may allow for extremely accurate estimates of frequencies.

In an example, CSPE may be performed for real sinusoids that have been windowed with an analysis window. CPSE may then be generalized, for example, to include the effects of windowing by defining the basic transform to be a windowed transform. For exemplary purpose, data may be windowed before computing the DFT. Further, for the purpose of exemplary discussion, an arbitrary analysis window, A (t), and its sampled version $A_n$ may be defined. The transforms may be performed as has been discussed previously. Further, the analysis window may be pre-multiplied by the function illustrated as below:

$$F(\vec{s}_0) \Rightarrow F(\vec{A} \odot \vec{s}_0) \equiv F_W(\vec{s}_0)$$

where the W subscript indicates that a windowed transform may be utilized.

Thus, in the presence of windowing, the following may be obtained:

$$F_W(\vec{s}_0)F_W^*(\vec{s}_1) = \left(\frac{a}{2}\right)^2 \begin{bmatrix} D^* \|F_W(D^n)\|^2 + \\ 2\mathrm{Re}\{DF_W(D^n) \odot F_W^*(D^{-n})\} + \\ D\|F_W(D^{-n})\|^2 \end{bmatrix}$$

The transform may enable minimizing the leakage into nearby frequency bins and further, reducing the interference terms to be negligible in most cases.

In accordance with some exemplary and non-limiting embodiments, in a unified domain model/super-resolution model for signal processing, an interaction among non-orthogonal AM/FM elements may be determined in a frequency-changing signal. Such determination may be made "tracker aware" so that an interaction tracker may be configured to look at the history of tracklets as they are evolving to make a consistent determination between the AM and FM components.

In an example, a method for performing modulation detection through an advanced fit process may be defined. For the purpose of discussion of the method, an assumption regarding the conventional Fourier based analysis methodology may be made. The assumption may describe that the conventional Fourier based analysis operates in a manner that any oscillator peak may be produced by a stable sinusoid during the time of a single analysis window, with a constant frequency and amplitude. For many applications, however, it may be necessary to detect changes in frequency and/or amplitude within a single analysis window. Such detection may be made by considering in combination or in isolation, one or more of the techniques as may be discussed below.

In an example, an amplitude modulation (AM)/frequency modulation (FM) detection technique using high resolution window (HRW) creation may be defined. The technique may include a singlet transformation process including applying a high resolution, frequency domain version of the analysis window to the time-domain samples to characterize the oscillator peak that may be analyzed. For the purpose of description, the high-resolution frequency domain version of the analysis window may be referred to as an (HRW).

In an example, the singlet transformation process may be used to characterize the oscillator peaks that may not be constant in amplitude and/or frequency within the sample window. In order to do so, an HRW with the corresponding amplitude and/or frequency modulation may be used for analysis. Such an HRW designed for amplitude modulation may hereinafter be referred to as an (AM HRW) for the purpose of description. For example, to analyze an oscillator peak that may be the result of a sinusoid that increased in amplitude during the sample window, it may be compared to an HRW where the analysis window used to create the HRW may be multiplied by the same increasing amplitude prior to conversion to the frequency domain. In a similar example, to analyze an oscillator peak that is modulating in frequency, an HRW where the analysis window is multiplied by a Modulation Creation Operator for the corresponding frequency modulation rate prior to conversion to the frequency domain may be used. Such an HRW may be hereinafter referred to as an (FM HRW) for the purpose of description.

The detection techniques discussed above may be combined to analyze the effects of a sinusoid with both amplitude and frequency modulation. Such an HRW may be hereinafter referred to as an (AM/FM HRW) for the purpose of description.

Figure 10:
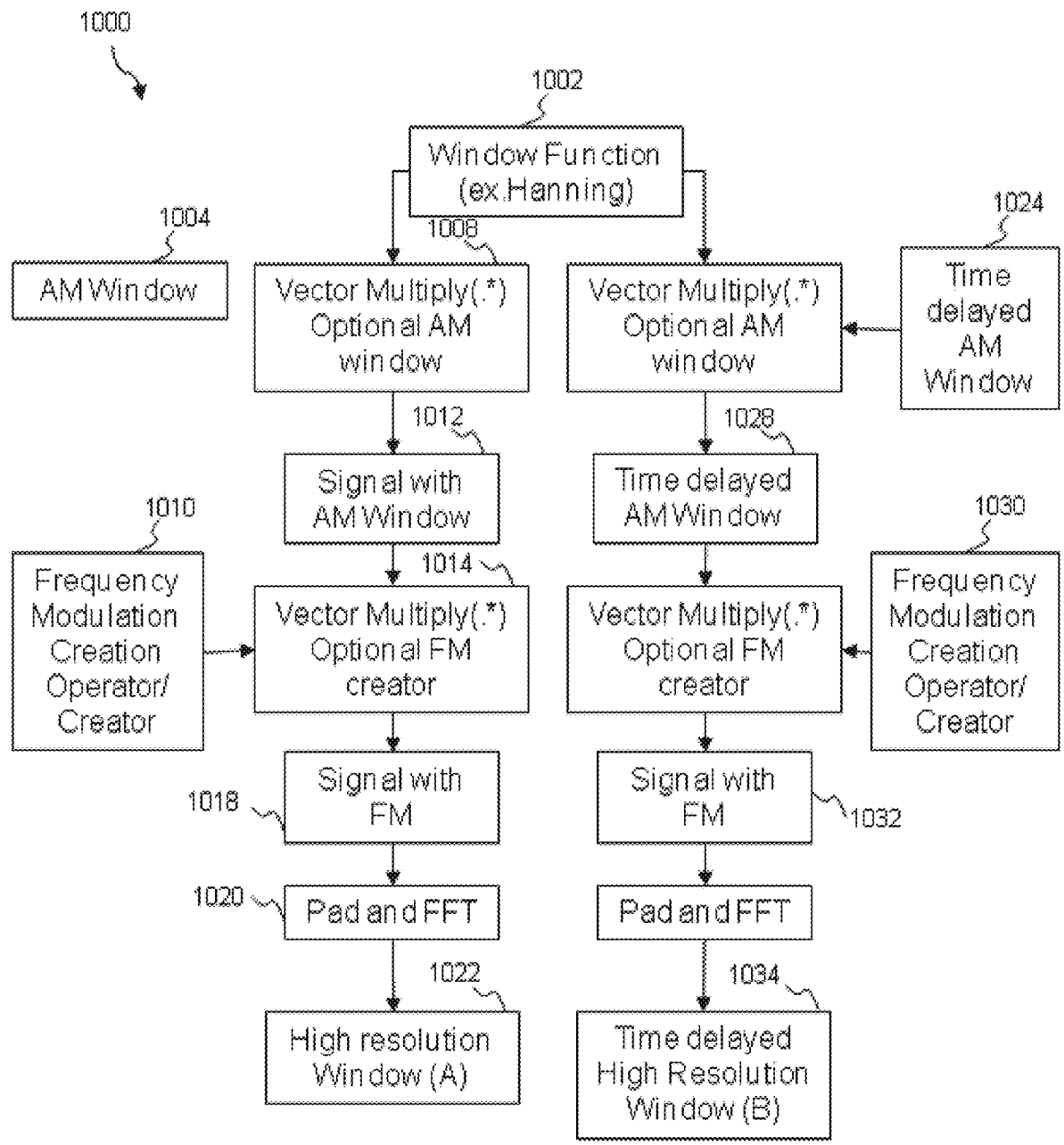
FIG. 10 illustrates an example of a method for creating high-resolution windows for AM/FM detection according to an exemplary and non-limiting embodiment.

FIG. 10 illustrates an example of a method for creating the high-resolution AM/FM windows. The method 1000 includes starting the process of high-resolution window creation with a copy of an original analysis window, such as is illustrated by the Window function 1002. The method 1000 may further include, at 1008, multiplying the analysis window 1002 by the desired amplitude modulation 1004, using such as a Hadamard product, for creating a window for the analysis of amplitude modulation 1012. The method 1000 may further include, at 1014, multiplying the window 1012 by the frequency Modulation Creation Operator 1010 with the appropriate modulation amount to create the window for the analysis of frequency modulation 1018. The Frequency Modulation Creation Operator (FMCO) may be configured to transform a sinusoid that is stable in frequency to one that is modulating in frequency. The method 1000 may further include, at 1020, padding the window 1018 to the desired length. In a preferred example, the desired length may be 16 or 32 times the original length of the sample window. Further, at 1020, an FFT or DFT may also be performed to the transform the analysis to the frequency domain. The transformation may result in a high resolution window (A) 1022, as illustrated in the example of FIG. 10.

The method 1000, may also be performed alternatively by repeating the steps 1008 till 1020 by using time shifted AM window 1024 and/or time shifted FM window 1030, that may be obtained by shifting the AM window 1004 and the FM window 1010 by the appropriate shifting factors for the time delay used when preparing the Sample time delayed high resolution Window (B) 1034 in the pre-processor.

In an example of a method for amplitude modulation (AM) detection, amplitude modulation may be detected by using the Singlet Transformation Method to compare various AM HRWs, each of which may have a different AM envelope applied in the time domain, as discussed previously. An AM HRW may be closest in shape in the frequency domain to an oscillator peak created from a sinusoid that has a similar amplitude modulation. Thus, the amplitude modulation of the original signal may be detected by selecting the AM HRW with the lowest residual error.

Figure 11:
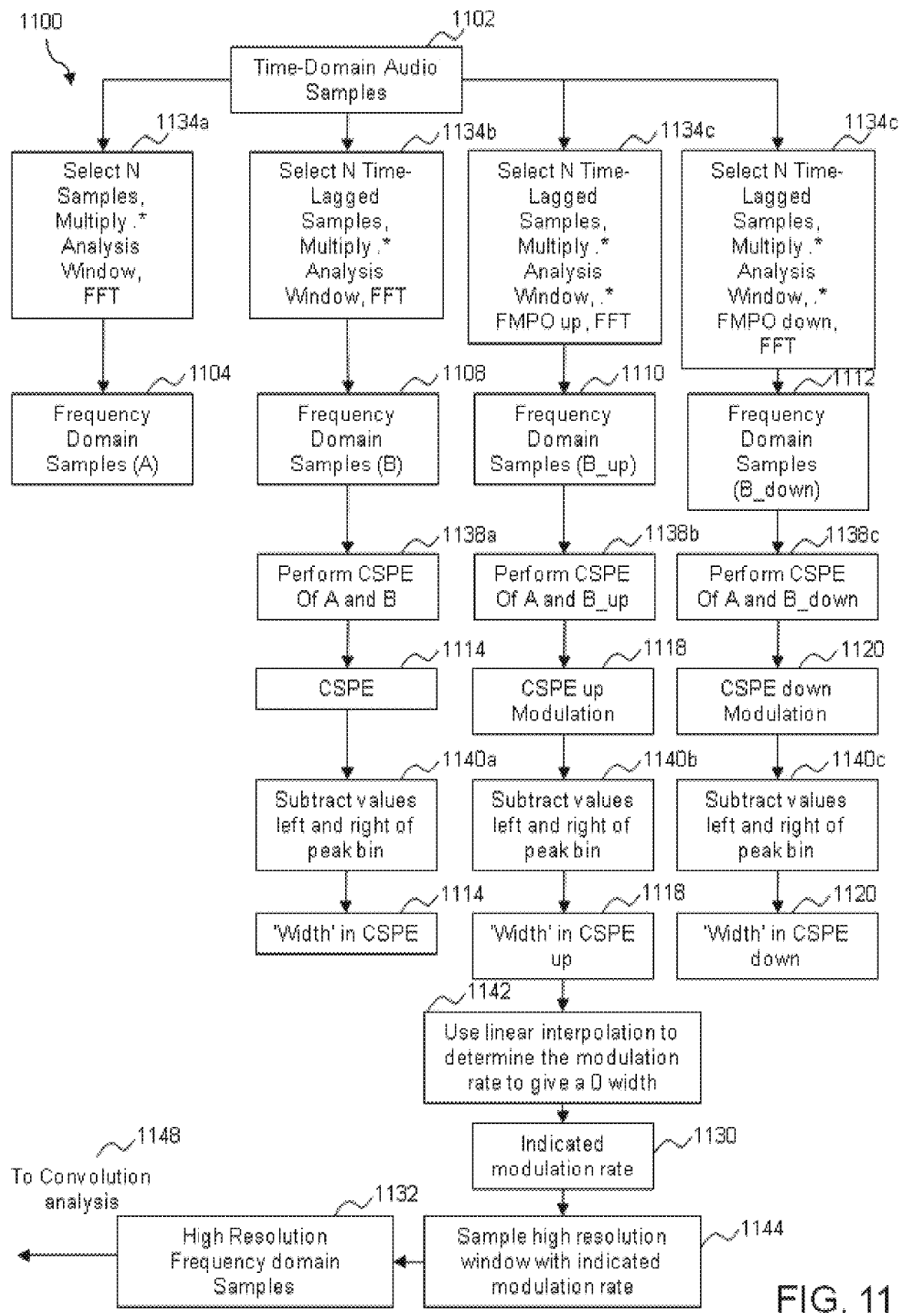
FIG. 11 illustrates an example of a method for frequency modulation detection according to an exemplary and non-limiting embodiment.

FIG. 11 illustrates an example of a method 1100 for frequency modulation detection. The method 1100 includes, at 1134, using the original time-domain audio samples 1102 in the pre-processor to create two additional (B) windows, the frequency domain sample window (B_UP) 1110, and the frequency domain sample window (B_DOWN) 1112. The additional windows may be created by, applying the Frequency Modulation Pullback Operator (FMPO) for a positive modulation to one (B) window, at 1134c, and call the window the (B_up) window 1110. This may be accomplished via a Hadamard product. Similarly, the method 1030 allows for the creation of Frequency Modulation Creation Operators. Similarly, the method 1100 may include, at 1134d, applying the Frequency Modulation Pullback Operator (FMPO) for a negative modulation to the other (B) window, and call it the (B_down) window 1112. This may also by accomplished via the Hadamard product. The method 1100 may further include, at 1138 (a-c), performing three Complex Spectral Phase Evolutions (CSPEs), as discussed in the description for Single Channel Super-Resolution Module, a non-modulation CSPE, at 1138a, of the (A) window and the (B) window; an up modulating CSPE, at 1138b, of the (A) window and the (B_up) window; and a down modulating CSPE, at 1138c, of the (A) window and the (B_down) window. In accordance with certain non-limiting examples, taking the inputs and implementing the methods described herein, a processor may be configured to receive a first set and a second set of frequency domain data, each having a given, or "fundamental," transform resolution, and the processor may further be configured to perform complex spectral phase evolution (CSPE), as further described herein, on the frequency domain data to estimate component frequencies at a resolution at very high accuracy, such that the accuracy may be typically greater than the fundamental transform resolution. As used herein, "transform resolution" may refer to the inherent resolution limit of a transformation method; for example, if a DFT or FFT is calculated on an N-point sample window taken from data that was sampled at Q samples per second, then the DFT or FFT may exhibit N frequency bins, of which half would correspond to positive (or positive-spinning) frequency bins and half would correspond to negative (or negative-spinning) frequency bins (as may be defined by a standard convention known in the art). The highest properly sampled signal that may be detected in this method may include a frequency of Q/2 that may be divided up into N/2 positive frequency bins, resulting in an inherent "transform resolution" of Q/N Hertz per bin. A similar calculation may be done for any of the other transformation techniques to determine the corresponding "transform resolution." In some examples there may further be performed peak selection comprising identifying one or more oscillator peaks in the frequency domain data, testing the CSPE behavior of at least one point near at least one of the identified oscillator peaks to determine well-behaved and/or short-term-stable oscillation peaks and performing an extraction of identified oscillator peaks. In other examples, further the amplitude and the phase of each identified oscillator peaks may be determined and a singlet transformation/singlet representation may be performed to map from a high resolution space to a low resolution space. In other examples, a singlet representation may be performed to remove a contribution of each identified oscillator peak from the frequency domain data.

As used above and herein, the "given," "original" or "fundamental" transform resolution is the resolution of the transform, such as the FFT, that may be used to provide the input data set of frequency domain data—that is, the inherent resolution of the transform used as the fundamental building block of the CSPE. Additional details on the CSPE transformation may be described in the following description.

In an example, performing the CPSE at 1138a-1138c may result in the generation of three CSPE windows, a CSPE window 1114, a CSPE_Up Modulation window 1118, and a CSPE_down modulation window 1120. Once an oscillator peak may be selected, the 'flatness' of the area around the peak in the CSPE, CSPE_up and CSPE_down may be analyzed. A signal with positive frequency modulation may have a flatter area around the peak in the CSPE_up, a signal with negative frequency modulation may have a flatter area around the peak in the CSPE_down, and a signal with a relatively low amount of frequency modulation may have a flatter area around the peak in the CSPE. For the purpose of description, the 'flatness' may refer to a plot of estimated frequency (or its equivalent measure, the effective rotation in complex space of the transforms for the A and B windows) such that the frequency bins near the oscillator peak map to a nearly constant value. The method 1100 may further include, at 1140 (a-c), subtracting the values in the left and right of peak from the CSPE window 1114, the CSPE_up window 1118 and the CSPE_down window 1120, to identify the width in CSPE 1122, the width in CSPE_up 1124 and the width in CSPE_down 1128 respectively, of the frequency modulation. If frequency modulation is detected, the values calculated at 1140, that is to say the values 1120-1124, may be used at 1142 to interpolate the exact amount of frequency modulation. As a result, at 1130, the indicated modulation rate may be obtained. At 1144, the indicated modulation rate 1130 may further be used in conjunction with an FM HRW to analyze and remove the oscillator peak to obtain the high resolution frequency domain samples 1132, which may further be used for convolution analysis 1148.

In an example, a method for FM detection may be elaborated. The complex spectral phase evolution methods may be extended so that they may be applied to signals that are more complicated than the short-time stable sinusoids that were introduced earlier. In this example, a variation on the CSPE may be introduced that may be applied to signals that may be sweeping through a range of frequencies, and may determine with good accuracy the key underlying parameters that may define the sweeping frequency.

An exemplary way to define a linear swept sine signal in the continuous case may be as follows:

$$x(t) = \sin\left(2\pi\left(f_0 t + \frac{\delta}{2}t^2 + \phi_0\right)\right)$$

where $f_0$ may be the root frequency, $\delta/2$ may be the frequency modulation rate and $\phi_0$ may be the initial phase of the signal. In the case where the signal may be discretely sampled, a convenient form of the swept sine signal may be:

$$\vec{x} = \exp\left(i\frac{2\pi}{N}\left\{[0:N-1]f_0 + \frac{\delta}{2}[0:N-1] + \frac{\delta}{2}([0:N-1]\odot[0:N-1])\right\}\right)$$

where $[0: N-1]$ may be defined as to mean a vector of samples labeled $0, 1, 2, \ldots, N-1$, and $([0: N-1]\odot[0: N-1])$ may be the Hadamard/Schur product of the sample vector with itself. For the purpose of discussion, the Hadamard/Schur product of a vector with itself may hereinafter be abbreviated as $[0: N-1]^{\wedge 2}$ in the following description. The operator $\odot$ may be defined to be the Hadamard/Schur product hereinafter. Without deviating from the spirit and scope of this disclosure, the first two terms in the curly braces may be combined as $$\left(f_0 + \frac{\delta}{2}\right)[0:N-1],$$

but it may also be convenient to write it in the uncombined form. The notation above may indicate a complex exponential form of the sinusoid (sometimes called the "analytic signal" by those skilled in the art), but one can easily convert back to the sine or cosine form by taking the real or imaginary part of the complex exponential. In an example, the vector $\vec{x}$ may represents a (complexified) sample of N points from the swept sine signal, and a subscript may be added to indicate the last sample included in the vector, such that in an example, the notation $\vec{x} \rightarrow \vec{x}_{N-1}$ may be used to represent that this vector of samples ends at sample N−1 (but it is implied that N total samples are included in the vector). Consequently, using this notation, the next possible group of N samples may be represented as depicted below:

$$\vec{x}_N = \exp\left(i\frac{2\pi}{N}\left\{[1:N]f_0 + \frac{\delta}{2}[1:N] + \frac{\delta}{2}([1:N]^{\wedge 2})\right\}\right)$$

In keeping with the spirit and scope of the CSPE methods discussed in the underlying description, the evolution of the signal from one group of N samples to a later group of N samples may be analyzed. In an example, this may be achieved by defining an evolution operator that may advance the signal so as to define $\Gamma_1: \vec{x}_{N-1} \rightarrow \vec{x}_N$ to be a one-sample evolution operator (applying it multiple times may advance the signal by more than one sample):

$$\vec{\Gamma}_1 = \exp\left(i\frac{2\pi}{N}\{\vec{f}_0 + \delta[1:N]\}\right)$$

whereby $\vec{f}_0$ may represent vector of length N where each entry may be the value $f_0$. Then by combining and refactoring it may be observed that $\vec{f}_1 \odot \vec{x}_{N-1} = \vec{x}_N$. This may be seen by the following rearrangement of the vector terms in the exponent:

$$\vec{f}_0 + \delta[1:N] + [0:N-1]f_0 + \frac{\delta}{2}[0:N-1] +$$
$$\frac{\delta}{2}([0:N-1]^{\wedge 2}) = [1:N]f_0 + \frac{\delta}{2}[1:N] + \frac{\delta}{2}[1:N] +$$
$$\frac{\delta}{2}[0:N-1] + \frac{\delta}{2}([0:N-1]^{\wedge 2}) = [1:N]f_0 + \frac{\delta}{2}[1:N] +$$
$$\frac{\delta}{2}\{[1:N] + [0:N-1] + [0:N-1]^{\wedge 2}\} = [1:N]f_0 +$$
$$\frac{\delta}{2}[1:N] + \frac{\delta}{2}[1:N]^{\wedge 2}$$

where the last step may follow from the general term:
$n+(n-1)+(n-1)^2=2n-1+(n^2-2n+1)=n^2$.

Thus it may be observed that $$\vec{\Gamma}_1 \odot \vec{x}_{N-1} = \exp\left(i\frac{2\pi}{N}\left\{[1:N]f_0 + \frac{\delta}{2}[1:N] + \frac{\delta}{2}[1:N]^{\wedge 2}\right\}\right) = \vec{x}_N$$

In an example, the ability to specify the evolution operator may be important since the basic premise of the CSPE methods may be to compare a time-advanced (or, in some applications, space-advanced) snapshot of a signal with the original snapshot of the signal and then to isolate terms that may reveal the underlying parameters that may be used in a mathematical reconstruction of the signal. As has been previously discussed, the "frequency" $f_0$ may be held at the first instant in the group of samples, and it may be more convenient to reformulate the problem so that the modulation may be considered relative to the instantaneous "frequency" at the center of the window of N samples. The quotes have been placed around "frequency" since it may be more accurate to consider $f_0$ to be the period of the signal, since a sinusoidal signal of the form $$x = \sin\left(\frac{2\pi}{N}[0:N-1]f_0\right)$$

may go through exactly $f_0$ periods in the N samples; however, it may be common to call $f_0$ the frequency and one skilled in the art may be able to determine the precise meaning based on the context of the usage. In this example, the modulation may be sweeping away from the initial frequency $f_0$ and one may view this as setting the initial instantaneous frequency in a group of N samples as being $f_0$. It may be possible to reformulate the modulation problem so that the modulation may be viewed as a modulation about an instantaneous frequency that may occur at the center of a group of N samples. This centered formulation may be convenient and so it may be discussed further.

In an example, the creation of a modulating signal may begin with a stable sinusoid, and Q periods over N samples may be taken such that:

$$\vec{x} = \exp(i2\pi[0:N]Q/N)$$

Further, a (centered) Frequency Modulation Creation Operator (FMCO) may be defined as:

$$FMCO = \exp\left(i\frac{2\pi}{N}\frac{\delta}{2}\left[-\frac{N}{2}:\frac{N}{2}\right]^{\wedge 2}\right)$$

and when the FMCO may be applied to the sampled sinusoid $\vec{x}$, the result may be a modulating signal, $\vec{y}$ (here defined with N+1 points that will be used to study the signal evolution):

$$\vec{y} = \exp\left(i\frac{2\pi}{N}\frac{\delta}{2}\left[-\frac{N}{2}:\frac{N}{2}\right]^{\wedge 2}\right) \odot \exp(i2\pi[0:N]Q/N) =$$

$$\exp\left(i\frac{2\pi}{N}\left\{[0:N]Q + \frac{\delta}{2}\left[-\frac{N}{2}:\frac{N}{2}\right]^{\wedge 2}\right\}\right)$$

where y may be a linearly modulating signal, with an instantaneous center frequency corresponding to Q periods in an N point sample window.

In the exemplary embodiment discussed above, the linear frequency modulation may be created in such a way that if δ=1/N, then the signal may exhibit an increase of 1 period in every sequential non-overlapping N-point sample window. Thus, while it may be recognized that the frequency may be increasing in a continuous and linear fashion, the defined equation structure may lead to a signal with Q full oscillations in the first N samples (such that a full oscillation may be defined to be a passage through a full 2π interval), and in the next N samples, the signal may exhibit Q+1 full oscillations, and in the next N samples the signal may exhibit Q+2 full oscillations, and the like.

In an example, if the modulation parameter δ=2/N, then the formulation above may give an increase of 2 periods in every subsequent window of N samples (non-overlapping). In an alternate example, if the windows are overlapped by 50%, it may give an increase of 1 period in each subsequent 50% overlapping window, so if the signal exhibits Q full oscillations over samples 1 to N, then for a 50% overlapping window of samples N/2+1 to N/2+N, the signal may exhibit Q+1 full oscillations and for the next 50% overlapping window of samples N+1 to 2N the signal may exhibit Q+2 full oscillations.

In a similar example, if the modulation parameter may be taken to be δ=P/N, then the signal may exhibit an increase of P periods in every subsequent window of N samples (non-overlapping). In this example, the formulation of the signal frequency may be related to the value of Q (periods) through the usual transformations between frequency and period. The signal may be defined so that the instantaneous frequency at the center of an analysis window may be equal to the frequency that may create Q periods in the window. The modulations may be around that center frequency. In order to develop a method similar to the CSPE for short-time stable sinusoids and extend the method to modulating frequencies, it may be necessary to develop a Frequency Modulation Pullback Operator (FMPO) that may operate on the time-advanced (or in some cases spatially-shifted) data in such a manner that the frequency transform of the resulting signal from the Hadamard/Schur product of the FMPO and the time-advanced signal may be nothing more than a phase rotation from the transform of the first signal.

In an example, the FMPO may be defined as illustrated below:

$$FMPO = \exp\left(\pm i\frac{2\pi}{N}\delta[-N/2:N/2]\right)$$

In this example, the sign of the imaginary unit, i, may be chosen to be positive or negative depending on whether an up pullback operation or a down pullback operation may be desired. The CSPE technique for modulating signals may then become $$CSPE = F^*(\vec{y}_{N-1}) \odot F(FMPO \odot \vec{y}_N) =$$

$$e^{i2\pi \cdot \frac{Q+\delta/2}{N}} F^*(\vec{y}_{N-1}) \odot F(FMPO \odot \vec{y}_N) = e^{i2\pi \cdot \frac{Q+\delta/2}{N}} \|F(\vec{y}_{N-1})\|^2$$

The derivation of this result may come from the following formulation where the exponent in (FMPO⊙$\vec{y}_N$) may be considered and the factor $$i\frac{2\pi}{N}$$

may be ignored for the purpose of the derivation:

$$-\delta\left[-\frac{N}{2}:\frac{N}{2}-1\right] + [1:N]Q +$$

$$\frac{\delta}{2}\left[-\frac{N}{2}+1:\frac{N}{2}\right]^{\wedge 2} = [1:N]Q + \frac{\vec{\delta}}{2} + \frac{\delta}{2}\left[-\frac{N}{2}:\frac{N}{2}-1\right]^{\wedge 2} =$$

$$\left(\vec{Q}+\frac{\vec{\delta}}{2}\right) + [0:N-1]Q + \frac{\delta}{2}\left[-\frac{N}{2}:\frac{N}{2}-1\right]^{\wedge 2}$$

where the transformation from the first to the second line above may be seen by considering the general term:

$$-\delta\left(\frac{N}{2}-1\right) + \frac{\delta}{2}\left(\frac{N}{2}\right)^2 = \frac{\delta}{2} + \frac{\delta}{2}\left(\left(\frac{N}{2}\right)^2 - N + 1\right) = \frac{\delta}{2} + \frac{\delta}{2}\left(\frac{N}{2}-1\right)^2$$

In the example above, putting all the elements together may give the result that $$(FMPO \odot \vec{y}_N) = \exp\left(i\frac{2\pi}{N}\left(Q+\frac{\delta}{2}\right)\right)\vec{y}_{N-1}$$

and the result above for the modulating CSPE follows. Consequently, if the angle of the modulating CSPE may be calculated, and further may be normalized by multiplying by N/(2π), the result may be exactly $$Q + \frac{\delta}{2}$$

and this result may be found in any frequency bin if a single modulating signal were present. In practice, other interfering signals may be present, but the result may still hold in the region around the spectral peak associated with the modulating signal. As a result it may be concluded that this calculation may have been rendered a local operation in the frequency domain, and this may make it much more robust. If one skilled in the art were to isolate Q and δ then the modulating signal may be recreated exactly using the modulating signal creation techniques as described within the scope described above.

In an exemplary method of determining the correct value of δ, calculation of the modulating CSPE for a set of modulation rates and from the resulting calculations, extrapolation or interpolation to the correct value of δ may be performed. The extrapolation may be done by measuring the width of the remapped spectral peak after calculating the CSPE and modulated CSPE for a few values of the modulation rate. The correct value of the modulation rate may then be used to produce a spectral peak of near-zero width, and since the width of the spectral peak may vary approximately linearly with the modulation rate, one may use interpolation or extrapolation to estimate the value of the modulation rate that may produce the near-zero width peak. This may have the benefit of allowing the calculation of independent modulation parameters (i.e. δ values) for several different signal components that may be present and may have different modulation rates. A second approach may be to use an iterative scheme to converge upon the optimal modulation rate. In either case, the desired result may be detected by the presence of a delta function-like spectrum that results from taking the power in every frequency bin and re-plotting it at the locally measured value of $$Q + \frac{\delta}{2}.$$

This may help to reduce the spectrum to a delta function when the correct value of δ is used. If a number of different modulating signals may be present, then if a signal associated with a spectral peak $p_k$ may have a modulation rate $\delta_k$, and then if the modulating CSPE may be calculated with δ replaced by $\delta_k$, then the resulting spectrum locally around peak $p_k$ may be like a delta-function. Hence, either through extrapolation/interpolation, or through iteration, it may be possible to isolate the central frequency values (corresponding to Q) or the modulation rates for linearly modulating signals.

In an example, a method for combined AM/FM detection may be defined. The methods for amplitude and frequency modulation detection discussed thus far may be used to detect either frequency modulation or amplitude modulation, but not both. There may be several methods of integrating these techniques into a coherent framework, including various decision trees, with and without mixed AM/FM detection, and tracker-assisted modulation detection. An exemplary decision tree may be discussed in the following description.

In an exemplary signal processing method, frequency modulation and amplitude modulation may be indistinguishable or intermixed. The method may include mapping the modulation into the complex plane, so that radial changes may be considered as amplitude modulation, angular changes may be considered as frequency modulation, and a co-variance matrix may be output into a tracking method. The tracker may then use the information calculated over time to determine which portion of the modulation is better or more effectively characterized as amplitude modulation and which portion is better or more effectively characterized as frequency modulation.

Figure 12:
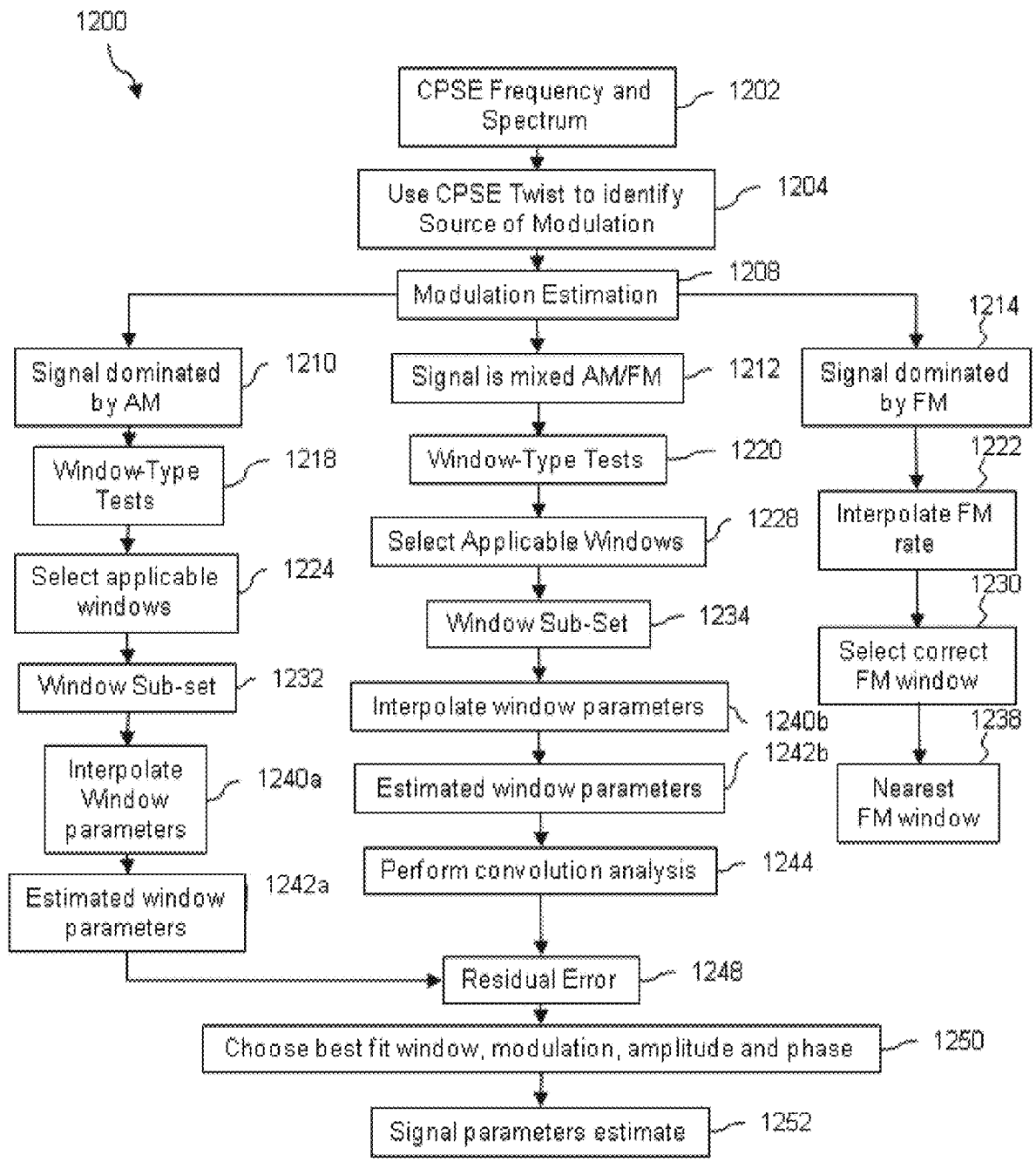
FIG. 12 illustrates a modulation detection decision tree according to an exemplary and non-limiting embodiment.

FIG. 12 illustrates an example of a method using a decision tree 1200 that may be used to combine AM/FM detection. The decision tree method 1200 may include at 1204, using a CPSE twist to identify a source of modulation for a CPSE frequency spectrum 1202. The method 1200 may further include using the modulation estimation 1208 obtained from the identification step 1204 to perform one of the three exemplary processes illustrated in the FIG. 12. In a first example, the modulation estimation 1208 may provide a signal dominated by AM 1210. In a second example, the modulation estimation 1208 may provide a signal with mixed AM/FM 1212, while in a third example, the modulation estimation 1208 may provide a signal dominated by FM 1214. The decision tree method 1200 may then include at 1218 and 1220, performing window type tests on the signal dominated by AM 1210 and the signal with mixed AM/FM 1212 respectively. The method 1200 may also include in an example, at 1222, interpolating an FM rate for the signal dominated by FM 1214. The method 1200 may then include at 1224 and/or 1228 selecting applicable windows from the windows obtained after performing window type tests 1218-1220. In an example, the method may include at 1230 selecting a correct FM window after the interpolation performed at 1222.

The method 1200 may further include, at 1232-1234 obtaining a window subset and/or at 1238 obtaining a nearest FM window based on the steps performed at 1224-1230. The method may further include, at 1240, that is to say at 1240a and at 1240b, interpolating window parameters for the window subsets 1232-1234, to obtain at 1242, the estimated window parameters, such as the estimated window parameter 1242a and the estimated window parameter 1242b. The method 1200 may further include, at 1244 performing convolution analysis on the estimated window parameters 1242. Further, the method 1200 may include, at 1248, identifying residual error 1248 for the results of convolution analysis 1244 and/or for the nearest FM window 1238. Based on the error, the method 1200 may include, at 1250, choosing the best fit window, modulation, amplitude and phase and provide the results of selection as the estimated signal parameters 1252. In its simplest form, the method 1200 may be reiterated as including the steps of calculating the fit-error for a non-modulating sinusoid, calculating the fit-error for various AM HRW, calculating the fit-error for the closest available FM HRW, and choosing the HRW and fit parameters that may yield the lowest residual error.

While the above steps may detect modulation effects more effectively than conventional FFT-based analysis, a more sophisticated decision tree may be used that may allow for the detection of both AM and FM simultaneously. In an example, the sophisticated decision tree may include calculating the apparent frequency modulation using any of the one or more FM detection methods discussed previously. The frequency modulation may hereinafter by refer herein to as the 'Indicated Modulation Rate'. The sophisticated decision tree may further include determining if the Indicated Modulation Rate is out of bounds or close to zero. If the Indicated Modulation Rate is out of bounds or close to zero, the modulation may be dominated by amplitude effects. Thus, amplitude modulation windows may be used for an analysis of the modulation rate using any of the plurality of AM detection methods discussed previously.

In an example of the sophisticated decision tree, if the indicated modulation rate is within certain ranges, the signal may be affected by both amplitude and frequency modulation. Thus, the sophisticate decision tree may include selecting a set of AM/FM HRWs. In an example, the amplitude modulation may skew the results of the CSPE flatness calculation. For example, a sinusoid with a positive frequency modulation of 2 periods per window may create an Indicated Modulation Rate of 2.0, but if the same sinusoid is also increasing in amplitude, it may create an Indicated Modulation Rate of 2.18. These effects may be pre-determined, and a calibration table may need to be created.

In accordance with one or more examples, there may be circumstances where amplitude modulation and frequency modulation may be indistinguishable or intermixed. In these cases, knowledge of the behavior of that oscillator in previous sample windows may be used to identify the true modulation. For example, if the oscillator peak belongs with a tracklet of data that may have been falling in frequency, it may be likely that the frequency may continue falling. In some examples, the peak detection process may be aware of the state of the tracker so that it may make such inferences. In other examples, the peak detection process may output ambiguous information that may be finalized by the tracker. Further, in some examples, the peak detector may use the track information to utilize fewer steps in an AM/FM detection decision tree, starting with the most likely AM/FM combinations.

In accordance with one or more examples, the multi-channel super-resolution method discussed previously may have as an output, a set of parameters describing individual oscillator components, and their relationship to each channel. In the set of parameters, each parameter may contain information that may be required to accurately reconstruct the oscillator with the use of such as the Unified Domain Re-synthesis methods. In a preferred example, that information may generally contain frequency, amplitude, Unified Domain sigma, amplitude modulation, frequency modulation, and the phase of the oscillator in each channel as well as any appropriate amplitude or frequency modulation parameters that may apply. The Unified Domain Sigma represents the portion of the signal that may be derived from each channel.

In accordance with exemplary and non-limiting embodiments, AM and FM modulation may be detected in a short duration window to achieve super-resolution for AM and FM characteristics. In other embodiments, one or more frequency modulation pullback operators as described herein may be applied to at least one set of sample data.

In accordance with exemplary and non-limiting embodiments, frequency modulation in a sample window may be detected. A plurality of frequency modulation pullback operators (FMPOs) may then be applied to at least a set of sample data with the results subjected to one or more of an interpolation, a linear interpolation, an extrapolation and an iteration to provide an improved estimate of an actual modulation rate. In some examples, the plurality of FMPOs may include at least two of an "up," a "down" and a "neutral" operation.

In a modification of the CSPE described above, in accordance with certain exemplary embodiments, a sample window, such as a "hamming window" or other standard windowing function or "tapers" may be used but, when dealing with an FM input signal, there may be inserted another vector (the FMPO—frequency modulation pullback operator) that may informally be hereinafter be referred to as a "twist vector". Typically, the FM signal may be moving in frequency as one receives the time-lagged version. In addition, AM signals tend to evolve in time like a rigid rotator; however, unlike the case of the effect of the analysis window used in the standard CSPE, for the AM modulation case the AM window may be a part of the data. Thus, when detecting the rotation of the "rigid rotator" of the AM window, one must allow for the shift in the AM window in the time-lagged version. For the frequency modulation case, application of the FMPO may turn the FM frequency back to something that may evolve like a rigid rotator, from which can be detected the frequency and the angular rotation. One can then derive the FM modulation and the reference "root" or "anchor" point for the frequency modulation representation.

In accordance with other exemplary and non-limiting embodiments, AM and FM modulation may be detected in a short time window to achieve super-resolution for AM and FM time windows. Complex spectral phase evolution (CSPE) may then be performed on the frequency domain data to estimate component frequencies at a resolution and/or an accuracy that may be greater than the fundamental transform resolution.

In an example, the amplitude effect of the AM signal may be different on the first snapshot or window of samples versus the lagged window of samples. Accounting for how the amplitude effect changes may allow derivation of the underlying signal from the CSPE. Conversely, as described above, with FM signals the FMPO may be used to derive the underlying FM behavior. With AM signals, the evolution of the amplitude effect may be considered.

In an example, creating the amplitude modulation windows may include taking a stable signal, applying an amplitude effect, and putting the result into a high-resolution FFT. By subsequently considering a variety of amplitude modulation effects, including but not limited to, AM effects where the amplitude envelope slopes upward, AM effects where the amplitude envelope slopes downward, AM effects where the amplitude envelope starts or stops at an arbitrary point in the data sample, AM effects where the amplitude envelope may have a combination of effects that may include sloping upward or downward or leveling off or transitioning smoothly from one AM envelope state to another, and any combination of these states, one may derive a series of high resolution oscillator peaks from which may be determined which one of the applied effects may fit best to a given component of the frequency spectrum.

In some examples, a plurality of amplitude effects may be pre-computed and multiplied by the analysis window. These amplitude effects may then be converted to the frequency domain via a high-resolution FFT or other transform and may be compared to the spectral peaks detected in the signal to determine the amplitude modulation effect that may be associated with the observed structure of the spectral peak. Examples of these AM effects may include, but are not limited to AM effects where the amplitude envelope slopes upward, AM effects where the amplitude envelope slopes downward, AM effects where the amplitude envelope starts or stops at an arbitrary point in the data sample, AM effects where the amplitude envelope has a combination of effects that include sloping upward or downward or leveling off or transitioning smoothly from one AM envelope state to another, and any combination of these states.

In accordance with another exemplary and non-limiting embodiment, a plurality of amplitude effects, such as commonly known amplitude effects within a library of possible known amplitude effects, may be applied in turn to a reference signal that may then have a high-resolution transform/FFT applied to it. Within a complex spectral phase evolution representation of a signal, an oscillator peak of an underlying signal that was modified by some amplitude effect may be analyzed, in order to determine which of the set of possible amplitude effects, when applied to the underlying signal/stable oscillator, results in the best fit to an actual oscillator peak of the underlying signal. Information known about the context of the signal, such as whether it is speech versus artificial sound, may be used to provide further assistance in the determination of what amplitude effect is likely the best representation of the change in amplitude over time of the underlying signal.

In accordance with exemplary and non-limiting embodiments, transient signal elements (onset and stop) may be treated as AM signals in a super resolution signal processing method. In addition to onset and stop, other transient signal elements including, but not limited to, rising up, rising down, or a generic envelope may be so treated. Mathematically, a sharp noise that occurs over a short time may be considered transient on some scale, where the short time duration of the noise is shorter than the sample window time. A short enough event may tend to have a very sharp envelope, and that envelope itself may be like an AM effect. As a result, in some examples, the present methodology may be configured to handle transient signal elements as manifesting themselves as AM signal effects.

In accordance with one or more examples, the signal component tracker/aggregator/selector/separator 214 as illustrated in FIG. 2, and hereinafter referred to as the signal component tracker 214, may be described. The function of the signal component tracker 214 in accordance with one or more examples may be to group and extract oscillator peaks for subsequent re-synthesis or output into one of the output formats.

Figure 13:
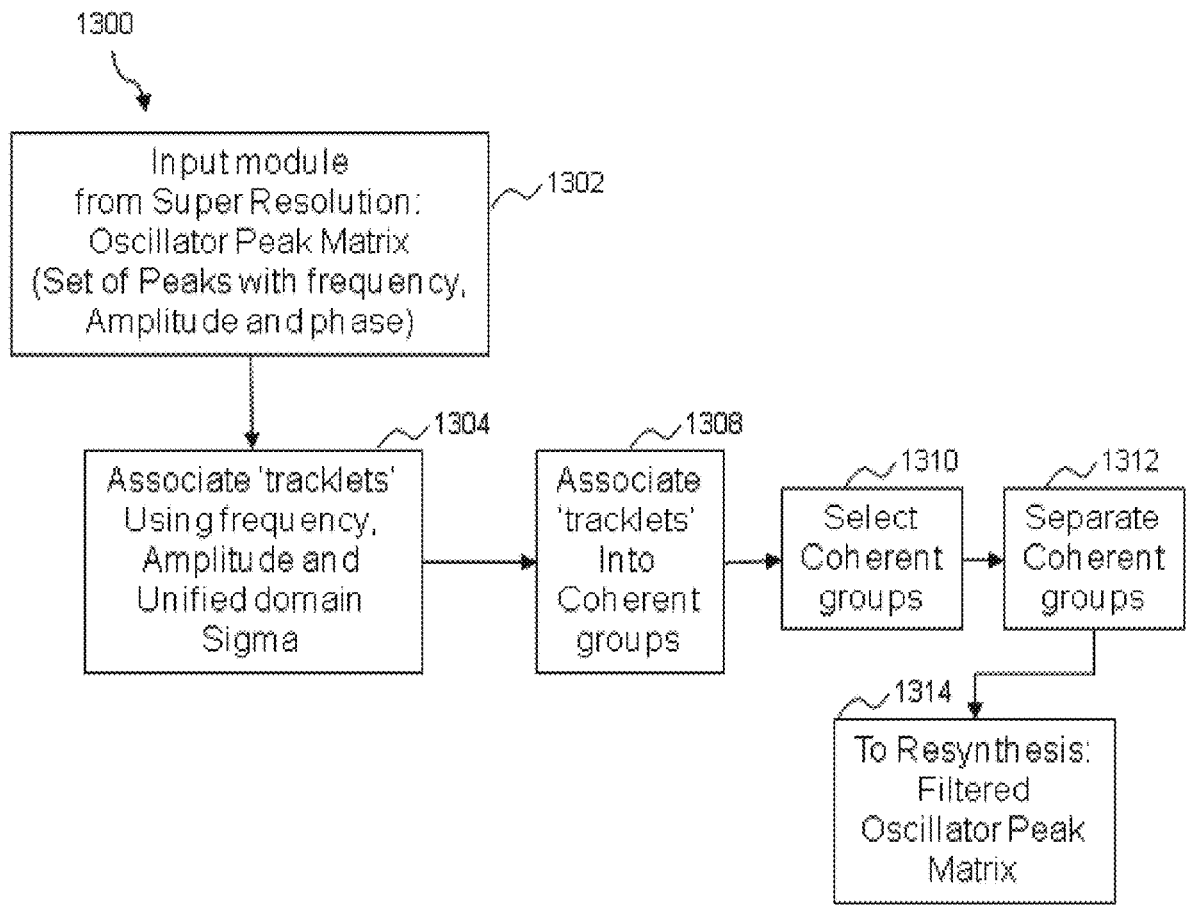
FIG. 13 illustrates an example of a method performed by a signal component tracker according to an exemplary and non-limiting embodiment.

FIG. 13 illustrates an example of a method 1300 performed by the signal component tracker. The signal component tracker may include an input module that may be configured to receive sets of signal oscillator peaks constructed by either the Single Channel Super-Resolution module or the Unified Domain Super-Resolution Module. Signal oscillator peaks may be given structure and organization by tracking methods. The oscillator peaks may be organized into sets of oscillator peaks, where each member of a set may be determined to be caused by the same oscillator ("Tracklets"). The method 1300 may include, at 1304, using the input provided by the input module 1302 to associate 'tracklets' using an association criteria that may include frequency, magnitude, Unified Domain Sigma, and other attributes to identify peaks from the same oscillator. The method 1300 may further include, at 1308, associating the 'tracklets' using their harmonic relationships to identify sets of tracklets created by the same source to group these tracklets into one or more "Coherent Groups". The grouping of tracklets may be performed using any of a plurality of tracking algorithms known in the art. Further, the method 1300 may include, at 1310, selecting the coherent groups and at 1312, separating the coherent groups to provide a filtered oscillator peak matrix 1314 for re-synthesis.

In an example, the tracking algorithms known in the art may include a Multi-Hypothesis Tracking (MHT) method. The method may include preserving multiple possible data associations until data is received that may confirm a correct association. In some other examples, the tracking algorithm may use other well-known algorithms to associate tracklet to oscillator peak, such as Greedy, Munkres, or JVC. In an algorithm, a Kalman Filter may be applied to predict the motion of a tracklet in several dimensions including, but not limited to, frequency and amplitude. Further, well-known grouping algorithms may also be applied to the problem of identifying tracklets emanating from the same source, such as Union Find. For example, a Track Fingerprinting algorithm may be used, which works by identifying individual signal sources using the source's harmonic patterns.

Thus, in accordance with an exemplary and non-limiting embodiment, a signal processing method may include super-resolution analysis and grouping of signals into frequency groups of tracklets, which form representations of the time evolution of oscillators, and aggregating the data into coherent groups of tracklets via a grouping algorithm to identify coherent groups of frequencies within a signal. The grouping into tracklets may be performed using a tracking algorithm such as Kalman Filter, greedy association or any other such algorithm as known to those skilled in the art, to identify short term stable oscillators that may come and go as a signal source evolves through time. The data may be further divided into coherent groups of tracklets using combinations of well-known track grouping algorithms, such as, without limitation, union find.

In some examples, the analysis may be used to aggregate signal elements into tracklets.

In some examples, partitioning may be used to aggregate signal elements into coherent groups.

In some examples AM and FM affects may be detected and/or corrected using the measured evolution of frequency and amplitude of oscillator peaks contained in a tracklet.

In some examples, the evolution of frequency and amplitude in a tracklet or a coherent group may be used to identify speech or non-speech. For example, speech tends to curve through frequency over time, whereas non-speech is often flat in frequency as it evolves in time.

In some examples, a human may be presented with an interface to view oscillator peaks, tracklets and coherent harmonic groups.

In some examples, a human may assist the system in determining which oscillator peaks, tracklets and harmonic groups may be output or accentuated.

In some examples, the system may learn from a human's choices about which oscillator peaks, tracklets and harmonic groups should be kept.

In some examples, the system may learn vocal patterns of an individual speaker or signal source. These patterns may include harmonic separation, rates of change of frequency and/or amplitude, or aggregations of any other data that may be contained in the oscillator peak.

In some examples, the oscillator peak detection, tracking and grouping process may be used for audio signals.

In some examples, the oscillator peak detection, tracking and grouping process may be used for any signal, including, but not limited to RADAR, SONAR, LIDAR, and sound/audio, video, and vibration sensors.

In some examples, the tracklets may be used to form coherent groups. That process of forming coherent groups is called "partitioning" in the tracking. For example, in sound sources, each tracklet may represent a harmonic. A tracklet may typically move through frequency, time and direction of arrival (that is, related to the sigma of the unified domain) and may vary in amplitude along the tracklet. These shapes represent AM or FM effects that are detected. "Grouping" as used herein may refer to attempts to find the harmonics amongst tracklets that may be moving together and may be from one coherent source. When viewed visually, as described below, sweeping curving lines in a time-frequency representation of a sound signal may be typically indicative of speech, while flat horizontal lines may be often indicative of artificial noises, such as car alarm sounds. As a result, naturally occurring versus artificial sounds can be separated by, for example, shape and type in the partitioning. Separation can also be based on any other parameters that may be calculated in the analysis process. As a result, an automated algorithm may be employed to eliminate artificial sounds or enhance artificial sounds as desired for a given application. In accordance with exemplary and non-limiting embodiments, a user interface may be provided for viewing a signal as a plurality of potentially coherent tracklets in order to edit the visual representation to identify signals as belonging to a desired tracklet or coherent group and scoring an element of the signal based on feedback from the editing of the visual element. In other embodiments, a sound signal, such as based on speech from an individual may be introduced for identifying parameters that may facilitate grouping of tracklets that correspond to signals produced by the individual. In this way, one may perform learning on the patterns of a speaker such that there is derived a characteristic feature set for that speaker. In another embodiment, speech originated by an individual may be identified based on "fingerprinting" of a source based on unified domain parameters that are characteristic of the known signature or "fingerprint" of the source/individual. In other embodiments, the source signal may be any of the other types of signals discussed within the scope of this disclosure.

In addition to well-known tracking algorithms, the tracker may employ new algorithms to improve output quality. For example, a Phase prediction algorithm may be used to predict the likelihood that two peaks emanate from the same sound source. In an example, peak correction may be performed using Phase Prediction.

Figure 14:
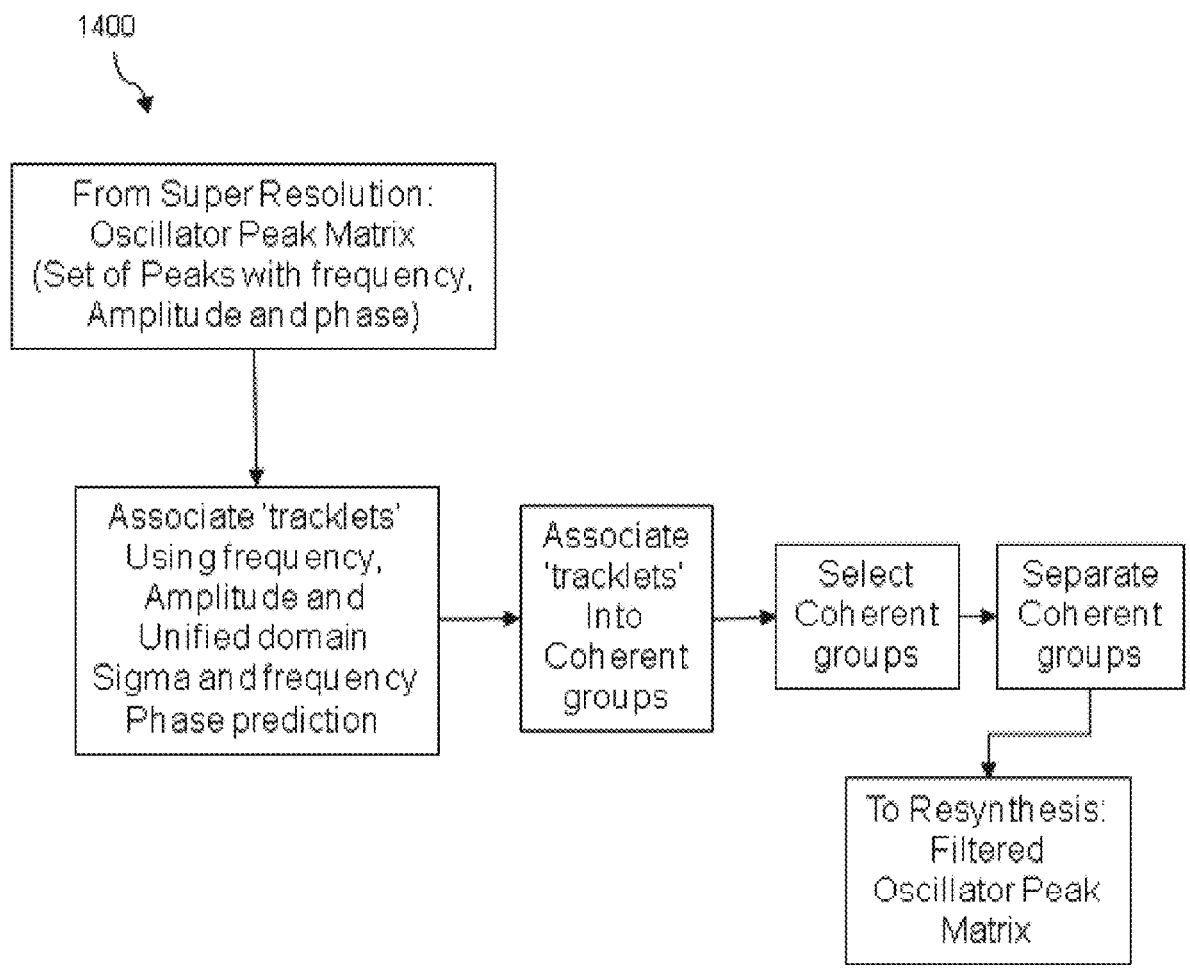
FIG. 14 illustrates an example of a method performed by the signal component tracker that may use frequency and phase prediction according to an exemplary and non-limiting embodiment.

FIG. 14 illustrates an example a method 1400 performed by the signal component tracker 214 that may use phase prediction. The method 1400 may use phase prediction as a criteria for associating 'tracklets' in addition to the association criteria discussed on in FIG. 13. In some examples, the output of frequency-phase prediction may cause the tracker to re-calculate the parameters associated with an oscillator peak. In some examples, peak correction may be performed using proximity. For example, the tracker may calculate that two oscillator peaks are interfering, and may use the track state information to correct that interference. The oscillator peaks may then be selected for providing an output.

In an example, the methods of peak selection may include, but are not limited to, evaluating the peak using parameters, such as Unified Domain Sigma, Frequency, and Amplitude, evaluating the tracklet to which the peak belongs using parameters, such as Unified Domain Sigma, Frequency, and Amplitude, evaluating the coherent group to which the peak may belong using parameters, such as Unified Domain Sigma, Frequency, and Amplitude, evaluating whether the coherent group to which the peak may belong matches a desired speaker using harmonic "fingerprinting," using frequency-phase prediction to identify whether the tracklet appears to be a 'direct-path' source, and may discount peak's parameters that may fail to pass the peak prediction tests when evaluating a tracklet's or a coherent group's parameters, or estimating a distance by combining the Unified Domain Sigma with the phase information.

As previously discussed, a tracklet may be defined as a grouping of oscillator peaks that may be determined to emanate from one source harmonic. In an example, a tracklet formation process may be performed on the basis of an input comprising a set of oscillator peaks extracted from a single sample window. Tracklets may then be formed using many different well-known track association methods and algorithms. The algorithms may involve a method that may predict a tracklet forward, a method that may compute a cost of association between a tracklet and a new piece of data (in this case, an oscillator peak), and a method that may choose an optimal set of assignments. By way of example, the tracklet prediction algorithm may include, but are not limited to, linear prediction, and Kalman Filter prediction. In some examples, the cost estimation algorithms may include, but are not limited to, statistical distance calculation, such as a Mahalanobis Distance, and simple distance calculations, such as difference in frequency and amplitude. Further, in an example, assignment algorithms may include, but are not limited to, Greedy Association, Munkres Association, and JVC association.

The output of the tracklet formation process may include a set of oscillator peaks that have been formed into tracklets.

As previously discussed, in some examples it may be desirable to form coherent groups. A coherent group may be a set of tracklets that may have been determined to be produced by the same sound source.

In accordance with exemplary and non-limiting embodiments, a signal processing method may include super-resolution analysis, assigning signal elements into frequency tracklets from snapshots in time (wherein the snapshots in time may indicate using a sample window of data starting at an initial time and ending at a final time, multiplying it by an analysis window, and converting it to the frequency domain), that is to say, organizing the data into tracklets by a tracking algorithm to identify frequency tracklets within a signal, and using at least one of the frequency, angle of arrival, amplitude, and slope of the amplitude of a track in order to assist in grouping tracklets into coherent groups.

As previously discussed, in some examples it may be desirable to form coherent groups. A coherent group may be a set of tracklets that have been determined to be produced by the same sound source. In an example, coherent groups may be formed by a process that may receive a set of tracklets as input. The set of tracklets may then be partitioned into disjoint sets. There are several well-known algorithms for partitioning the sets of tracklets into disjoint sets. For example, the Union Find algorithm may be employed. For most of the algorithms, a cost function may need to be calculated to compute the likelihood that two tracklets are from the same source. These cost functions may use any of the features stored in a Singlet representation of an oscillator peak including, but not limited to, frequency, amplitude, Unified Domain Sigma, and phase. These cost functions may rely on knowledge of the harmonic structure of a speaker. As a result of performing the coherent group formation process, as an output, a set of tracklets that have been formed into coherent groups may be generated.

In accordance with an exemplary and non-limiting embodiment, a unified domain directional estimate may be used with the outputted set of tracklets to identify a tracklet of interest.

In some embodiments it may be desirable to predict the evolution of phase as an oscillator evolves through time and frequency. Knowledge of predicted phase may be used in several stages of processing, including, but not limited to the activities discussed in the above description, including scoring the likelihood that a peak should be associated with a particular tracklet, detection and/or repair of results from interfering signals, detection and/or repair of dropped out or missed signals, detection of direct-path versus non-direct-path signals, compression algorithms, and association of tracklets into coherent groups.

In an example, the basic model of the signal may betaken as the projection into the real numbers of the general complex form $s(t)=r(t)e^{i\theta(t)}$. Further, it may be assumed for the example that over a short period of time the amplitude term may remain constant, that is to say, $r(t)=r_0$, then the rate of change of the signal may be related to the rate of change of $\theta$ and this may then be related to the instantaneous frequency. This may give $$\frac{ds}{dt} = ir_0 \frac{d\theta}{dt} e^{i\theta(t)}.$$

and since the rate of change of θ may include the instantaneous frequency, this may give a way to relate the frequency and phase of a signal that may be evolving in time. In practice, the parameters may be estimated based on the measured data, and the high-resolution analysis may make it possible to make accurate estimates of the instantaneous frequencies, and hence accurate predictions of future frequency and phase values.

The algorithm for frequency phase prediction may start with the differential equation relating phase and instantaneous frequency, $$\frac{d\theta}{dt} = f(t)$$

and over a sufficiently short window of time, $f(t)$ may be approximated as a constant plus linear term (and for one skilled in the art the expansion can be continued easily to higher order terms), giving $f(t)=f_0+at$.

The example may further include estimating the frequencies from the data, and this may be done using the super-resolution analysis from the CSPE family of transforms. In an alternate example, the frequency estimate for a given sample data window, say the $i^{th}$ window, may be assumed to be most accurate at the center of the window—which may hereinafter be referred to as $f_i$. The best position for the frequency estimate may be obtained by a variety of other methods, including but not limited to, checking zero crossing rate, looking at residual error after fitting with the frequency estimate and the like. The super-resolution frequency estimate for the $j^{th}$ window may be given by $f_j$ and it may be assumed to be most accurate at the middle of sample data window j (or again positioned by a variety of other methods). Thus the super-resolution frequency estimates and the related times where the estimates are positioned may be obtained. If the differential equation may be solved assuming boundary conditions that may be consistent with the frequency estimates, the first order approximation may include $$a = \frac{f_j - f_i}{2T}$$

where T may be the time between the two frequency estimates (and in a preferred embodiment may be taken to be the time shift between the two sample data windows). The net result may be that one may derive the phase as a function of time, giving $$\theta(t) = 2\pi\left(f_i t + \frac{f_j - f_i}{2T}t^2\right) + \theta_0$$

where $\theta_0$ may be the initial phase of the signal. The approach presented here may be shown to be highly accurate when used with the super-resolution frequency estimates.

In some examples, the phase of a tracklet may be predicted to a different time. The difference between that prediction and a new oscillator peak's measured phase may be used to score the likelihood that the new peak should be incorporated into the tracklet.

In some examples, if two tracklets may be determined to be interfering, the predicted frequency and phase of each tracklet may be used to repair the interfering regions so that the combined signal power may be reassigned to the interfering tracklets.

In some examples, if a tracklet may be determined to be missing data in a given frame, an estimated oscillator peak may be inserted using a predicted frequency, amplitude, phase, modulation type, direction of arrival, and any other characteristic that may be included in the tracked oscillator peaks.

In some examples, a difference between a tracklet's predicted phase and actual phase may be used to determine whether it travelled to the sensor in a direct path or via an indirect path.

In accordance with another exemplary and non-limiting embodiment, the frequency/phase of signal representations may be predicted based on super-resolution, unified domain model of coherent signal elements within a signal, and a signal element may then be processed based on the prediction. For example a prediction of every other frame may be used, allowing skipping of the processing of the predicted frame. As a result, for example, it may only be necessary to process frames 1, 3, 5, 7 in order to predict frames 2, 4, 6 and 8. In this example, a prediction of frame 2 may be performed and further an estimate of what frame 2 turned out to be may be done, thus providing a measurement of accuracy. In this way, it may be determined, for example, how closely did two spectral peaks so created line up. If the alignment is above a certain tolerance, frame 2 may be recalculated to make sure that it may be within an acceptable and predetermined range of error. If the alignment is within the accepted tolerance, then no further prediction may be required.

As described above, in accordance with exemplary and non-limiting embodiments, one may predict the frequency/phase of signal representations based on a super-resolution, unified domain model of coherent signal elements within a signal. The resulting models may be accurate enough to allow for the prediction of the evolution of signal elements through frequency, amplitude, phase, and time. As a result, if some data may be missing, it may be possible to keep the signal element tracks/tracklets going across gaps. In the instance of tracklet intersection, predicted values may be utilized to determine the behavior and direction of the underlying tracklets. In one embodiments, predictive interpolation of gaps in signals may be performed both forward and backward to determine a consistent estimate of the missing or obscured data. In one embodiment this may be implemented on a cell phone network to ameliorate the effects of dropped packets.

In other examples, the frequency and/or phase of signal representations may be predicted based on a super-resolution, unified domain model of coherent signal elements within a signal and grouping a signal element with other elements based on the prediction. The measurements of the signal are typically accurate enough to allow for prediction forward in time in a manner that is more accurate than random. Put simply, it may be predicted that a tracklet goes somewhere, and then when an observation regarding such a tracklet with those properties is made, it may be derived that the observed phenomenon is in fact associated with a signal element encountered before.

In accordance with another exemplary and non-limiting embodiment, the frequency/phase of signal representations may be predicted based on super-resolution, unified domain model of coherent signal elements within a signal, and a signal element may then be processed based on the prediction. For example a prediction of every other frame may be used, allowing skipping of processing of the predicted frame. As a result, for example, it may only be necessary to process frames 1, 3, 5, 7 in order to predict frames 2, 4, 6 and 8. In this example, a prediction of frame 2 may be done and a quick estimate of what frame 2 turned out to be may also be performed, thus providing a measurement of accuracy. In this way, one may determine, for example, how closely did two spectral peaks so created may line up. If the alignment may be above a certain tolerance, frame 2 may be recalculated to make sure that it may be within an acceptable and predetermined range of error. On the other hand, if the alignment may be within the accepted tolerance, then no further prediction may be required.

In some examples, the frequency/phase of signal representations may be predicted based on super-resolution, unified domain model of coherent signal elements within a signal and may be used to provide data to complete an incomplete signal representation based on the prediction.

In some embodiments, frequency/phase of signal representations based on super-resolution, unified domain model of coherent signal elements within a signal may be predicted and used to process a signal element based on the prediction, wherein processing the signal element may include using the prediction to facilitate compression of a representation of the signal. As above, by not having to process every frame, the information retained in the mathematical representation can be represented with far fewer bits than the original data (that is to say it may be naturally compressed).

The oscillator peak detection stage may use information from the current state of the tracking and/or grouping stages to guide its processing decisions. Techniques may further include reduction of interference by track aware fitting and prioritization of oscillator peak selection, as described below.

In an exemplary technique, reduction of interference through track-aware fitting may be implemented. When two oscillator peaks are on nearly the same frequency, they may interfere, and be indistinguishable. If two tracklets are detected to be on a trajectory that will intersect in frequency in a given frame, one may use predicted frequencies and amplitudes to create two oscillator peaks where the system may only detect a single peak that is the sum of both oscillators.

In another exemplary technique prioritization of oscillator peak selection may be done. Due to computational resource limitations, or a desire to optimize performance or battery life or a number of other features, the system may fit fewer oscillator peaks than it detects. The system may use the tracklet and/or group state information to pick the oscillator peaks to fit. For example, in sound processing, if a speaker of interest may show a consistent harmonic separation, the system may first attempt to find oscillator peaks that may fit the existing pattern. Similarly, psycho-acoustic measures of the importance of signal components may be used to prioritize which oscillator peaks should be processed.

In another exemplary technique extraction of desired signals from noisy environments or enhancement of desired signals in noisy environments—the tracking and grouping algorithms may be used, along with any of the measured parameters of the fitted data, to determine which tracklets or coherent groups should be extracted from the noise, or enhanced over the noise.

In accordance with an exemplary and non-limiting embodiment, an ambiguity measure or certainty measure may be assigned to the tracklets by the tracker. This ambiguity measure may be used in a Kalman filter, a Bayesian decision process, a scoring function or a similar process whereby the certainty/ambiguity measure is used to determine which tracklets or coherent groups should be extracted or enhanced. In yet other embodiments, the intersection of a plurality of tracklets may be identified with prediction of tracklet direction used to assist in the handling of intersection points. For example, in sound processing, when tracklets actually cross, one merged sound at one frequency may be observed. In this example, the merged sound may be taken at an intersection point and may be assigned to each of the tracks so that they may be self-consistent.

In an example, the output may include a subset of the peaks that were received on input. In some cases, these may be modified, such as in the case of frequency phase prediction correction.

A range of techniques may be used to identify relevant oscillator peaks and tracklets. In an example, a processor may receive a plurality of oscillator peaks and may select one or more of the plurality of oscillator peaks for re-synthesis.

In an alternate example, oscillator peaks may be scored to determine which are desired for output. Oscillator peaks may be scored using at least one of time, frequency, phase, amplitude, and unified domain direction of arrival.

In an alternate example, tracklets may be scored to determine which are desired for output. Tracklets may be scored using at least one of time, frequency, phase, amplitude, unified domain direction of arrival, change in any of those characteristics, and predictability of change in any one of those characteristics.

In an alternate example, coherent groups of tracklets may be scored to determine which are desired for output. Coherent groups may be scored using at least one of time, frequency, phase, amplitude, unified domain direction of arrival, and change in any of those characteristics, and predictability of change in any one of those characteristics, and conformance to a known harmonic structure, such as a person's known harmonic frequency patterns.

In an alternate example, a peak, tracklet, or coherent groups score may be used to assign it for output, or eliminate it from output.

In an alternate example, a peak, tracklet, or coherent group's score may be used to modify its amplitude in output, thereby reducing or amplifying its impact.

In an alternate example, a peak, tracklet, or coherent groups score may be communicated to another system, such as a speech recognizer, to aid it in its estimation process.

In an alternate example, original signal may be combined with reconstructed signal for output. Either the original or reconstructed signal may be diminished or amplified before combination.

In an alternate example, elements such as background noise, other interfering signals, or any other signal with undesirable characteristics may be rejected or diminished.

In an alternate example, elements such as background noise, secondary or other interfering signals may be revealed by removing a primary signal that may be obscuring the background.

In some examples the signal channel re-synthesis module 220, as illustrated in FIG. 2 may be used in accordance with one or more examples to create a frequency domain representation of the targeted oscillator peaks in a single output channel. In an example, the selected oscillator peaks may be converted back to frequency or time-domain signal using single channel re-synthesis. For some applications, such oscillator peaks may be the output of the system.

The input to single channel re-synthesis module 220 may be a set of oscillator peaks containing the parameters that may be used to create frequency domain representations of those oscillator peaks in a single channel. In one or more examples, the oscillator peaks may generally contain any of the parameters, including but not limited to, frequency, amplitude and phase. Further, the parameters of the analysis window used with Sample Window (A) and Sample Window (B) may be those determined in the single channel pre-processor.

In some examples, the single channel re-synthesis module 220 may be configured to perform a method to use each oscillator peak received at the input to calculate a frequency domain data projection. The method may include creating a normalized frequency domain representation of the oscillator by sampling the high resolution frequency domain version of the analysis window used to taper Sample Window (A) and Sample Window (B) in the Single Channel Pre-Processor. Multiply the normalized frequency domain representation of this oscillator by the oscillator peak's amplitude and phase. The method may further include, summing the spectrum created previously, once the frequency domain data corresponding to the oscillator peaks has been calculated. In an example, if time-domain data may be required, an inverse-FFT (iFFT) may be performed that may convert the frequency output to the time domain.

In some examples, some amount of background signal may be required to provide desirable characteristics in the output. An advantage of the methods used herein is that the phase of the output signal may be preserved with high accuracy. As a result, the phase of the samples in the original signal may match the phase in the extracted and re-synthesized signal. In some circumstances, addition of the background signal may yield a result that has desired characteristics. This may be achieved by a variety of techniques, including mixing back in the original signal or an attenuated or amplified version of the original signal. In some examples, it may be desirable to use the singlet representation of the original signal, such as a singlet representation in a compressed form, so that the original signal may be reconstituted before remixing with the extracted signal.

Based on the method performed by the single channel re-synthesis module 220, a set of frequency domain or time-domain data that accurately represents the portions of the original signal corresponding to the selected set of oscillator peaks may be obtained as the output from the single channel re-synthesis module 220.

In some examples the multi-channel re-synthesis module 222, as illustrated in FIG. 2 may be used in accordance with one or more examples to create a frequency domain representation of the targeted peaks in a multi-channel output. The multi-channel re-synthesis module 222 may be configured to convert selected oscillator peaks back to frequency or time-domain signals. In some examples, such oscillator peaks may be the output of the system.

The multi-channel re-synthesis module 222 may be configured to receive as an input, a set of oscillator peaks containing the parameters used to create frequency domain representations of those oscillator peaks in multiple channels, and the parameters of the analysis window used with Sample Window (A) and Sample Window (B) in the multi-channel pre-processor 210. In an example, the oscillator peaks may contain: frequency, amplitude, Unified Domain Sigma, and the phase of the oscillator peak in each channel.

The multi-channel re-synthesis module 222 may be configured to perform a method for each oscillator peak to calculate its frequency domain data projection for each channel. The method may include calculating the amplitude for that channel for that peak using the Unified Domain Sigma and the input amplitude. The method may further include creating a normalized frequency domain representation of the oscillator by sampling the high resolution frequency domain version of the analysis window used with Sample Window (A) and Sample Window (B) in the Single Channel Pre-Processor. Multiply the normalized frequency domain representation of this oscillator by the amplitude calculated in step 1 and the oscillator peak's phase for that channel, as received in the input. The method may further include summing the spectrum created in the previous step once the frequency domain data corresponding to the oscillator peaks has been calculated. In an example, the frequency domain for channel X may be the sum of all the calculated frequency domain spectrum for channel X for all oscillator peaks. If time-domain data may be required, an inverse-FFT (iFFT) may be performed to convert the frequency output to the time domain.

In an example, a re-synthesized signal may be built in a signal processing model, using a convolutional model and using distinct methods to build each of a plurality of signal elements or characteristics, including stable frequency signals, FM peaks, and AM peaks. Oscillator peak parameters, including frequency, amplitude, frequency modulation and amplitude modulation may be re-calculated to predict the parameters that may exist in a different window position (such as slightly later in time) or window length as follows:

In an example a different window length may be chosen for resynthesis than may have been used for oscillator peak detection. This may enable the system to use a more optimal window length for re-synthesis than may have been used for oscillator peak detection.

In an example, the length of the sample window may be adjusted as necessary. Under certain condition, it may be optimal to use a sample window of a different length. This may be done because the parameters of the detected oscillator peaks may be adjusted for comparison. For example, during periods of intense frequency modulation it may be advantageous to sample more frequently.

In some examples, frames may be shifted within re-synthesis. For example, a first snapshot of a signal may be taken using for example, from 0 to 1024 data points. A next might start with data point 512 and continue to data point 1536, shifting one-half of the window length. If changes on a smaller scale may be desired, shifting by fewer data points may be desired (such as shifting by 256), then shift again, in which case each signal element is covered more closely. At re-synthesis, just the middle segments may be used (256 to 768 and 512 to 1024) and predicting forward within a frame may be done to make smaller frames. For example, if while processing a video input signal and sending video from wide screen format to old fashioned television, operation may be changed on the fly so that the center of the TV image may be reproduced and the edges may be eliminated without decreasing quality and without being required to undertake complicated manipulation of the frames.

Based on the method performed by the multi-channel re-synthesis module 222, a window of data in the frequency or time domain that may accurately represent the portions of the frequency domain from the original signal corresponding to the selected peaks may be obtained as the output from the multi-channel re-synthesis module 222.

The signal separation (SS) technology described herein may be applied to any system that may send or capture signals through a collection mechanism (such as including a microphone, a camera, radio receiver, a video camera, a transducer, or other receiver) for either transmission, storage, analysis or manipulation. The signal may subsequently be (but not limited to): transmitted between receivers (e.g.

RF transmission); delivered in an audio format, such as for transmission of a voice call, delivered in an image or video format such as transmission of a photo or video, depicted in a text-format such as converted from speech to text, or interpreted and rendered as an image such as a radar display or ultrasound.

In some embodiments, SS technology may be introduced into one or more processes and/or systems that involve digital signal processing. Digital signal processing is generally defined as the mathematical manipulation of an informational signal to modify or improve it, and may be characterized by the representation of discrete time, discrete frequency, or other discrete domain signals by a sequence of numbers or symbols and the processing of these signals. Sample digital signal processing fields where SS technology may deliver benefit may include but are not limited to, audio processing and compression, speech processing and recognition, RF transmission, biometric analysis, sonar and radar, sensor array, ultrasonic testing, spectral estimation, statistical analysis, digital image, digital and cellular communications, control systems, biomedical, medical imaging, and seismic data. Digital signal processing may be applied to measure, filter and/or compress continuous real-world analog signals. The process may typically begin by converting the signal from an analog to a digital form, by sampling and then digitizing it using an analog-to-digital converter (ADC), which may turn the analog signal into a digital stream of numbers. Typically, after analysis and transmission, the required output signal may be another analog output signal, which requires a digital-to-analog converter (DAC).

In some embodiments, the SS technology may be implemented on, but not limited to, one or more of the following: general purpose computers and GPUs; specialized single and multi-core processors (such as Digital Signal Processors); purpose-built hardware such as application-specific integrated circuit (ASICs); field-programmable gate arrays (FPGAs); digital signal controllers; and stream processors. In addition, the SS technology described herein may be implemented as firmware, embedded software, a software platform, a standalone software application, and/or a network or cloud-based application/service. Such implementations may be applied, but not limited to: computers; cellular phones or smart phones; tablets; or other communications; audio, video, sensor, radar, sonar or medical-imaging devices or systems; or any other system or device whereby digital signal processing may improve performance or general usefulness.

In some embodiments, the signal separation technology described herein may be utilized in Radar-based object detection and tracking systems that rely on radio waves as a method to determine the range, altitude, direction, speed or other characteristics of objects. The radar systems may incorporate a process of transmitting pulses of radio waves (or microwaves), which are reflected off any object in their path, and subsequently return a portion of the wave's energy to a receiver. Some exemplary uses of radar may include, but are not limited to: general imaging, air defense and anti-missile systems, air traffic control, marine systems to locate terrain, vessels and other marine-based points of interest, aircraft anti-collision systems, ocean surveillance systems, outer space surveillance and rendezvous systems, meteorological tracking and monitoring, altimetry and flight control systems, guided missile target locating systems, terrain mapping, detection and location systems, oil and gas discovery and drilling systems, and ground-penetrating radar for geological observations.

In some embodiments, the SS technology may be applied to the radar systems to mitigate "noise", "interference", and/or "clutter" at any point within the process and thereby enhancing the quality of the final data delivered to the end use application. The SS technology may be introduced independent of any other correction algorithms and systems or in conjunction with one or more of such systems, such as: pulse-doppler, moving target indication, automatic gain control ("AGC"), 3D mapping imaging applications, and/or horizontal, vertical, linear and circular polarization. Reflected signals decline rapidly as distance increases, so noise introduces a radar range limitation, and the lower the power of the desired signal, the more difficult it is to discern it from the noise. Radar systems must be configured to overcome unwanted signals, that is to say both passive signals and active signals, while focusing on the actual targets of interest. Overcoming unwanted signals may define a radar system's signal-to-noise ratio ("SNR"), comparing the level of a desired target signal to the level of background noise or interference.

In an exemplary embodiment, introduction of SS technology may increase a radar system's SNR that may result in delivering improvements in isolating actual targets from the surrounding noise signals, interference and clutter. In an example, noise and interference may be caused by any of the factors including, internal source of random variations in the signal, which may be generated by all electronic components; random variations superimposed on the desired echo signal received in the radar receiver; and/or external sources, such as thermal radiation of the background surrounding the target of interest. In addition, clutter may be caused due to radio frequency echoes returned from targets which are uninteresting to the radar operators. Such targets may include natural objects (such as rain, birds); atmospheric turbulence and other atmospheric effects (such as ionosphere reflections); man-made objects (such as buildings); and/or even radar countermeasures such as chaff. Some clutter may also be caused by a long radar waveguide between the radar transceiver and the antenna. The SS methods and techniques described herein may serve to effectively mitigate interference from the above and other interfering signals. The SS technology may be applied to all forms of radar signals, equipment and imaging software and hardware, regardless of frequency bands, scan types, display processors and systems utilized, and/or end uses and links. The technology may also be applied to other systems that make use of other parts of the electromagnetic spectrum. One example of such a system may be "LIDAR", which uses visible light from lasers rather than radio waves. In addition, the technology may be applied to other radiofrequency-based (RF) systems, such as a scalable multifunction RF system which enables RF functionality (e.g. radar, communications, and electronic warfare) to be extended, identified, separated, concealed or otherwise manipulated in the performance of its functions.

In accordance with an exemplary and non-limiting embodiment a source separated signal generated using any process or combination of the previously described techniques herein may generate outputs presented as: (i) an audio file; and/or (ii) audio signal components; and/or (iii) speech feature vectors, all of which alone or in combination can serve as the inputs to a speech recognition engine or biometric voice identification system. In some embodiments, the signal separation technology described herein may be utilized in speech recognition systems which may be used to such as, translate spoken words into text, control automated systems through voice translation, or convert spoken words into other outputs other than voice through an automated process. Introduction of SS to improve speech and voice recognition may be applied independently of any other algorithms and systems used to improve recognition, or in conjunction with one or more of such systems. Additionally, SS may be applied such as to original voice source signals that may have been converted to digital signals and reconverted to analog signals prior to once again being converted to digital to be processed for speech recognition, or, to the audio signal once it may have been converted to digital format immediately prior to the speech recognition process.

Speech recognition may be referred to as "automatic speech recognition" ("ASR"), "computer speech recognition", and/or "speech to text". These systems may use training, such as in the case of "Speaker Dependent" systems or not use training by a speaker (referred to as "Speaker Independent" systems). Voice recognition generally refers to finding the identity of who is speaking, in contrast to what they are saying. Recognizing the speaker may simplify the task of translating speech in speaker dependent systems or it may be used to authenticate or verify the identity of a speaker as part of a security process. In some embodiments, applying SS to speech recognition may include conversion of analog voice signal into digital audio and then into recognized speech. In an example, the conversion may be performed through a process that may include, transforming the digital audio into a better acoustic representation, applying rules so the speech recognizer knows what phonemes to expect, and determining which phonemes are spoken, and converting the phonemes into words. The digital audio format may vary in terms of number of channels (such as mono vs. stereo), bitrate, and/or other characteristics.

Speech recognition may also include extracting feature vectors from speech waveforms. The extraction may be achieved by first transforming the digital audio into the "frequency domain" using a windowed Fast-Fourier Transform (FFT), with a resulting output similar to what a spectrograph produces. In this domain, the frequency components of a sound for a given sample rate may be used to generate a graph of the amplitudes of frequency components for that sample. A feature vector may be computed from a window of speech signals in every short time interval, and an utterance may be represented as a sequence of these feature vectors.

In some embodiments, an automated speech recognizer engine may consist of a database of thousands of such graphs correlated to different types of sounds produced by the human voice, and the graph generated at that sample may be matched against the database, producing a number that describes the sound. The most likely word sequence for the given speech feature vectors is found using two types of knowledge sources, that is to say, acoustic knowledge and linguistic knowledge. Speech recognition engines may use a mathematical technique called "Hidden Markov Models" (HMMs) for the acoustic features of speech sound and the stochastic language model may be used to represent linguistic knowledge. In some examples, interferers such as loud background noise or other ambient environmental sounds may often lead to misinterpretation of the source, resulting in the recognizer to determine a different vector than it would have if the user were in a quiet room with a high-quality microphone. Traditionally, background noise and variability problems have been addressed using statistical models to figure out which phoneme is spoken; however, with strong interference the results are generally poor. In an embodiment of applying SS technique to speech recognition process, introduction of SS in the initial steps of the recognition process, whereby the feature vectors are extracted from speech waveforms may greatly increase the robustness of determining the phonemes and utterances with a much higher confidence than other approaches. Application of SS may greatly mitigate the impact of interferers like ambient noise when extracting the feature vectors from the digital audio signal. SS processed signals may offer higher accuracy for voice recognition/identification and may be introduced into any existing voice recognition or voice security system, using either onboard processing (as with cell phone, tablet and other personal device security features) or linked to a network or cloud for controlled access devices or areas (such as restricted access facilities, buildings, vaults or other secured locations). For voice/speaker recognition, similar processes may be used to extract feature vectors of the speaker of interest; however, these vectors may be compared and contrasted to a model/library of utterances originally created by the speaker, and a similarity score may be generated. The SS technology may be introduced to voice recognition to enhance the robustness of the scoring by mitigating interference such as background noise or competing conversations by delivering improved feature vectors through any of the methods including but not limited to application to the original voice source signals that have been converted to digital signals and reconverted to analog signals prior to once again being converted to digital to be processed for speech recognition, or, application to the audio signal once it has been converted to digital immediately prior to the voice recognition process. SS methods and systems described herein may be implemented as hardware or software on any PC, cell phone, tablet, or other system using voice/speech recognition, as a stand-alone processing technique or an add-on to existing software program.

In accordance with exemplary and non-limiting embodiments, a representation of signal elements may be developed in a model of a signal. The signal may be decomposed and grouped into tracks and/or tracklets corresponding to individual speakers, and the decomposed signal transformed into feature vectors adapted for use in a speech recognition engine. In such embodiments, one might develop and introduce a bias toward a specific speaker (e.g. the owner of a phone), so as to automatically pull out their speech and enhance it over all other sounds in the environment.

In another embodiment, a representation of signal elements which may be referred to as speech features or speech vectors may be developed in a source signal separation model of a signal. The signal may then be decomposed into speech feature vectors corresponding to individual speakers, and the decomposed representation used as an input to a speech recognition engine or biometric voice identification system.

In accordance with exemplary and non-limiting embodiments, a system comprises a sound gathering device, such as a microphone, with a nearby processor for engaging in cooperative/distributed computing of source signal separation. In some embodiments, the algorithm is scalable to be less processing-intensive so it can be used on cellular phones, smartphones, tablets or other mobile devices. In some embodiments, some of the processing may be conducted on the mobile device and then be distributed or transmitted to a remote processor or server with results then delivered back to the mobile device.

In some embodiments SS techniques may be used for hearing aid applications. A hearing aid is any medical device that helps amplify and filter sounds to enable those with hearing impairments/hearing loss to comprehend sound. Hearing aids consist of microphones (directional or omnidirectional) that may convert sound to an electrical signal, which may then be processed by a digital signal processor to enhance targeted sounds and minimize unwanted background noise. The resulting targeted sounds are then amplified and rebroadcast via speakers in the patient's ear canal. Patient controls may be used for volume, noise reduction, and different environmental settings. Microphones, DSPs and controls for the device may be located on or within the hearing aid itself or in external control devices or cell phones.

In some embodiments, the methods for source signal separation described herein may be embodied in any design hearing aid device for the purposes of, but not limited to, amplifying targeted sounds, focusing on a single person speaking or sound source, focusing on limited region, such as a conversation at a table in a crowded restaurant while turning off/minimizing other sounds in the restaurant, and/or minimizing or eliminating background or other ambient noises that the user may choose not to hear and/or interfere with his/her comprehension of a desired conversation or sound source. These SS methods may be employed across any hearing assistance device including but not limited to behind-the-ear aids, in-the-canal hearing aids, open canal aids, closed canal aids, air conduction hearing aids, bone conduction/bone anchored aids, eyeglass based aids, external device-linked aids, cell phone based aids, PDA based aids, iPad/Tablet based aids, PC based aids and cochlear implants. The SS techniques may also be applied in hearing assistance devices includes both FDA-Regulated hearing aids and over-the counter non-prescription sound amplification devices.

In some embodiments, the SS methods described herein may also be linked to cell phone, television, radio, PC, Cloud, tablet and other hearing-assistance linked devices. One exemplary embodiment may be linkage to a television to enable the user to comprehend the broadcast while minimizing or turning off other background or ambient noises that may impair a user's ability to comprehend the broadcast. Likewise a similar embodiment of this application may include the amplification of a cell phone transmission processed to minimize or eliminate ambient or background noises both at the site where the user is receiving the call as well as the unwanted background noises transmitted by the caller on the other end of the line.

In some embodiments, the SS methods described herein may be intended to work with any microphone (stereo or mono, directional or omni-directional) or microphone array located on or incorporated into any hearing assistance device, or located off the hearing assistance processing device and transmitted to that device via wireless, infra-red (IR), Bluetooth, wired or other transmission methods. An exemplary embodiment may be a cell phone or tablet linked hearing aid where sound may be recorded on these devices and them transmitted to the ear for broadcast. Likewise, microphones for recording targeted sound sources may be located on the users eyeglasses, embedded into clothing or jewelry, worn around the user's neck, embedded in buttons, hats or other clothing or fashion accessories. Microphone designs, including but not limited to the above examples, may transmit targeted sounds to a processing device, where the SS methods and system described herein may be configured to process those sounds. The algorithm processing may take place on an independent DSP or in the device's CPU through embedded firmware. The deployment of these processing platforms may be on the device itself, an external control unit, a tablet, PC, PDA, cell phone or transmission through a cloud or transmission back to a central server over a cellular or wireless network. Signals recorded on bilateral hearing aids or array microphone systems may be transmitted across devices or to an external processing unit, including but not limited to those described above, for real time or near-real time processing.

In some embodiments, signals processed with the SS techniques described herein may then be re-synthesized into an output signal to be played back through a speaker in or near the users' ear, or through an neural or bone stimulation device for direct sensorineural processing. Speaker based devices for rebroadcast include open canal and closed canal systems, headphones, telephonic devices, cell phones, Bluetooth and other speaker based devices. Re-synthesized signals may be captured on the same device (such as a behind the ear hearing aid) or transmitted to the output speaker devices from an external processing unit (such as a tablet, cell phone, PC or other portable processor) and may be a single reprocessed input or the combination of many simultaneously recorded and mixed inputs from multiple recording devices. Hearing assistance technologies making use of SS processing may feature clinical programmed parameters or user controlled parameters to adjust device processing to a specific environment. An exemplary embodiment of clinician parameters would be distance based SS and background noise reduction setting that may be programmed at the time of the initial fitting or subsequently adjusted via telephonic or PC/web interface reprogramming. An exemplary embodiment of user based controls may include onboard device dials, external control units, or PC/cellphone/Tablet based applications that may allow the user to control the mix of targeted speech to background noise, the level of targeted speech amplification, the use of real-time or near-real-time transmission, distance and vector based controls to govern the area or direction in when they would like to gather targeted sound sources, the ability to tap into TV, cell phones, radios, voice control systems or other PC based devices for direct interface. Users may also have the ability to set the device for various modes, such as restaurants or close conversations, or control the lead-in time for playback such that they may determine tradeoffs between delayed lead-ins for targeted speech vis-a-vis intelligibility or naturalness of rebroadcast sounds.

In accordance with exemplary and non-limiting embodiments, a system comprises a sound gather device, such as a microphone, or a sound transmitting device for communication (e.g., using Bluetooth or other transmission protocol), with a nearby processor for engaging in cooperative/distributed computing of source signal separation. In some embodiments, the algorithm is scalable to be less processing-intensive so it can be used on hearing aids. In some embodiments, some processing may be distributed to remote server by the processor with results forwarded to the hearing aid.

Figure 15:
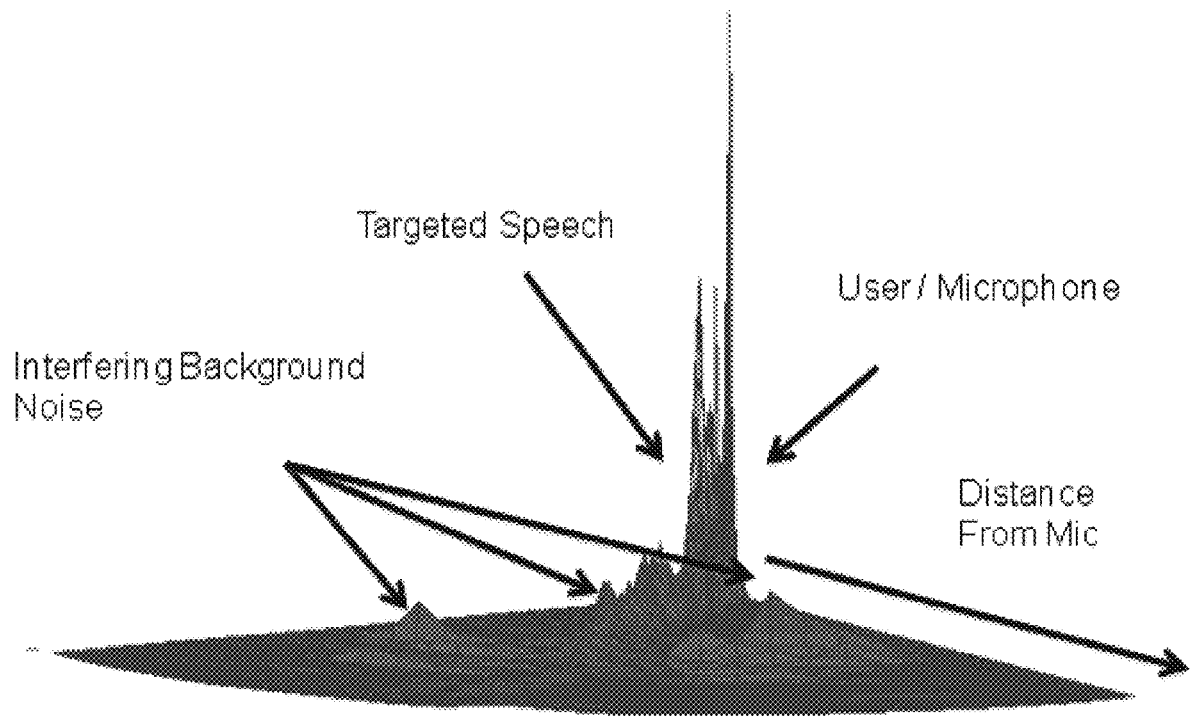
FIG. 15 is an illustration of a computer generated interface for tablet or cell phone control according to an exemplary and non-limiting embodiment.

In one variation, a cell phone can send data to a server that can perform more processing. In some instances, as when a hearing aid really needs more processing power and it can't transmit to a remote server, it may transmit to a nearby device such as a phone in your pocket. The phone may act like a local super booster or external processing system. In such an instance, the hearing aid could transition to a defined mode and use extra computing power to offload processing to the cell phone and achieve improved capabilities. In one example, controls may be placed on an actual cell phone or computing tablet such that, for example, a person sitting in a restaurant can put the cell phone down on the table and can tap a screen or move a slider control to tailor processing and source signal separation in the directions of the people sitting at the table. In response, an algorithm operates to help enhance table-mates conversation. FIG. 15 illustrates an exemplary and non-limiting representation of such a computer generated interface for tablet or cell phone control.

In another embodiment, ambient noise or unwanted background noise may be removed from an input source signal to produce a deconstructed source signal which then may be re-combined with the ambient or background noise at a lower noise level, and outputting the combined signal. In some embodiments, the user may dynamically or statically alter the noise level of the ambient noise re-introduced.

In some embodiments, the SS techniques described herein may be used in telephony applications. For mobile phone calls on cellular networks, the audio is captured through an embedded microphone and is subsequently converted from an analog to a digital signal (typically referred to as an "A to D" conversion). The resulting digital signal is then transmitted through the cellular network in a compressed or non-compressed form to an end terminus whereby it is delivered as audio output. Anywhere along the transmission process or at the endpoint of delivery, the digital signal is converted back to an analog signal. Typically, audio captured by a phone (such as a cellular phone, a speakerphone, a VoIP phone and the like) for sending may contain ambient noise or other interferences which will not inhibit the conversion nor transmission of the audio file, but may impact the general quality of the output file to the intended receiver. For example, the microphone in a mobile phone may pick up the voice of the speaker, but may also be capturing the noise of other conversations occurring near the caller of interest, which may be converted and transmitted to the receiver of the call. When the audio is converted and delivered to the receiver, the listener may find it difficult to understand the speaker with the interfering noise also delivered. Generally certain algorithms such as noise and echo cancellation are applied at the point of capture (such as in the mobile phone), where the signal may be converted for transmission, however, the applied algorithms traditionally only mitigate some of the noise/interfering effects and the receiving party may still receive interfering environmental noises which may impede the perceptibility of the sender.

The methods for source signal separation described herein may be introduced into any telephony application for the purposes of, but not limited to, amplifying targeted sounds and/or focusing on the cell phone or telephone user or the person of interest speaking on a conference call while minimizing or eliminating background or other ambient noises that a receiving party would prefer not to hear and/or have transmitted, as such unwanted transmissions would interfere with the user's comprehension of the calling party, speaker of interest and/or conversation.

These SS methods may be introduced and applied during any point of the source signal capture, conversion, transmission and/or delivery/output to the receiver in a telephony application. The SS methods may be integrated to be always applied during a call, or may be introduced with a control mechanism that may enable the sender or receiver to request the introduction of the SS methods to provide mitigation of interferers during a call. SS systems and methods may be incorporated as firmware, embedded software, a stand-alone software application or platform, or an additional software function or feature, which may be implemented from the point of collection, transmission or delivery (such as a cell phone or network) to be used alone or in conjunction with other algorithms for noise reduction, call clarity and/or other performance benefits.

In some embodiments, the SS applications may be used in car voice control systems that may face challenges in processing elements of a targeted audio command mixed with any of the following or similar interfering sound sources: road noise, external environmental noise, radio noise, HVAC noise, unintended cabin noise and accompanying passenger noises. The SS methods described herein may be used in conjunction with in-car voice response systems to extract and amplify targeted commands from unwanted or interfering background noise for accurate voice response system processing, automotive controls and vehicle security. The SS methods described herein may interact with a voice command system through the use of speech or extracted speech features that may be processed by the voice response system. The processing system may be contained on-board in a car-based-PC or transmitted to a central processing server outside of the vehicle. An exemplary embodiment of the voice response commands controlled by such a system may include but are not limited to in-car navigation, auto system controls such as HVAC, windows, radio, seat function, wipers, automatic door locks and controls, sunroof controls and third party integrated device controls such as cell phone integration and iPod, tablet, mp3, audio and entertainment device controls. The SS system may also be linked to cellphones; Bluetooth and other headset systems to process such as both send and receive signals that may be passing through the vehicles central audio processing system. An additional deployment of the SS methods may be onboard voice biometrics for vehicle controls and security. Speech features captured by the SS systems and methods described herein may enable the extraction of precise speech features unique to each individual user. Representative deployments of this control feature may include but are not limited to driver/user assigned vehicle locks and alarm controls, driver engine start and turn-off controls (initiated onboard or through an external control device such as a cell phone), driver and/or specific user controls of navigation systems and non-essential vehicle control systems.

The SS systems described herein may be enabled by a single microphone (stereo or mono, directional or omnidirectional) or an array of microphones built into the cabin or through linkage to an external systems such as a Bluetooth headset or other hands free cellphone control device. The system may be deployed and programmed by the user such that the voice control system may only accept prompts for the driver's seat, both the driver and passenger seats, or an individual with a designated biometric signature. Separate controls may also be added such that individuals in the rear seats may control rear HVAC systems or rear entertainment systems. In some embodiments, drive or additional party voice biometric controls may be programmed through use of the system or through a download user voice biometric profile from another device using the SS methods described herein.

In some embodiments, the SS methods described herein may be deployed in a series of medical imaging applications that make use of static imaging or time-series imaging signal analysis including but not limited to the following: Ultrasound, MRI, CT Scans, PET Scans, X-Rays, SPECT, Gamma Camera Imaging, Nuclear Imaging, Photoacoustic Imaging, Breast Thermography, and Optical Coherence Tomography. The application of the SS methods described herein may enable improved resolution of targeted images and the reduction of noise generated by the imaging equipment in the above mentioned and other medical imaging systems. An exemplary embodiment of the SS methods and systems described herein may include applications in medical ultrasound systems to enhanced resolution and reduce the noise generated by overlapping elements in the ultrasound probe. SS algorithms may be incorporated into freestanding ultrasound systems, pc-based systems, tablet systems, smart phone apps, PDAs, and handheld systems. The SS algorithms may be incorporated as firmware that may run off the devices internal CPUs, software, or apps loaded on to the devices, or as DSPs or other chips incorporated into the control box or onto the ultrasound probe itself. The SS methods and systems for improved ultrasound may be incorporated pre- or post-summation of the data collected by the individual elements in the probe. The SS methods and systems described herein may be used pre and/or post beam formation so as to be compatible with adjustments in beam angles and signal intensity to compensate for differences in targeted anatomy.

In some embodiments, the SS methods and systems described herein may be used with any form of ultrasound (such as sonography or echosonography) imaging software or add-on imaging analysis programs including but not limited to 2D ultrasound, 3D ultrasound, 4D ultrasound, tissue doppler, flow doppler tissue strain analysis, elasticity analysis and other applications. The SS software may be applied across all clinical practices including both diagnostic and surgical applications. Embodiments of SS enhanced ultrasound image may include ultrasound assisted biopsies, ultrasound assisted catheter placement, echo cardiology, cardiology and cardiac surgery applications, orthopedic and orthopedic surgical applications, sonography and other obstetrics and gynecology applications, including both imaging and surgical, urological applications, gastrointestinal applications, soft tissue applications, head, neck and cranial applications. The core ultrasound applications described herein may also be used with both ultrasound hardware and imaging software programs for veterinary and industrial applications including but not limited to ultrasonic analysis of composite materials, structures, and geological surveys.

In some embodiments, the SS techniques may be used for applications related to Sound Navigation And Ranging (Sonar), as well as for hydro acoustics applications. Sonar uses sound propagation to navigate, communicate with and/or detect objects on or under the surface of the water. There may be two types of sonar based applications that may include, applications based on a passive sonar technology that may "listen" for sounds generated by target objects; and applications based on an active sonar technology that may emit pulses of sounds and listen for echoes. Sonar may be used as a means of acoustic location and of measurement of the echo characteristics of "targets" in the water, and may be used in applications including, but not limited to, submarine navigation, guidance for torpedoes and mines, underwater survey and mapping, echo sounding, pipeline inspection, wave measurement, and determining the course, range, trajectory and speed of a target of interest (such as using the Target Motion Analysis).

In some embodiments, the SS methods and systems described herein may be used to enhance the signal quality with any form of active sonar which may use a sound transmitter and a receiver, which may be operated in monostatic, bistatic or multistatic configurations and the acoustic frequencies may vary from very low (infrasonic) to extremely high (ultrasonic). The sonar may utilize a pulse of sound generally created electronically using a signal generator, power amplifier and electro-acoustic transducer/array at constant frequency or a "chirp" of changing frequency (enabling pulse compression upon reception). The SS may also be incorporated in conjunction with a beam former that may be used to concentrate the acoustic power into a beam, which may be swept to cover the required search angles. Occasionally, the acoustic pulse may be created by other means, such as by chemically using explosives, or by using air guns or by using plasma sound sources.

In some embodiments, the SS methods and systems described herein may be used to enhance the signal quality with any form of passive sonar, which may typically "listen" without transmitting any pulses and has a wide variety of techniques for identifying the source of a detected sound, generally by comparing the detected sound against large sonic databases. Through use of passive sonar, if the target radiated noise level is high enough it allows the target to be identified. However, in some examples, operation may be affected by variations in sound speed determined by the water's bulk modulus, mass density, temperature, dissolved impurities (usually salinity), and even water pressure.

In one or more embodiments described herein, the SS methods described herein may be applied to all forms of active and passive sonar systems to address sound variations as well as mitigate noise, interference, and/or scatter at any point within the process of analysis once sound or echo has been received, and thereby enhancing the quality of the final data delivered to the end use application. It may be introduced in the software or hardware components of the receiving, transmission or display systems independent of any other correction algorithms and systems or in conjunction with one or more of such systems, such as beam forming and narrow beam transmissions. In some examples, sources of noise that interfere with the desired target echo or signature may range from waves and shipping to turbulence and marine life. Additionally, the motion of the receiver through the water may also cause speed-dependent low frequency noise. When active sonar is used, scattering may occur from small objects in the sea as well as from the bottom and surface. In addition to active and passive sonar, the SS technology may be applied to deliver benefit to other sonar-based systems including, but not limited to, synthetic aperture sonar and parametric and non-linear sonar. The SS methods and systems described herein may also be introduced to hydro acoustic systems, including underwater acoustic communication that may be used to send and receive messages below water. There may be several ways of employing such communication but the most common may include using hydrophones. Underwater communication may be difficult due to numerous factors, which can be addressed by SS, including but not limited to: multi-path propagation; time variations of the channel; small available bandwidth; and strong signal attenuation.

In some embodiments, the SS systems and methods described herein may be used in microphone dependent systems. Much like cell phones and other telephony systems, headsets, speakerphones and general microphone based systems (used either alone or in conjunction with cellular or other telephony networks) may have the unintended effects of receiving, processing and transmitting the device user as well as unintended background noise and ambient noise present at the time of transmission/recording. Current systems may not be capable of isolating the targeted users from other ambient or interfering noises that may overpower the speaker and may make it difficult for the receiver/user to comprehend the intended transmission/recording. Representative examples of this problem may include: the transmission of airplane noise through flight control systems, the broadcast of PA announcements at the airport through a cell phone headset, room noise broadcast through a conference call speaker system, auto and outdoor noises broadcast through a "drive-thru" ordering system, or even crowd noise broadcast over a coach's headset.

The SS systems and methods described herein may be incorporated into such microphone dependent devices for the purpose of improving the quality/intelligibility of the user relative to unwanted/unintended ambient/background noises captured by the microphone in the transmitting/recording device. The SS methodology may be optimized for each device so that it may only transmit sound sources emanating from a specific speaker, or defined limited area/radius, such as the proximal device user and turning off far field noises. This may be achieved by using SS methods and systems to extract and selectively transmit/record sounds from the targeted speaker and not the unintended background noises.

An exemplary embodiment of such a system may include the addition of the SS systems and methods described herein to a Bluetooth headset. The SS technology may be added to the headset as a dedicated DSP or firmware added to an existing processor. It may be capable of processing the signals captured by the devices' microphone (directional or omni-directional), extracting the targeted sound source from the unintended noise, before the resulting signal may be transmitted or recorded. This may assure that the recording device or transmitting systems may only record the extracted sound source, hence increasing the quality and intelligibility of that sound source. This new step in the processing chain may be used as a stand-alone feature or may be used in combination with other audio processing and enhancement algorithms. Another exemplary embodiment of the SS systems and methods described herein may be used in microphone-based recordings. Targeted sound sources may be extracted and recorded on one channel, while background noises may be recorded on a separate channel. Each channel may then be remixed for optimal/desired sound effects and quality.

In accordance with exemplary and non-limiting embodiments, a system comprises a sound gathering device, such as a microphone, or a sound transmitting device for communication (e.g., using Bluetooth or another communications protocol), with a nearby processor for engaging in cooperative/distributed computing of source signal separation. In some embodiments, some processing may be distributed to remote server by the processor with results returned and transmitted through the communication system.

In another embodiment, ambient noise or background noise distinct from the targeted input signal may be removed from an input source signal to produce a deconstructed source signal which may then be re-combined with the ambient or background noise at a lower or reduced presentation level and outputting the combined signal. In some embodiments, the user may dynamically or statically alter the presentation level of the reintroduced ambient noise.

In some embodiments, the SS systems and methods described herein may be used in voice controlled television and other interactive device based applications. The growth of voice recognition and voice driven command systems for TV, video games, entertainment systems and other interactive devices has been limited by the challenges of interfering noises, unintended speakers interrupting commands, and background noise impacting command recognition and response. The SS methods described herein may be embedded in any such entertainment device for the purpose of assuring accurate voice recognition and response. Additionally, such devices may be linked or utilize a network-dependent solution for speech and voice recognition similar to those described above to which SS methods described herein may be applied. An exemplary embodiment of the SS systems and methods described herein may include be the use of SS in voice response/voice controls for television function. SS may enable the system to focus on a specific speaker (s) that may be preprogrammed in the system or an unknown speaker talking into a remote control or other similar device. The speakers' voice commands may be configured to control all device features and those of related devices including but not limited to cable TV boxes, DVR systems, satellite systems, DVD players, integrated sound systems, PCs, video game systems/consoles, internet connectivity, cloud connectivity, video conference systems, VOIP/internet phone systems, and other similar devices. In some examples, the TV voice response controls may be driven by any microphone or speaker/microphone combination systems including but not limited to television embedded microphone/speakers, dedicated remote control microphone/speakers, external microphone/speaker systems, cell phones, tablets, PCs, video game systems and headsets. In such examples, the control features may use directional/omni-directional microphones and/or may make use of IR, bluetooth, wifi, RF or wired linkages to the system. Such a system may permit two-way interaction, both accepting and responding to voice driven queries, and it may also serve as the interface for video conferencing, web conferencing, VOIP, and web based conference calls. The SS methods and systems for Voice Controlled TV described herein may or may not re-synthesize the received speech. In noisy environments, received speech may be processed as speech features or speech vectors based on the SS mathematical models described herein for purposes of driving a speech recognition engine or voice response system. With re-synthesized speech, varying levels of background noise may be reincorporated. The system may be trained to respond to a targeted voice or voices. In some embodiments, speaker recognition training may be generated through device use or the citation of speech at the time of device initialization.

In some embodiments, the SS methods and systems described herein may be used in electrical power supply monitoring related applications. The electrical power supply emits a continuous low-level noise, which e.g., averages roughly 50 Hz in some applications. Fluctuations in power demand may cause slight variations in this noise level. For example, increased electrical demand may lower the noise level, while reduced demand level may have the opposite effect. Fluctuations in power demand may give the power grid the capability of providing a unique time/date signature that may be correlated with any recording. The SS systems and methods described herein may be used to monitor the electric grid to create a highly accurate time series signature of the system. This signature may be derived from any recording device (audio or video) or source signal type (analog or digital). The low level audio signal may be consistent across the system and the signal analysis may take place at generation station, specific machine or any other location. The SS systems and methods described herein may be configured to extract the signal impact of electrical supply from any live feed or recording to provide a highly accurate time series signature of the electrical grid. This signature may be monitored real-time, near real-time or subsequently analyzed. An exemplary embodiment of this system may use SS to predict impending brown-outs, power spikes, power failures or disruptions in power supply. This may occur at a grid-wide level, at an individual site, or on an individual device by analyzing changes in the low-level noise vs. historic standards/predictors. A recording device may record the ambient noise at any of the above locations, machines or devices and then SS methods would separate the targeted electrical noise from other noises. The SS methods and systems may be configured to generate a reading of the power noise and send a warning of an impending event if the noise level poses any concerns. The warning may appear on the device itself or be sent through a network, wireless or through the cloud to any monitoring device, PC, tablet, cell phone or any other device.

Another exemplary embodiment of this system may be related to forensic audio analysis. This embodiment may include identification and validation of the date and time during which a recording was created. The SS methods and systems described herein may be used to extract the electrical system noise from a recording and generate a highly accurate mathematical representation of that signal. That signal may be correlated to known recordings from the electrical grid to determine the exact time and date at which the recording was created. Such authentication and/or validation may be necessary for verifying recordings to be admitted into evidence and to assure that such recording have not been adulterated. The analysis may be conducted on any type of recording (such as audio or video, digital or analog), file format, or duration of recording.

Fit User Interface allows a user to view and interact with the tracking, grouping, and peak selection for resynthesis stages of processing. User interface may be used "offline" to view and modify stored data, or "online" to command the processing components and interact with the data in real time. It may be used to analyze data, and modify component parameters. It may detect optimal component parameters from user interaction. For example, given a user's selection of data for resynthesis, the Fit User Interface may calculate processing parameters for detecting similar data.

In accordance with an exemplary and non-limiting embodiment, a user interface is provided for viewing a signal as: tracks; a plurality of potentially coherent tracklets and/or coherent groups for editing the visual representation to at least one of add, remove or group signal data with the tracks, tracklets and/or coherent groups.

In another embodiment, the user interface may be utilized to view a signal as: tracks; a plurality of potentially coherent tracklets; and/or coherent groups wherein a user can click on a track, tracklet; and/or coherent group and to be presented the data associated with that track, tracklet and/or coherent group. In another embodiment, the user interface may be utilized for viewing a signal as a track; plurality of potentially coherent tracklets; and/or coherent groups wherein a user can search and find a track and/or tracklet within the interface based on input comprising characteristic data about that track, tracklet, and/or group. In another embodiment, a user may change the scoring function on the fly to modify what data is associated into tracks, groups, and/or tracklets.

Figure 16:
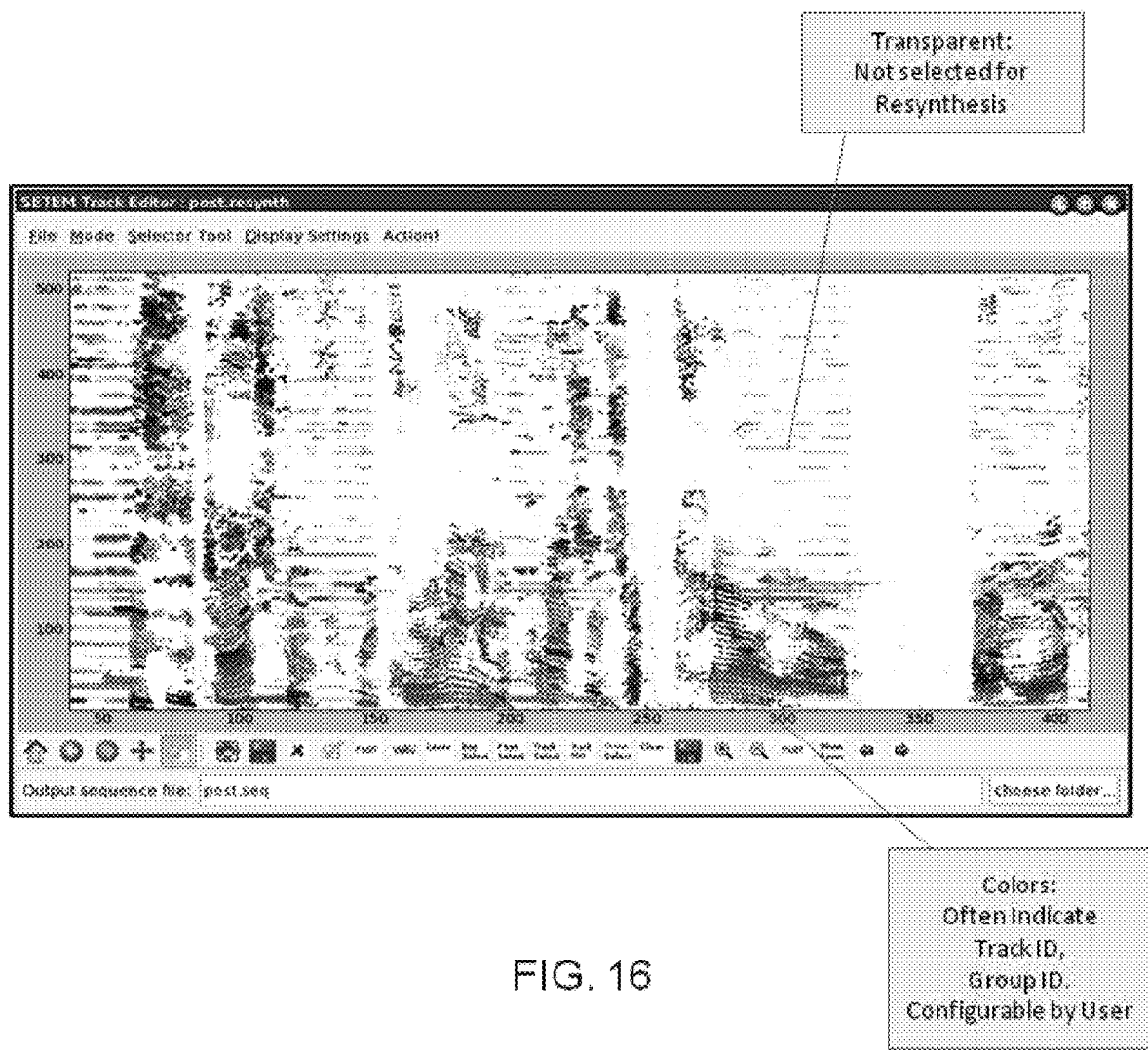
FIG. 16 is an illustration of a track editor according to an exemplary and non-limiting embodiment.

With reference to FIG. 16, there is illustrated an exemplary embodiment of a track editor as may be practiced in accordance with the embodiments and description above. As illustrated, the track editor displays a plurality of tracklets composed of oscillator peaks. In various exemplary and non-limiting embodiments, oscillator peaks may be colored according to track-id. In yet other embodiments, oscillator peaks may be colored according to coherent group-id. In other embodiments, oscillator peaks may be colored or set transparent according to whether or not they are selected for resynthesis. In other embodiments, oscillator peaks may be colored according to any other oscillator peak parameter. In other embodiments, oscillator peaks may be scaled according to amplitude, amplitude with respect to background power, or with equal size.

Figure 17:
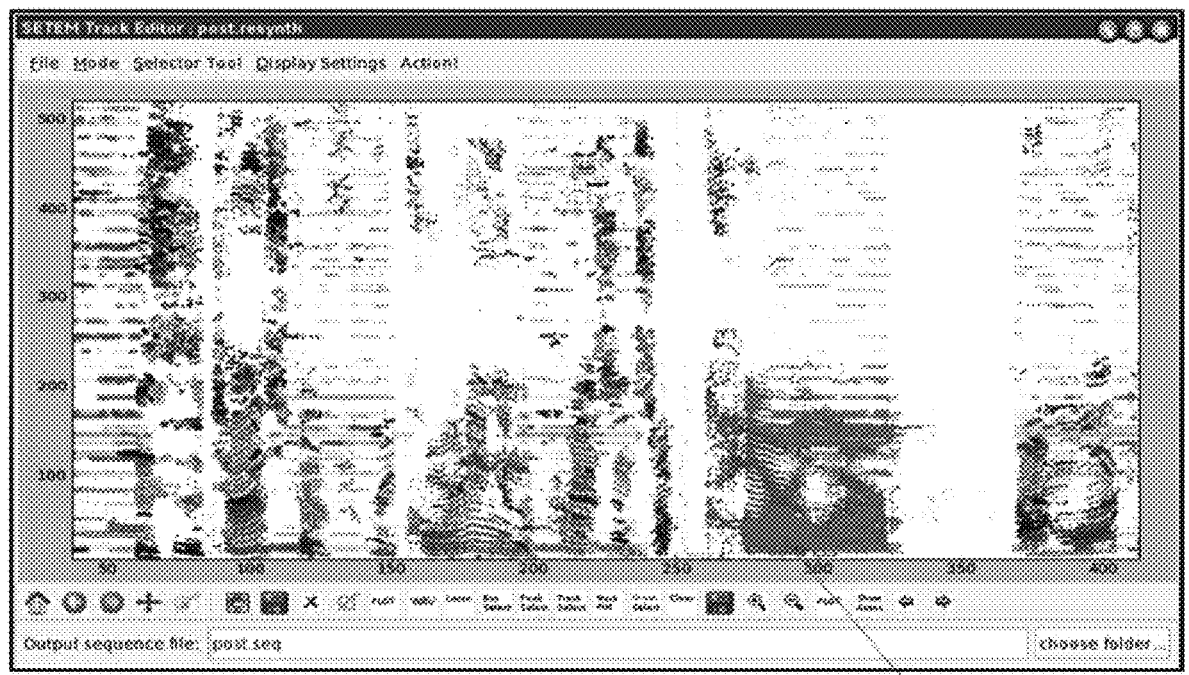
FIG. 17 is an illustration of a track editor sub-selection according to an exemplary and non-limiting embodiment.

With reference to FIG. 17, there is illustrated an exemplary and non-limiting embodiment of a track editor GUI. In accordance with exemplary and non-limiting embodiments, a user may select data displayed in the track editor GUI in order to perform an action on the selected data. In one embodiment, data may be selected by area such as via drawing with a box or a lasso. In other embodiments, a user may select data by tracklet such as by clicking on any peak in a tracklet. In other embodiments, a user may select data by coherent group such as by clicking on any peak in a coherent group. In yet another embodiment, a user may select data by oscillator peak such as by clicking on any peak.

Once selected, a user may select an action to be performed on the data. For example, a user may plot the data in another view wherein there is visually rendered oscillator peak statistics, direction of arrival, time-domain audio, spectrogram data and the like. In some embodiments, a user may Instruct the system whether or not to include select peaks for re-synthesis such as via a "Turn on/Turn off" option.

Figure 18:
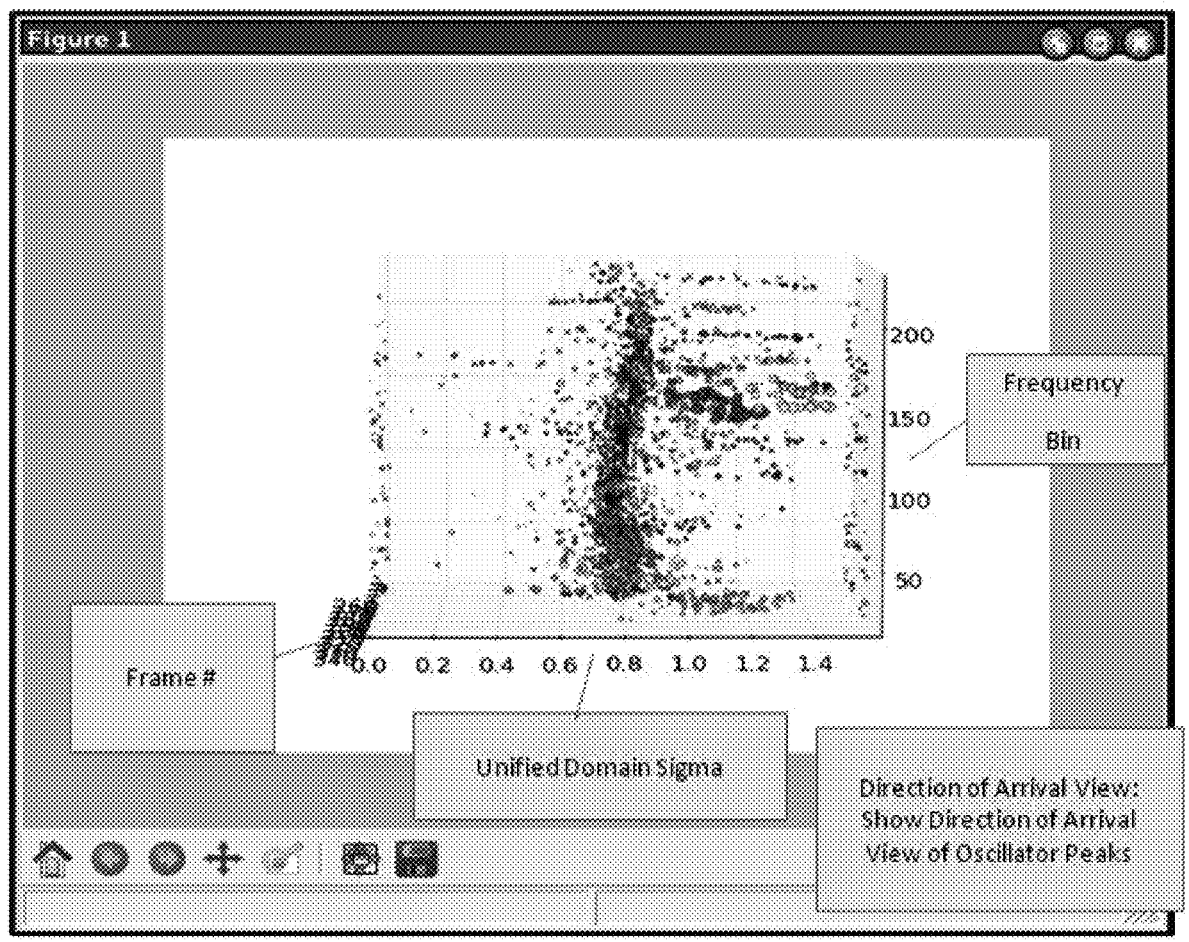
FIG. 18 is an illustration of track editor data visualizer according to an exemplary and non-limiting embodiment.

With reference to FIG. 18, there is illustrated an exemplary embodiment of a data visualizer for displaying user selected data as described above.

The SS methods and systems in accordance with various embodiments may be implemented in software, hardware, firmware, or any combination thereof. The processes may preferably be implemented in one or more computer programs executing on a variety of computer-equipped devices (such as personal computers, mobile phones, imaging devices, hearing aids, interactive voice response systems, conference call systems, audio recording devices, in-vehicle voice activation systems, dictation systems, and communications systems). Such devices may include, among other things, a computer processor (such as general and special purpose microprocessors), and a storage medium readable by the processor and input and output devices. Each computer program may be a set of instructions (program code) in a code module resident in the random access memory of the device. Until required by the computer processor, the set of instructions may in some cases be stored in another computer memory (such as in semiconductor memory devices, hard disk drives, or removable memory devices such as optical disks, external hard drives, memory cards, or flash drives) or stored on another computing device and downloaded via the Internet or other network.

There has thus been described the ability to decompose any signal into its constituent elements or source signal emitters, and reconstitute the signal in whole or in part. There is now introduced new methods and systems for improved measurement in source signal separation, enabling more precise extraction of targeted source signal emitters in accordance with exemplary and non-limiting embodiments.

Also described herein are techniques for path propagation effect measurement and mitigation. These techniques may be used in combination with source signal separation to more accurately identify signals of interest and to mitigate the effects introduced by echoes, reverberations and reflecting signals as a source signal passes from the emitter to a receiver.

As used herein, "Path Propagation Effect (PPE)" is the name given to a mathematical representation that can be used to characterize the distortions to a signal caused by channel effects between a source and receiver, such as those caused by echoes and reverberation, and is commonly implemented through a mathematical convolution. These effects may cause changes to a signal's phase, frequency and magnitude.

As used herein, "Path Propagation Function" is closely related to the Path Propagation Effect (PPE) defined above, and represents the distortions to a signal caused by echoes, reflections, reverberations and other room effects that alter a signal between a source position and a receiver, and how these effects can be encapsulated into a mathematical function for use in PPE mitigation. These effects may be non-stationary and nonlinear and may generally be defined from specific point(s) in a room or other environment and may be considered to be distinct from the path propagation function for nearby positions.

As used herein, "Angle of Arrival (AOA)" refers to the direction to the source of a signal, as measured from a sensor or set of sensors.

As used herein, "Time Delay of Arrival (TDOA)" refers, when a signal is measured from multiple sensors, to the amount of time between receipt of the signal at the first sensor and receipt of the signal at the second sensor. In audio signal processing, this measurement is often estimated in samples, where the sample rate is the output rate of the Analog to Digital Converter.

As used herein, "Cross Channel Complex Spectral Phase Evolution (XCSPE) analysis" refers to a method of using relative phase to determine the TDOA of a signal, including, but not limited to audio signals.

As used herein, "Sigma" is an estimate of AOA calculated using the measured magnitude of a signal in multiple sensors.

As used herein, "Predicted XCSPE Curve (PXC)" refers to predicted XCSPE values per frequency for given TDOAs.

As used herein, "Aggregated XCSPE Tau Estimation (AXTE)" refers to a process for measuring TDOA for a set of oscillator peaks using known patterns of PXC traces.

As used herein, "Entity Parameters" refer to a set of measurements that can be used to identify and separate portions of spectrum from a given sound source, or entity.

The following exemplary and non-limiting embodiments introduce five new measurement techniques that may be applied in conjunction with i) Oscillator Peaks or ii) Frames or Groups of Oscillator Peaks as described above. Examples of peak measurement tools introduced herein include XCSPE and Sigma. Frame or Groups of Oscillator Peaks tools introduced in this application include PHAT, XPHAT and AXTE. The output of these tools enable Source or Target Modeling of a given signal component.

The systems and methods introduced in the described exemplary embodiments may enable new methods and systems for path propagation effect measurement and mitigation. Path propagation effect measurement provides improved source identification, tracking and separation. Path propagation mitigation provides new techniques for managing the effects of reverberation and echoes to help clean a source signal emitter or introduce reverberation into a clean signal.

These exemplary embodiments may enable more accurate source signal separation and provide new techniques for more effectively managing reverberation and identifying a source signal of interest. Three key systems and methods enhance the source signal separation system and methods outlined above including, but not limited to, (1) Improved Measurement, (2) Entity & Parameter Estimation and (3) Path Propagation Effect Measurement and Mitigation.

Figure 19:
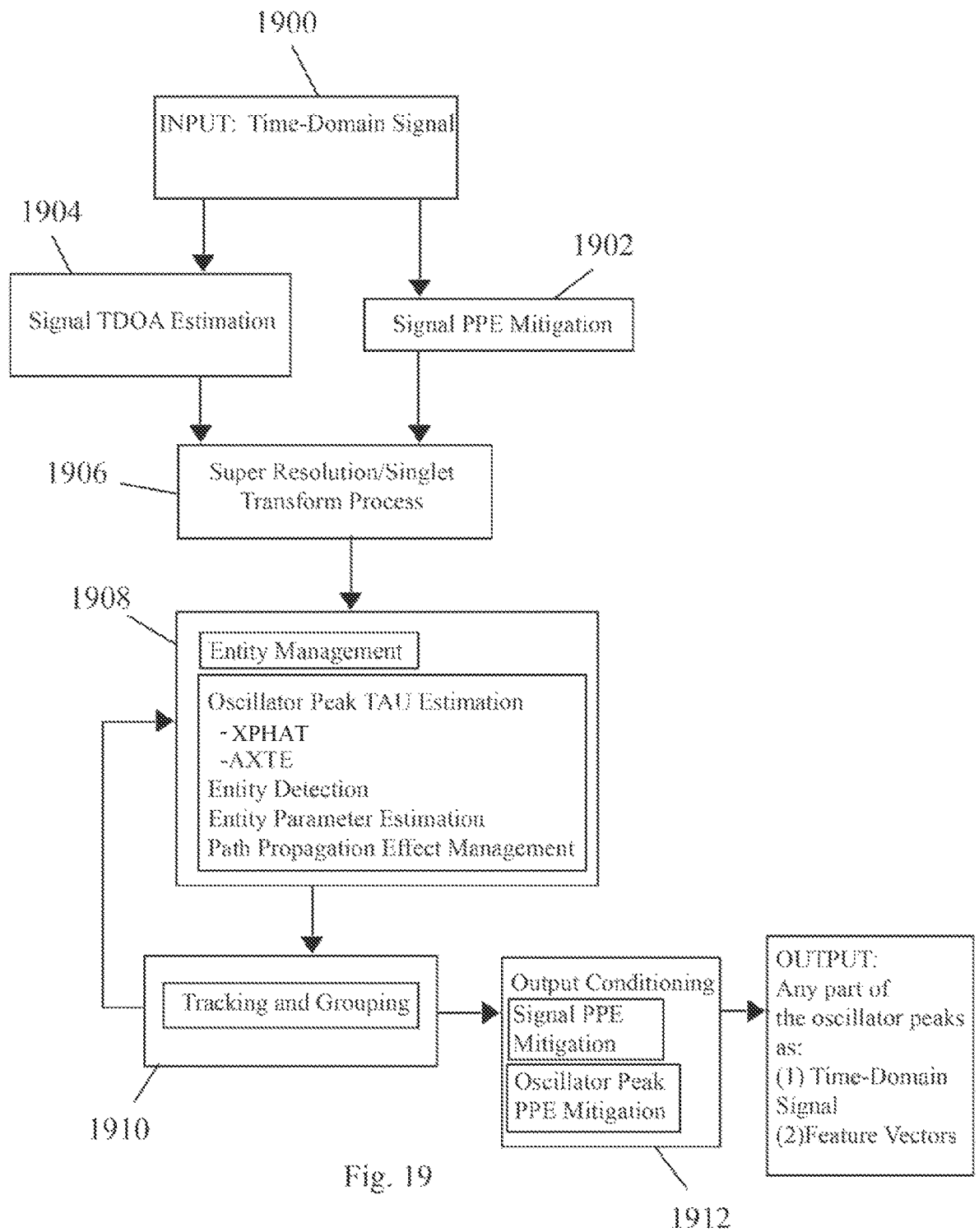
FIG. 19 is an illustration of an expanded source signal separation (SSS) method according to an exemplary and non-limiting embodiment.

With reference to FIG. 19, there is illustrated a method according to an exemplary and non-limiting embodiment. As illustrated, at step 1900, a time domain signal is selected for analysis to form the input to path propagation effect mitigation and TDOA estimation. At step 1902, Path Propagation Effect Mitigation may be applied to the input signal prior to the Singlet Transformation Process (for example, if more than one iteration of the processing is applied, the input signal may have PPE mitigation applied before it is processed again). Likewise, at step 1904, Signal-based TDOA estimation may be performed prior to the Singlet Transformation Process, where methods applied at this stage do not necessarily rely on super-resolution information found in the singlet transformation process. At step 1906, super resolution/singlet transformation is performed, as described in SSS. Next, at step 1908, as described more fully below, the Entity Manager may refine TDOA estimates (or calculate them for the first time) using a process such as XPHAT or AXTE. The Entity Manager may further perform entity detection to determine which entities are contributing to the signal of interest and may perform Path Propagation Estimation to measure effects such as reverberation and echo.

Next, at step 1910, the tracking and grouping module may add the oscillator peaks to its current set of tracklets and coherent groups, updating using the likelihoods that oscillator peaks, tracklets, frames of oscillator peaks and coherent groups of oscillator peaks were produced by entities of interest. The tracking and grouping module may use the PPE parameters to achieve greater accuracy in estimating which oscillator peaks were produced by each entity. As illustrated, the tracking and grouping module may send track and group information back to the Entity Manager to repeat step 1908 to update the entity parameters. Lastly, at step 1912, desired oscillator peaks are selected for output. These oscillator peaks may have PPE mitigation applied to them either prior to resynthesis using Oscillator Peak PPE Mitigation or after resynthesis using signal based PPE mitigation. Further, the PPE mitigation methods may be applied at the high-resolution scale or may be applied at the scale of the fundamental transform resolution.

As noted above, in accordance with exemplary and non-limiting embodiments, there is disclosed herein numerous measurement techniques to work with either individual oscillator peaks and/or frames or groups of oscillator peaks. These techniques may be applied to any signal in the fundamental transform resolution frequency spectrum to provide an output estimate, but are most effective when used with the high-resolution analysis techniques discussed above.

A first Individual Oscillator Peak Analysis Tool is comprised of Cross Channel Complex Spectral Phase Evolution (XCSPE) which may be used to estimate the direction of arrival for a signal. Specifically, oscillator peaks derived via source signal separation (SSS) are used to develop direction of arrival (DOA) estimates using methods including but not limited to methods that take advantage of relative phase (XCSPE) and relative power (Sigma). Patterns derived via these measurements may then be used to correct and calibrate for the observed effects of the Path Propagation Effect (PPE).

Cross Channel Complex Spectral Phase Analysis (XCSPE) is a method of using relative phase or phase advance measured on the high-resolution scale described in SSS to determine the TDOA of a signal component. If a signal is measured using multiple sensors, the difference in travel distance from the source to each sensor results in a different phase measurement at each sensor. This technique is an extension of the CSPE methods defined in the SSS described above and the mathematical derivation is detailed below.

Those skilled in the art will recognize that phase difference at multiple sensors has previously been used to estimate TDOA. However, such measurements are imprecise, especially in the presence of interference. An Oscillator Peak measurement process that takes as input Oscillator Peaks with frequency and phase measurements from multiple channels, and outputs an indicated Time of Flight Calculation derived via Cross Channel CSPE (XCSPE), provides a more accurate measure of the phase difference, yielding a more accurate measure of TDOA.

In accordance with such a process, TDOA=((N/(2*PI))/freq)*angle(conj(specA0)*specA1) where, N=full length of FFT;

freq=high-resolution frequency measured in FFT bins. This may be a high resolution CSPE frequency;

specA0=Complex spectrum associated with the frequency in question as measured by microphone 0, i.e., the transform of the windowed signal; and specA1=Complex spectrum associated with the frequency in question as measured by microphone 1.

The result of this calculation is the difference in arrival time at microphone 0 compared to microphone 1, measured in time domain samples. Note that is straightforward to use a time-lagged sample window on one or both of the microphone data streams, since this just introduces a fixed number of samples of advance; one familiar with the art would see that the equations can be modified to accommodate the variation without changing the essence of the method.

Figure 20:
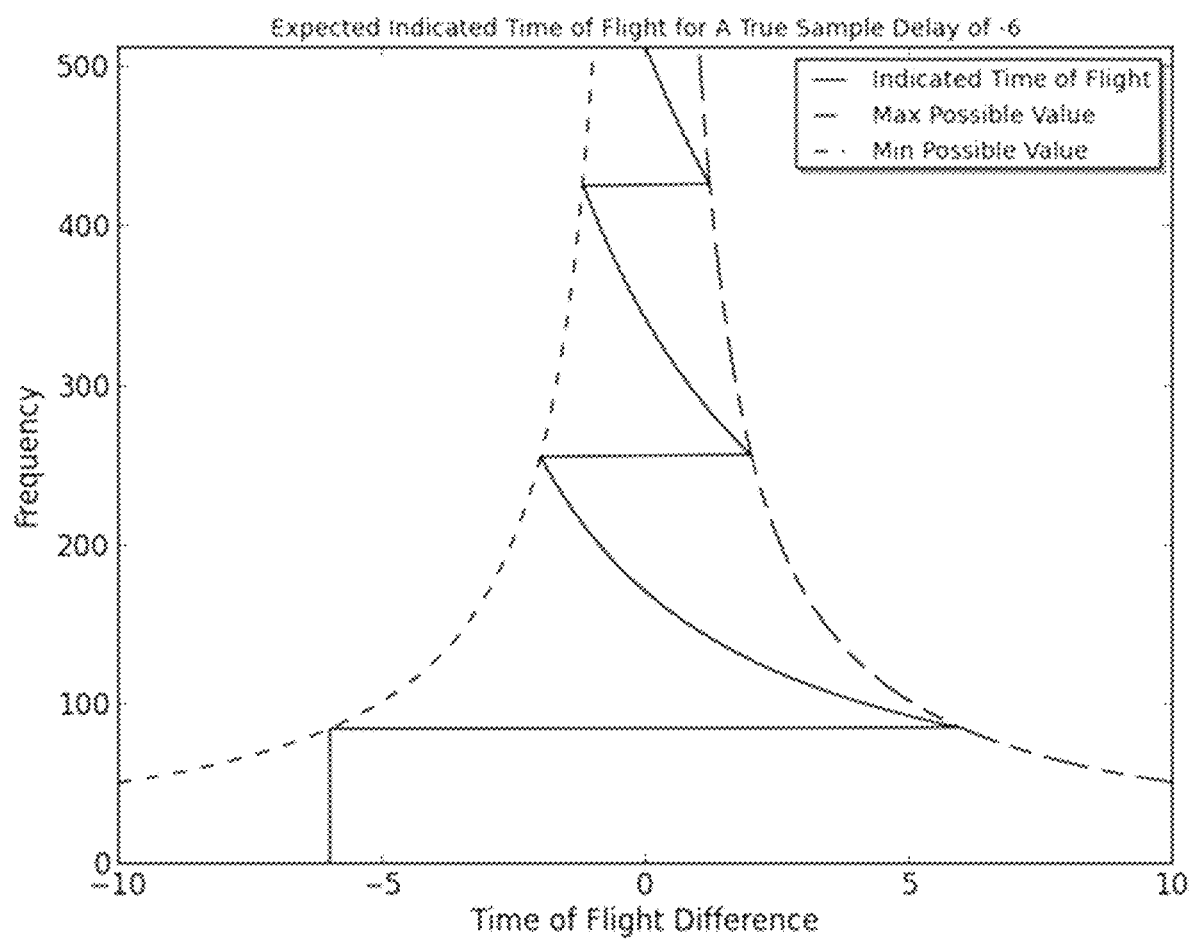
FIG. 20 is an illustration of an example predicted XCSPE Curve (PXC) according to an exemplary and non-limiting embodiment.

For frequencies higher than some threshold that depends on the spacing between the receivers and the source positions, there will be introduced a $2\pi$ wrap at wavelengths shorter than the separation between sensors. Thus the expected pattern of XCSPE measurement, henceforth defined as Predicted XCSPE curve (PXC), exhibits discontinuities that correspond to this $2\pi$ wrapping in the TDOA pattern as exhibited in FIG. 20 below. In this image, the horizontal lines are discontinuities that indicate that there is a $2\pi$ wrap in the phase difference caused by the time difference of arrival, and that fact that the bounds on the plot are tapering is related to the fact that the time of flight contribution of the $2\pi$ wrap is not observed in the measurements.

Figure 21:
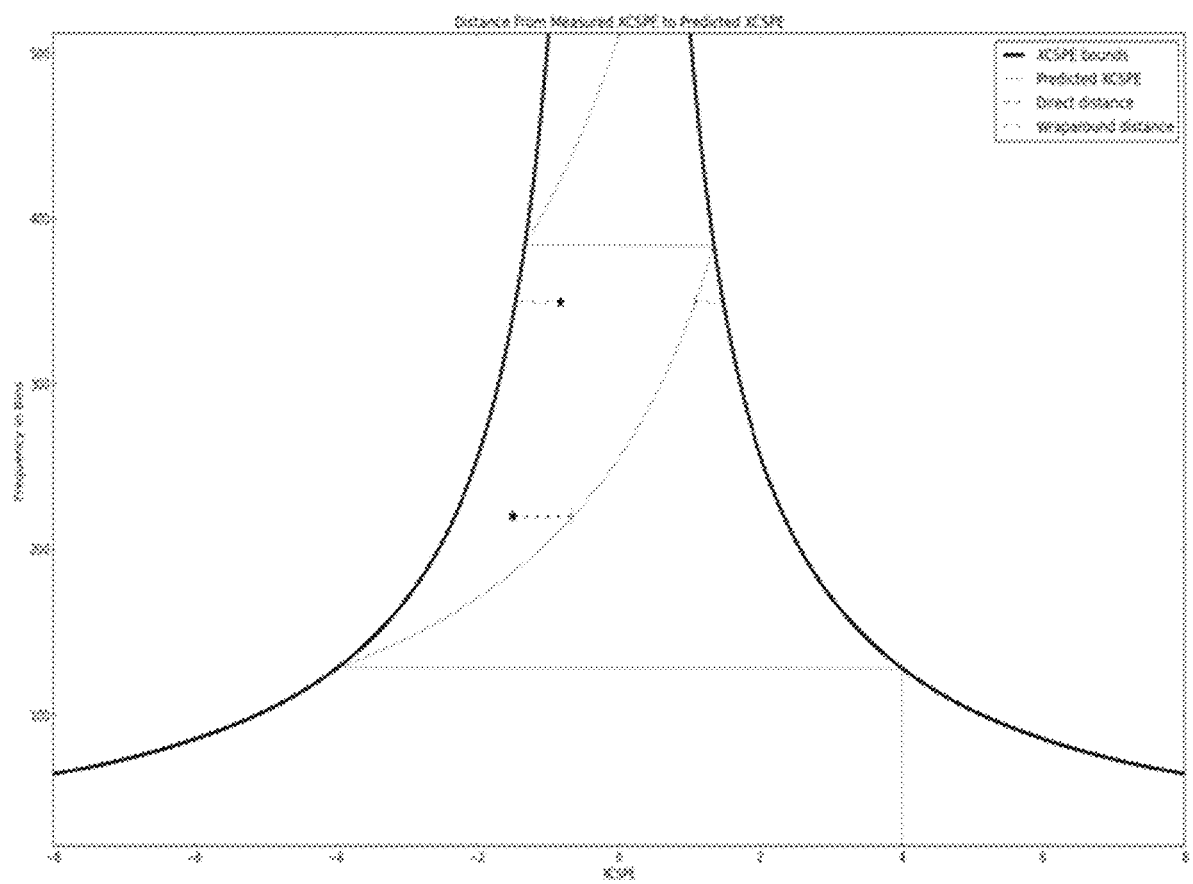
FIG. 21 is an illustration of an example of a distance calculation of measured XCSPE according to an exemplary and non-limiting embodiment.
Figure 22:
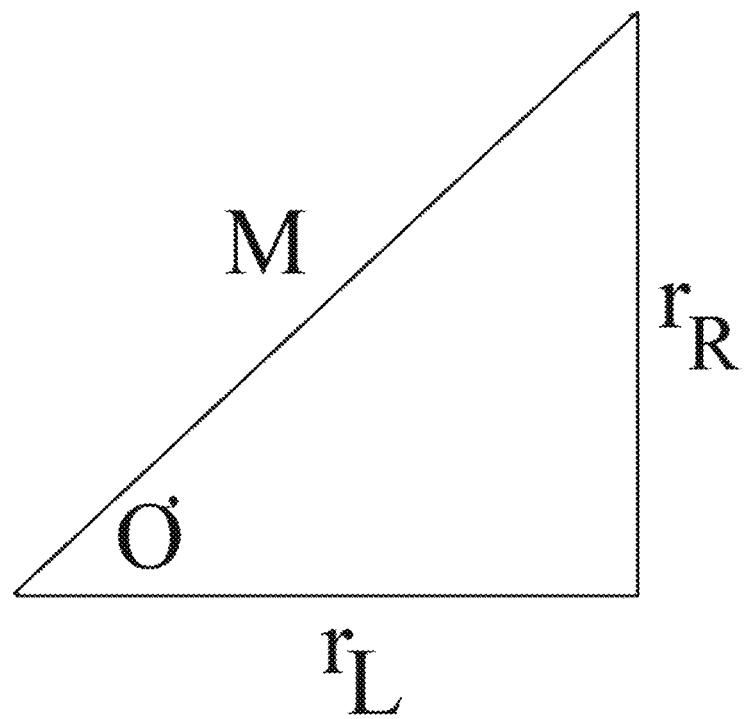
FIG. 22 is an illustration trigonometric relationships.

There is now described a Method for Calculating the Distance from a Measurement to a Predicted XCSPE. As illustrated with reference to FIG. 21, the distance from a measured XCSPE to a predicted XCSPE (i.e. on the PXC trace) must take wrap-around effects into account. The correct XCSPE distance is the shorter of the direct path and indirect/wraparound paths shown in FIG. 21.

The CSPE may be extended to analysis of a signal that is received on more than one receiver or sensor. In such a case, the assumption is that the signal originates at a given source position and propagates to the receivers. Since the physical dimensions of the receiver/sensor require that the positions of the receivers/sensors are separated in space, the signal must propagate over different paths to reach the receiver. In the simplest case, this has the effect of creating an offset between the signal received on sensor 1 and the signal received on sensor 2, and this can be used to create the Cross-CSPE (XCSPE).

In contrast to the case of the simplest version of the CSPE described above, where the signal is sampled at a single receiver and the offset is created by shifting the signal by an integer number of samples, in the case of the XCSPE the offset will be an unknown quantity. When the standard CSPE is used to find the actual underlying frequency, the XCSPE can then be used to solve for the unknown offset, and this then represents the (fractional) sample delay between the signal received at sensor 1 and the signal received at sensor 2. Furthermore, as shown in the detailed description below, the (fractional) sample delay can be estimated at individual frequencies and, in fact, can provide different results if different frequencies result from more than one source position for the signals.

One goal of the XCSPE is to analyze the phase evolution of the components of the signal between the signal received at receiver/sensor 1 and the signal received at receiver/sensor 2, where there is some unknown fractional number of samples delay between the received signals. Assume again that one processes N sample points at sensor 1 and another data window of N sample points from sensor 2. In keeping with common practice, call the data for sensor 1 the channel 1 data and the data for sensor 2 the channel 2 data. Let the time delay between the received signals be designated by $\Delta$ (where $\Delta$ can now be a fractional delay and can be negative), and define the received data vectors as $\vec{s}_i$ for channel 1 and $\vec{s}_{i+\Delta}$ for channel 2, where each data vector represents N samples of data. (In most cases the sampling of the channels is considered to be time synchronous, meaning that there is a master clock governing the timing of the analog-to-digital converters, but in other cases it may be that the timing of the two channels is independent. In this latter case, there would then be an extra time-base synchronization delay between the channels that would be included in the calculation of the unknown fractional sample delay between the channels—and XCSPE can be used to find the synch delay if it is unknown and the other delays are known or are small).

The first step in the XCSPE calculation is to take the transform (FFT, DFT, DCT or other transform) of the channel data, so let $F_1(\vec{s}_i)$ be the transform of the channel 1 data and let $F_2(\vec{s}_{i+\Delta})$ be the transform of the channel 2 data. One then considers the Hadamard product of the complex conjugate of $F_1(\vec{s}_i)$ and $F_2(\vec{s}_{i+\Delta})$. The CSPE is defined as the product (taken on an element-by-element basis) CSPE=$F(\vec{s}_i)\odot F^*(\vec{s}_{i+\Delta})$, along with an associated frequency, $f_{CSPE}=\measuredangle(F(\vec{s}_i)\odot F^*(\vec{s}_{i+\Delta}))$ where the operator $\measuredangle$ indicates that one takes the angle of the complex entry resulting from the product. This frequency estimate will provide improved resolution over that which is inherent in the DFT.

To illustrate the XCSPE method on sinusoidal data, take a signal of the form of a complex sinusoid that has period $p=q+\delta$, where q is an integer and $\delta$ is a fractional deviation of magnitude less than 1, i.e., $|\delta|\leq 1$. For the channel 1 data, assume the overall phase of the signal is set to zero and the samples of the complex sinusoid can be written (the overall phase term would just pull out of the calculation for both channel 1 and channel 2, so it is set to zero in channel 1 for simplicity):

$$\vec{s}_{1,0} = \begin{bmatrix} e^0 \\ e^{j2\pi\frac{(q+\delta)}{N}} \\ e^{j2\pi 2\frac{(q+\delta)}{N}} \\ e^{j2\pi 3\frac{(q+\delta)}{N}} \\ \vdots \\ e^{j2\pi(N-1)\frac{(q+\delta)}{N}} \end{bmatrix} \quad (1)$$

Where the first subscript, 1, indicates that this is channel 1 data and the second subscript, 0, indicates that this is the initial $0^{th}$ data window under consideration. If one takes a shift of one sample, then, as before for the CSPE, and one has:

$$\vec{s}_{1,1} = \begin{bmatrix} e^{j2\pi\frac{(q+\delta)}{N}} \\ e^{j2\pi 2\frac{(q+\delta)}{N}} \\ e^{j2\pi 3\frac{(q+\delta)}{N}} \\ e^{j2\pi 2\frac{(q+\delta)}{N}} \\ \vdots \\ e^{j2\pi N\frac{(q+\delta)}{N}} \end{bmatrix} = e^{j2\pi\frac{(q+\delta)}{N}} \begin{bmatrix} e^0 \\ e^{j2\pi\frac{(q+\delta)}{N}} \\ e^{j2\pi 2\frac{(q+\delta)}{N}} \\ e^{j2\pi 3\frac{(q+\delta)}{N}} \\ \vdots \\ e^{j2\pi(N-1)\frac{(q+\delta)}{N}} \end{bmatrix} = e^{j2\pi\frac{(q+\delta)}{N}} \vec{s}_{1,0} \quad (2)$$

Since channel 2 is essentially independent of channel 1, there is a delay of $\Delta$ between the time the signal reaches receiver 1 and when it reaches receiver 2. Hence, one has independent samples of the same source signal, so one designates them as $\vec{s}_{2,i}$ for channel 2 and data window i:

$$\vec{s}_{2,0} = \begin{bmatrix} e^{j2\pi\Delta\frac{(q+\delta)}{N}} \\ e^{j2\pi(1+\Delta)\frac{(q+\delta)}{N}} \\ e^{j2\pi(2+\Delta)\frac{(q+\delta)}{N}} \\ e^{j2\pi(3+\Delta)\frac{(q+\delta)}{N}} \\ \vdots \\ e^{j2\pi((N-1)+\Delta)\frac{(q+\delta)}{N}} \end{bmatrix} \quad (10)$$

Then, if one looks at a shifted signal on sensor 2, one obtains:

$$\vec{s}_{2,1} = \begin{bmatrix} e^{j2\pi(1+\Delta)\frac{(q+\delta)}{N}} \\ e^{j2\pi(2+\Delta)\frac{(q+\delta)}{N}} \\ e^{j2\pi(3+\Delta)\frac{(q+\delta)}{N}} \\ e^{j2\pi(4+\Delta)\frac{(q+\delta)}{N}} \\ \vdots \\ e^{j2\pi(N+\Delta)\frac{(q+\delta)}{N}} \end{bmatrix} = e^{j2\pi\frac{(q+\delta)}{N}} \begin{bmatrix} e^{j2\pi(\Delta)\frac{(q+\delta)}{N}} \\ e^{j2\pi(1+\Delta)\frac{(q+\delta)}{N}} \\ e^{j2\pi(2+\Delta)\frac{(q+\delta)}{N}} \\ e^{j2\pi(3+\Delta)\frac{(q+\delta)}{N}} \\ \vdots \\ e^{j2\pi((N-1)+\Delta)\frac{(q+\delta)}{N}} \end{bmatrix} = e^{j2\pi\frac{(q+\delta)}{N}} \vec{s}_{2,0}$$

If one compares the signal evolution from channel 1 to channel 2, one observes that:

$$\vec{s}_{2,0} = \begin{bmatrix} e^{j2\pi\Delta\frac{(q+\delta)}{N}} \\ e^{j2\pi(1+\Delta)\frac{(q+\delta)}{N}} \\ e^{j2\pi(2+\Delta)\frac{(q+\delta)}{N}} \\ e^{j2\pi(3+\Delta)\frac{(q+\delta)}{N}} \\ \vdots \\ e^{j2\pi((N-1)+\Delta)\frac{(q+\delta)}{N}} \end{bmatrix} = e^{j2\pi\Delta\frac{(q+\delta)}{N}} \begin{bmatrix} e^0 \\ e^{j2\pi\frac{(q+\delta)}{N}} \\ e^{j2\pi(2)\frac{(q+\delta)}{N}} \\ e^{j2\pi(3)\frac{(q+\delta)}{N}} \\ \vdots \\ e^{j2\pi((N-1))\frac{(q+\delta)}{N}} \end{bmatrix} = e^{j2\pi\Delta\frac{(q+\delta)}{N}} \vec{s}_{1,0}$$

To form the XCSPE between channel 1 and channel 2, one may take the transforms of any pair of data windows and take the Hadamard product between the conjugate of the first transform (from channel 1) and the second transform (from channel 2). If one illustrates this for $F_1(\vec{s}_{1,0})$ and $F_2(\vec{s}_{2,0})$, where one uses the first data window from the two different channels, the result is $$F_1^*(\vec{s}_{1,0}) \odot F_2(\vec{s}_{2,0}) = F_1^*(\vec{s}_{1,0}) \odot \left( e^{j2\pi\Delta\frac{(q+\delta)}{N}} F_2(\vec{s}_{1,0}) \right) \quad (1)$$
$$= e^{j2\pi\Delta\frac{(q+\delta)}{N}} \|F_1(\vec{s}_{1,0})\|^2$$

The XCSPE can be used in conjunction with the standard CSPE to find the delay between the channels, since the standard CSPE returns the value of $(q+\delta)$. Thus, to find the delay factor D all that must be done is to take the angle of the product above, divide out the CSPE frequency $(q+\delta)$, and adjust by the scaling factor $N/2\pi$, giving the XCSPE delay between the channels:

$$\Delta = \frac{N\angle\left(F_1^*(\vec{s}_{1,0}) \odot F_2(\vec{s}_{2,0})\right)}{2\pi f_{CSPE}} = \frac{N\left(\frac{2\pi\Delta(q+\delta)}{N}\right)}{2\pi(q+\delta)} \quad (1)$$

It should be noted that the CSPE frequency of $(q+\delta)$ is, in general, a fractional number corresponding to the high-resolution frequency, and if the CSPE were not employed, then when the frequency value is taken from the original transform resolution, the value would generally only be known on a nearest-integer basis. The extension of the CSPE to the XCSPE thus allows for the determination of the delay, $\Delta$, between the arrival of the signal at sensor/microphone 1 and sensor/microphone 2.

The XCSPE analysis takes as input separate transforms of independent channels and by analyzing first the super-resolved frequencies, and then using the Hadamard product between the spectra of the different channels (where again the complex conjugate of one of the channels is taken), it is possible to ascertain the phase advance between the state of the oscillator peaks on one channel and the oscillator peaks on the other channel; however, if there is a phase advance of greater than $2\pi$ between the two channels, then the measured result is modulo $2\pi$. In order to isolate signals that are from a single source, it is necessary to analyze the possibility of extra $2\pi$ rotations being present.

Since the phase advance over a fractional number of samples is dependent on the frequency of the underlying signal component, it is apparent that a measurement of the phase advance between the right and left channels of a signal, no matter how accurately that phase advance is estimated, can be obscured by phase wraparound effects; the measured result is modulo $2\pi$. Measurements are generally constrained to lie in a principal value region of $[0, 2\pi]$ or $[-\pi, \pi]$ but if the signal frequency is high enough, the phase may advance by extra full $2\pi$ rotations between measurements, and to maintain consistency, the measurements are restricted to the principal value region. This effect can be precomputed, in most cases, and so it is generally possible to account for the effect.

For a signal in a (fractional) frequency bin $f_i$, the phase advance per sample is $f_i \cdot 2\pi/N$ for an N-point sample window. Now, the XCSPE only measures the angular rotation in a principal value region, and then rescales by $N/2\pi$ to find $f_i$, so if $$P \cdot \frac{2\pi}{N} f_i > 2\pi,$$

then the XCSPE can only give us $$\left[ P \cdot \frac{2\pi}{N} f_i \right]_{mod 2\pi}$$

and so there may be an integer number of full $2\pi$ rotations that have been dropped. However, for a given range of frequencies and a given separation of microphones or sensors (accounting for any angular effects caused by the angle of approach of the signal to the sensors), it is possible to pre-compute the integer multiple of $2\pi$ corrections that must be applied. Thus, we are trying to find the value of K which solves the following equation:

$$\left[ P \cdot \frac{2\pi}{N} f_i \right]_{mod 2\pi} + 2\pi K = P \cdot \frac{2\pi}{N} f_i$$

Or the alternate form where the $2\pi$ has been removed $$\left[ P \cdot \frac{f_i}{N} \right]_{mod 1} + K = P \cdot \frac{f_i}{N}$$

And then, once the correct value of K has been ascertained, the P value for number of (fractional) samples between the arrival of the signal at sensor 0 and sensor 1 can be found by rescaling by $2\pi/N \cdot f_i$. One detail that should be mentioned is that if the principal value region is from $[-\pi,\pi]$ then the mod map should be modified slightly to a map that is centered at zero. With a traditional mod map defined on the principal value region of $[0, 2\pi]$, a value of $(7/2)\pi$ would be mapped to $(3/2)\pi$, but if the principal value region of $[-\pi,\pi]$ is used, $(7/2)\pi$ should be mapped to $(-1/2)\pi$. This remapping of the principal value region is important in determining when the phase difference as measured by the XCSPE needs to be increased by $K*2\pi$, and the value of K is determined by the range of the frequency value. The principal value region that is used by a particular computation or software package is well defined, so one skilled in the art can make adjustments as necessary.

Consider a test case where there is a 10 sample shift between the signal on channel 0 and the signal received on channel 1. If we assume that the FFT window is of length 2048 samples (or 1024 samples zero-padded to 2048 samples), and a sample rate of 44100 samples/sec, then each frequency bin would correspond to approximately 21.53 Hz/bin. For this example, consider a signal in the center of bin 250. Since bin 250 has 250 periods per window of 2048 points, there will be 8.192 samples/period, so a 10 sample shift corresponds to 1.220703125 periods (i.e. 10 samples/ 8.192 samples/period). Since the phase advance is greater than a full period, the corresponding radian measure would be 1.220703125*27, but the principal value result would give 0.220703125 periods*$2\pi$(radians/period) =1.386718632 radians (rounded to 9 decimal places) and if the extra $2\pi$ radians is added back in the result is 7.66990393943 radians and if one divides now by the $(2\pi/N)f_i$ term, the result is 10 samples, as expected.

The result described above is particularly pertinent for a system with multiple sensors/receivers/microphones, etc., since whenever a signal is in bin $f_{bin}$ within a window of N samples, then if the delay between sensors/receivers/microphones is greater than $N/f_{bin}$, there are extra $2\pi$ phase rotations that must be added back in. In the case where the principal value region is $[-\pi,\pi]$, the need to add in extra $2\pi$ rotations occurs for frequency bin numbers $f_{bin} > N/(2f_{bin})$ and for every odd multiple of $N/(2f_{bin})$ thereafter.

There is now described more fully the derived parameter designated Sigma. Sigma estimation is a method that uses measured power ratios to estimate the angle of arrival (AOA) of a signal. If a signal is measured using multiple sensors, the ratio of measured amplitude is an indicator of AOA.

Those skilled in the art will recognize that power has previously been used to measure AOA. While that is true, the measurements are imprecise, especially in the presence of interference. Further, improvements in sigma estimation result from using the high-resolution measurements associated with the Oscillator Peaks.

Note that for the following figures and plots, sigma is measured from 0 to $\pi/2$, where 0 indicates that the signal measurement occurs only in sensor 0, $\pi/2$ indicates the signal measurement occurs only in sensor 1, and $\pi/4$ indicates that the signal measurement occurs equally in both sensors. Let an input comprise an Oscillator Peak with frequency and magnitude measurements from multiple channels. If one defines the magnitude of the Oscillator Peak in channel 0 as mag0, and the magnitude of the Oscillator Peak in channel 1 as mag1, then the value of sigma can be found from the relationship tan $\sigma$=mag1/mag0. An output comprising estimated AOA may be derived using in pseudo-code using the standard function given as atan 2 (magnitude in channel1, magnitude in channel0) where:

atan 2=arc tangent (or inverse tangent function) and is formulated to return the correct sign for angles in given quadrants; and magnitude in channel 0, 1=Magnitude of the oscillator that produced the spectrum measured by this oscillator peak in channel 0, 1 respectively.

There is now discussed Path Propagation Effects and their Impact on Sigma. Consider device, environmental and reverb effects on the sigma parameter, and their relation to the effects seen in the analysis of the phase evolution of a signal. From the Unified Domain representation (described in SSS), it is known that if one lets $r_L$ be the amplitude on the left channel and $r_R$ be the amplitude on the right channel, m is the hypotenuse of the right triangle with legs $r_L$ and $r_R$, and $\sigma$ be the angular variable, then one has $$\cos \sigma_k = \frac{r_{Lk}}{m_k}$$

$$\sin\sigma_k = \frac{r_{Rk}}{m_k}$$

If one allows that there may be a problem with the assumption of direct path arrival from the source of the signal to the receiver (such as with an echo or reverb effect), then there can be constructive or destructive interference present in the measured signal, and this can depend on the frequency of the signal (and the relative phases of the signals). For example, if there is an echo or reverberation effect, then the power on one channel (or both) can be artificially increased or decreased. So, the goal in this section is to show how it is possible to find the power scaling factor that returns the signals to their proper relationship, so that the re-calculated sigma value will then be correct.

In order to distinguish correct values from values that are influenced by the room reverb effects, one will add a subscript "true" to the values, so one sees that for the undisturbed, direct path-only case, one has $$\theta_{true} = \tan^{-1}\left(\frac{r_{R_{true}}}{r_{L_{true}}}\right)$$

And we need to compare this with the case where we have reverb or echo, where we let the measured values (that include the echo or reverb effects) be labeled as $$\sigma = \tan^{-1}\left(\frac{r_R}{r_L}\right)$$

One can view the problem of deviation in sigma as being a relative effect caused by the reverb/echo and so one may choose the median or mean value of sigma as the (approximate) true value, so $\sigma_{true}$ is generally assumed to be a constant and one thinks of $\sigma - \sigma_{true}$ as the deviation from the expected value. Further, in an illustrative but non-limiting case, it is simpler to assume that $r_L = r_{Ltrue}$, and so we have that one may consider a correction factor applied just to $r_R$ and one gets $r_{Rtrue} = \alpha(f) r_R$ with $\alpha$ a function of frequency $f$.

$$\tan\sigma_{true} = \frac{r_{R_{true}}}{r_{L_{true}}} = \frac{\alpha(f) r_R}{r_L} = \alpha(f)\tan\sigma$$

Let the assumed constant value for tan of sigma (tan ($\sigma_{true}$)) be called $\kappa$ and we find that $\kappa = \alpha(f)\tan\sigma(f) \Rightarrow \alpha(f) = \kappa/\tan\sigma(f)$ Thus, at a given frequency, we can find $\alpha(f)$ and we can show that by correcting the amplitude $r_R \to \alpha(f) r_R$ we can see that the measured sigma value will now become $$\frac{\alpha(f) r_R}{r_L} = \alpha(f)\tan\sigma = \tan\sigma_{true}$$

So the result is guaranteed to be $\sigma_{true} = \tan^{-1}(\alpha(f)\tan\sigma)$ Next, one takes the calculated and smoothed estimate of the sigma deviation curve from the oscillator peaks sigma values and works backward to the corrected amplitude. This should follow directly from the fact that in the calculation, one derives an approximate average sigma deviation curve (i.e., deviation from the mean value of sigma) that can be processed and filtered to extract the sigma deviation curve as a function of frequency. If one lets the resulting deviation in sigma at a given frequency be denoted by $\Delta\sigma$, then if one lets the tangent of the expected sigma value to again be $\kappa$, then the actual measured sigma value can be written as $\kappa + \Delta\sigma$, and the result is that the desired amplitude correction is given by $$\alpha(f) = \frac{\tan\sigma_{true}}{\tan(\sigma_{true} + \Delta\sigma)} = \frac{\kappa}{\tan(\sigma_{true} + \Delta\sigma)}$$

Thus, the amount of amplitude correction would depend on the sigma values and where they fall within a principal value region, since for some values the ratio could be near 1, while for other values, the ratio could be far from 1. This accounts for the variation in the sigma deviations.

In accordance with further embodiments, one may show explicitly that the sum of two sinusoids is a phase shifted sinusoid of the same frequency. Consider $2\alpha_0 \cos(2\pi f_0 t + \varphi_0) + 2\alpha_1 \cos(2\pi f_0 t + \varphi_1)$ If one converts the cosines into complex exponentials, one gets $\alpha_0 e^{i(2\pi f_0 t + \varphi_0)} + \alpha_0 e^{-i(2\pi f_0 t + \varphi_0)} + \alpha_1 e^{i(2\pi f_0 t + \varphi_1)} + \alpha_1 e^{-i(2\pi f_0 t + \varphi_1)}$ If one rearranges the order of the sum, one can see that one has the sum of two complex conjugate pieces $\{\alpha_0 e^{i(2\pi f_0 t + \varphi_0)} + \alpha_1 e^{i(2\pi f_0 t + \varphi_1)}\} + \{\alpha_0 e^{-i(2\pi f_0 t + \varphi_0)} + \alpha_1 e^{-i(2\pi f_0 t + \varphi_1)}\}$ (*)

Considering just the first term in (*) and factoring out the $f_0$ oscillatory part and the first phase, one obtains $e^{i2\pi f_0 t} e^{i\varphi_0}\{\alpha_0 + \alpha_1 e^{i(\varphi_1 - \varphi_0)}\}$ And if one defines $\tau = \varphi_1 - \varphi_0$, one can split up the phase terms to "symmetrize" the sum to get $e^{i2\pi f_0 t} e^{i\varphi_0}\{\alpha_0 e^{i\tau/2} e^{-i\tau/2} + \alpha_1 e^{i\tau/2} e^{i\tau/2}\} = e^{i2\pi f_0 t} e^{i\varphi_0} e^{i\tau/2}\{\alpha_0 e^{-i\tau/2} + \alpha_1 e^{i\tau/2}\}$ Here it is noted that the symmetrized sum is of two complex exponentials that are complex conjugates, but the magnitude terms $\alpha_0$ and $\alpha_1$ are unequal. Since they are unequal, the result will lie along an ellipse with major axis $\alpha_0 + \alpha_1$ and minor axis $\alpha_0 - \alpha_1$.

So far there has been neglected the second term in the complex conjugate pair, $\{\alpha_0 e^{-i(2\pi f_0 t + \varphi_0)} + \alpha_1 e^{-i(2\pi f_0 t + \varphi_1)}\}$ and if one performs the same steps on this term, one again gets the complex conjugate $e^{-i2\pi f_0 t} e^{-i\varphi_0}\{\alpha_0 e^{-i\tau/2} e^{i\tau/2} + \alpha_1 e^{-i\tau/2} e^{-i\tau/2}\} = e^{-i2\pi f_0 t} e^{-i\varphi_0} e^{-i\tau/2}\{\alpha_0 e^{i\tau/2} + \alpha_1 e^{-i\tau/2}\}$ And one can further simplify to get $e^{-i2\pi f_0 t} e^{-\varphi_0} e^{-i\tau/2}\{\alpha_0(\cos(\tau/2) + i\sin(\tau/2)) + \alpha_1(\cos(\tau/2) - i\sin(\tau/2))\} = e^{-i2\pi f_0 t} e^{-i\varphi_0} e^{-i\tau/2}\{(\alpha_0 + \alpha_1)\cos(\tau/2) + i(\alpha_0 - \alpha_1)\sin(\tau/2)\}$ One gets an equivalent term from the first term in (*), except that it is the complex conjugate, and when these are combined the result is $(\alpha_0 + \alpha_1)\cos(\tau/2)\{e^{i2\pi f_0 t} e^{i\varphi_0} e^{i\tau/2} + e^{-i2\pi f_0 t} e^{-i\varphi_0} e^{-i\tau/2}\} + i(\alpha_0 - \alpha_1)\sin(\tau/2)\{e^{-i2\pi f_0 t} e^{-i\varphi_0} e^{-i\tau/2} - e^{i2\pi f_0 t} e^{i\varphi_0} e^{i\tau/2}\}$ but since the terms in brackets are complex conjugates of each other, there is a further simplification that is useful $(\alpha_0+\alpha_1)\cos(\tau/2)\{2\cos(2\pi f_0 t+\varphi_0+\tau/2)\}+i(\alpha_0-\alpha_1)\sin(\tau/2)\{-2i\sin(2\pi f_0 t+\varphi_0+\tau/2)\}=2(\alpha_0+\alpha_1)\cos(\tau/2)\{\cos(2\pi f_0 t+\varphi_0+\tau/2)\}+2(\alpha_0-\alpha_1)\sin(\tau/2)\{\sin(2\pi f_0 t+\varphi_0+\tau/2)\}$ This result is of the form A cos θ+B sin θ and so we can use the standard "triangle trick" to convert the sum to single sinusoid with an adjusted phase.

Consider a right triangle where A and B are the non-hypotenuse sides of a right triangle and the angle opposite side B is θ, $A=\sqrt{A^2+B^2}\cos\theta$ and $B=\sqrt{A^2+B^2}\sin\theta$ with $A=2(\alpha_0+\alpha_1)\cos\tau/2$ and $B=2(\alpha_0-\alpha_1)\sin\tau/2$. If one chooses A and B and θ in this manner, the result is $$\sqrt{A^2+B^2}\left\{\cos\theta\cos\left(2\pi f_0 t+\varphi_0+\frac{\tau}{2}\right)+\sin\theta\sin\left(2\pi f_0 t+\varphi_0+\frac{\tau}{2}\right)\right\}$$

One can then use the standard trig identity to simplify this further into $$\sqrt{A^2+B^2}\cos\left(2\pi f_0 t+\varphi_0+\frac{\tau}{2}-\theta\right)$$

with $\theta=\tan^{-1}(B/A)$. Note further that $\tau=\varphi_1-\varphi_0$ and final form is then $$\sqrt{A^2+B^2}\cos\left(2\pi f_0 t+\frac{\varphi_0+\varphi_1}{2}-\theta\right)$$

With the following simplifications $$A^2+B^2=4(\alpha_0^2+\alpha_1^2)+8\alpha_0\alpha_1\cos(\varphi_1-\varphi_0) \text{ and}$$

$$\theta=\tan^{-1}\left(\frac{\alpha_0-\alpha_1}{\alpha_0+\alpha_1}\tan\left(\frac{\varphi_1-\varphi_0}{2}\right)\right)$$

It is noted that the representation above, for the sum of two sinusoids of the same frequency but different amplitudes and phases, provides a good model for the sum of a direct path signal with a reflected path signal; hence it is a good representation for understanding the effect of reverb/echo on the XCSPE calculation. Further, one may consider how a given path length difference between the direct path and a reflected path (in fact, between any two paths of different lengths between a source and a receiver) impacts the measured phase difference, and this effect can be understood to vary as a function of frequency.

For example, if the path length difference between two signals is L (cm), then the time difference of arrival between the signals (and hence, all corresponding parts of the signals) is L(cm)/v(cm/sec)=χ(sec) where under typical conditions for audio signals, the speed of sound is approximately v=34300 cm/sec. Then, if one collects data at a sample rate of R(samples/sec), then the number of samples in the time difference of arrival is χ(sec)*R(samples/sec)=P(samples) and it can be that P is a fractional number of samples. For example, if there is a 10 cm difference in length between two paths and the sample rate is 44100 samples per second (as in the CD sample rate), then if L=10 cm and χ={10 (cm)/34300 (cm/sec)} and P={10 (cm)/34300 (cm/sec)}*44100 (samples/sec)≈12.857 samples. It should be noted that in this illustrative example the speed of sound is assumed constant, but one skilled in the art can adapt the equations if the speed signal propagation is non-constant or is affected by environmental conditions or varies, e.g., as a function of frequency of the signal.

Once the number of samples of delay is known, it is possible to figure out the phase advance for a signal of a given frequency or period. In the standard FFT, one often refers to the bins as frequency bins, but it is equally accurate to consider them as period-bins; however, the description herein adheres to the common practice and calls them frequency bins with the understanding that a signal centered in the $Q^{th}$ frequency bin corresponds to a signal that contains exactly Q periods in whatever sample window is used. Further, there is no reason that Q cannot be considered to be a fractional value, and the standard CSPE algorithm clearly shows how a signal may be analyzed to find a fractional number of periods Q (in which case the measurement process implicit in the FFT or DFT or other transform will distribute or smear out the power of the signal over several frequency bins, with the peak in the frequency bin closest to the value round(Q)). In any case, for a signal of Q periods over an N-point sample window (where Q can be fractional), the phase advance is 2*π*Q radians over the sample window. This means that for every sample there is a phase advance of (2πQ)/N (radians/sample). Thus, the total phase advance for a P sample delay is given by P*(2πQ)/N. Since this phase advance depends on the (fractional) frequency bin Q, it is clear that the phase advance varies as a function of frequency.

The implication of this analysis for the XCSPE is that the values in the XCSPE are directly related to the phase differences between the channels as measured using the super-resolution techniques of the standard CSPE. However, when there is a reverberation/echo effect, then there is introduced an anomalous phase change. This anomalous phase change has been shown above to be $\varphi_1-\varphi_0$, but this can now be related directly to the number of samples in the delay between the received signals, $$\varphi_1-\varphi_0=P\cdot\frac{2\pi}{N}Q$$

where P is calculated from the reflected path difference.

When one knows information about the measurement setup, including such information as receiver separations and positions (e.g., microphone positioning for an audio signal), it is possible to ascertain the expected delay between the channels and it becomes possible to compare the expected phase advance to the measured phase advance between channels to expose the effects of the reverberation. Further, it is possible to estimate the expected phase advance between channels, since the anomalous phase change caused by the reverberation/echo is a secondary effect that has a different pattern than the pattern revealed by the expected XCSPE pattern.

The estimation of the anomalous phase change caused by reverb/echo is most simply presented if one allows the echo to affect only the right channel of an audio signal. With no reverb/echo present, the XCSPE gives a result that is proportional to the difference in phase between the channels, $\varphi_R-\varphi_L$, where $\varphi_R$ is the signal phase on the right channel for a given frequency, and $\varphi_L$ is the signal phase on the left channel. As seen above, if there is echo/reverb on the right channel, the measured phase would be changed to $$\left\{\frac{\varphi_0+\varphi_1}{2}-\theta\right\}$$

and the XCSPE result would instead be proportional to $$\left\{\frac{\varphi_0+\varphi_1}{2}-\theta\right\}-\varphi_L.$$

The XCSPE techniques are sufficiently accurate that for many cases it is possible to isolate this anomalous phase change and thus to work backward to determine the characteristics of the interfering reverb/echo signals. If one refers to FIG. 33 and compares it to the PXC trace pattern in FIG. 20, one can see that there is a variation around the typical PXC trace pattern for a fixed phase delay (as exhibited in FIG. 20 for a delay of −6 samples). This variation corresponds to the effect induced by reverberation or echo.

Measurements of TDOA have been considered in the literature for some time. Below is presented one such algorithm and then improvements to that algorithm using super-resolution available in Oscillator Peak formulations are presented. The Phase Transform (aka PHAT) algorithm is a method for determining TDOA estimates for signals including but not limited to audio. This method yields estimated TDOA for spectra received on multiple sensors. It involves a cross spectrum analysis followed by a phase extraction and a transform to a time difference of arrival domain via a transform such as an inverse fast Fourier transform.

Figure 23:
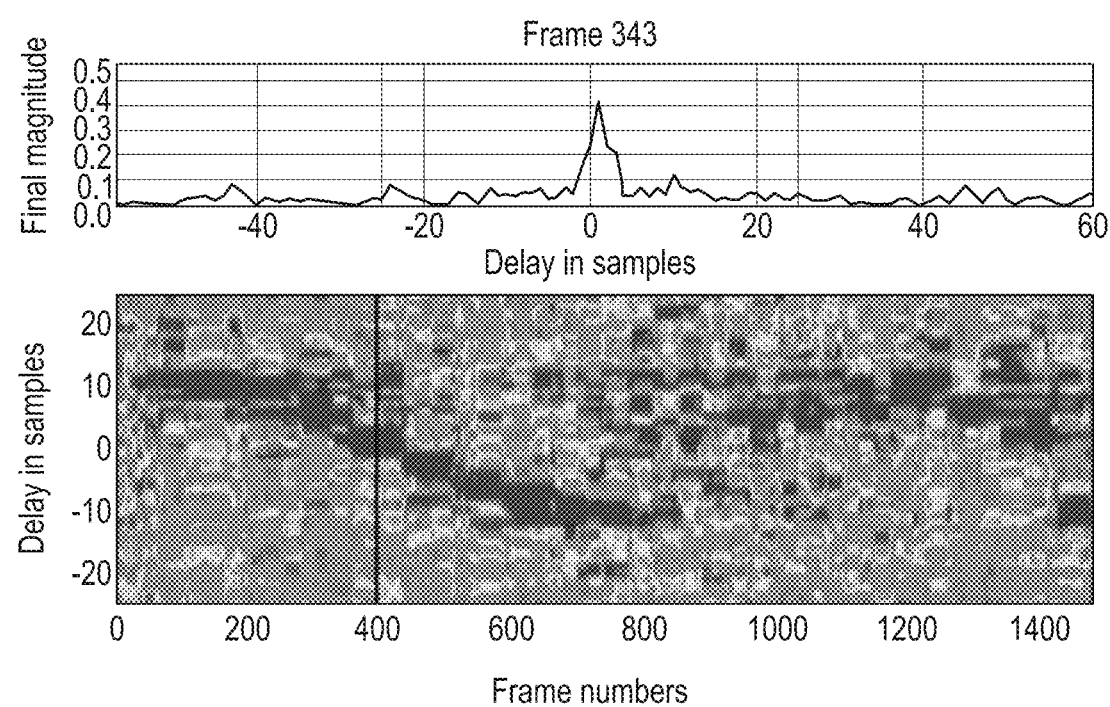
FIG. 23 is an illustration of PHAT Analysis of a moving sound source as known in the art.

In some exemplary and non-limiting embodiments, the PHAT algorithm may be used as a TDOA estimator. An example of the PHAT calculation for an audio file is shown with reference to FIG. 23. In this example, a speaker moves in a circle, moving from a TDOA on one side of an array of microphones to a TDOA on the other side. The PHAT calculation for a single frame of audio is shown in the top portion of the plot, showing a peak at a TDOA of approximately two samples. The heat map in FIG. 23 below shows the PHAT calculation for a series of frames of audio as known in the art.

In accordance with exemplary and non-limiting embodiments there is described a high-resolution approach to the PHAT algorithm using the Oscillator peak representation described above to pick portions of the spectrum that are more likely to be produced by a source of interest to calculate a TDOA estimate. Thus, the methods described above can be used to pre-screen the oscillator peaks to select a subset that are primarily associated with a single source. This method, called XPHAT, is preferred over the standard PHAT algorithm in many cases because it yields sub-sample TDOA resolution through the use of the high resolution frequency analysis and XCSPE information contained in an oscillator peak. Furthermore, this method is preferred in many cases because the phase contribution of a non-source related signal can be removed prior to TDOA estimation, yielding a result that is more stable in low SNR conditions.

Such a method receives as an input a set of Oscillator Peaks and outputs one or more TDOA estimates. First, there is selected a set of Oscillator Peaks. Next, a signal is synthesized in the time difference of arrival domain for each Oscillator Peak using measured XCSPE and frequency. The time difference of arrival domain signals for all selected Oscillator Peaks are then summed and the maximum magnitude(s) are determined to identify one or more active TDOA(s).

Let k=peak index; $\omega_k$=peak frequency in radians/sample; t=time in samples; then $$\hat{\tau}_k = \frac{\arg(X_1 X_2^*)}{\omega_k},$$

corresponding to the XCSPE result at $\omega_k$, and $$\phi(t) = \sum_k e^{i\omega_k(t-\tau_k)},$$

corresponding to the time synthesis in the time difference of arrival domain and, finally, $$\hat{\tau} = \underset{t}{\operatorname{argmax}}|\phi(t)|^2$$

is the delay estimate, where a set of maxima may also be selected.

In accordance with exemplary and non-limiting embodiments, there is provided a method for aggregated XCSPE Tau Estimation (AXTE). The TDOA of some or all component parts can be determined by using the known patterns of the XCSPE calculation.

As Described above, the expected XCSPE values for a range of frequencies for a given TDOA can be calculated using the formula:

For each frequency:

Predicted XCSPE=TDOA−(FFT_length/frequency)
        *floor((frequency+FFT_length/(2*TDOA))/
        (FFT_length/TDOA)) or, simplifying,
        PredictedXCSPE=TDOA−(FFT_length/fre-
        quency)*floor(0.5+frequency*TDOA/FFT-
        _length)

Where:
Predicted XCSPE=expected XCSPE value given a TDOA and frequency pair, and the set of PredictedXCSPE values as a function of frequency gives the PXC trace;
FFT_length=Full FFT length used to convert audio from time domain to frequency domain; and
TDOA=Actual Time Difference of Arrival of signal as measured from sensor/microphone 1 to sensor/microphone 2 (or between more pairs of sensors/microphones if they are present) in units of fractional samples.

The "floor" function maps its argument to the next integer smaller than the absolute value of the argument.

Figure 24:
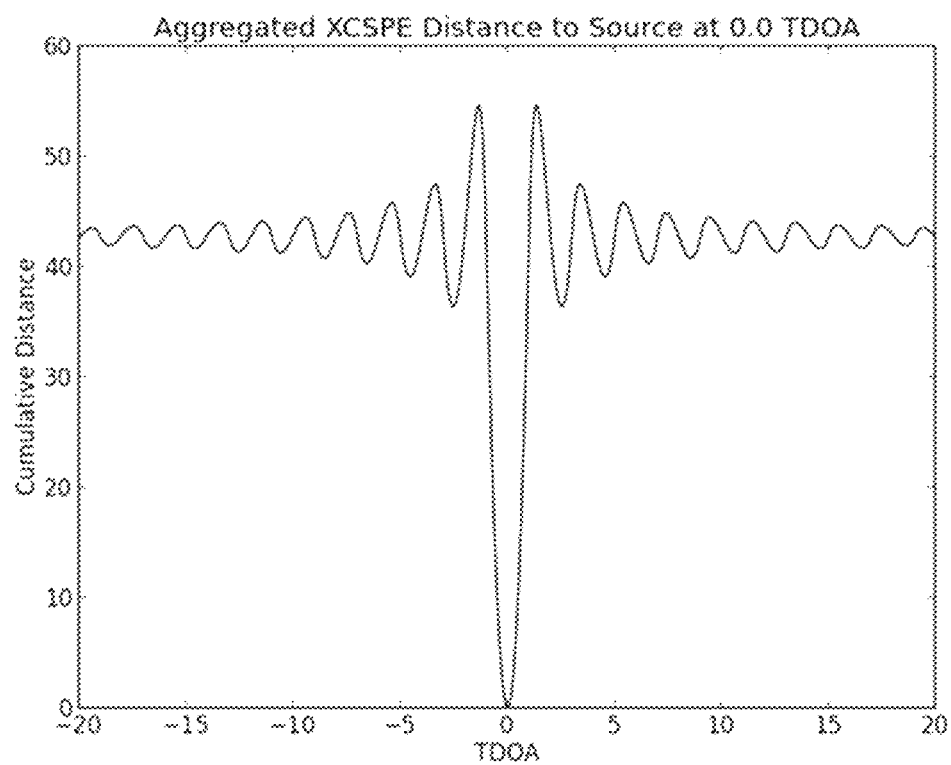
FIG. 24 is an illustration of a sample aggregated XCSPE distance to a source according to an exemplary and non-limiting embodiment.

Furthermore, the cumulative distance of a set of XCSPE values at a fixed TDOA can be calculated and is predictable. The plots below show the cumulative distance to all TDOAs for several sample TDOAs. The method for this calculation is as follows. First, given a sample TDOA such as a sample delay of 3.6 samples, calculate the predicted PXC trace as described above. Call this curve the reference set. Then, for a desired range of TDOA values, calculate a PXC trace for each of those values. Call these PXC traces the evaluation sets. Next, for each frequency bin, calculate the distance of the reference set PXC trace to all evaluation set PXC traces as described above. With reference to FIG. 24, there is illustrated an exemplary embodiment of sample results of the above calculations for a signal with a TDOA of 0.

Figure 25:
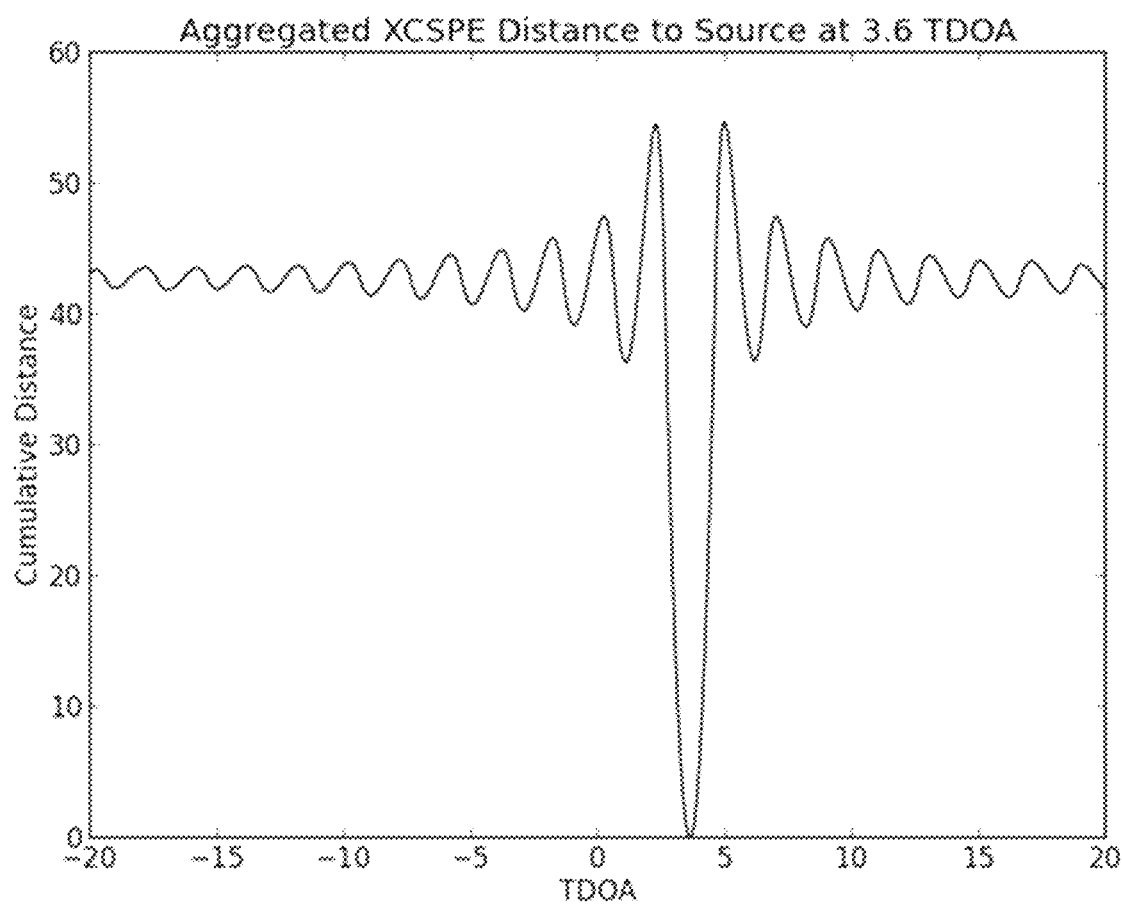
FIG. 25 is an illustration of a sample aggregated XCSPE distance to a source according to an exemplary and non-limiting embodiment.

With reference to FIG. 25, there are illustrated the results of the above calculations for a signal with a TDOA of 3.6. Note that the curve in FIG. 25 is a shifted version of curve in FIG. 24. This consistency in form enables an optimized calculation as described below with regard to a method for determining TDOA for a group of oscillator peaks using a set of oscillator peaks as input and outputting cumulative distance to range of TDOAs and a set of likely source TDOAs. The method is as follows. First, for a desired range of TDOA values, calculate a PXC for each TDOA. Then, for each oscillator peak in the set calculate the difference between the test XCSPE value and the calculated PXCs at that frequency, taking 2-pi wraps into account and add this distance squared to the cumulative error for this TDOA. A sample of this calculation is illustrated with reference to FIG. 26, where a set of oscillator peaks is compared to possible PXCs and the minimum at −11 indicates the correct delay for the position of the source.

Figure 26:
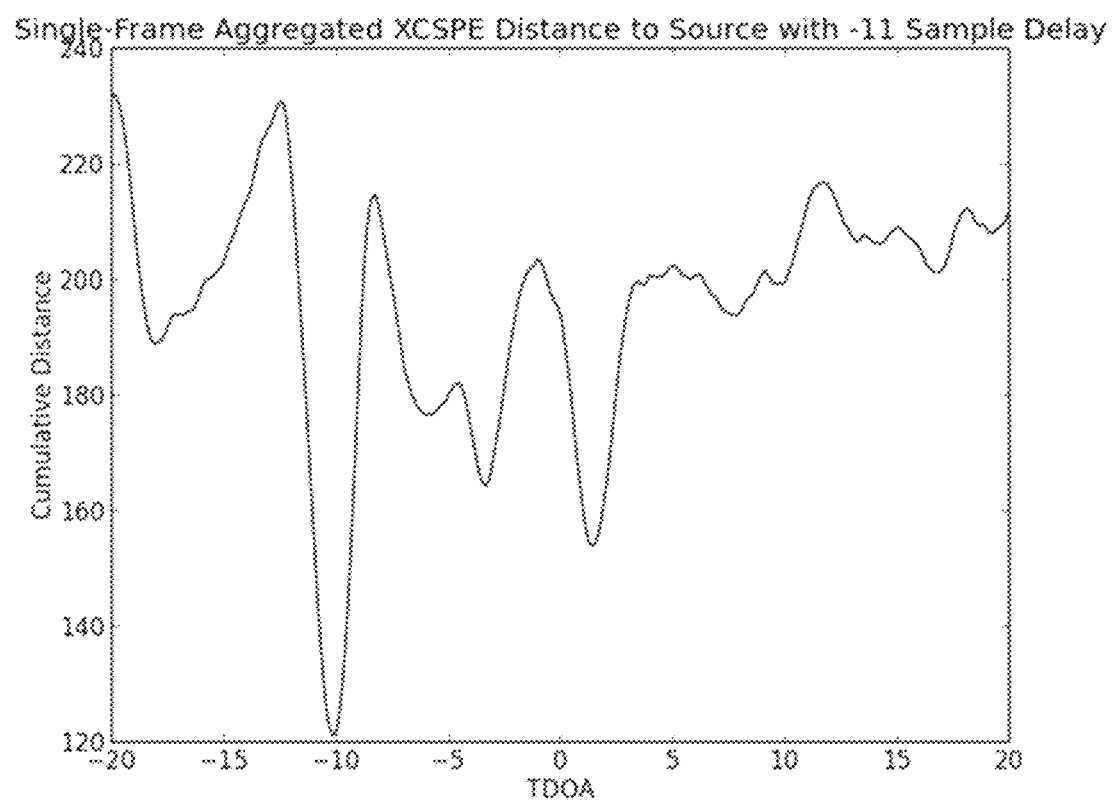
FIG. 26 is an illustration of a sample aggregated XCSPE distance to a source according to an exemplary and non-limiting embodiment.
Figure 27:
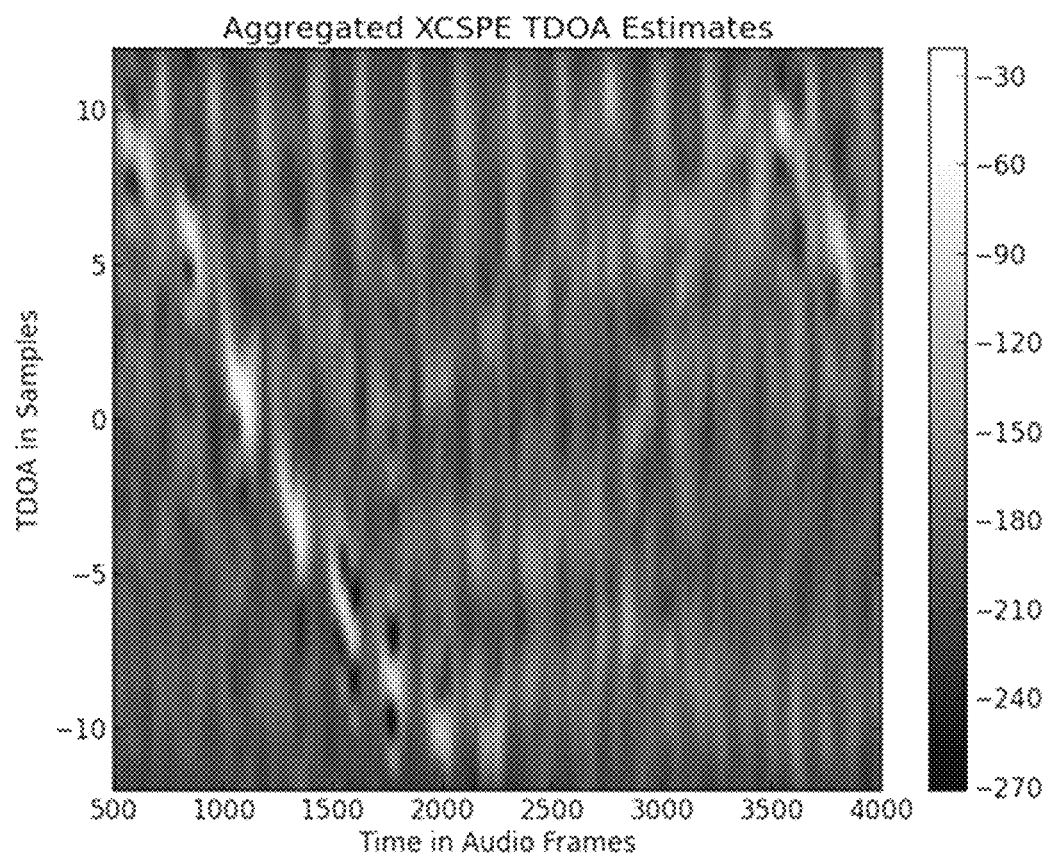
FIG. 27 is an illustration of aggregated XCSPE TDOA estimates for a moving source according to an exemplary and non-limiting embodiment.

The utility of this approach can be seen in the following example, where a speaker moves in a circle, moving from a TDOA on one side of an array of microphones to a TDOA on the other side. With reference to FIG. 27 there is illustrated an exemplary and non-limiting embodiment of an AXTE calculation performed on a recording containing a sound source moving in a circle approximately 10 feet from a pair of microphones and a second sound source which is stationary at approximately an 11 sample TDOA. Each column of the image corresponds to one AXTE calculation as shown in FIG. 26, however the height is now converted to a grey scale value along a vertical line in the image. (For ease of interpretation, the plot values have been inverted so that the minima shown in FIG. 26 are maxima). The areas of the plot which are whiter correspond to likely TDOA positions of sound sources.

In accordance with various exemplary and non-limiting embodiments involving the optimized calculation of AXTE, it may be desirable to use a more computationally efficient algorithm for calculating TDOA. In these cases, the AXTE may be calculated using a lookup table. For each possible frequency and XCSPE pair, the distance to desired PXCs may be calculated and stored in a lookup table.

There is further provided an exemplary method for detecting entities in aggregated XCSPE distances. A local minimum (in the context of a local max/min point from the calculus of continuous functions) in the aggregated XCSPE distance calculation may often be a sound source. In the case where several sound sources are present they may all be detected. In some embodiments, the contribution of a set of oscillator peaks that correspond to a given TDOA may be removed from the cumulative distance to unmask other harder to detect sound sources.

Figure 28:
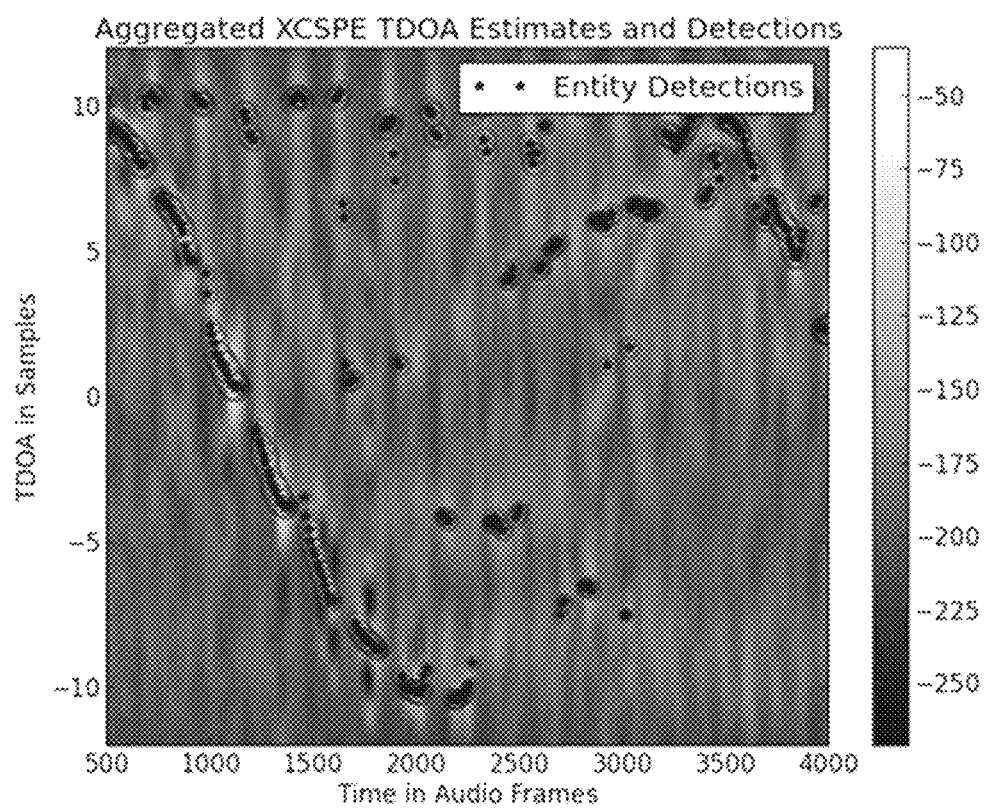
FIG. 28 is an illustration of the detection of entities in AXTE sound sources according to an exemplary and non-limiting embodiment.

With reference to FIG. 28, there is illustrated the same scenario as described above with reference to FIG. 27, but with entities detected. In this plot, the size of the detections is scaled by the percent of power in the frame that is close to that TDOA. Using the methods described here, it is apparent that there is a moving sound source, as described above, as well as a second source at a constant TDOA of approximately 10 samples.

Figure 29:
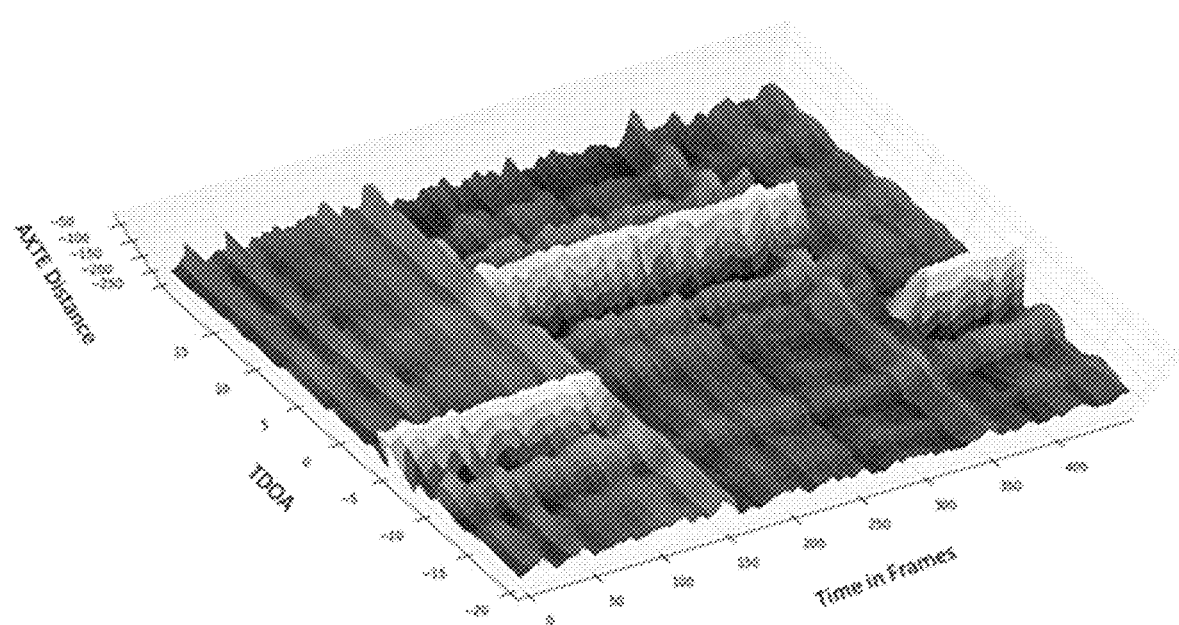
FIG. 29 is an illustration of an aggregated XCSPE measurement for two speakers inside an automobile according to an exemplary and non-limiting embodiment.
Figure 30:
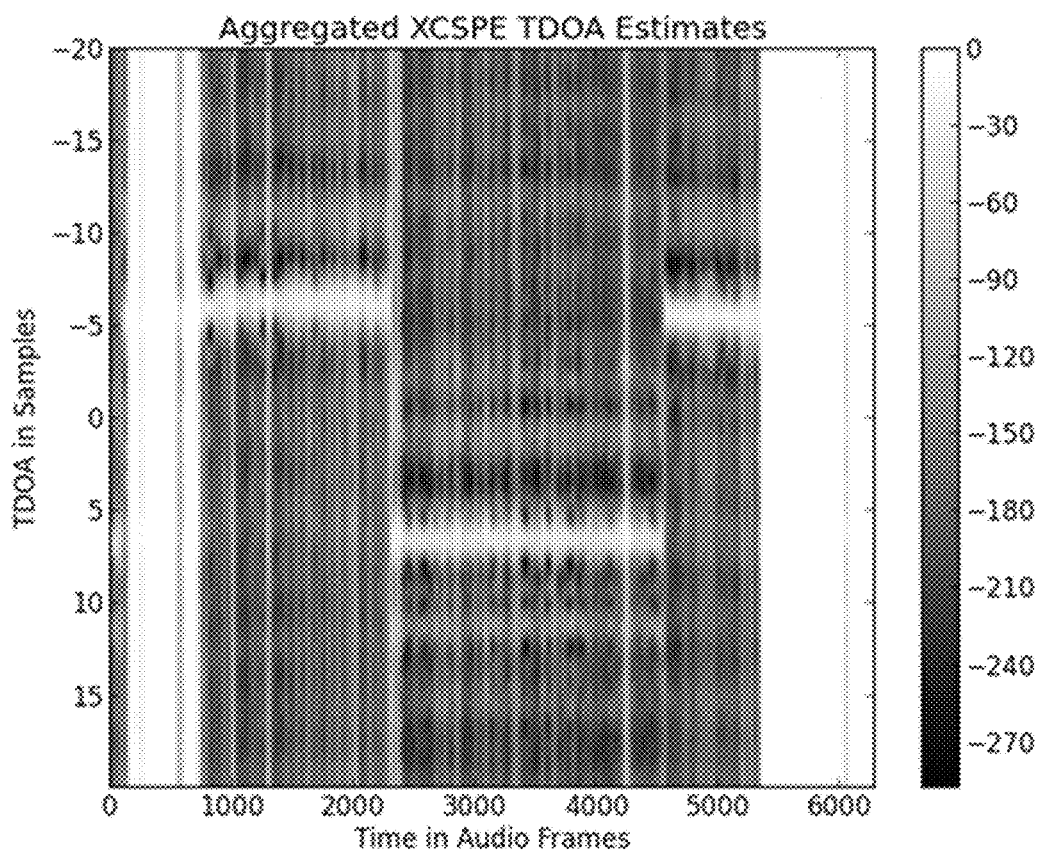
FIG. 30 is an illustration of an aggregated XCSPE measurement for two speakers inside an automobile according to an exemplary and non-limiting embodiment.

With reference to FIGS. 29 and 30, there are illustrated the AXTE methods applied to a recording of two speakers inside an automobile. Note that in this case the TDOA for the two speakers is relatively constant since the speakers are seated and not moving much, and since the microphones were in the center of the car, the sources in the driver's seat and passenger seat are symmetrically spaced relative to the microphones, resulting is opposite signs but similar absolute values for the TDOA estimate.

There is now provided exemplary and non-limiting embodiments of a method for the estimation of the parameters of a source signal emitter. These parameters may be used to estimate the likelihood that an oscillator peak is produced by that source. These parameters may also be used as part of the estimation of path propagation effects.

In accordance with various embodiments, such a method receives as its inputs oscillator peaks and outputs source parameters including, but not be limited to, the mean and variance of fundamental pitch, the mean and variance of power per frequency, the mean and variance of XCSPE per frequency and the mean and variance of Sigma per frequency.

Such a method of estimating the parameters of an entity begins when one chooses a set of oscillator peaks that is likely to be associated with the speaker or entity of interest. Next, the mean and variance statistics of those oscillator peaks for each parameter are calculated. Next, some of these statistics may be aggregated at the frame level, such as mean fundamental pitch. Further, some of these statistics may be aggregated at the frequency bin level, such as mean power or mean sigma.

Figure 31:
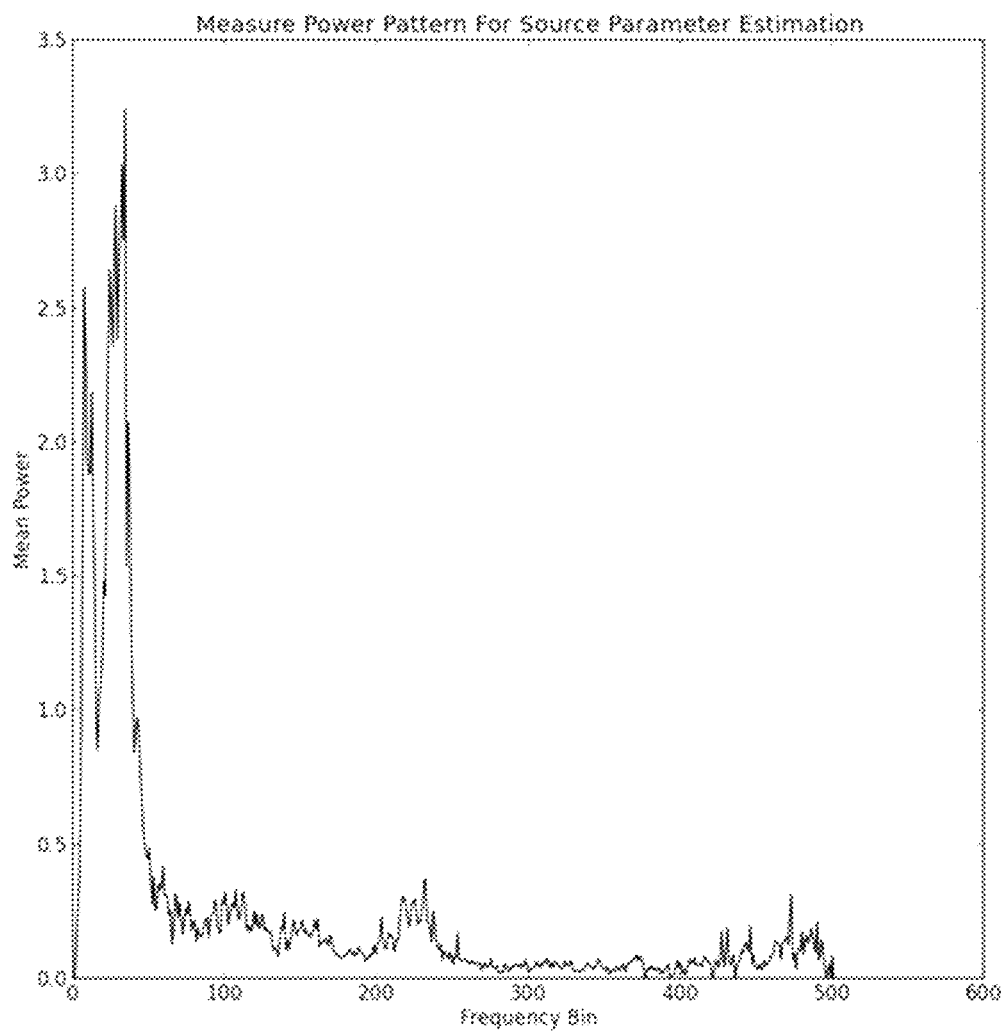
FIG. 31 is an illustration of a measured power pattern for source parameter estimation according to an exemplary and non-limiting embodiment.
Figure 32:
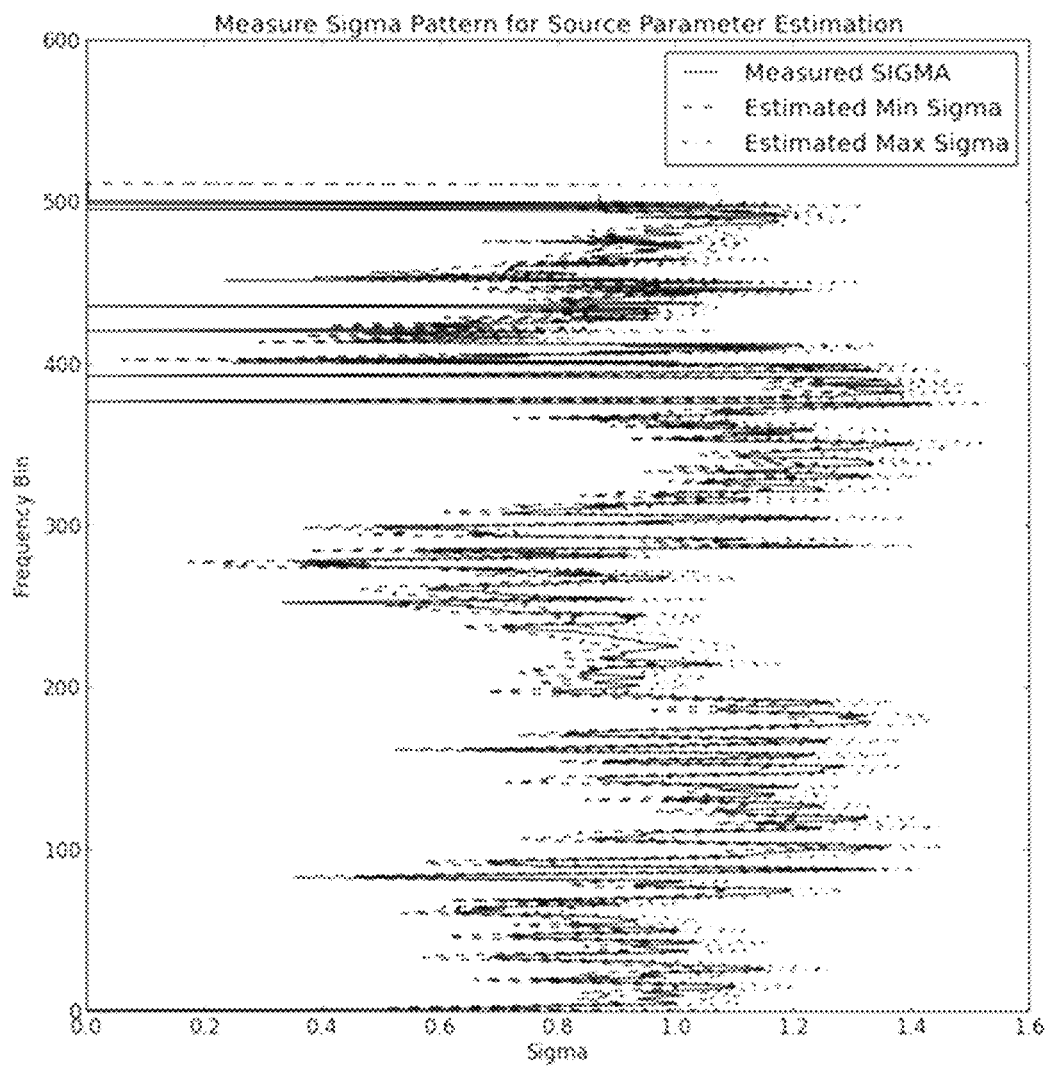
FIG. 32 is an illustration of a measured sigma pattern for source parameter estimation according to an exemplary and non-limiting embodiment.
Figure 33:
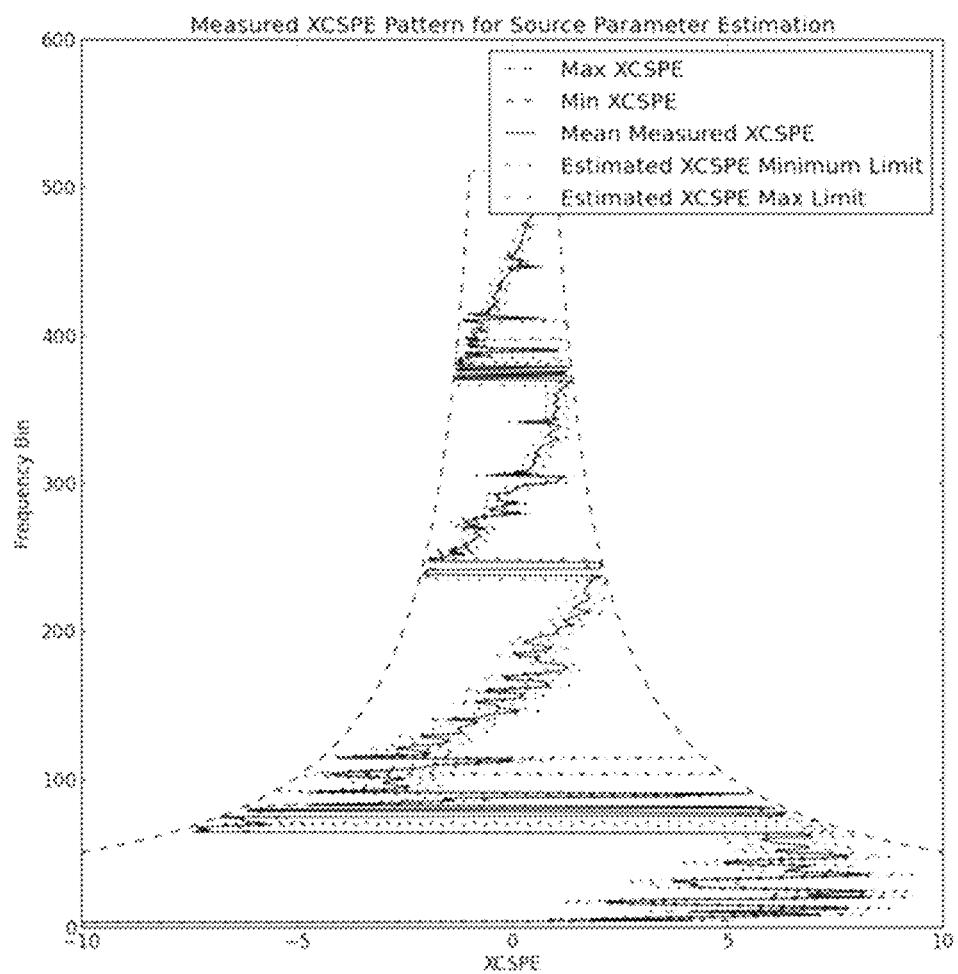
FIG. 33 is an illustration of a measured XCSPE pattern for source parameter estimation according to an exemplary and non-limiting embodiment.

Measured statistics for sigma, XCSPE and power are illustrated with reference to FIGS. 31-33.

Figure 34:
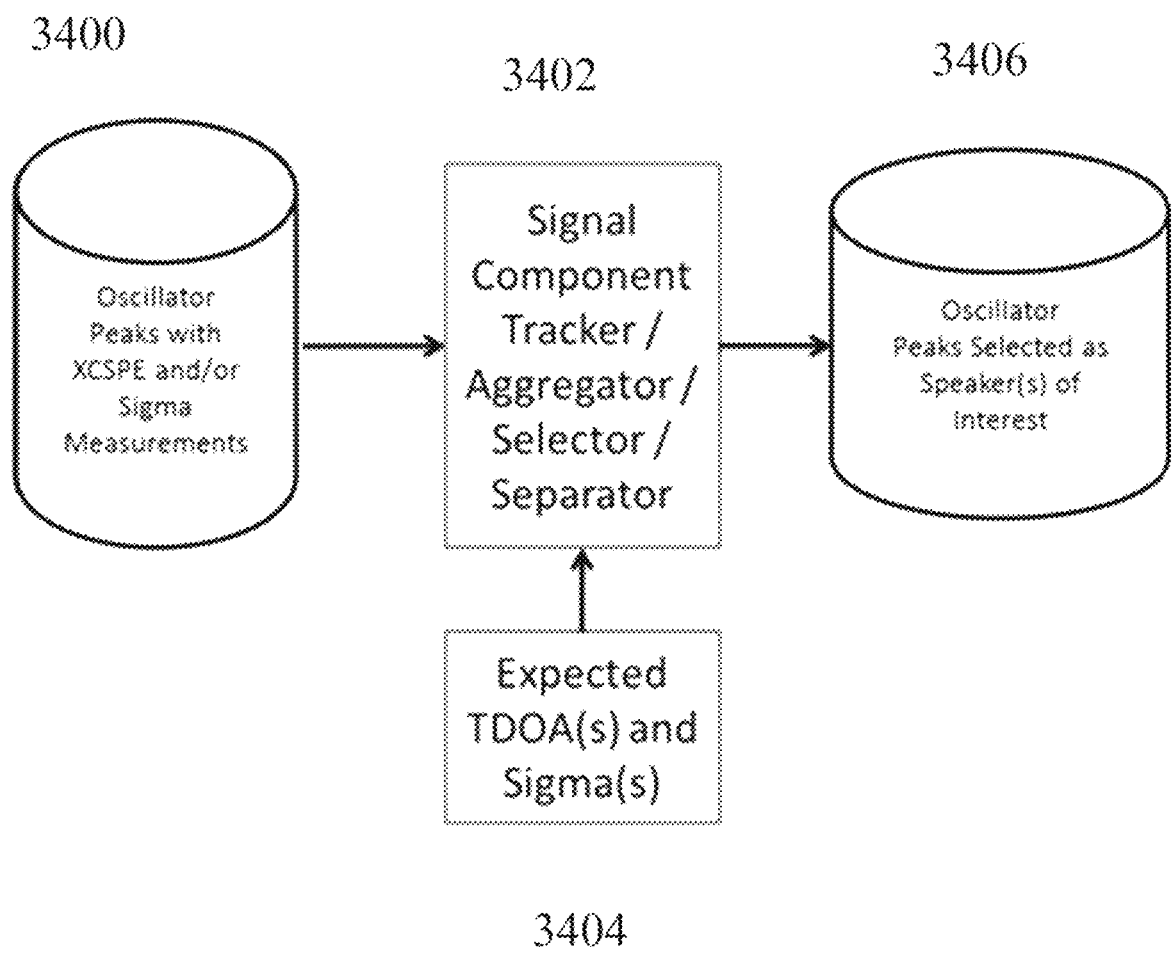
FIG. 34 is an illustration of the selection of oscillator peaks using XCSPE and Sigma measurements according to an exemplary and non-limiting embodiment.

There is now described the selection of Oscillator Peaks using XCSPE and/or Sigma measurements. As illustrated with reference to FIG. 34 below, Sigma and/or XCSPE measurements may be used to determine the likelihood that an oscillator peak was produced by a sound source of interest. This likelihood may be computed on individual oscillator peaks, groups of oscillator peaks that have been incorporated into a tracklet, as described above, or groups of oscillator peaks that have been determined to be part of a coherent group, as described in above. These likelihoods may be calculated using expected values, such as user specified parameters, external prompts such as camera face detection, using entity parameters as described below, or using a probabilistic framework such as Bayes. As illustrated, at step 3400, oscillator peaks with XCSPE and/or Sigma measurements form an input to step 3402. Likewise, at step 3404, expected TDOAs and Sigmas form an input to step 3402. At step 3402, there is performed signal component tracker/aggregator/selector separator with the results forming an input to step 3406 whereat oscillator peaks are selected as one or more speakers of interest.

Figure 35:
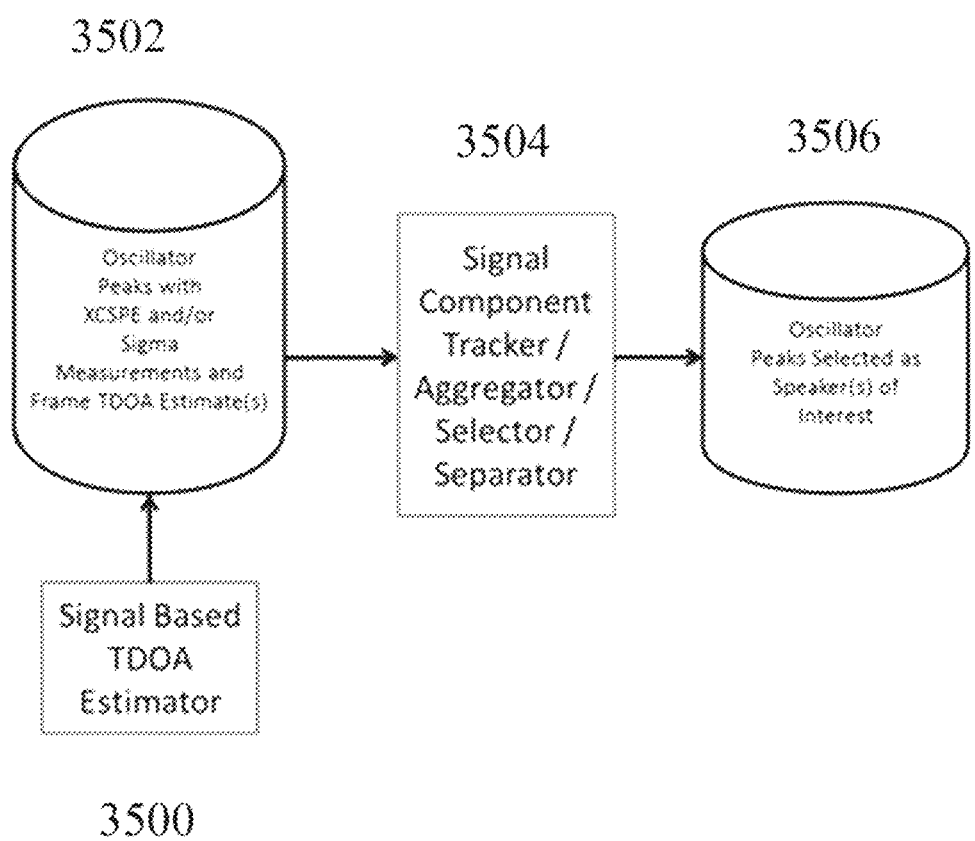
FIG. 35 is an illustration of the selection of oscillator peaks using TDOA measurements according to an exemplary and non-limiting embodiment.

With reference to FIG. 35 there is illustrated an exemplary method for the selection of Oscillator Peaks using TDOA estimation. As illustrated, frame-based TDOA measurements may be used to determine the likelihood that an oscillator peak was produced by a sound source of interest. This likelihood may be computed on individual oscillator peaks, groups of oscillator peaks that have been incorporated into a tracklet, as described above, or groups of oscillator peaks that have been determined to be part of a coherent group, as described above. These likelihoods may be calculated using expected values, such as user specified parameters, external prompts such as camera face detection, using entity parameters as described below, or using a probabilistic framework such as Bayes.

In a general form, the system uses the TDOA estimate to determine if there is a sound source coming from a desired TDOA. Oscillator peaks that occur in frames where some of the content is determined to be coming from a desired TDOA are more likely to be from a signal of interest.

These TDOA estimates may be generated using a well-known algorithm such as PHAT, or may be calculated using high-resolution information in the oscillator peaks themselves, using an algorithm such as XPHAT or Aggregated XCSPE TDOA Estimation (AXTE). In some applications, a combination of the methods may be employed, wherein an oscillator peak based calculation will be used to further refine estimates based on the original signal.

As illustrated, at step 3500, a signal based TDOA estimator provides input to step 3502 whereat oscillator peaks with XCSPE and/or Sigma measurements and frame TDOA estimates form an input to step 3504. At step 3504, there is performed signal component tracker/aggregator/selector separator with the results forming an input to step 3506 whereat oscillator peaks are selected as one or more speakers of interest.

The advantages of this approach are many. A subset of the oscillator peaks may be included in the peak-based TDOA estimation, allowing the system to remove 'noise' or strong contributions from other sources that may mask the signal of interest. Oscillator peak-based TDOA estimation is, in many cases, significantly more accurate, allowing for sub-sample resolution. Oscillator peak-based TDOA estimation may use a variable resolution, providing high resolution in areas of interest, with coarser resolution in other areas. This approach can be used to increase computational efficiency if so desired. Oscillator peak-based TDOA estimation may be used as a means to reject false TDOA estimates from signal-based TDOA estimates. Oscillator peak-based TDOA estimation may allow for separate and different estimates on separate components of the signal spectrum that come from separate and different source positions.

Figure 36:
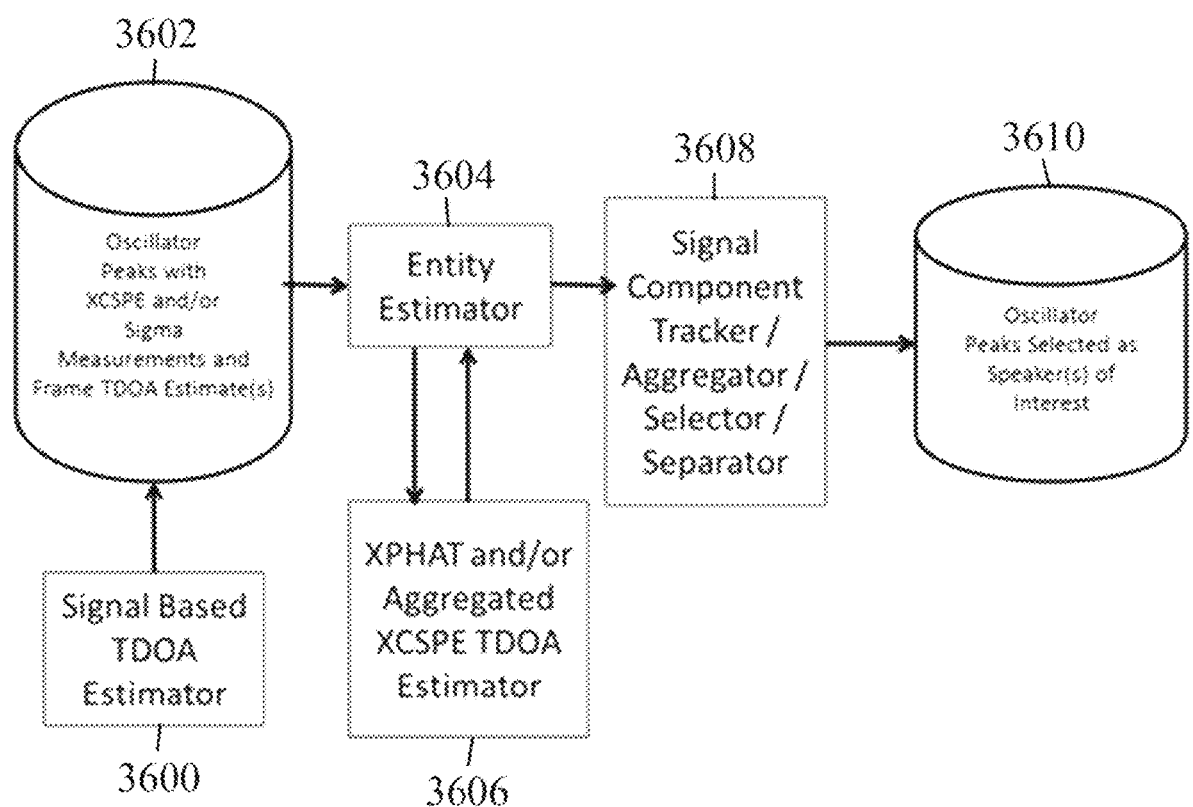
FIG. 36 is an illustration of the selection of oscillator peaks using entity parameters according to an exemplary and non-limiting embodiment.

With reference to FIG. 36, there is illustrated an exemplary embodiment of a method for the selection of Oscillator Peaks using entity parameters. As illustrated, frame-based Entity parameters may be used to determine the likelihood that an oscillator peak was produced by a sound source of interest. This likelihood may be computed on individual oscillator peaks, groups of oscillator peaks that have been incorporated into a tracklet, as described above, or groups of oscillator peaks that have been determined to be part of a coherent group, as described above. These likelihoods may be calculated using any of the following: expected values, such as user specified parameters, external prompts such as camera face detection, using entity parameters as described below, or using a probabilistic framework such as Bayes. In such applications, the oscillator peaks' Sigma, XCSPE, power and other parameters are compared to entity parameters. These parameters may be generated in a variety of ways, including but not limited to previously tracked data, known physical layout of a recording including true AOA and microphone placement, and external cues such as camera face detection.

As illustrated, at step 3600, a signal based TDOA estimator provides input to step 3602 whereat oscillator peaks with XCSPE and/or Sigma measurements and frame TDOA estimates form an input to step 3604. At step 3604, an entity estimator further receives as input XPHAT and/or aggregated XCSPE TDOA estimates from step 3606 and provides output to step 3608 whereat there is performed signal component tracker/aggregator/selector separation with the results forming an input to step 3610 whereat oscillator peaks are selected as one or more speakers of interest.

Figure 37:
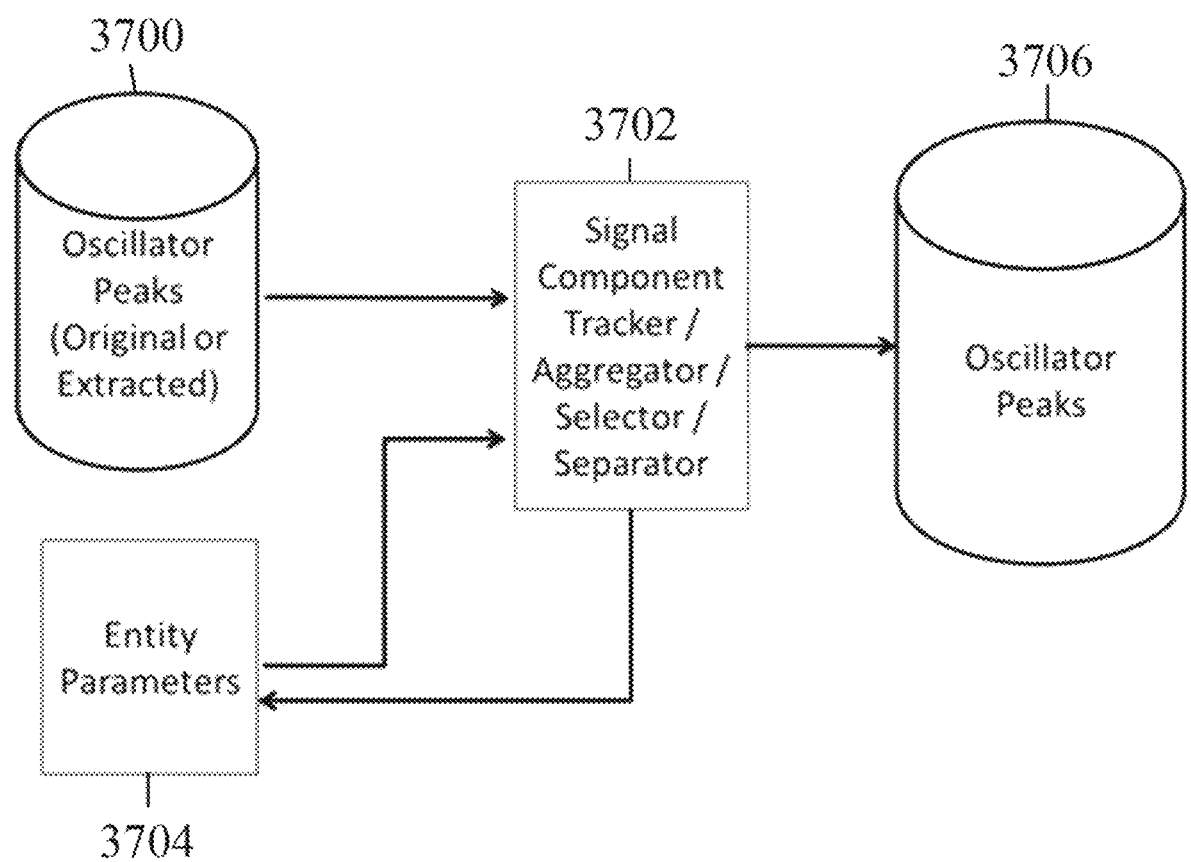
FIG. 37 is an illustration of the estimation of entity parameters using tracker output according to an exemplary and non-limiting embodiment.
Figure 38:
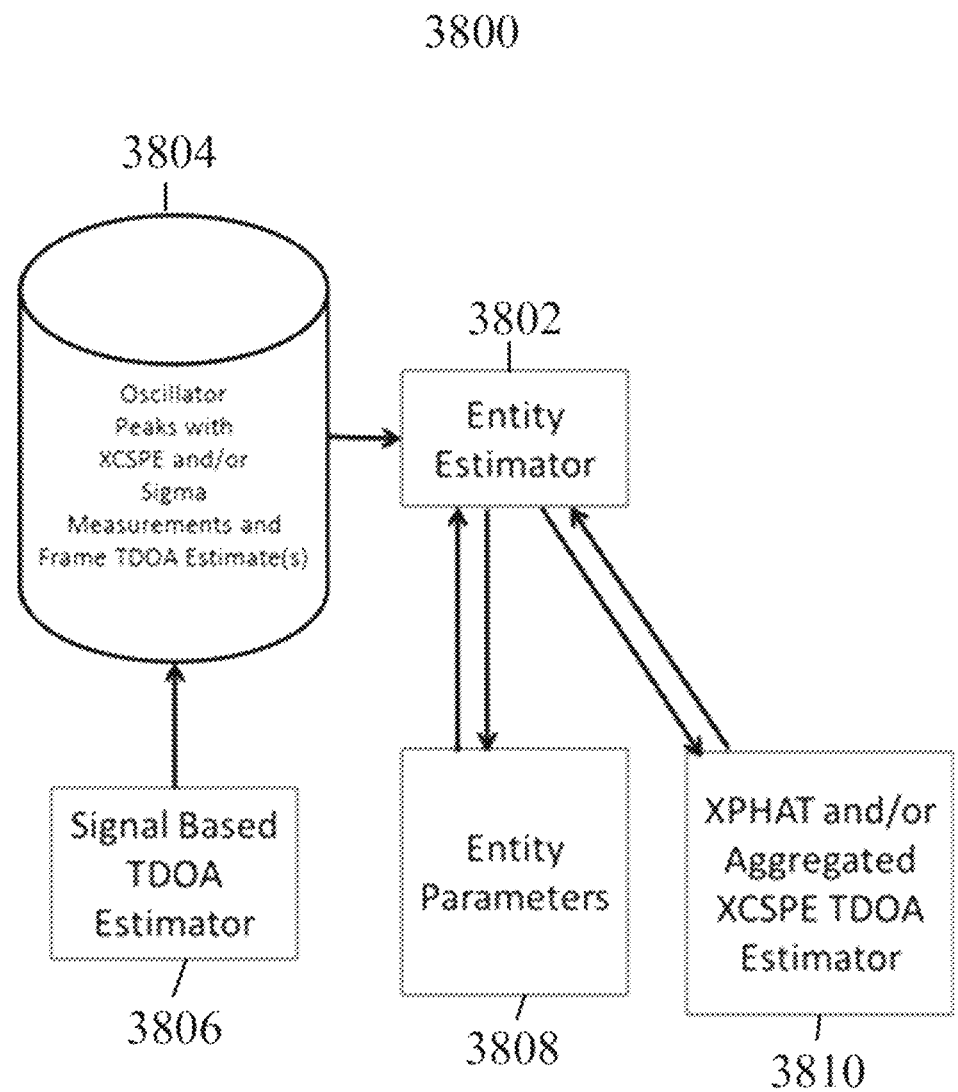
FIG. 38 is an illustration of the estimation of entity parameters using TDOA estimation according to an exemplary and non-limiting embodiment.

With reference to FIG. 37, there is illustrated an exemplary embodiment of a method for estimating entity parameters using tracking output. As illustrated, in step 3702, the tracking module as presented originally in SSS may be used to define tracks that have a high likelihood of coming from one source or entity. Then, in step 3704, there is computed an estimate of entity parameters for the source and these are passed back to 3702. At step 3702 a selection of oscillator peaks is made based on the returned entity parameters. The processing loop between 3702 and 3704 may be iterated, if desired. In this mode, oscillator peaks that have been determined to have a high likelihood of being produced by a source of interest are then passed to the output stage in step 3706. If entity parameters are available prior to tracking, they may be updated or replaced by this process.

In some embodiments, an entity estimation module may be used as part of the signal separation process. The entity estimator may use the available estimates of signal sources, including parameter files, existing entity parameters and external cues to maintain a list of active sound producers or entities. The entity estimator, step 3802, may act as the central decision making method, and may continually update its estimation about the number of entities that are present, as well as the parameters that best describe and distinguish the entities.

In some embodiments, the entity estimator may use TDOA estimates 3806 to determine that a frame of oscillator peaks 3804 was largely produced by an entity of interest. In such cases, the entity estimator may use that frame to update the known parameters for that entity in module 3808.

Figure 39:
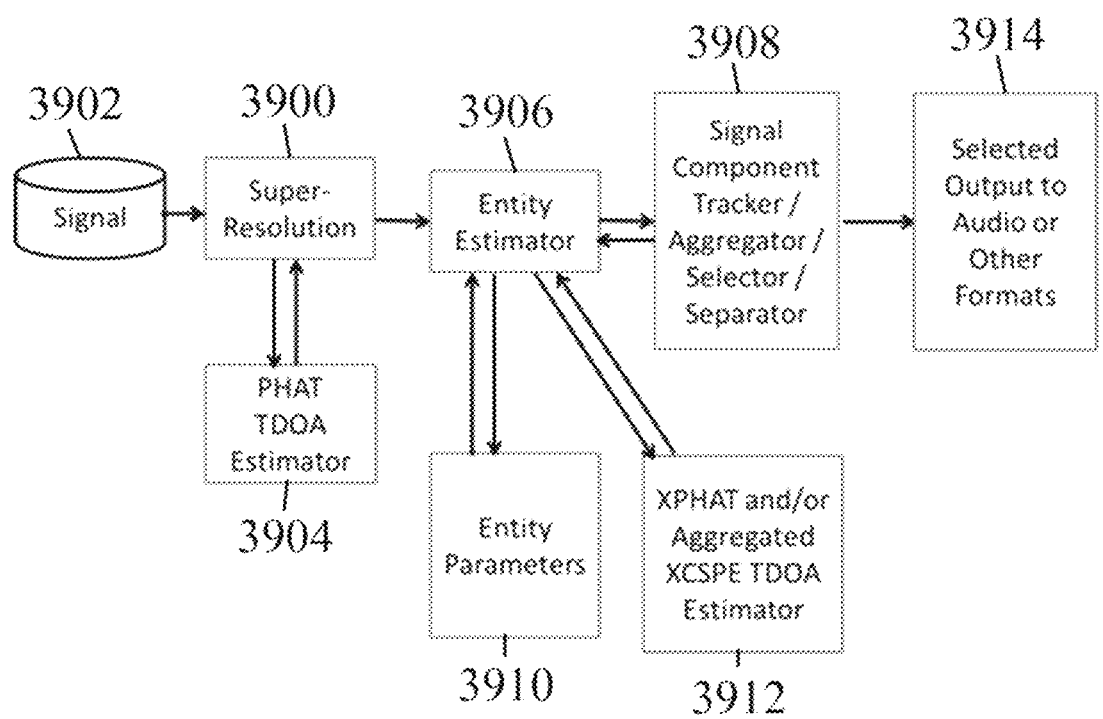
FIG. 39 is an illustration of a system using XCSPE, Sigma and TDOA estimation to enhance source signal separation according to an exemplary and non-limiting embodiment.

In some embodiments, the entity estimator, in step 3810, may attempt to use multiple measurements of TDOA to determine a physical location of the sound producer. In yet other embodiments, the entity estimator may attempt to use a well-known algorithm such as a Kalman Filter to update the TDOA estimate or physical location of a moving entity. With reference to FIG. 39, there is illustrated a system using XCSPE, Sigma and TDOA estimation to enhance source signal separation. As illustrated, measurement techniques described herein are used to enhance source signal separation. First, a Super Resolution Module converts an input signal 3902 to oscillator peaks. These oscillator peaks contain XCSPE and Sigma measurements. Next, the Super Resolution Module performs a TDOA estimate on frames of audio using an algorithm such as PHAT at step 3904. In some cases, the Super Resolution Module may be configured to not engage this process if the TDOA estimator does not detect a significant contribution from the direction of a source of interest. An entity estimator 3906 uses the TDOA estimate and peak-based TDOA (XPHAT or AXTE) estimation 3912 to further refine TDOA estimates and to determine which entities, known or unknown, contributed to the current set of oscillator peaks. Then, the entity estimator provides the oscillator peaks, current entity parameters and TDOA estimates to the tracking module 3908. The tracking module 3908 adds the oscillator peaks to its current set of tracklets and coherent groups, updating using the likelihoods that oscillator peaks, tracklets, frames of oscillator peaks and coherent groups of oscillator peaks were produced by each entity. The tracking module 3908 provides these likelihoods back to the entity estimator 3906 and the entity estimator 3908 updates the entity parameters 3910. The selected oscillator peaks for each entity are aggregated and passed to the output module 3914.

Figure 40:
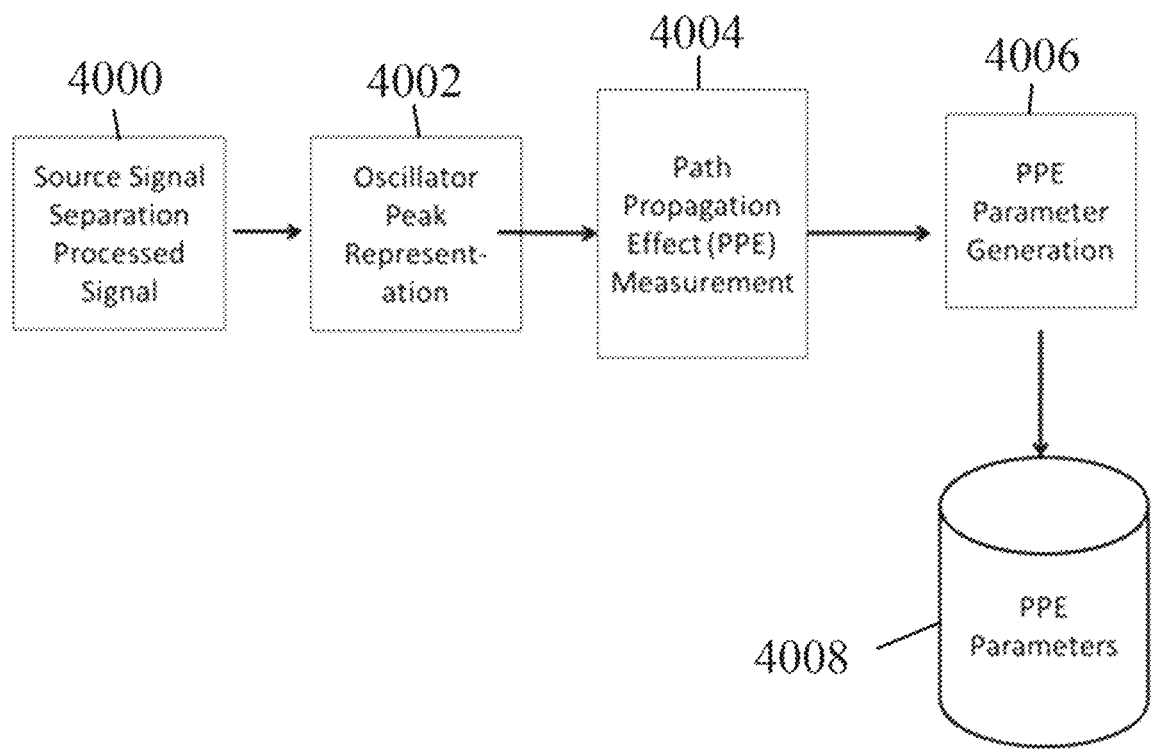
FIG. 40 is an illustration of a path propagation effect measurement using the oscillator peak representation according to an exemplary and non-limiting embodiment.

With reference to FIG. 40, there is illustrated an exemplary embodiment of a method for path propagation effect measurement and mitigation. Sigma and Cross channel CSPE provide improved measures of AOA and TDOA estimates that enable more accurate Path Propagation Effect (PPE) measurement and parameter identification. FIG. 40 illustrates a representative but non-limiting overview of the PPE measurement process.

The Path Propagation Effect (PPE) between a signal source and signal receiver is composed of multiple effects, including reflections, reverberation, and interference. These effects cause distortion in phase and fluctuations in power. When a signal has been measured using the Oscillator Peak measurement process described above, it is possible to detect these effects.

Input: A set of oscillator peaks that has been analyzed and segregated and assigned to sets of entities is input into the PPE mitigation stage 4000.

From the input set of oscillator peaks, a subset corresponding to one entity is selected for further PPE analysis and PPE mitigation 4002.

In step 4004 the analysis of the PPE distortions on Sigma and XCSPE is computed by comparing the measured Sigma values to the mean expected Sigma value, and the measured XCSPE values to the expected PXC trace for the given entity. These deviations are calculated as a function of frequency 4006 and may be stored as parameters in 4008. In some embodiments it may be further desirable to apply filtering techniques to the deviations in 4006 so that, for example, only the slowly varying part of the deviations is allowed. Further, the PPE parameters in 4008 may be stored in the form of deviations as a function of frequency, functional representations, representations in a transformed space, and any other form that may be useful.

Figure 41:
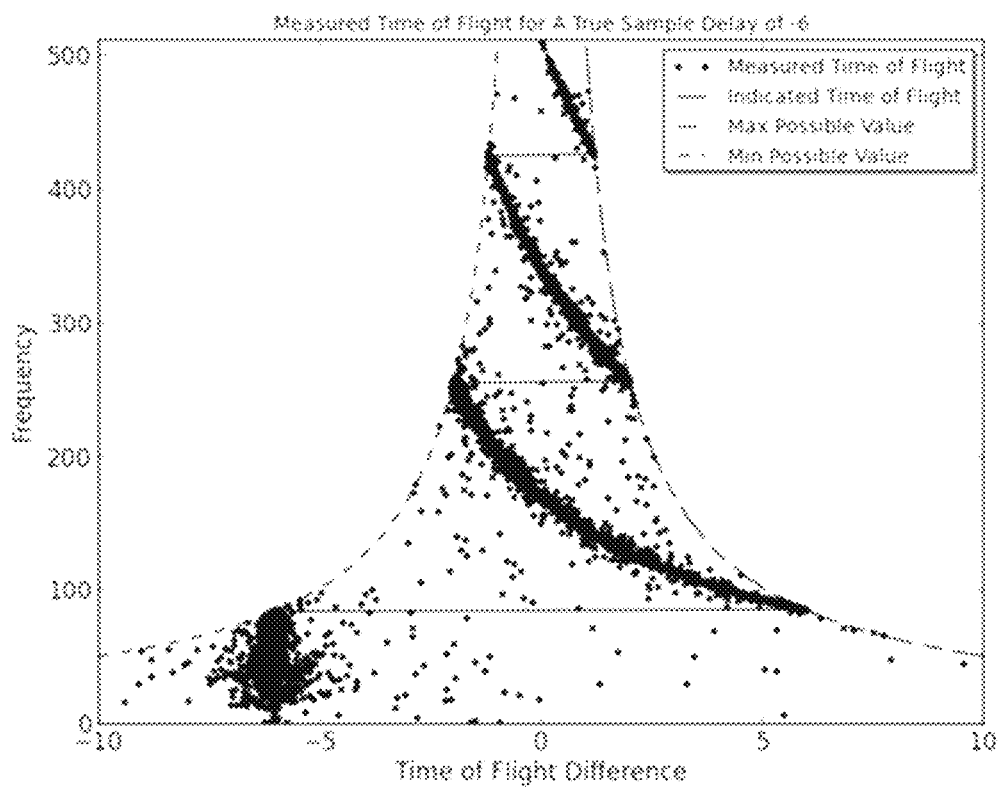
FIG. 41 is an illustration of XCSPE measurements for audio according to an exemplary and non-limiting embodiment.
Figure 42:
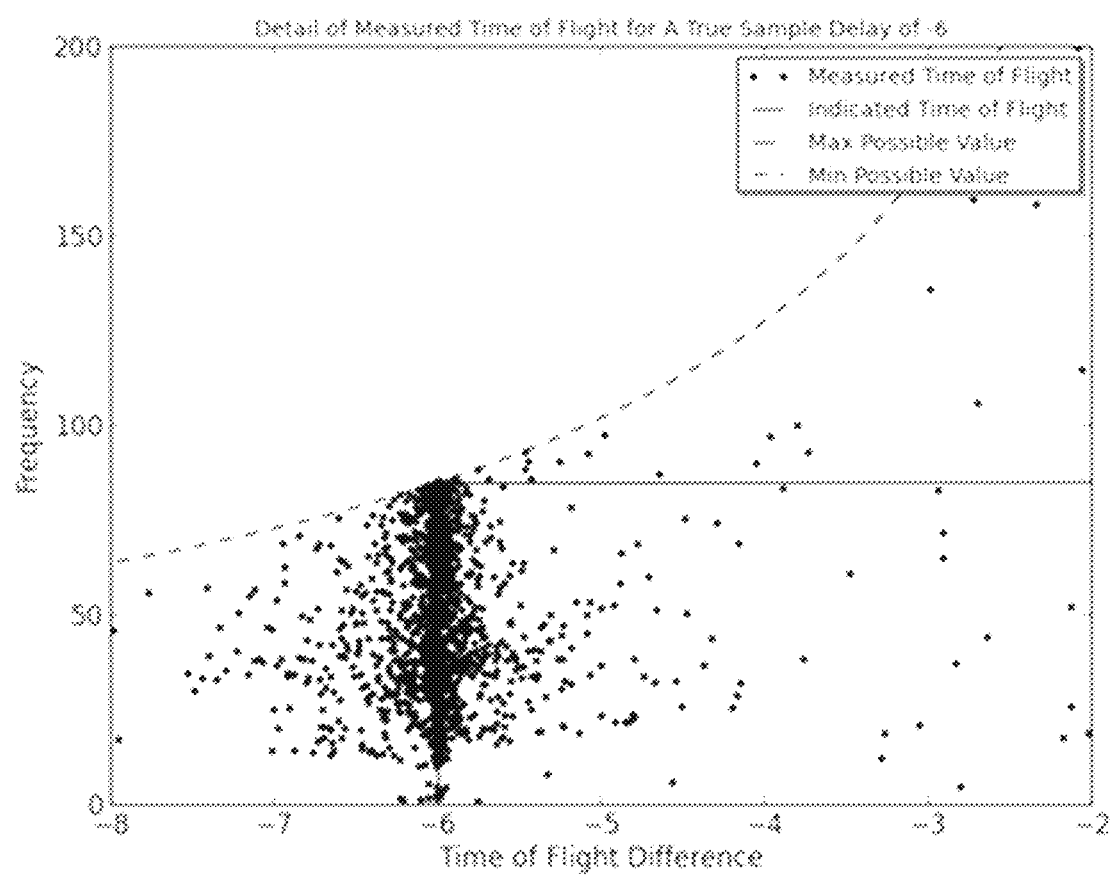
FIG. 42 is an illustration of XCSPE measurements for audio according to an exemplary and non-limiting embodiment.

FIGS. 41 and 42 illustrate exemplary and non-limiting embodiments of the measured XCSPE values for a signal with a TDOA of −6 samples with no echo. Note that the XCSPE values tend to lie very close to the PXC trace for a TDOA of −6.

Figure 43:
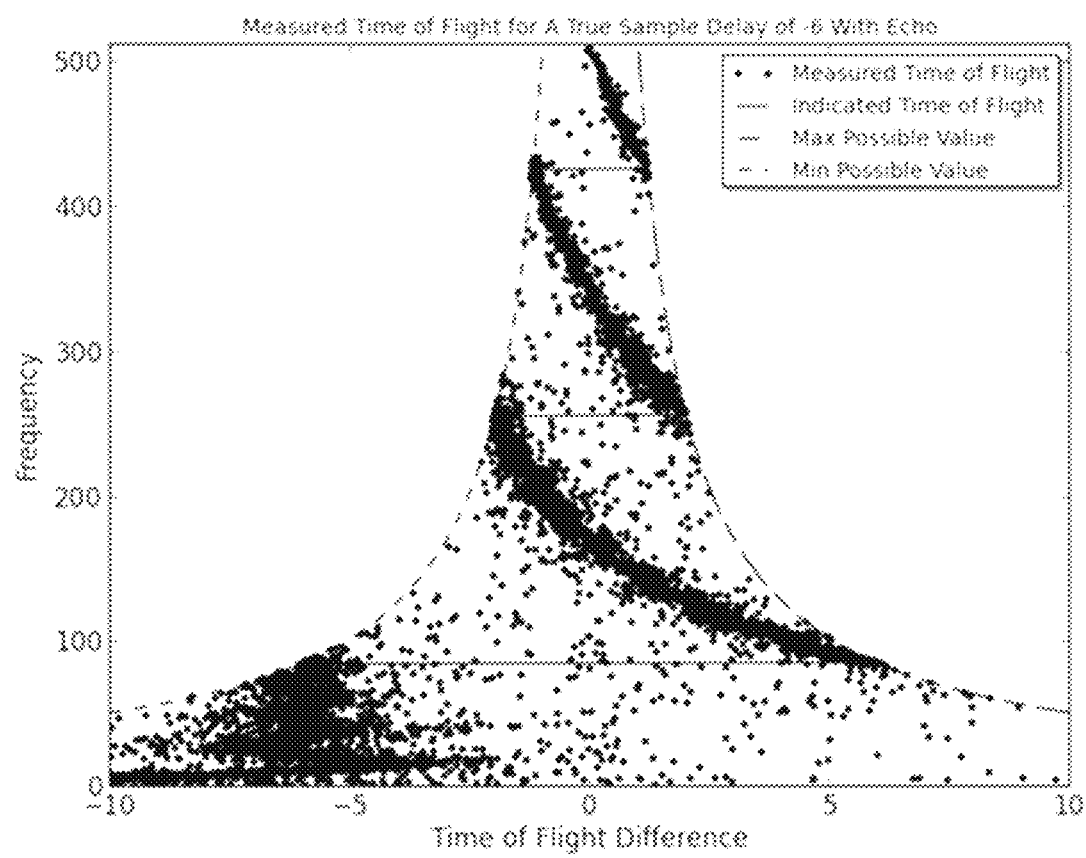
FIG. 43 is an illustration of XCSPE measurements for audio according to an exemplary and non-limiting embodiment.
Figure 44:
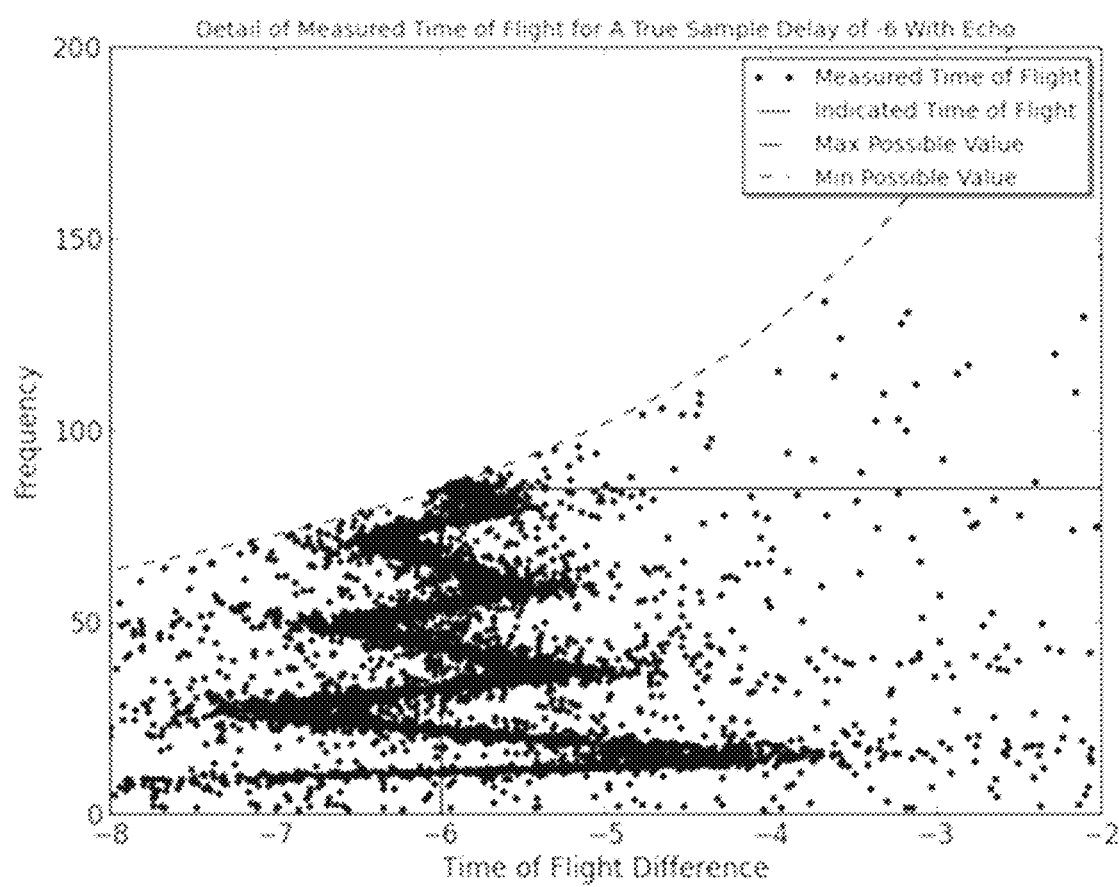
FIG. 44 is an illustration of a detail of XCSPE measurements for audio according to an exemplary and non-limiting embodiment.

FIGS. 43 and 44 illustrate exemplary embodiments of the same signal with an additional echo. Note that the XCSPE values now oscillate about the −6 TDOA PXC trace.

Figure 45:
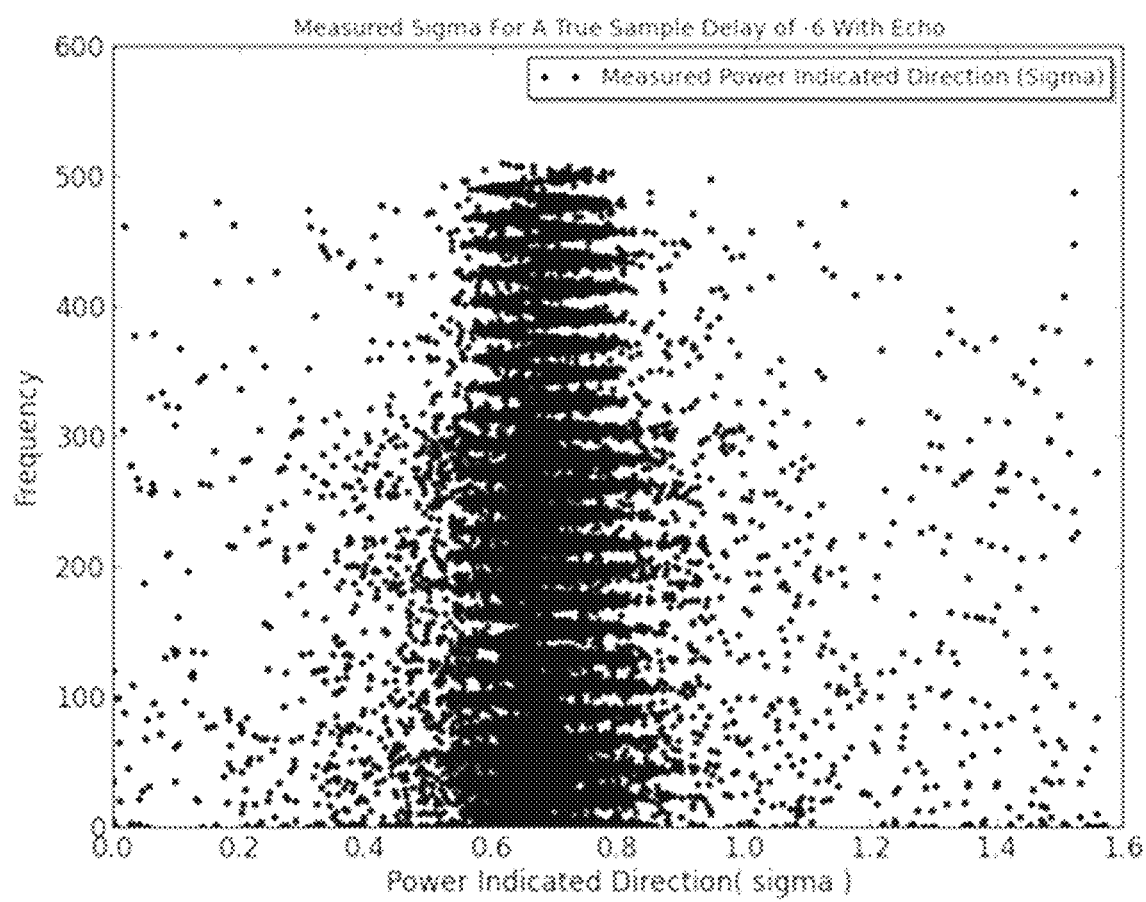
FIG. 45 is an illustration of Sigma measurements for audio according to an exemplary and non-limiting embodiment.

FIG. 45 illustrates an exemplary embodiment of the measured sigma values for the same signal. Note that it also shows an oscillatory pattern.

Figure 46:
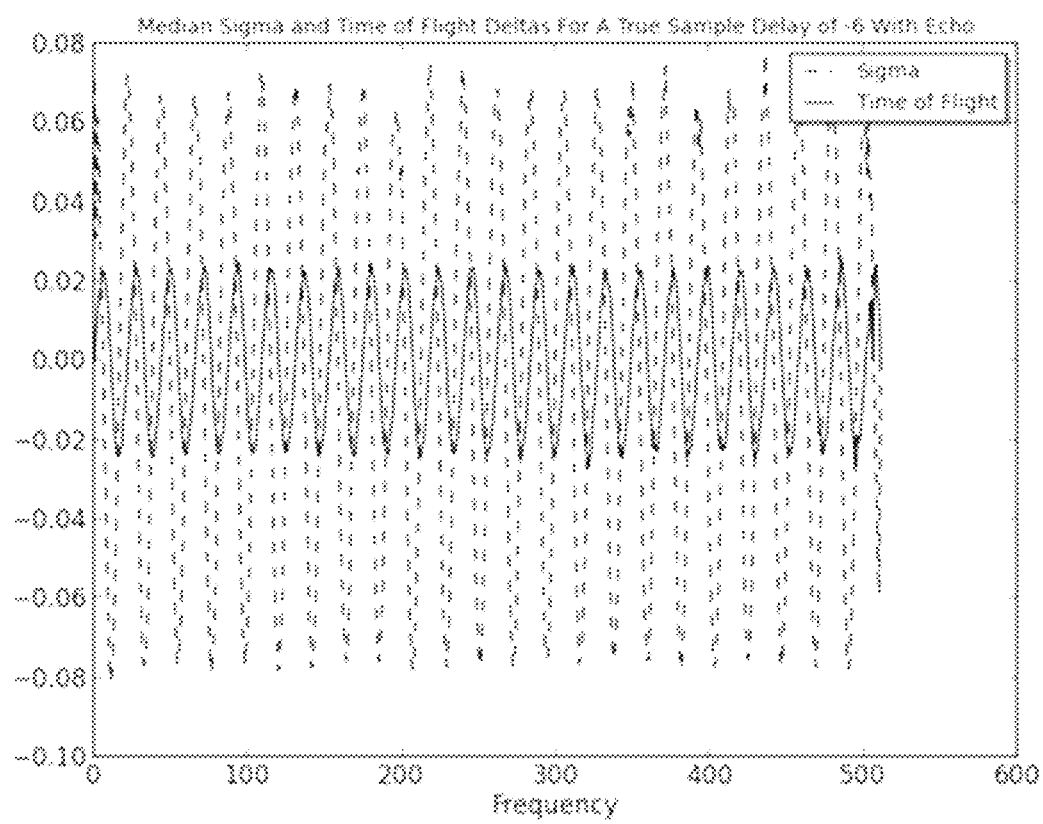
FIG. 46 is an illustration of Sigma and XCSPE shown together for a signal according to an exemplary and non-limiting embodiment.

FIG. 46 illustrates an exemplary embodiment of the measured sigma and the XCSPE oscillations (multiplied by the frequency/Nyquist) on the same plot. Note that the oscillations have the same period with a constant offset in phase.

Figure 47:
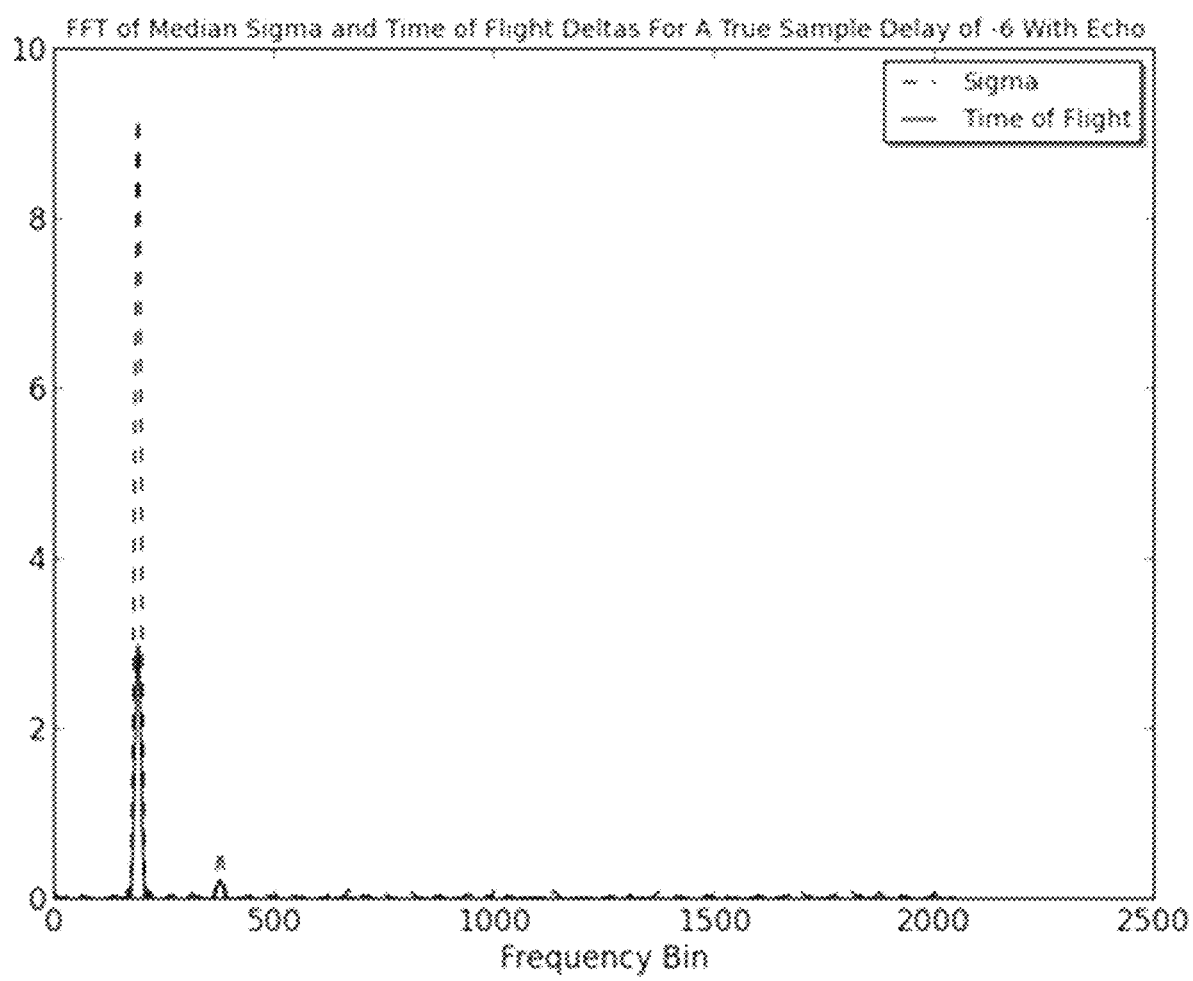
FIG. 47 is an illustration of a FFT of median Sigma and XCSPE fluctuations according to an exemplary and non-limiting embodiment.

FIG. 47 illustrates an exemplary embodiment of a transform of the plots shown in FIG. 46 to a frequency domain using an FFT. Note that both have a strong peak in approximately bin 200. The regular oscillations in sigma and XCSPE, and therefore the location of this peak is a function of the time delay of the strongest echo path. In this domain, one may employ filtering techniques to focus on only parts of the oscillatory variation and filter out or change other parts of the oscillatory variation, e.g., if a low pass filter is applied to the oscillatory variation, then only the slowly varying components of the oscillatory variation will remain.

Figure 48:
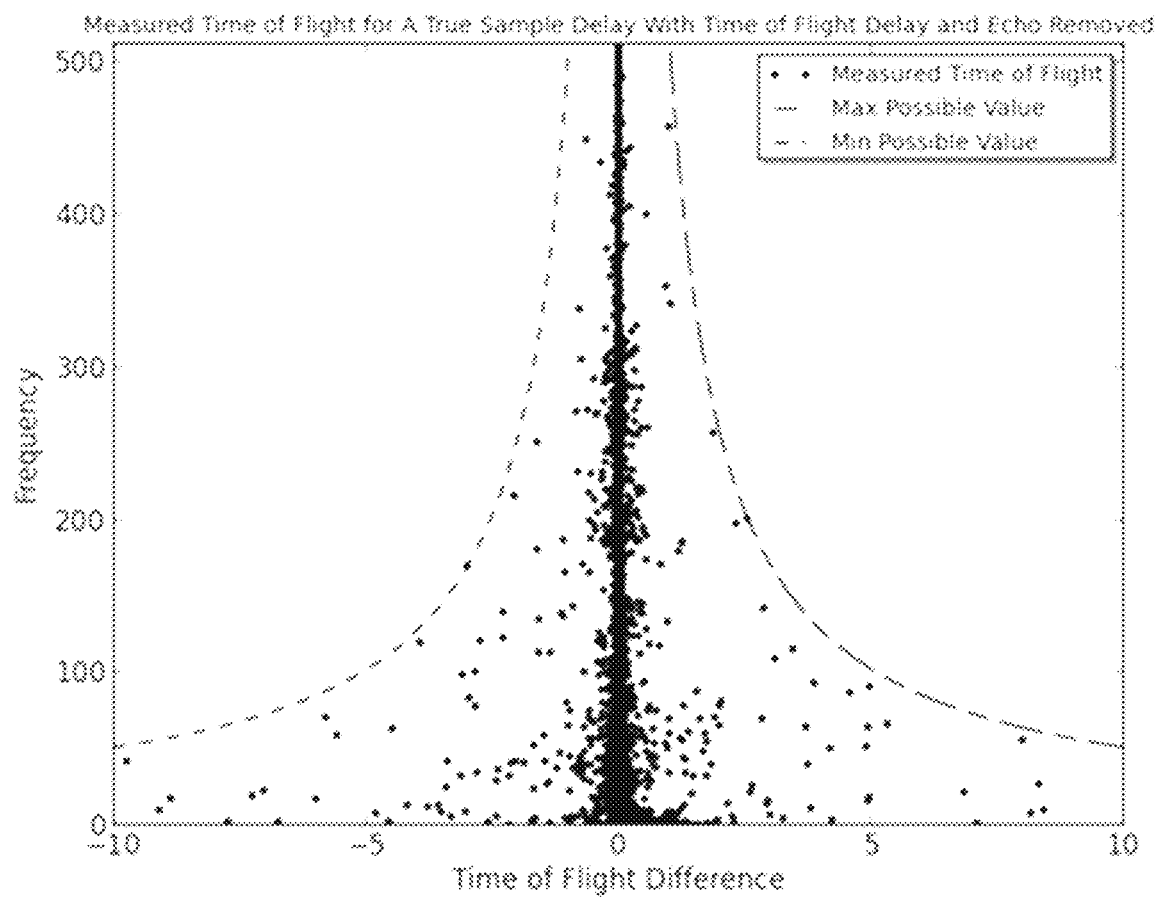
FIG. 48 is an illustration of measured XCSPE for audio according to an exemplary and non-limiting embodiment.
Figure 49:
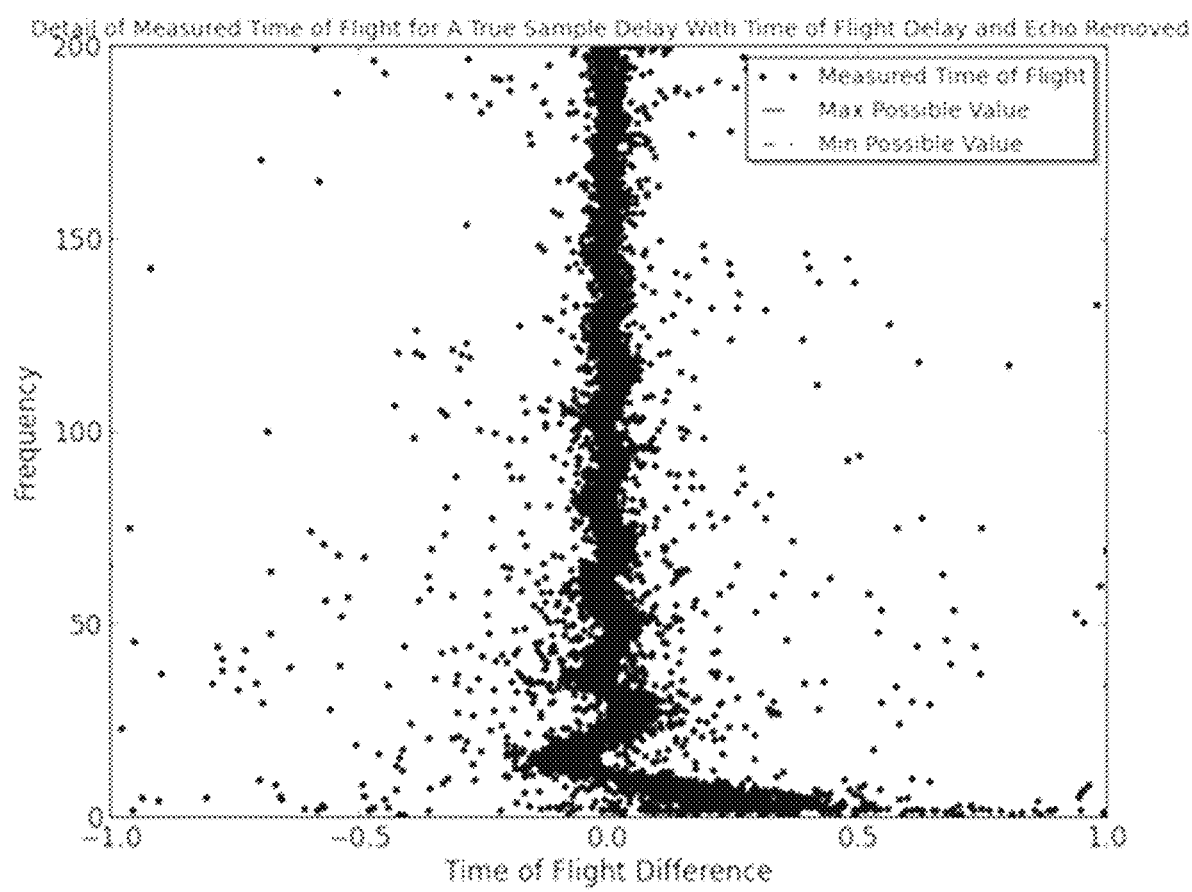
FIG. 49 is an illustration of a detail of measured XCSPE for audio according to an exemplary and non-limiting embodiment.
Figure 50:
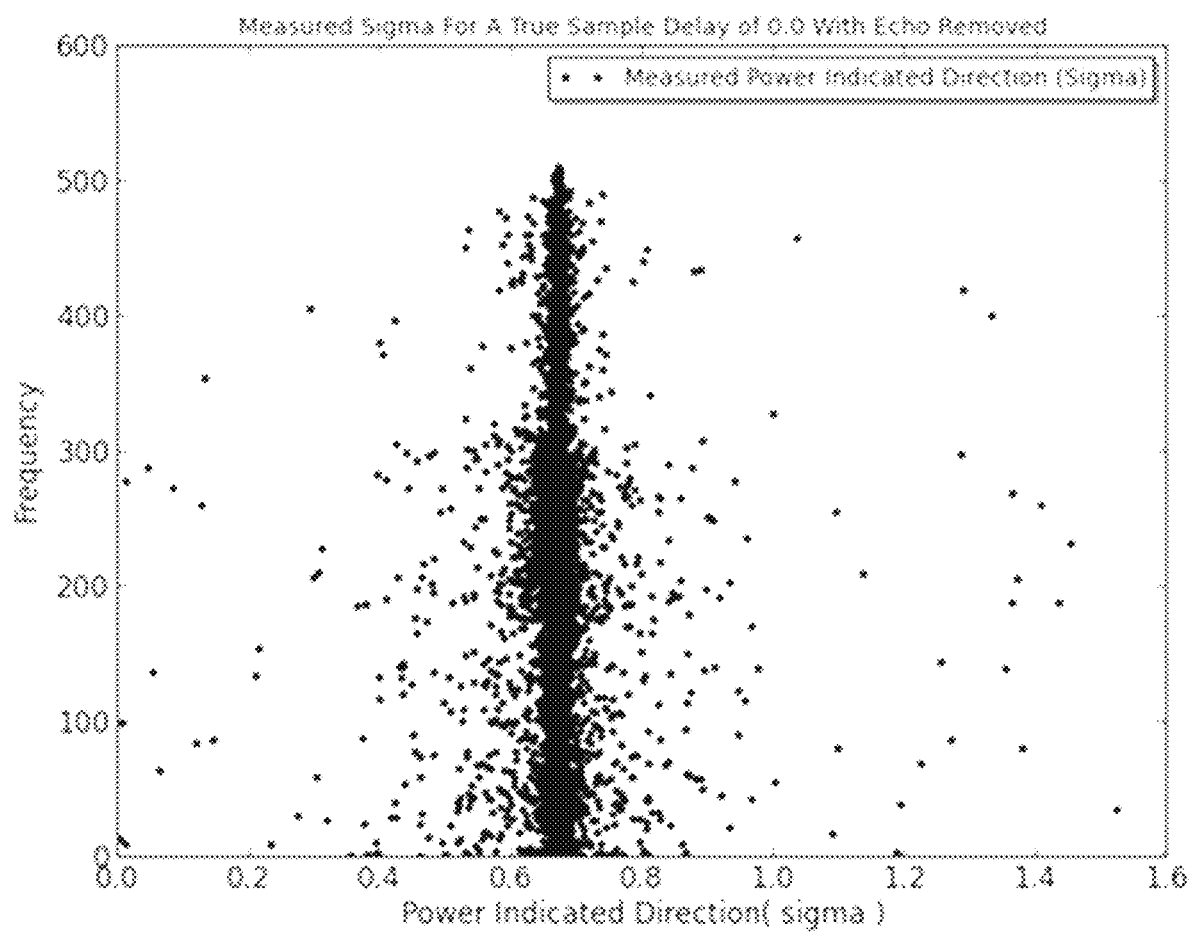
FIG. 50 is an illustration of measured Sigma for audio according to an exemplary and non-limiting embodiment.

In accordance with exemplary and non-limiting embodiments, there is described a method for the mitigation of path propagation effect (PPE). If the parameters of a Path Propagation Effect (PPE) are known, the effects can be mitigated. This transform may be applied to a time-domain signal, a frequency domain signal, or a set of oscillator peaks. Path Propagation Effect (PPE)s that have previously been estimated may be used to remove the effects of those Path Propagation Effect (PPE)s on other signals. With reference to FIGS. 48-50, there are illustrated plots of sigma and XCSPE with effects of echo removed. Note that the scale of the fluctuations is roughly an order of magnitude less than the original fluctuations plotted in FIGS. 43-44 and the Sigma fluctuations shown in FIG. 45.

In one embodiment, path propagation effect (PPE) parameters and a signal in one of a time domain, a frequency domain or an oscillator peak representation forms the input with the resulting output being a signal or oscillator peak with effects of Path Propagation Effect (PPE) mitigated. First, amplitude and Sigma may be corrected using the processes described below with reference to the Mathematics of Path Propagation Effect Removal. Next, the phase fluctuations may be corrected using the processes similarly described below. If desired, the TDOA channel delay may be removed likewise employing the processes described below.

Each of these corrections can be scaled to avoid damaging the perceptual quality of the signal. While these describe the corrections for oscillator peaks, these exemplary methods may be used to create a correction that may be applied to the entire signal using transfer function formalism. This can be achieved by interpolation and extrapolation to all frequency bins based on the sub-bin analysis.

There is now described the Mathematics of Path Propagation Effect removal. In a standard formulation of a de-reverberation process, one attempts to derive the overall Reverberation Effect of, for example, a room, and then one can attempt to deconvolve the measured transform of the received signal by the Reverberation Effect of the room to achieve an estimated version of the original signal without the reverberation effects; however, these techniques suffer from lower resolution effects and do not elucidate the unique reverberation properties associated with a given source position relative to the given microphone/receiver positions. When these ideas are carried over into the high-resolution space of the oscillator peaks, it becomes possible to correct for the path propagation effects on a finer scale that allows for the detection of the unique reverberation properties associated with a given source position relative to the given microphone/receiver positions, and in instances where there is more than one source present, it is possible to apply different path propagation corrections to subsets of the oscillator peaks. Further, it is possible to choose and alter the path propagation corrections to, for example, remove reverberation effects, but leave in or enhance the effects caused by direction of arrival. This may make it possible to use the path propagation corrections to further separate different source signals or to (perceptually) focus source signals in different positions in space so that improved clarity can be achieved.

As discussed above, the path propagation effects are seen in perturbations to the amplitudes and phases of the received signals. For example, in the section on "Implications for the XCSPE in Conditions with Reverberation" one sees that the anomalous phase change, $\varphi_1 - \varphi_0$, measures the deviation to the XCSPE caused by a reverberation. This can be observed in the measured data if one looks at the deviation between the optimal XCSPE curve for a given source signal (the Predicted XCSPE Curve (PXC)) and the XCSPE values of the peaks associated with the source signal. While this is, in general, a noisy measurement, one can average (or take another statistic such as the median of) the deviations caused by the reverberation on these signals over time to achieve an aggregate estimate of the path propagation effects on the measured oscillator peaks. Further, this aggregate estimate can be built up from a subset of the oscillator peaks that have been associated with a given source signal, for example using techniques described above, and different mitigating corrections can be applied to different subsets of oscillator peaks within a single frame of data. Also, it is possible to allow for time adaptation of the path propagation effects estimation by varying the number of frames of data that are aggregated, so that, for example, if a source is moving, the estimate can be altered and updated so that the path propagation estimates will continue to track the source.

In one embodiment, the aggregate deviations curve is taken as the median of the deviations of the set of frames used. To be more specific, the aggregate deviation curve is computed as the median as a function of frequency, of the difference between the XCSPE values of the oscillator peaks and the PXC trace, taking into account that the distance is the shorter of the (absolute value of) direct distance to the PXC or the wraparound distance to the PXC. This median may have a degree of noise present, or may be affected by influences that are of less importance, so one can apply filtering techniques such as low-pass filtering or band-pass filtering to the aggregate deviation curve to select a reduced deviation curve.

(RDC) that will be corrected or mitigated. Similarly, it will be useful to have a Sigma deviation curve (SDC) that is based on the difference between the sigma values of the oscillator peaks and the overall mean sigma value, where the SDC varies as a function of frequency, as in FIGS. 45 and 46, and similar filtering techniques can be applied to the SDC, as well. Once any desired filtering has been applied, the PPE may be constructed from the RDC and SDC and with knowledge of the PPE function there are two corrections/mitigations that can be applied. The first correction/mitigation is to correct the overall propagation path delay between the source and the receivers, as indicated by the time difference of arrival and the optimal PXC curve. The second correction is to mitigate the reverberation or echo effects encountered in the path propagation from source to receiver. The mitigation function has amplitude and phase components, with the phase related components computable from the RDC function. The amplitude related components are computable from the SDC function.

The first step in the process is to use the RDC and SDC to find the functional form of the PPE. The RDC is originally computed in a coordinate system that uses units of sample delay, so it must be multiplied by a conversion factor related to the width of the XCSPE bounds in FIG. 21, so we set $$PPEangle = \left(\frac{2\pi}{\text{width}(f)}\right) * RDC,$$

where width(f) is the width of the XCSPE bounds as a function of frequency, and PPEangle(0)=0 is imposed as a condition, as well. These values may be found in other coordinate systems, but those skilled in the art will be able to transform from the fractional sample space to the phase-related coordinates. For the amplitude-related components, the magnitude is computed from PPEmag=tan($\sigma_{mean}$+SDC), where in this case the amplitude adjustment includes the $\sigma_{mean}$ part to account for the overall power difference between channels related to the overall delay. We use the magnitude and phase parts to calculate the estimate of the path propagation function (PPF, generally) that transforms the signal on channel 0 to the signal on channel 1 and vice versa. Call these PPF0to1 and PPF1to0, formed as PPF0to1=PPEmag*exp(i*PPEangle) and PPF1to0=(1/PPEmag)*exp(−i*PPEangle) where again one must set the values at the zero frequency or DC bin to a real value (generally 1) as well as the Nyquist bin (generally 0).

It is also possible to estimate the PPF0to1 and PPF1to0 functions using the oscillator peaks themselves in an averaging process in the complex domain. This averaging is accomplished by setting FC0=amps0*exp(i*phase0) and FC1=amps1*exp(i*phase1), where amps0 and amps1 are vectors holding all of the amplitude values for the oscillator peaks for channels 0,1 respectively, and phase0 and phase1 are vectors holding all of the phase values for the oscillator peaks for channels 0,1 respectively. Then, on a bin-by-bin basis, or a sub-bin-by-sub-bin basis, we accumulate the complex products given by $$\frac{FC0(f_{bin})FC1*(f_{bin})}{\|FC1\|^2}$$

into the estimate for PPF1to0 and $$\frac{FC1(f_{bin})FC0*(f_{bin})}{\|FC0\|^2}$$

into the estimate for PPF0to1 and then after accumulating the sums, we divide by the number of entries in each sum (this is done on a bin-by-bin basis or a sub-bin-by-sub-bin basis).

In a further example, in some instances it may be clear from analysis of the RDC and SDC that the evolution of the group (or subgroup) of oscillator peaks is governed primarily by an overall signal delay and a few (one or several) important echo effects producing the overall reverberation. In these cases, taking the transform of the RDC and SDC can reveal the important components in the reverberation, as shown in FIG. 47. Keeping only the important components, one can create an approximation of the signal at the receiver/microphone as ss(t)=$s_0$(t−$\tau_1$)+$s_0$(t−$\tau_2$)+ . . . for however many components are retained. This can then be reformulated as a convolution with a string of delta functions, ss(t)=$s_0$(t)∘(δ(t−$\tau_0$)+δ(t−$\tau_1$)+ . . . ) and then in the frequency domain the result is the product of the transform of $s_0$(t) and the transform of the string of delta functions. The mathematical formulation is straightforward when the delays are integer sample values, but if they are not, it is possible to work in the frequency domain, where the transforms for fractional sample delay can be found to be of the form exp(±i*2π*$\vec{b}$*P/N) where $\vec{b}$ is a vector of positive frequency bins in the transform space, P is the fractional sample delay, N is the number of samples in the analysis window (may include padding by zeros), and the sign is chosen based on the format of the transform and the sign of the delay. The negative frequency bins are created from the complex conjugate of the positive frequency bins and the DC and Nyquist bins must be real. In the case where we are looking for the functions PPF0to1 and PPF1to0, it is generally sufficient to look at the evolution from channel 0 to 1 and channel 1 to 0 and create the evolution operator using this convolutional form.

Once the values for PPF0to1 and PPF1to0 are computed, the result represents an evolution operator showing how the group or subgroup of oscillator peaks that were used in the computation evolved from channel 0 to 1 or channel 1 to 0.

The PPF functions can then be employed to transform the signals in a number of ways. In one embodiment, the PPF evolution operators are used to transform the signal on channel 0 to the approximate form it would be in if it evolved all the way to the position of receiver/microphone 1, and similarly for the signal on channel 1 in the reverse direction. In this form, the subset of oscillator peaks that was used in the PPF calculation is transformed coherently to the other channel, but other signals (which may be in oscillator peak form) that do not have the same source position would transform into a signal that is not as coherent on the other channel, so by combining the signals we naturally get reinforcement of the signal from the desired entity, while we get partial cancellation or destructive interference for the signals that are not coherent. This generally has the effect of enhancing the signal of interest, i.e., the subgroup of oscillator peaks associated with the entity of interest, while diminishing the power of the other signal components. In another embodiment, the evolution operators PPF0to1 and PPF1to0 may be applied only to the subgroup of oscillator peaks associated with the entity of interest.

In a second (generally preferred) embodiment, the PPF functions can be used to evolve the signal to a virtual position that would be at a midway point between the microphones. In general, this requires advancing the signal from one of the channels (for the subgroup of oscillator peaks associated with the entity of interest) and retarding the signal from the other channel, so that the signals evolve to a point somewhere in between (this can actually be outside of the segment connecting the receivers/microphones, as well, but the midpoint is the most useful position to use). The approach can be explained for a specific example, where the evolution operators PPF0to1 and PPF1to0 are used to create new evolution operators to reach the mid position, PPF0tomid and PPF1tomid. This will require first calculating the extra $2\pi$ phase evolution values that occur for sufficiently high frequencies (as described above), and these values are tied to the particular PXC trace that is used, i.e., the extra $2\pi$ phase depends on the source position. Call this pre-computed value extra_2_pi and recognize that it changes (as a step function) as a function of frequency. Let PPF0to1angle be the phase angle of PPF0to1 and let PPF1to0angle be the phase angle of PPF1to0. Then the new phase angles for the evolution operator to the mid position are given by PPF0to_mid_angle=(PPF0to1angle+ extra_2_pi)/2 and PPF1to_mid_angle=(PPF1to0angle− extra_2_pi)/2, where the sign of the extra_2_pi term may change depending on the direction used in the calculation. Then, the amplitude changes must be applied to counteract the effects of reverberation. To do so, let PPF0to1mag=∥PPF0to1∥ and PPF1to0mag=∥PPF1to0∥ where the brackets mean to take the complex magnitude of the vectors. In order to create a smoother remapping of the magnitudes, it is useful to define $\alpha=\tan(\sigma_{mean})/\tan(SDC+\sigma_{mean})$ and $\beta=\tan(SDC+\sigma_{mean})/\tan(\sigma_{mean})$ and then further define $\Delta_\alpha=1-\alpha$ and $\Delta_\beta=\beta-1$. Now, if values are selected for $0\leq\kappa\leq1$, $0\leq\gamma\leq1$ such that $\kappa+\gamma=1$, a smooth transformation of power that mitigates the variation in the SDC is given by the adjustment terms PPF0to1adj=1+$\kappa\Delta_\beta$ and PPF0to1adj=1−$\gamma\Delta_\alpha$ where these adjustment terms account for the variation in sigma about $\sigma_{mean}$. Without loss of generality, we can choose the factors that produce the overall shift of $\sigma_{mean}$ to the mid position ($\pi/4$ in this formulation) in the following manner:

if $\sigma_{mean}>\pi/4$, $\sigma_{shiftL}=\tan(\sigma_{mean})$, $\sigma_{shiftR}=1$ but
if $\sigma_{mean}\leq\pi/4$, $\sigma_{shiftL}=1$, $\sigma_{shiftR}=1/\tan(\sigma_{mean})$. Now that the intermediate values are calculated, the overall PPF to mid evolution operators can be computed as
PPF0to_mid=PPF0to1adj*$\sigma_{shiftL}$*exp
(i*PPF0to_mid_angle) and
PPF1to_mid=PPF1to0adj*$\sigma_{shiftR}$*exp
(i*PPF1to_mid_angle). Finally, when the PPF0to_mid and PPF1to_mid operators are applied to the oscillator peaks, the end result has (generally) altered amplitude and phase and can be stored again as PPE mitigated oscillator peaks and if the signal is reconstructed in the time domain the reverberant effects will be mitigated.

Note that in some cases one might choose only to apply amplitude correction by setting the exponential phase term to 1 or, one might want to apply only the phase correction by setting the amplitude correction to 1. Finally, one might choose to take out only the reverberant effects contained in the RDC and the SDC, but leave the signal at the apparent position of $\sigma_{mean}$. The key feature is that knowledge of the PPE and PPF functions allows for the remapping and repositioning of the signal to a different apparent spatial position. One skilled in the art can use the representation to handle the delay, echo and reverberant effects and alter them in whatever manner is desired.

The PPF functions defined above may further be applied to a raw audio file (such as in .wav format) without using the oscillator peaks directly. This is done by mapping the PPF functions to the nearest frequency bins for a given transform length and then using the modified PPF function as a transfer function. This is done, in one embodiment, so that an original audio file may be remapped to a spatial position that is aligned with the remapped extracted oscillator peak file, and the remapped original may scaled down (quieter) or up (louder) then be recombined with the extracted oscillator peak file to create an enhanced processed output file.

When the delay corrections and the reverb corrections are applied to the oscillator peaks, one can then resynthesize the complete file of altered oscillator peaks and the resulting signal will have approximately mitigated the path propagation effects of delay and reverb.

Figure 51:
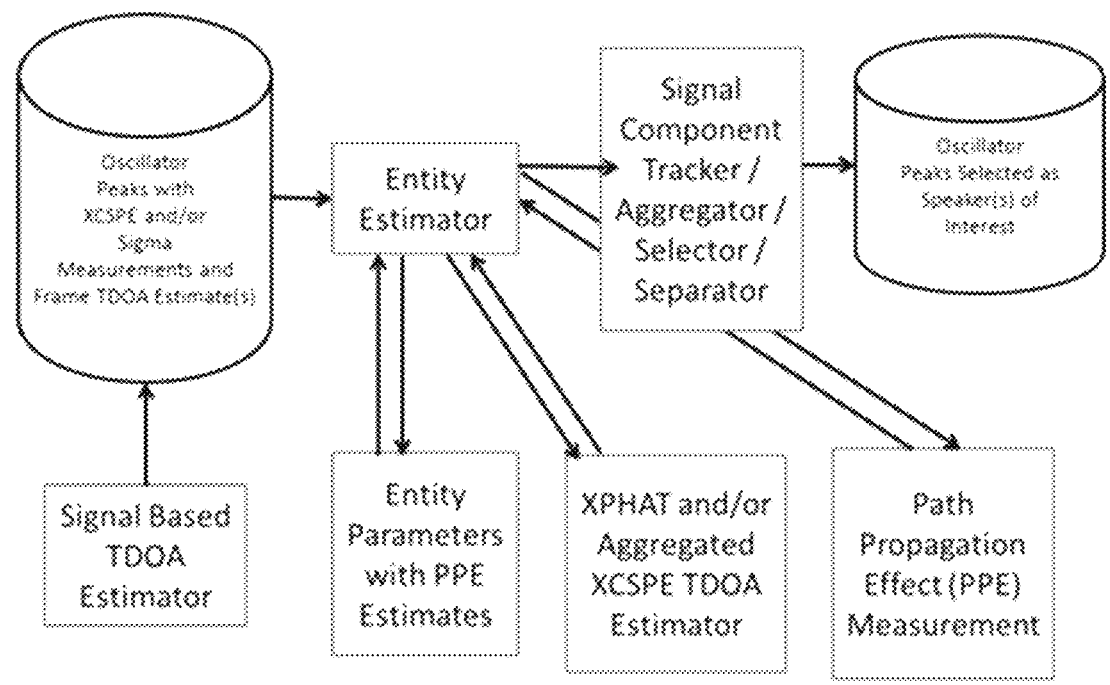
FIG. 51 is an illustration of path propagation effect measurement and mitigation in an SSS system according to an exemplary and non-limiting embodiment.

With reference to FIG. 51, there is illustrated a method by which Path Propagation Effect parameters may be incorporated into Entity Parameters to enable enhanced signal separation. For example, one of the effects of Path Propagation is to induce distortions to a source signal's XCSPE and Sigma measurement. If these distortions can be measured, the Signal Component Tracker may use these measurements to more accurately estimate which oscillator peaks are produced by a source of interest. Each of these PPE measurements can be used as a sort of fingerprint for signals coming from a specific source position, so the entity estimator may monitor any of the measurements, PPE parameters, XPHAT or AXTE TDOA estimates, PPE/PPF functional forms, to track and group the oscillator peaks and separate them into distinct entities before outputting the oscillator peaks sets for the entities.

If PPE parameters are known, their effects may be mitigated in a signal such as an audio signal. The techniques for removing Path Propagation Effects from a signal are described above. In some embodiments, signal PPE Mitigation may be performed prior to the SSS Super-Resolution Module. This will have the effect of removing distortions in Sigma and XCSPE for a given source. Alternatively, it can be viewed as an iterative process, whereby PPE mitigation is performed to stabilize the signal/entity of interest and then the output is input back into the system to be analyzed again.

Figure 52:
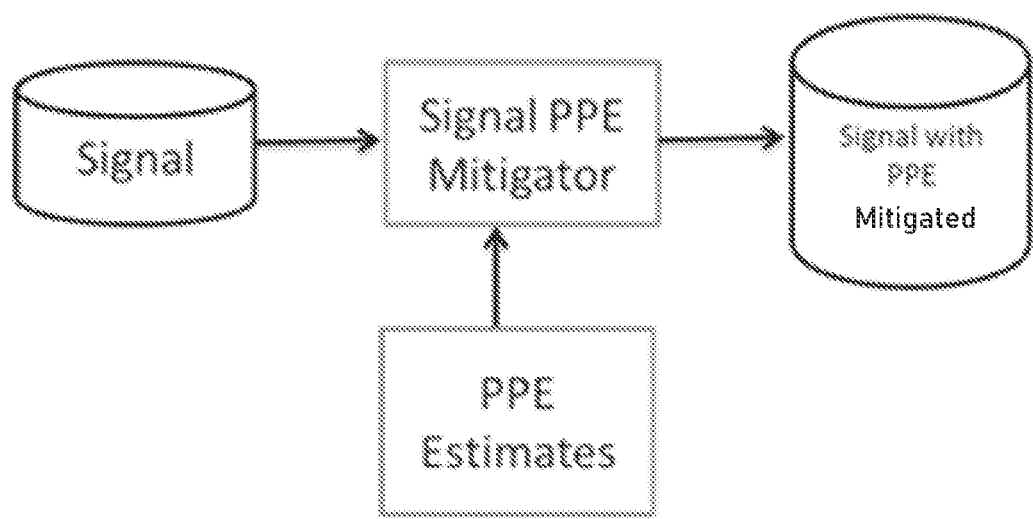
FIG. 52 is an illustration of the mitigation of path propagation effects in signals according to an exemplary and non-limiting embodiment.

In some embodiments, signal PPE Mitigation may be performed after the SSS resynthesis module. In this case, the Signal PPE Mitigator may use parameters specific to the source that is being reconstructed. In some cases, multiple sets of PPE parameters may be applied to separate portions of audio, as illustrated with reference to FIG. 52.

If PPE parameters are known, their effects may be mitigated in an oscillator peak. The techniques for removing Path Propagation Effects from an oscillator peak was described above.

In some embodiments, an Oscillator Peak PPE Mitigation may be performed prior to any entity detection or selection of oscillator peaks as signals of interest. This will have the effect of removing distortions in Sigma and XCSPE for a given source.

Figure 53:
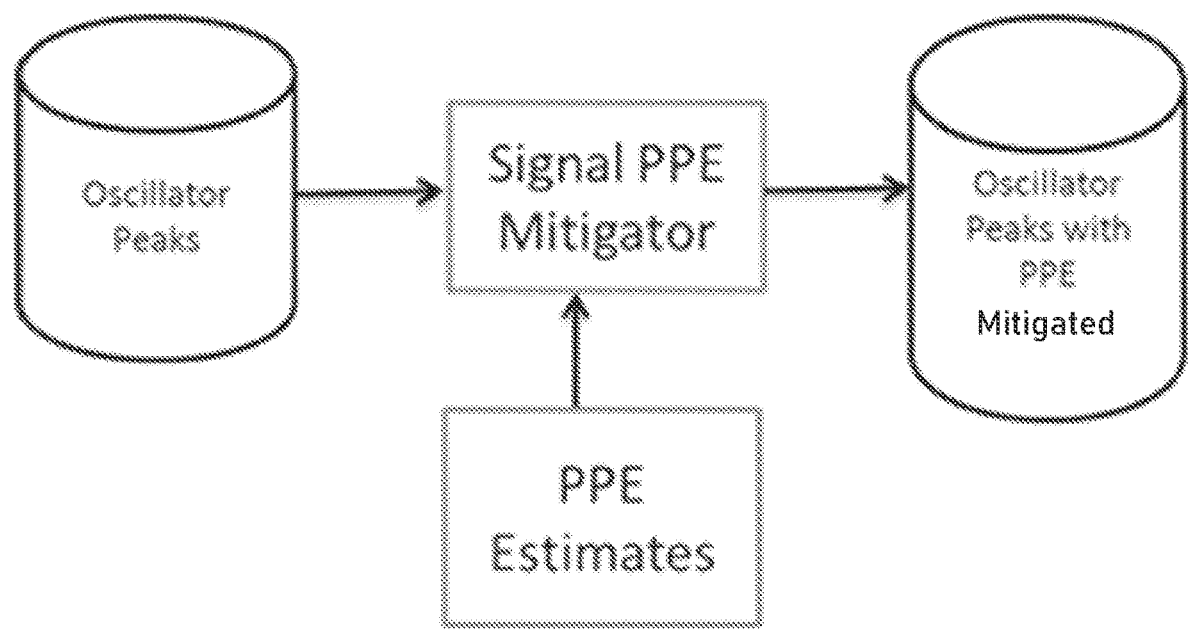
FIG. 53 is an illustration of the mitigation of path propagation effects in oscillator peaks according to an exemplary and non-limiting embodiment.

In some embodiments, Oscillator Peak PPE Mitigation may be performed after oscillator peaks have been selected as signals of interest. In this case, the Oscillator Peak PPE Mitigator may use parameters specific to the source that is being reconstructed. In some cases, multiple sets of PPE parameters may be applied to separate portions of audio, as illustrated with reference to FIG. 53.

Figure 54:
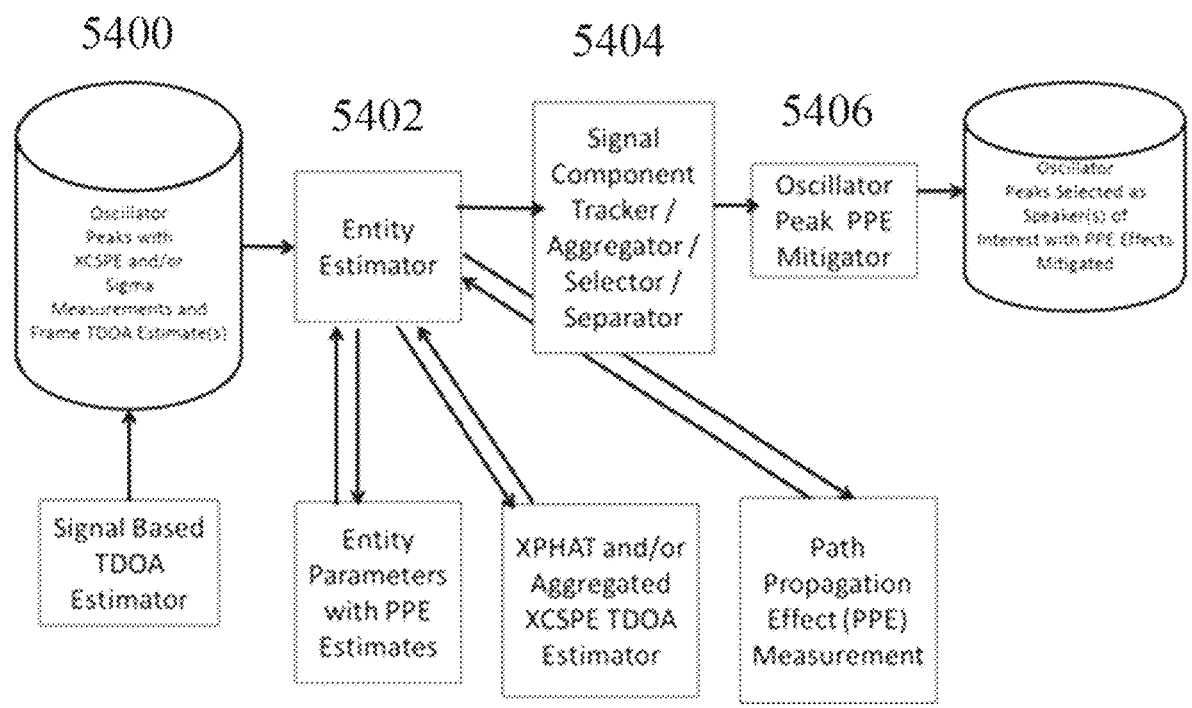
FIG. 54 is an illustration of a system using PPE estimation and entity detection to remove path propagation effects for individual sound sources according to an exemplary and non-limiting embodiment.

With reference to FIG. 54, there is illustrated a method for using PPE Estimation and Entity Detection to Remove Path Propagation Effects for individual sound sources. Specifically, FIG. 54 illustrates an exemplary embodiment that estimates Path Propagation Effects as part of entity estimation and mitigates those PPEs once oscillator peaks have been selected as likely to have been created by entities of interest. First, the Super Resolution Module 5400 converts audio to oscillator peaks. These oscillator peaks contain XCSPE and Sigma measurements. The Super Resolution Module performs a TDOA estimate on frames of Audio using an algorithm such as PHAT or XPHAT or AXTE. In some cases, the Super Resolution Module may be configured to not process if the TDOA estimator does not detect a significant contribution from the direction of a source of interest. An entity estimator 5402 uses the TDOA estimate and peak-based TDOA estimation to further refine TDOA estimates and to determine which entities, known or unknown, contributed to the current set of oscillator peaks. The entity estimator 5402 uses the TDOA estimate and peak-based TDOA estimates, combined with measurements of XCSPE and Sigma contained in oscillator peaks to estimate Path Propagation Effects. The entity estimator 5402 provides the oscillator peaks, current entity parameters, TDOA estimates and PPE parameters to the tracking module 5404. The tracking module 5404 adds the oscillator peaks to its current set of tracklets and coherent groups, updating using the likelihoods that oscillator peaks, tracklets, frames of oscillator peaks and coherent groups of oscillator peaks were produced by each entity. The tracker 5404 uses the PPE parameters to achieve greater accuracy in estimating which oscillator peaks were produced by each entity. The tracking module provides these likelihoods back to the entity estimator 5402. The entity estimator 5402 updates the entity parameters and PPE parameters. The Path Propagation Effects are optionally mitigated in oscillator peaks prior to output 5406. The Oscillator Peak PPE Mitigator 5406 uses the PPE parameters associated with the entity which is likely to have produced the oscillator peaks.

In some exemplary embodiments, it may be desirable to estimate the location of a source signal emitter in physical space. There are well known techniques for converting TDOA and other estimates to geolocation estimates. Described herein is one technique that uses the precise information derived from CSPE and XCSPE to provide enhanced geolocation capabilities. Oscillator peak based time difference of arrival estimates may be used as the input.

Cross-channel CSPE (XCSPE) measurements may be applied to any number of signal processing techniques that use TDOA, or signal path length differences to provide more accurate geolocational estimates. The higher subsample resolution provided by the cross-channel CSPE TDOA measurement delivers the increase in accuracy.

In one exemplary and non-limiting embodiment, XCSPE may be used in conjunction with a hyperbolic asymptotic estimation through the use of a prolate spheroidal coordinate transformation to calculate signal source bearing (and range, in the case of an antenna array of more than 2 channels) estimates. The improved measurement of TDOA allows one the ability to respond to low SNR environments without compromising the accuracy of the results of downstream algorithms and even lend further improvements on modern techniques in high SNR environments.

In the case of geolocation with the hyperbolic asymptotic estimation the improved precision allows for very effective spatial filtering techniques which have been most useful in far field signal separation. An intermediate output of the hyperbolic asymptotic estimation is a hyperbolic path determined by possible source positions from the give TDOA of a signal.

Figure 55:
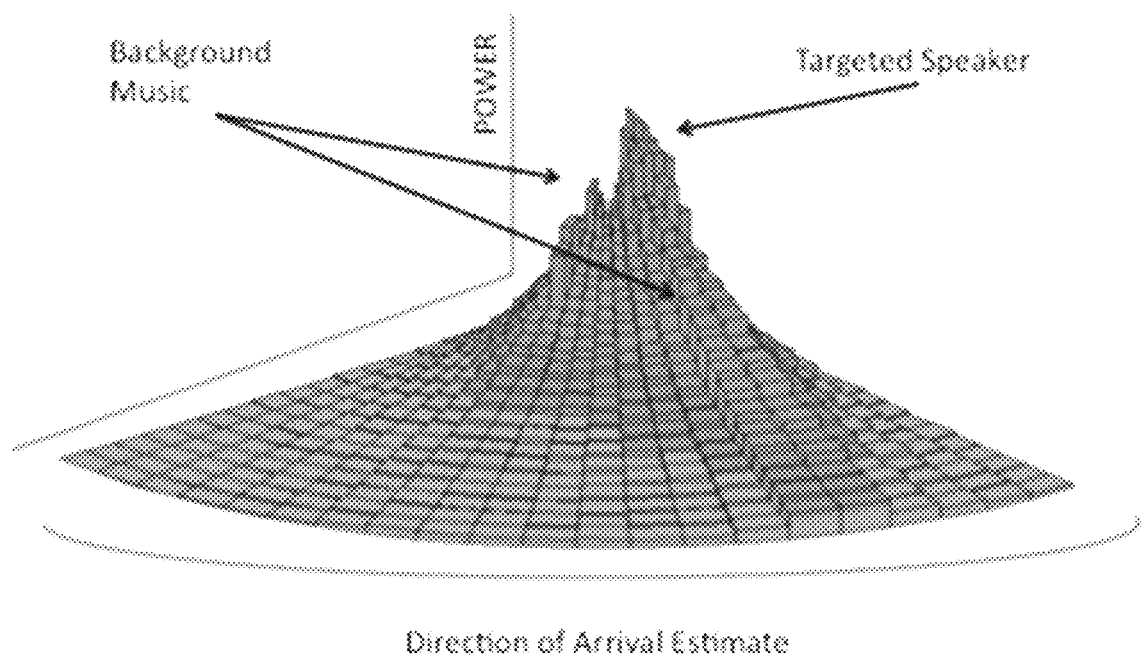
FIG. 55 is an illustration of a speaker in the presence of music and background noise according to an exemplary and non-limiting embodiment.

In an illustrative but non-limiting example, XCSPE may be used to extract a single speaker from a complex audio environment with multiple source signals. With reference to FIG. 55, there is illustrated a plot of an individual speaking in the presence of music and other background noise.

Figure 56:
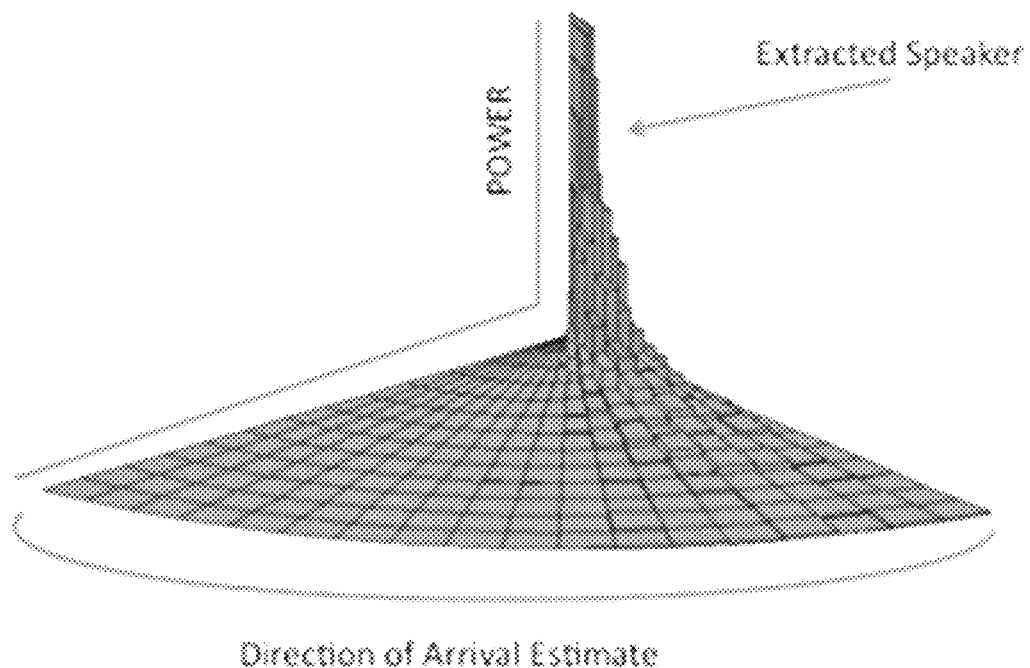
FIG. 56 is an illustration of a speaker extracted from music and background noise according to an exemplary and non-limiting embodiment.

XCPSE bearing estimates inform direction of arrival analysis in SSS processing that enable one to identify, target and extract the targeted speaker of interest/sound source from the other sound source emitters as seen with reference to FIG. 56.

In the near field, each additional wavelength added to the total path length of the signal source position to each receiver can result in large changes in the direction of arrival. However; if the source is sufficiently far away from the receiver array, additional wavelengths added to the total path length of the source signal will result in negligible changes in the direction of arrival. The improved accuracy of the algorithm from the input of cross-channel CSPE results allows one to make spatial cuts on regions containing signals of interest. Given the potential accuracy of this measurement, future applications may include, but are not limited to, passive sonar and spatial tracking of signals through time, multipath signal identification.

XCSPE measurements enable greater accuracy in TDOA and bearing estimates which in turn permit greater accuracy in determining source signal emitter location and movement over time, as well as the ability to resolve ambiguous DOA estimates from multiple source signal emitters. These estimates may be applied to source signal separation techniques by using multiple TDOA estimates to better select oscillator peaks and track source signal emitters over time.

The source signal separation (SSS) technology described above may be applied to any system that sends or captures signals through a collection mechanism (e.g. microphone, camera, radio receiver, video camera, transducer, or other receiver) for either transmission, storage, analysis or manipulation, and subsequently may be, (but not limited to): transmitted between receivers (e.g. rf transmission); delivered in an audio format (e.g. transmission of a voice call); delivered in an image or video format (e.g. transmission of a photo or video); depicted in a text-format (e.g. converted from speech to text); or interpreted and rendered as an image (e.g. a radar display or ultrasound).

SSS technology may be introduced into one or more processes and/or systems that involve digital signal processing. Digital signal processing is generally defined as the mathematical manipulation of an informational signal to modify or improve it, and is characterized by the representation of discrete time, discrete frequency, or other discrete domain signals by a sequence of numbers or symbols and the processing of these signals. Sample digital signal processing fields where SSS technology can deliver benefit include but are not limited to: audio processing and compression; speech processing and recognition; rf transmission; biometric analysis; sonar and radar; sensor array; ultrasonic testing; spectral estimation; statistical analysis; digital image; digital and cellular communications; control systems; biomedical; medical imaging; and seismic data.

Digital signal processing can be applied to measure, filter and/or compress continuous real-world analog signals. The process typically begins by converting the signal from an analog to a digital form, by sampling and then digitizing it using an analog-to-digital converter (ADC), which turns the analog signal into a digital stream of numbers. Typically, after analysis and transmission, the required output signal is another analog output signal, which requires a digital-to-analog converter (DAC).

The SSS technology may be implemented on, but not limited to, one or more of the following: general purpose computers and GPUs; specialized single and multi-core processors (e.g. DSPs); purpose-built hardware such as application-specific integrated circuit (ASICs); field-programmable gate arrays (FPGAs); digital signal controllers; and stream processors. In addition, the SSS technology described herein may be implemented as firmware, embedded software, a software platform, a standalone software application, and/or a network or cloud-based application/service. Such implementations may be applied, but not limited to: computers; cellular phones or smartphones; tablets; or other communications; audio, video, radar, sonar or medical-imaging devices or systems; or any other system or device whereby digital signal processing may improve performance or general usefulness.

The signal separation technology described herein may be utilized in Radar-based object detection and tracking systems that rely on radio waves as a method to determine the range, altitude, direction, speed or other characteristics of objects. The radar systems incorporate a process of transmitting pulses of radio waves (or microwaves), which are reflected off any object in their path, and subsequently return a portion of the wave's energy to a receiver.

Sample uses of radar may include, but are not limited to: general imaging; air defense and anti-missile systems; air traffic control; marine systems to locate terrain, vessels and other marine-based points of interest; aircraft anti-collision systems; ocean surveillance systems; outer space surveillance and rendezvous systems; meteorological tracking and monitoring; altimetry and flight control systems; guided missile target locating systems; terrain mapping, detection and location systems; oil and gas discovery and drilling systems; and ground-penetrating radar for geological observations.

The SSS technology described herein may be applied to the radar systems to mitigate "noise", "interference", and/or "clutter" at any point within the process and thereby enhancing the quality of the final data delivered to the end use application. It may be introduced independent of any other correction algorithms and systems or in conjunction with one or more of such systems, such as: pulse-doppler; moving target indication; automatic gain control ("AGC"); 3D mapping imaging applications; and/or horizontal, vertical, linear and circular polarization.

Reflected signals decline rapidly as distance increases, so noise introduces a radar range limitation, and the lower the power of the desired signal, the more difficult it is to discern it from the noise. Radar systems must overcome unwanted signals (both passive and active) while focusing on the actual targets of interest. Overcoming unwanted signals defines a radar system's signal-to-noise ratio ("SNR"), comparing the level of a desired target signal to the level of background noise or interference.

Introduction of SSS technology can increase a radar system's SNR, delivering improvements in isolating actual targets from the surrounding noise signals, interference and clutter. Generally noise and interference may be caused by: (i) internal source of random variations in the signal, which is generated by all electronic components; (ii) random variations superimposed on the desired echo signal received in the radar receiver; and/or (iii) external sources, for example thermal radiation of the background surrounding the target of interest. Clutter generally refers to radio frequency echoes returned from targets which are uninteresting to the radar operators, including: natural objects (e.g. rain, birds); atmospheric turbulence and other atmospheric effects (e.g. ionosphere reflections); man-made objects (e.g. buildings); and/or even radar countermeasures such as chaff. Some clutter may also be caused by a long radar waveguide between the radar transceiver and the antenna. The SSS methods and techniques described herein effectively mitigate interference from the above and other interfering signals.

The SSS technology described herein may be applied to all forms of radar signals, equipment and imaging software and hardware, regardless of frequency bands, scan types, display processors and systems utilized, and/or end uses and links.

The technology may also be applied to other systems that make use of other parts of the electromagnetic spectrum. One example is "LIDAR", which uses visible light from lasers rather than radio waves.

In addition, the technology may be applied to other radiofrequency-based (RF) systems, such as a scalable multifunction RF system which enables RF functionality (e.g. radar, communications, and electronic warfare) to be extended, identified, separated, concealed or otherwise manipulated in the performance of its functions.

In accordance with an exemplary and non-limiting embodiment a source separated signal generated using any process or combination of the previously described techniques herein may generate outputs presented as: (i) an audio file; and/or (ii) audio signal components; and/or (iii) speech feature vectors, all of which alone or in combination can serve as the inputs to a speech recognition engine or biometric voice identification system. The signal separation technology described herein may be utilized in speech recognition systems which may be used to: translate spoken words into text; control automated systems through voice translation; or convert spoken words into other outputs other than voice through an automated process.

Introduction of SSS described herein to improve speech and voice recognition can be applied independent of any other algorithms and systems used to improve recognition, or in conjunction with one or more of such systems. Additionally, SSS described herein can be applied to: original voice source signals that have been converted to digital signals and reconverted to analog signals prior to once again being converted to digital to be processed for speech recognition; or, to the audio signal once it has been converted to digital immediately prior to the speech recognition process.

Speech recognition can be referred to as "automatic speech recognition" ("ASR"), "computer speech recognition", and/or "speech to text". These systems may use training ("Speaker Dependent") or not use training by a speaker (referred to as "Speaker Independent" systems). Voice recognition generally refers to finding the identity of who is speaking, in contrast to what they are saying. Recognizing the speaker can simplify the task of translating speech in speaker dependent systems or it can be used to authenticate or verify the identity of a speaker as part of a security process.

The methodology applied to speech recognition generally first relies on the conversion of analog voice signal into digital audio which and then into recognized speech through the following process: (i) transform the digital audio into a better acoustic representation; (ii) apply rules so the speech recognizer knows what phonemes to expect; (iii) determine which phonemes are spoken; and (iv) convert the phonemes into words. The digital audio format can vary in terms of number of channels (e.g. mono vs. stereo), bitrate, and/or other characteristics.

In speech recognition feature vectors are extracted from speech waveforms. Typically, this is accomplished by first transforming the digital audio into the "frequency domain" using a windowed Fast-Fourier Transform (FFT), with a resulting output similar to what a spectrograph produces. In this domain, the frequency components of a sound for a given sample rate can be used to generate a graph of the amplitudes of frequency components for that sample. A feature vector is usually computed from a window of speech signals in every short time interval, and an utterance is represented as a sequence of these feature vectors.

An automated speech recognizer engine consists of a database of thousands of such graphs correlated to different types of sounds produced by the human voice, and the graph generated at that sample is matched against the database, producing a number that describes the sound. The most likely word sequence for the given speech feature vectors is found using two types of knowledge sources, i.e., acoustic knowledge and linguistic knowledge. Speech recognition engines use a mathematical technique called "Hidden Markov Models" (HMMs) for the acoustic features of speech sound and the stochastic language model is used to represent linguistic knowledge.

Interferers such as loud background noise or other ambient environmental sounds can often lead to misinterpretation of the source, resulting in the recognizer to determine a different vector than it would have if the user were in a quiet room with a high-quality microphone. Traditionally, background noise and variability problems are addressed using statistical models to figure out which phoneme is spoken; however, with strong interference the results are generally poor.

Introduction of SSS described herein in the initial steps of the recognition process, whereby the feature vectors are extracted from speech waveforms can greatly increase the robustness of determining the phonemes and utterances with a much higher confidence than other approaches. Application of SSS described herein can greatly mitigate the impact of interferers like ambient noise when extracting the feature vectors from the digital audio signal. SSS processed signals offer higher accuracy for voice recognition/identification and may be introduced into any existing voice recognition or voice security system, using either onboard processing (as with cell phone, tablet and other personal device security features) or linked to a network or cloud for controlled access devices or areas (e.g. restricted access facilities, buildings, vaults or other secured locations).

For voice/speaker recognition, similar processes are used to extract feature vectors of the speaker of interest; however, these vectors are compared and contrasted to a model/library of utterances originally created by the speaker, and a similarity score is generated. The SSS technology described herein can be introduced to voice recognition to enhance the robustness of the scoring by mitigating interference such as background noise or competing conversations by delivering improved feature vectors through either: (i) application to the original voice source signals that have been converted to digital signals and reconverted to analog signals prior to once again being converted to digital to be processed for speech recognition; or, (ii) application to the audio signal once it has been converted to digital immediately prior to the voice recognition process. SSS methods and systems described herein may be implemented as hardware or software on any PC, cell phone, tablet, or other system using voice/speech recognition, as a stand-alone processing technique or an add-on to existing software program.

In accordance with exemplary and non-limiting embodiments, a representation of signal elements may be developed in a model of a signal. The signal may be decomposed and grouped into tracks and/or tracklets corresponding to individual speakers, and the decomposed signal transformed into feature vectors adapted for use in a speech recognition engine. In such embodiments, one might develop and introduce a bias toward a specific speaker (e.g. the owner of a phone), so as to automatically pull out their speech and enhance it over all other sounds in the environment.

In another embodiment, a representation of signal elements, which may be referred to as speech features or speech vectors, may be developed in a source signal separation model of a signal. The signal may then be decomposed into speech feature vectors corresponding to individual speakers, and the decomposed representation used as an input to a speech recognition engine or biometric voice identification system.

In accordance with exemplary and non-limiting embodiments, a system comprises a sound gathering device, such as a microphone, with a nearby processor for engaging in cooperative/distributed computing of source signal separation. In some embodiments, the algorithm is scalable to be less processing-intensive so it can be used on cellular phones, smartphones, tablets or other mobile devices. In some embodiments, some of the processing may be conducted on the mobile device and then be distributed or transmitted to a remote processor or server with results then delivered back to the mobile device.

A hearing aid is any medical device that helps amplify and filter sounds to enable those with hearing impairments/ hearing loss to comprehend sound. Hearing aids consist of microphones (directional or omnidirectional) that convert sound to an electrical signal, which is then process by a digital signal processor to enhance targeted sounds and minimize unwanted background noise. The resulting targeted sounds are then amplified and rebroadcast via speakers in the patient's ear canal. Patient controls may be used for volume, noise reduction, and different environmental settings. Microphones, DSPs and controls for the device may be located on or within the hearing aid itself or in external control devices or cell phones.

The methods for source signal separation described herein may be embodied any design hearing aid device for the purposes of, but not limited to, amplifying targeted sounds, focusing on a single person speaking or sound source, focusing on limited region (such as a conversation at a table in a crowded restaurant while turning off/minimizing other sounds in the restaurant) and/or minimizing or eliminating background or other ambient noises that the user chooses not to hear and/or interfere with his/her comprehension of a desired conversation or sound source.

These SSS methods described herein may be employed across any hearing assistance device including but not limited to behind-the-ear aids, in-the-canal hearing aids, open canal aids, closed canal aids, air conduction hearing aids, bone conduction/bone anchored aids, eyeglass based aids, external device-linked aids, cell phone based aids, PDA based aids, iPad/Tablet based aids, PC based aids and cochlear implants. The application in hearing assistance devices includes both FDA-Regulated hearing aids and over-the counter non-prescription sound amplification devices.

The SSS methods described herein may also be linked to cell phone, television, radio, PC, Cloud, tablet and other hearing-assistance linked devices. One exemplary embodiment would be linkage to a television to enable the user to comprehend the broadcast while minimizing or turning off other background or ambient noises that impair his/her ability to comprehend the broadcast. Likewise a similar embodiment of this application would be the amplification of a cell phone transmission processed to minimize or eliminate ambient or background noises both at the site where the user is receiving the call as well as the unwanted background noises transmitted by the caller on the other end of the line.

The SSS methods described herein are intended work with any microphone (stereo or mono, directional or omni-directional) or microphone array located on or incorporated into any hearing assistance device, or located off the hearing assistance processing device and transmitted to that device via wireless, TR, Bluetooth, wired or other transmission methods. An exemplary embodiment would be cell phone or tablet linked hearing aids where sound is recorded on these devices and then transmitted to the ear for broadcast. Likewise, microphones for recording targeted sound sources may be located on the users eyeglasses, embedded into clothing or jewelry, worn around the user's neck, embedded in buttons, hats or other clothing or fashion accessories.

Microphone designs, including but not limited to the above examples, transmit targeted sounds to a processing device, where the SSS methods and system described herein process those sounds. The algorithm processing may take place on an independent DSP or in the devices CPU through embedded firmware. The deployment of these processing platforms may be on the device itself, an external control unit, a tablet, PC, PDA, cell phone or transmission through a cloud or transmission back to a central server over a cellular or wireless network. Signals recorded on bilateral hearing aids or array microphone systems may be transmitted across devices or to an external processing unit, including but not limited to those described above, for real time or near-real time processing.

Signals processed with the SSS techniques described herein are then resynthesized into an output signal to be played back through a speaker in or near the users ear, or through a neural or bone stimulation device for direct sensorineural processing. Speaker based devices for rebroadcast include open canal and closed canal systems, headphones, telephonic devices, cell phones, Bluetooth and other speaker based devices. Resynthesized signals may be captured on the same device (such as a behind the ear hearing aid) or transmitted to the output speaker devices from an external processing unit (such as a tablet, cell phone, PC or other portable processor) and may be a single reprocessed input or the combination of many simultaneously recorded and mixed inputs from multiple recording devices.

Hearing assistance technologies making use of SSS processing described herein may feature clinical programmed parameters or user controlled parameters to adjust device processing to a specific environment. An exemplary embodiment of clinician parameters would be distance based SSS and background noise reduction setting that may be programmed at the time of the initial fitting or subsequently adjusted via telephonic or PC/web interface reprogramming. An exemplary embodiment of user based controls would be onboard device dials, external control units, or PC/cell-phone/Tablet based applications that allow the user to control the mix of targeted speech to background noise, the level of targeted speech amplification, the use of real-time or near-real-time transmission, distance and vector based controls to govern the area or direction in when they would like to gather targeted sound sources, the ability to tap into TV, cell phones, radios, voice control systems or other PC based devices for direct interface. Users may also have the ability to set the device for various modes, such as restaurants or close conversations, or control the lead-in time for playback such that they can determine tradeoffs between delayed lead-ins for targeted speech vs intelligibility or naturalness of rebroadcast sounds.

In accordance with exemplary and non-limiting embodiments, a system comprises a sound gather device, such as a microphone, or a sound transmitting device for communication (e.g using Bluetooth or other transmission protocol), with a nearby processor for engaging in cooperative/distributed computing of source signal separation. In some embodiments, the algorithm is scalable to be less processing-intensive so it can be used on hearing aids. In some embodiments, some processing may be distributed to remote server by the processor with results forwarded to the hearing aid.

In one variation, a cell phone can send data to a server that can perform more processing. In some instances, as when a hearing aid really needs more processing power and it can't transmit to a remote server, it may transmit to a nearby device such as a phone in your pocket. The phone may act like a local super booster or external processing system. In such an instance, the hearing aid could transition to a defined mode and use extra computing power to offload processing to the cell phone and achieve improved capabilities. In one example, controls may be placed on an actual cell phone or computing tablet such that, for example, a person sitting in a restaurant can put the cell phone down on the table and can tap a screen or move a slider control to tailor processing and source signal separation in the directions of the people sitting at the table. In response, an algorithm operates to help enhance table-mates conversation.

Figure 57:
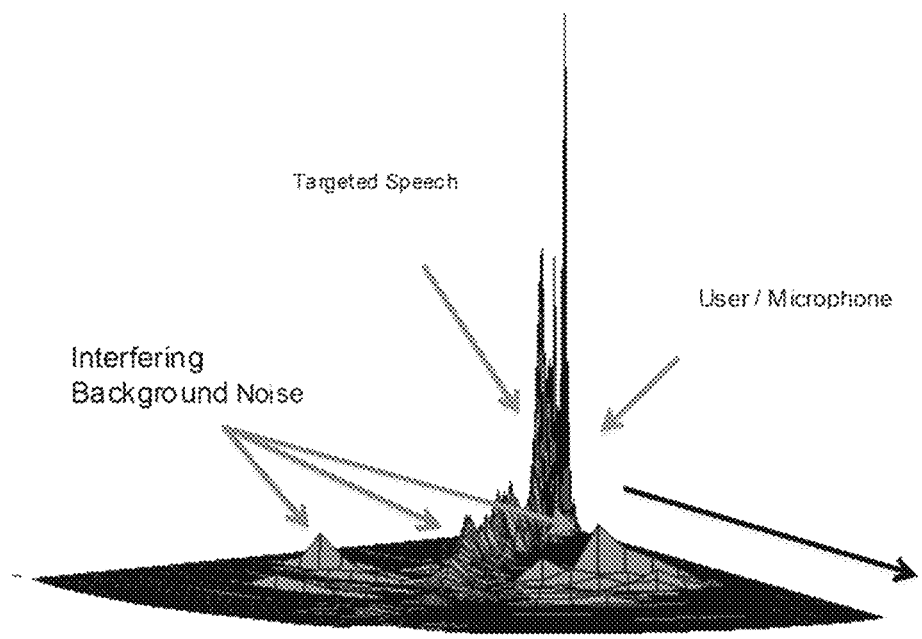
FIG. 57 is an illustration of a computer generated interface according to an exemplary and non-limiting embodiment.

With reference to FIG. 57, there is illustrated an exemplary and non-limiting embodiment of such a computer generated interface for tablet or cell phone control.

In another embodiment, ambient noise or unwanted background noise may be removed from an input source signal to produce a deconstructed source signal which then may be re-combined with the ambient or background noise at a lower noise level, and outputting the combined signal. In some embodiments, the user may dynamically or statically alter the noise level of the ambient noise re-introduced.

For mobile phone calls on cellular networks, the audio is captured through an embedded microphone and is subsequently converted from an analog to a digital signal (typically referred to as an "A to D" conversion). The resulting digital signal is then transmitted through the cellular network in a compressed or non-compressed form to an end terminus whereby it is delivered as audio output. Anywhere along the transmission process or at the endpoint of delivery, the digital signal is converted back to an analog signal.

Typically, audio captured by a phone (e.g. cellular; speakerphone; VoIP; etc.) for sending may contain ambient noise or other interferences which will not inhibit the conversion nor transmission of the audio file, but may impact the general quality of the output file to the intended receiver. For example, the microphone in a mobile phone may pick up the voice of the speaker, but may also be capturing the noise of other conversations occurring near the caller of interest, which will be converted and transmitted to the receiver of the call. When the audio is converted and delivered to the receiver, the listener may find it difficult to understand the speaker with the interfering noise also delivered. Generally, certain algorithms such as noise and echo cancellation are applied at the point of capture (e.g. mobile phone), where the signal is converted for transmission; however, the applied algorithms traditionally only mitigate some of the noise/interfering effects and the receiving party still receives interfering environmental noises which may impede the perceptibility of the sender.

The methods for source signal separation described herein may be introduced into any telephony application for the purposes of, but not limited to, amplifying targeted sounds and/or focusing on the cell phone or telephone user or the person of interest speaking on a conference call while minimizing or eliminating background or other ambient noises that a receiving party would prefer not to hear and/or have transmitted, as such unwanted transmissions would interfere with his/her comprehension of the calling party, speaker of interest and/or conversation.

These SSS methods described herein may be introduced and applied during any point of the source signal capture, conversion, transmission and/or delivery/output to the receiver in a telephony application. The SSS described herein methods may be integrated to be always applied during a call, or may be introduced with a control mechanism that enables the sender or receiver to request the introduction of the SSS methods described herein to provide mitigation of interferers during a call. SSS systems and methods may be incorporated as firmware, embedded software, a stand-alone software application or platform, or an additional software function or feature, which may be implemented from the point of collection, transmission or delivery (e.g. cell phone or network) to be used alone or in conjunction with other algorithms for noise reduction, call clarity and/or other performance benefits.

In car voice control systems face challenges in processing elements of a targeted audio command mixed with any of the following or similar interfering sound sources: road noise, external environmental noise, radio noise, HVAC noise, unintended cabin noise and accompanying passenger noises. The SSS methods described herein may be used in conjunction with in-car voice response systems to extract and amplify targeted commands from unwanted or interfering background noise for accurate voice response system processing, automotive controls and vehicle security.

The SSS methods described herein may interact with a voice command system through the use of speech or extracted speech features that are processed by the voice response system. The processing system may be contained on-board in a car-based-PC or transmitted to a central processing server outside of the vehicle. An exemplary embodiment of the voice response commands controlled by such a system include but are not limited to in-car navigation, auto system controls such as HVAC, windows, radio, seat function, wipers, automatic door locks and controls, sunroof controls and third party integrated device controls such as cell phone integration and iPod, tablet, mp3, audio and entertainment device controls. The SSS system described herein may also be linked to cellphones, Bluetooth and other headset systems to process both send and receive signals passing through the vehicles central audio processing system.

An additional deployment of the SSS methods described herein is onboard voice biometrics for vehicle controls and security. Speech features captured by the SSS systems and methods described herein enable the extraction of precise speech features unique to each individual user. Representative deployments of this control feature include but are not limited to driver/user assigned vehicle locks and alarm controls, driver engine start and turn-off controls (initiated onboard or through an external control device such as a cell phone), driver and/or specific user controls of navigation systems and non-essential vehicle control systems.

The SSS systems described herein may be enabled by a single microphone (stereo or mono, directional or omnidirectional) or an array of microphones build into the cabin or through linkage to an external system such as a Bluetooth headset or other hands free cellphone control device. The system can be deployed and programmed by the user such that the voice control system only accepts prompts for the driver's seat, both the driver and passenger seats, or an individual with a designated biometric signature. Separate controls may also be added such that individuals in the rear seats can control rear HVAC systems or rear entertainment systems.

Drive or additional party voice biometric controls may be programmed through use of the system or through a download user voice biometric profile from another device using the SSS methods described herein.

The SSS methods described herein may be deployed in a series of medical imaging applications that make use of static imaging or time-series imaging signal analysis including but not limited to the following: Ultrasound, MRI, CT Scans, PET Scans, X-Rays, SPECT, Gamma Camera Imaging, Nuclear Imaging, Photoacoustic Imaging, Breast Thermography, and Optical Coherence Tomography. The application of the SSS methods described herein enable improved resolution of targeted images and the reduction of noise generated by the imaging equipment in the above mentioned and other medical imaging systems.

An exemplary embodiment of the SSS methods and systems described herein would be the application in medical ultrasound systems to enhanced resolution and reduce the noise generated by overlapping elements in the ultrasound probe. SSS algorithms described herein may be incorporated into freestanding ultrasound systems, pc-based systems, tablet systems, smart phone apps, pdas, and handheld systems. The SSS algorithms described herein may be incorporated as firmware that runs off the devices internal CPUs, software, or apps loaded on to the devices, or as DSPs or other chips incorporated into the control box or onto the ultrasound probe itself.

The SSS methods and systems described herein for improved ultrasound may be incorporated pre- or postsummation of the data collected by the individual elements in the probe.

The SSS methods and systems described herein can be used pre and/or post beam formation so as to be compatible with adjustments in beam angles and signal intensity to compensate for differences in targeted anatomy.

The SSS methods and systems described herein may be used with any form of ultrasound (aka sonography or echosonography) imaging software or add on imaging analysis programs including but not limited to 2D ultrasound, 3D ultrasound, 4D ultrasound, tissue doppler, flow doppler tissue strain analysis, elasticity analysis and other applications.

The SSS software described herein may be applied across all clinical practices including both diagnostic and surgical applications. Embodiments of SSS enhanced ultrasound image include ultrasound assisted biopsies, ultrasound assisted catheter placement, echocardiology, cardiology and cardiac surgery applications, orthopedic and orthopedic surgical applications, sonography and other obstetrics and gynecology applications—both imaging and surgical—urological applications, gastrointestinal applications, soft tissue applications, head, neck and cranial applications.

The ultrasound applications described herein may also be used with both ultrasound hardware and imaging software programs for veterinary and industrial applications, including but not limited to ultrasonic analysis of composite materials, structures, and geological surveys.

Sonar uses sound propagation to navigate, communicate with and/or detect objects on or under the surface of the water. There are two types of sonar: (i) passive sonar that "listens" for sounds generated by target objects; and (ii) active sonar that emits pulses of sounds and listens for echoes. Sonar may be used as a means of acoustic location and of measurement of the echo characteristics of "targets" in the water, and is used in applications including, but not limited to: submarine navigation; guidance for torpedoes and mines; underwater survey and mapping; echo sounding; pipeline inspection; wave measurement; and determining the course, range, trajectory and speed of a target of interest (aka Target Motion Analysis).

The SSS methods and systems described herein may be used to enhance the signal quality with any form of active sonar which uses a sound transmitter and a receiver, which can be operated monostatic, bistatic or multistatic configurations and the acoustic frequencies may vary from very low (infrasonic) to extremely high (ultrasonic). The sonar may utilize a pulse of sound generally created electronically using a signal generator, power amplifier and electro-acoustic transducer/array at constant frequency or a "chirp" of changing frequency (enabling pulse compression upon reception). The SSS may also be incorporated in conjunction with a beam former used to concentrate the acoustic power into a beam, which may be swept to cover the required search angles. Occasionally, the acoustic pulse may be created by other means, e.g. (1) chemically using explosives, or (2) airguns or (3) plasma sound sources.

The SSS methods and systems described herein may be used to enhance the signal quality with any form of passive sonar, which typically "listens" without transmitting any pulses and has a wide variety of techniques for identifying the source of a detected sound, generally by comparing the detected sound against large sonic databases. Through use of passive sonar, if the target radiated noise level is high enough it allows the target to be identified; however, operation may be affected by variations in sound speed determined by the water's bulk modulus, mass density, temperature, dissolved impurities (usually salinity), and even water pressure.

The SSS methods described herein may be applied to all forms of active and passive sonar systems to address sound variations as well as mitigate noise, interference, and/or scatter at any point within the process of analysis once sound or echo has been received, and thereby enhancing the quality of the final data delivered to the end use application. It may be introduced in the software or hardware components of the receiving, transmission or display systems independent of any other correction algorithms and systems or in conjunction with one or more of such systems, such as beamforming and narrow beam transmissions.

Sources of noise that interfere with the desired target echo or signature range from waves and shipping to turbulence and marine life. Additionally, the motion of the receiver through the water can also cause speed-dependent low frequency noise. When active sonar is used, scattering occurs from small objects in the sea as well as from the bottom and surface.

In addition to active and passive sonar, the SSS technology described herein may be applied to deliver benefit to other sonar-based systems including, but not limited to, synthetic aperture sonar and parametric and non-linear sonar.

The SSS methods described herein may also be introduced to hydroacoustic systems, including underwater acoustic communication used to send and receive messages below water. There are several ways of employing such communication but the most common is using hydrophones. Underwater communication is difficult due to numerous factors, which can be addressed by SSS, including but not limited to: multi-path propagation; time variations of the channel; small available bandwidth; and strong signal attenuation.

Much like cell phones and other telephony systems, headsets, speakerphones and general microphone based systems (used either alone or in conjunction with cellular or other telephony networks) have the unintended effects of receiving, processing and transmitting the device user as well as unintended background noise and ambient noise present at the time of transmission/recording. Current systems are not capable of isolating the targeted users from other ambient or interfering noises that can overpower the speaker and make it difficult for the receiver/user to comprehend the intended transmission/recording. Representative examples of this problem may include: the transmission of airplane noise through flight control systems; the broadcast of PA announcements at the airport through a cell phone headset; room noise broadcast through a conference call speaker system; auto and outdoor noises broadcast through a "drive-thru" ordering system; or even crowd noise broadcast over a coach's headset.

The SSS systems and methods described herein may be incorporated into such microphone dependent devices for the purpose of improving the quality/intelligibility of the user relative to unwanted/unintended ambient/background noises captured by the microphone in the transmitting/recording device. The SSS methodology described herein may be optimized for each device so that it only transmits sound sources emanating from a specific speaker, or defined limited area/radius, such as the proximal device user and turning off far field noises. This is achieved by using SSS methods and systems described herein to extract and selectively transmit/record sounds from the targeted speaker and not the unintended background noises.

An exemplary embodiment of such a system would be the addition of the SSS systems and methods described herein to a Bluetooth headset. The SSS technology may be added to the headset as a dedicated DSP or firmware added to an existing processor. It would be capable of processing the signals captured by the devices microphone (directional or omni-directional), extracting the targeted sound source from the unintended noise, before the resulting signal is transmitted or recorded. This would assure that the recording device or transmitting systems only records the extracted sound source, hence increasing the quality and intelligibility of that sound source. This new step in the processing chain may be used as a stand-alone feature or used in combination with other audio processing and enhancement algorithms.

Another exemplary embodiment of the SSS systems and methods described herein would be used in microphone-based recordings. Targeted sound sources can be extracted and recorded on one channel, while background noises are recorded on a separate channel. Each channel then may be remixed for optimal/desired sound effects and quality.

In accordance with exemplary and non-limiting embodiments, a system comprises a sound gathering device, such as a microphone, or a sound transmitting device for communication (e.g. using Bluetooth or another communications protocol), with a nearby processor for engaging in cooperative/distributed computing of source signal separation. In some embodiments, some processing may be distributed to remote server by the processor with results returned and transmitted through the communication system.

In another embodiment, ambient noise or background noise distinct from the targeted input signal may be removed from an input source signal to produce a deconstructed source signal which may then be re-combined with the ambient or background noise at a lower or reduced presentation level and outputting the combined signal. In some embodiments, the user may dynamically or statically alter the presentation level of the reintroduced ambient noise.

The growth of voice recognition and voice driven command systems for TV, video games, entertainment systems and other interactive devices has been limited by the challenges of interfering noises, unintended speakers interrupting commands, and background noise impacting command recognition and response. The SSS methods described herein may be embedded in any such entertainment device for the purpose of assuring accurate voice recognition and response. Additionally, such devices may be linked or utilize a network-dependent solution for speech and voice recognition similar to those described {in the section detailed earlier} to which SSS methods described herein may be applied.

An exemplary embodiment of the SSS systems and methods described herein would be the use of SSS in voice response/voice controls for television function. SSS described herein enables the system to focus on a specific speaker (s) that may be preprogrammed in the system or an unknown speaker talking into a remote control or other similar device. The speakers' voice commands would control all device features and those of related devices including but not limited to cable TV boxes, DVR systems, satellite systems, DVD players, integrated sound systems, PCs, video game systems/consoles, internet connectivity, cloud connectivity, video conference systems, VOIP/internet phone systems, and other similar devices.

The TV voice response controls may be driven by any microphone or speaker/microphone combination systems including but not limited to television embedded microphone/speakers, dedicated remote control microphone/speakers, external microphone/speaker systems, cell phones, tablets, pcs, video game systems and headsets. Control features may use directional/omni-directional microphones and/or may make use of IR, Bluetooth, wifi, RF or wired linkages to the system.

The system permits two-way interaction both accepting and responding to voice driven queries, and it also serves as the interface for video conferencing, web conferencing, VOIP, and web based conference calls.

The SSS methods and systems for Voice Controlled TV described herein may or may not resynthesize the received speech. In noisy environments, received speech may be processed as speech features or speech vectors based off the SSS mathematical models described herein for purposes of driving a speech recognition engine or voice response system. With resynthesized speech, varying levels of background noise may be reincorporated.

The system may be trained to respond to a targeted voice or voices. Speaker recognition training may be generated through device use or the citation of speech at the time of device initialization.

The power supply emits a continuous low-level noise, which e.g., averages roughly 50 Hz in some applications. Fluctuations in power demand cause slight variations in this noise level: increased electrical demand lowers the noise level, while reduced demand levels have the opposite effect. Fluctuations in power demand give the power grid the capability of providing a unique time/date signature that can be correlated with any recording.

The SSS systems and methods described herein may be used to monitor the electric grid to create a highly accurate time series signature of the system. This signature is derived from any recording device (audio or video) or source signal type (analog or digital). The low level audio signal is consistent across the system and the signal analysis may take place at generation station, specific machine or any other location. The SSS systems and methods described herein extract the signal impact of electrical supply from any live feed or recording to provide a highly accurate time series signature of the electrical grid. This signature can be monitored real-time, near real-time or subsequently analyzed.

An exemplary embodiment of this system is the use of SSS described herein to predict impending brown-outs, power spikes, power failures or disruptions in power supply. This can occur at a grid-wide level, at an individual site, or on an individual device by analyzing changes in the low-level noise vs historic standards/predictors. A recording device would record the ambient noise at any of the above locations, machines or devices and then SSS methods described herein would separate the targeted electrical noise from other noises. The SSS methods and systems described herein would generate a reading of the power noise and send a warning of an impending event if the noise level posed any concerns. The warning may appear on the device itself or be sent through a network, wireless or through the cloud to any monitoring device, PC, tablet, cell phone or any other device.

Another exemplary embodiment of this system in forensic audio analysis would be identification and validation of the date and time during which a recording was created. The SSS methods and systems described herein may be used to extract the electrical system noise form a recording and generate a highly accurate mathematical representation of that signal. That signal may be correlated to known recordings form the electrical grid to determine the exact time and date at which the recording was created. Such authentication/validation is necessary for verifying recordings to be admitted into evidence and to assure that such recording have not been adulterated. The analysis may be conducted on any type of recording (audio or video, digital or analog), file format, or duration of recording.

In one exemplary but non-limiting embodiment, the new measurement tools and path propagation techniques introduced in this application enable roomscaping or the sound mapping of a targeted environment. The information about echoes and reflected signal elements (reverberation) provided by the path propagation mitigation approaches provide important geolocational clues about the structure of the environment in which the signals are generated. For example, the receipt of the emitter signal in combination with various reflections or indirect bounce paths of that signal provide important geometrical and distance information about the shape of a room or the various interfering structures between the source signal emitter and the receiver. This information can be used to determine the shape of a room or geographical features around the source signal emitter, providing either an image (2D or 3D) of the landscape or mathematical data that may be used to track the movement of the emitter or various other entities in its presence.

The parameters of the roomscaping process can be used to inform the shaping of output signals to achieve a spatial perception. These parameters may be measured or created synthetically. For example, audio for video games or home entertainment systems may be shaped to produce a virtual soundscape. The soundscape gives the listener a sense of location associated with the sound source by altering phase or speaker mix, such as giving the perception that a sound source is coming from behind the user in a video game or more accurate locational sound generation in a home theater system.

In one exemplary but non-limiting embodiment, the high resolution signal analysis afforded by the XCSPE techniques and new measurement tools described herein provide more accurate AOA and TDOA estimates. These more precise estimates can be used in conjunction with the SSS systems and methods to more precisely locate, track and target individual source signal emitters. The technique is source agnostic and may be used with a variety of input signals including but not limited to audio, video, sonar, radar, ultrasound or other signal capture device employing an arrayed receiver or time series analysis. Conversely the geolocational data can be used to inform and tailor the shape of an output signal to achieve a desired effect. Exemplary but not limiting embodiments are the delivery of ultrasonic therapy or intensity modulated radiotherapy tailored to work on one type of tissue in a given location, or the shaping of an output signal to mask the recognition of an object on sonar or radar.

The precise TDOA and PPE estimated provided by these algorithms may be used to enhance the performance of a beam forming system.

Fit User Interface allows a user to view and interact with the tracking, grouping, and peak selection for resynthesis stages of processing. User interface may be used "offline" to view and modify stored data, or "online" to command the processing components and interact with the data in real-time. It may be used to analyze data, and modify component parameters. It may detect optimal component parameters from user interaction. For example, given a user's selection of data for resynthesis, the Fit User Interface may calculate processing parameters for detecting similar data.

In accordance with an exemplary and non-limiting embodiment, a user interface is provided for viewing a signal as: tracks; a plurality of potentially coherent tracklets and/or coherent groups for editing the visual representation to at least one of add, remove or group signal data with the tracks, tracklets and/or coherent groups.

In another embodiment, the user interface may be utilized to view a signal as: tracks; a plurality of potentially coherent tracklets; and/or coherent groups wherein a user can click on a track, tracklet; and/or coherent group and to be presented the data associated with that track, tracklet and/or coherent group. In another embodiment, the user interface may be utilized for viewing a signal as a track; plurality of potentially coherent tracklets; and/or coherent groups wherein a user can search and find a track and/or tracklet within the interface based on input comprising characteristic data about that track, tracklet, and/or group. In another embodiment, a user may change the scoring function on the fly to modify what data is associated into tracks, groups, and/or tracklets.

Figure 58:
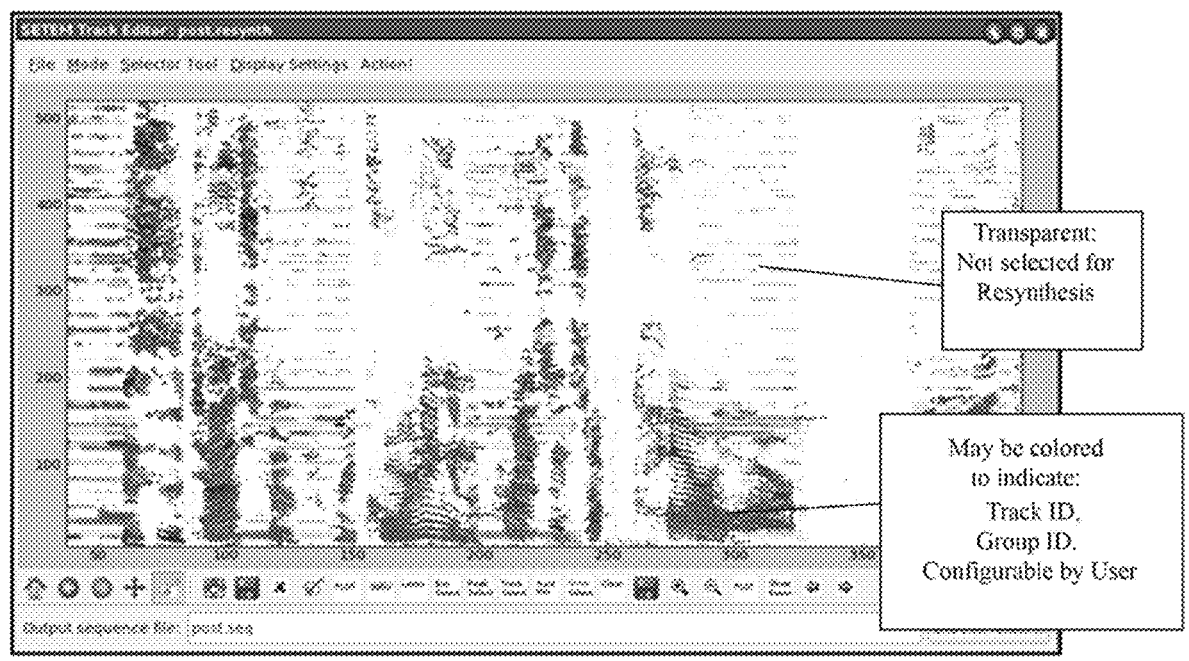
FIG. 58 is an illustration of a track editor according to an exemplary and non-limiting embodiment.

With reference to FIG. 58, there is illustrated an exemplary embodiment of a track editor as may be practiced in accordance with the embodiments and description above. As illustrated, the track editor displays a plurality of tracklets composed of oscillator peaks. In various exemplary and non-limiting embodiments, oscillator peaks may be colored according to track-id. In yet other embodiments, oscillator peaks may be colored according to coherent group-id. In other embodiments, oscillator peaks may be colored or set transparent according to whether or not they are selected for resynthesis. In other embodiments, oscillator peaks may be colored according to any other oscillator peak parameter. In other embodiments, oscillator peaks may be scaled according to amplitude, amplitude with respect to background power, or with equal size.

Figure 59:
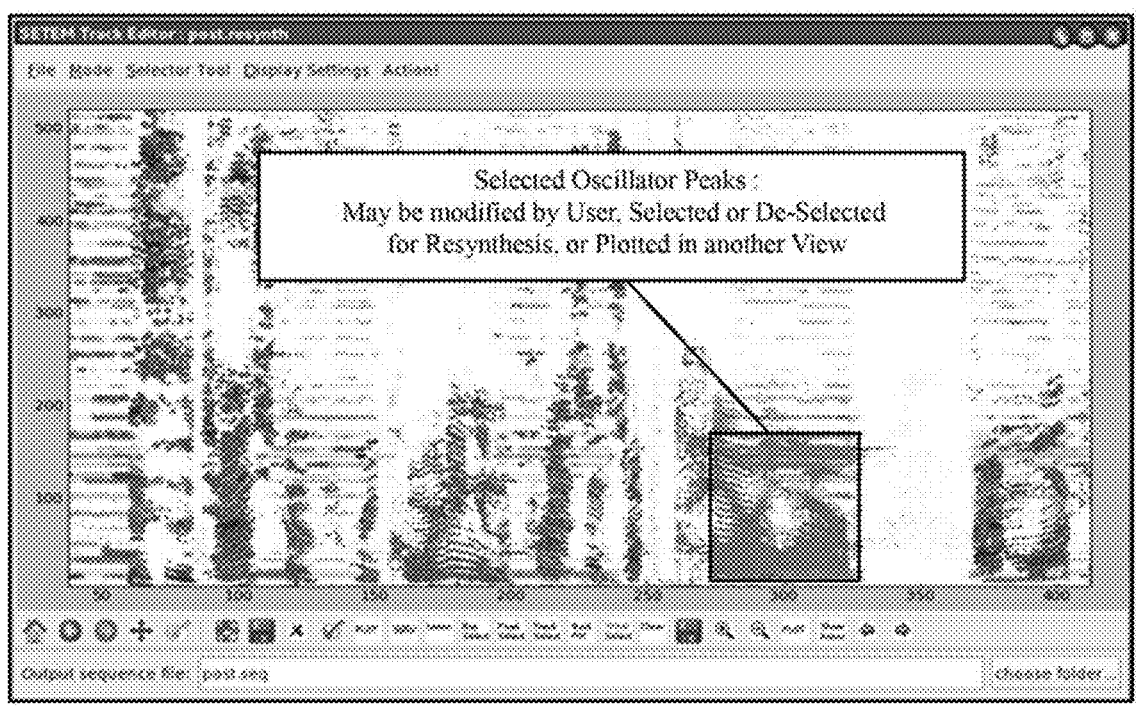
FIG. 59 is an illustration of a track editor post-analysis and tracking according to an exemplary and non-limiting embodiment.

With reference to FIG. 59, there is illustrated and exemplary and non-limiting embodiment of a post-resynthesis track editor GUI. In accordance with exemplary and non-limiting embodiments, a user may select data displayed in post-resynthesis track editor GUI in order to perform an action on the selected data. In one embodiment, data may be selected by area such as via drawing with a box or a lasso. In other embodiments, a user may select data by tracklet such as by clicking on any peak in a tracklet. In other embodiments, a user may select data by coherent group such as by clicking on any peak in a coherent group. In yet another embodiment, a user may select data by oscillator peak such as by clicking on any peak.

Once selected, a user may select an action to be performed on the data. For example, a user may plot the data in another view wherein there is visually rendered oscillator peak statistics, direction of arrival, time-domain audio, spectrogram data and the like. In some embodiments, a user may Instruct the system whether or not to include select peaks for resynthesis such as via a "Turn on/Turn off" option.

Figure 60:
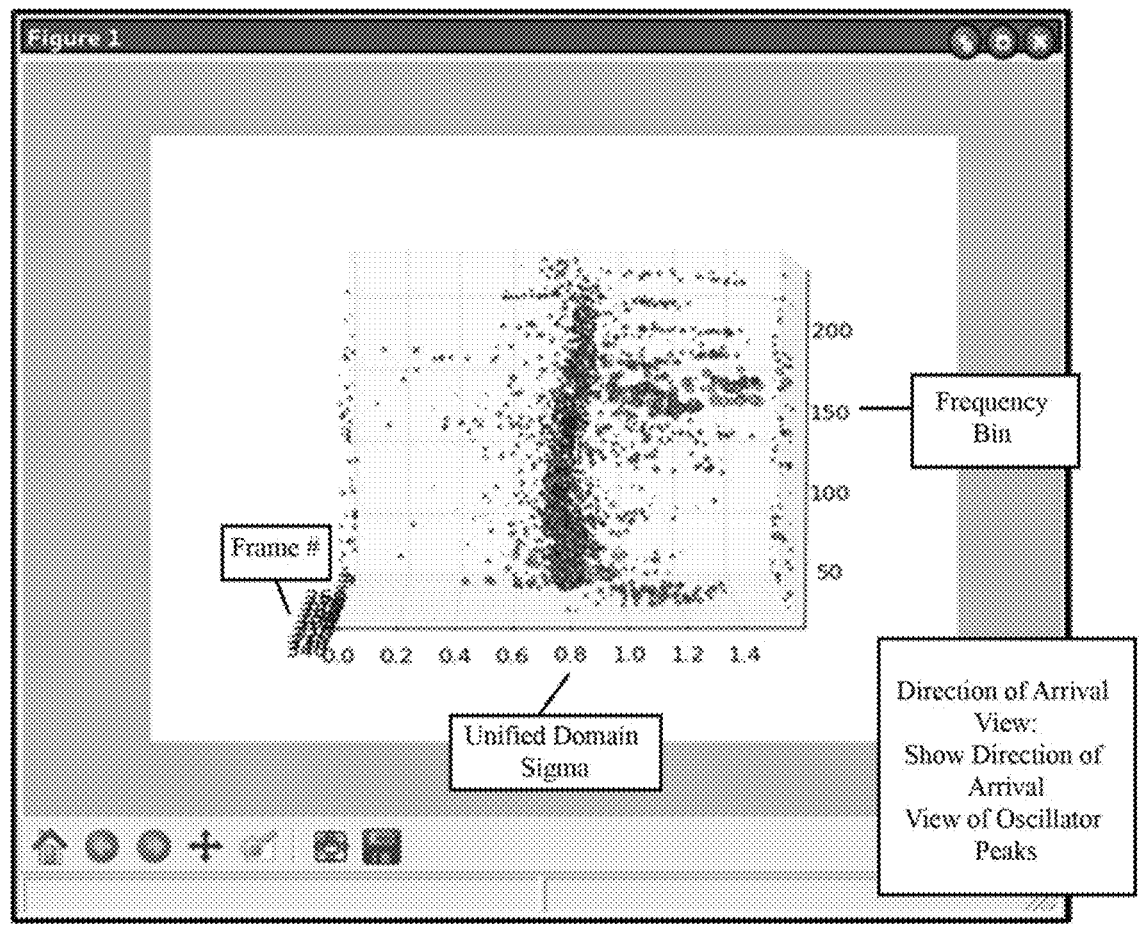
FIG. 60 is an illustration of track editor data visualizer according to an exemplary and non-limiting embodiment.

With reference to FIG. 60, there is illustrated an exemplary embodiment of a data visualizer for displaying user selected data as described above.

The SSS methods and systems in accordance with various embodiments may be implemented in software, hardware, firmware, or any combination thereof. The processes are preferably implemented in one or more computer programs executing on a variety of computer-equipped devices (e.g., personal computers, mobile phones, imaging devices, hearing aids, interactive voice response systems, conference call systems, audio recording devices, in-vehicle voice activation systems, dictation systems, and communications systems). Such devices include, among other things, a computer processor (e.g., general and special purpose microprocessors), a storage medium readable by the processor, and input and output devices. Each computer program can be a set of instructions (program code) in a code module resident in the random access memory of the device. Until required by the computer processor, the set of instructions may in some cases be stored in another computer memory (e.g., semiconductor memory devices, hard disk drives, or removable memory devices such as optical disks, external hard drives, memory cards, or flash drives) or stored on another computing device and downloaded via the Internet or other network.

With reference to FIG. 61, there is illustrated an exemplary and non-limiting embodiment of a method. At step 6100, a signal is recorded by a plurality of signal recorders. Next, at step 6102, at least one super-resolution technique is applied to the signal to produce an oscillator peak representation of the signal comprising a plurality of frequency components for a plurality of oscillator peaks. Next, at step 6104, at least one Cross Channel Complex Spectral Phase Evolution (XCSPE) attribute is computed for the signal to produce a measure of a spatial evolution of the plurality of oscillator peaks between the signal recorders and a measured time of flight of the plurality of oscillator peaks. Next, at step 6106, a known predicted XCSPE curve (PXC) trace is identified corresponding to the frequency components and at least one XCSPE attribute of the plurality of oscillator peaks. Finally, at step 6108 the identified PXC trace is utilized to determine a spatial attribute corresponding to an origin of the signal.

With reference to FIG. 62, there is illustrated an exemplary and non-limiting embodiment of a method. First, at step 6200, a signal is recorded by a plurality of signal recorders. Next, at step 6202, at least one super-resolution technique is applied to the signal to produce an oscillator peak representation of the signal comprising a plurality of frequency components for a plurality of oscillator peaks. Next, at step 6204, at least one Cross Channel Complex Spectral Phase Evolution (XCSPE) attribute for the signal is computed to produce a measure of a spatial evolution of the plurality of oscillator peaks between the signal recorders and a measured time of flight of the plurality of oscillator peaks. Then, at step 6206, a known predicted XCSPE curve (PXC) trace corresponding to the frequency components and at least one XCSPE attribute of the plurality of oscillator peaks is identified. At step 6208, deviations away from the PXC trace of a plotted position for each of the plurality of oscillator peaks are measured and, at step 6210, a path propagation effect (PPE) is determined based, at least in part, on the deviations and an amount of reverberation in the original signal.

Having thus described several illustrative embodiments, it may be appreciated that various alterations, modifications, and improvements will readily occur to those skilled in the art. Such alterations, modifications, and improvements may be intended to form a part of this disclosure, and may be intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

While only a few embodiments have been shown and described, it will be obvious to those skilled in the art that many changes and modifications may be made thereunto without departing from the spirit and scope as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. Various embodiments described herein may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of the program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SAAS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

All documents referenced herein are hereby incorporated by reference.

We claim:

1. A method of processing a signal comprising:
    taking a signal recorded by a plurality of signal recorders;
    applying at least one super-resolution technique to the signal to produce an oscillator peak representation of the signal comprising a plurality of frequency components for a plurality of oscillator peaks;
    computing at least one Cross Channel Complex Spectral Phase Evolution (XCSPE) attribute for the signal to produce a measure of a spatial evolution of the plurality of oscillator peaks between the signal recorders;
    identifying a known predicted XCSPE curve (PXC) trace corresponding to the frequency components and at least one XCSPE attribute of the plurality of oscillator peaks;
    measuring deviations away from the PXC trace of a plotted position for each of the plurality of oscillator peaks; and
    determining a path propagation effect (PPE) based, at least in part, on the deviations and an amount of reverberation in the original signal, wherein the PPE comprises at least a phase related deviation.

2. The method of claim 1 further comprising:
    utilizing the PPE to identify a signal emitting entity.

3. The method of claim 1 further comprising:
    utilizing the PPE to remove an effect of reverberation from the signal.

4. The method of claim 1, wherein the PPE comprises an amplitude related deviation.

5. The method of claim 4 further comprising:
utilizing the PPE to identify a signal emitting entity.

6. The method of claim 4 further comprising:
utilizing the PPE to remove an effect of reverberation from the signal.

* * * * *

UNITED STATES PATENT AND TRADEMARK OFFICE
CERTIFICATE OF CORRECTION

PATENT NO. : 10,978,088 B2
APPLICATION NO. : 16/656058
DATED : April 13, 2021
INVENTOR(S) : Kevin M. Short et al.

It is certified that error appears in the above-identified patent and that said Letters Patent is hereby corrected as shown below:

On the Title Page

On the page 2, in Column 2, item (56) under "Other Publications", Line 39, delete "Patentabiliy" and insert -- Patentability --, therefor.

In the Drawings

On sheet 12 of 62, in Figure 12, reference numeral 1202, Line 1, delete "CPSE" and insert -- CSPE --, therefor.

On sheet 12 of 62, in Figure 12, reference numeral 1204, Line 1, delete "CPSE" and insert -- CSPE --, therefor.

In the Specification

In Column 12, Line 16, delete ""*"," and insert -- ".*", --, therefor.

In Column 12, Line 16, after "as" insert -- ".*" --.

In Column 16, Line 10, delete "CPSE" and insert -- CSPE --, therefor.

In Column 17, Line 30, delete "t)" and insert -- τ) --, therefor.

In Column 26, Line 38, delete "$Be^{io2}$" and insert -- $Be^{io2}$, --, therefor.

In Column 33, Line 8, delete "CPSE" and insert -- CSPE --, therefor.

In Column 36, Line 53, after "approximately" insert -- ± --.

In Column 36, Line 54, after "to" insert -- ± --.

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,978,088 B2

In Column 39, Line 22, delete "CPSE" and insert -- CSPE --, therefor.

In Column 42, Line 16, delete "CPSE" and insert -- CSPE --, therefor.

In Column 43, Line 57, delete "$\vec{f}_1$" and insert -- $\vec{\Gamma}_1$ --, therefor.

In Column 47, Line 61, delete "CPSE" and insert -- CSPE --, therefor.

In Column 47, Line 62, delete "CPSE" and insert -- CSPE --, therefor.

In Column 54, Line 54, delete "betaken" and insert -- be taken --, therefor.

In Column 82, Line 8, delete "27," and insert -- 2π, --, therefor.

In Column 84, Lines 27-28, delete

"$\alpha_0 e^{i(2\pi f0t+\varphi 0)} + \alpha_0 e^{-i(2\pi f0t+\varphi 0)} + \alpha_1 e^{i(2\pi f0t+\varphi 1)} + \alpha_1 e^{-i(2\pi f0t+\varphi 1)}$"

and insert

-- $\alpha_0 e^{i(2\pi f_0 t+\varphi_0)} + \alpha_0 e^{-i(2\pi f_0 t+\varphi_0)} + \alpha_1 e^{i(2\pi f_0 t+\varphi_1)} + \alpha_1 e^{-i(2\pi f_0 t+\varphi_1)}$ --, therefor.

In Column 84, Lines 32-33, delete

"$\{\alpha_0 e^{i(2\pi f0t+\varphi 0)} + \alpha_1 e^{i(2\pi f0t+\varphi 1)}\} + \{\alpha_0 e^{-i(2\pi f0t+\varphi 0)} + \alpha_1 e^{-i(2\pi f0t+\varphi 1)}\}(*)$"

and insert

-- $\{\alpha_0 e^{i(2\pi f_0 t+\varphi_0)} + \alpha_1 e^{i(2\pi f_0 t+\varphi_1)}\} + \{\alpha_0 e^{-i(2\pi f_0 t+\varphi_0)} + \alpha_1 e^{-i(2\pi f_0 t+\varphi_1)}\}(*)$ --, therefor.

In Column 84, Lines 53-54, delete

"$e^{-i2\pi f0t}e^{-i\varphi 0}\{\alpha_0 e^{-i\tau/2}e^{i\tau/2} + \alpha_1 e^{-i\tau/2}e^{-i\tau/2}\} = e^{-i2\pi f0t}e^{-i\varphi^0}e^{-i\tau/2}\{\alpha_0 e^{i\tau/2} + \alpha_1 e^{-i\tau/2}\}$"

and insert

-- $e^{-i2\pi f_0 t}e^{-i\varphi_0}\{\alpha_0 e^{-i\tau/2}e^{i\tau/2} + \alpha_1 e^{-i\tau/2}e^{-i\tau/2}\} = e^{-i2\pi f_0 t}e^{-i\varphi_0}e^{-i\tau/2}\{\alpha_0 e^{i\tau/2} + \alpha_1 e^{-i\tau/2}\}$ --, therefor.

In Column 100, Line 25, delete "XCPSE" and insert -- XCSPE --, therefor.

In Column 105, Line 34, delete "TR," and insert -- IR, --, therefor.